United States Patent
Wilson et al.

(10) Patent No.: US 12,228,889 B2
(45) Date of Patent: *Feb. 18, 2025

(54) CONFIGURING CONTEXT-SPECIFIC USER INTERFACES

(71) Applicant: Apple Inc., Cupertino, CA (US)

(72) Inventors: Eric Lance Wilson, San Jose, CA (US); Lee S. Broughton, Santa Cruz, CA (US); Christopher Wilson, Sonoma, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/236,340

(22) Filed: Aug. 21, 2023

(65) Prior Publication Data

US 2023/0393535 A1 Dec. 7, 2023

Related U.S. Application Data

(63) Continuation of application No. 17/349,226, filed on Jun. 16, 2021, now Pat. No. 11,733,656, which is a
(Continued)

(51) Int. Cl.
*G04G 21/04* (2013.01)
*G04G 21/08* (2010.01)
(Continued)

(52) U.S. Cl.
CPC .............. *G04G 21/04* (2013.01); *G04G 21/08* (2013.01); *G06F 3/016* (2013.01); *G06F 3/0414* (2013.01);
(Continued)

(58) Field of Classification Search
CPC ...... G04G 21/04; G04G 21/08; G06F 3/0414; G06F 9/451; G06F 3/0488;
(Continued)

(56) References Cited

U.S. PATENT DOCUMENTS 4,355,380 A 10/1982 Huguenin et al.
4,819,189 A 4/1989 Kikuchi et al.
(Continued)

FOREIGN PATENT DOCUMENTS

AU 2012202140 A1 5/2012
AU 2015100115 A4 3/2015
(Continued)

OTHER PUBLICATIONS

Applicant-Initiated Interview Summary received for U.S. Appl. No. 15/411,110, mailed on May 3, 2023, 3 pages.
(Continued)

*Primary Examiner* — Pei Yong Weng
(74) *Attorney, Agent, or Firm* — DLA Piper LLP (US)

(57) ABSTRACT

Techniques for configuring context-specific user interfaces for use with a portable multifunction device are disclosed. The context-specific user interfaces provide indications of time and, optionally, a variety of additional information. The methods provided herein allow for configuring such user interfaces, e.g., at a first electronic device coupled via wireless communication to a second electronic device. Further disclosed are non-transitory computer-readable storage media, systems, and devices configured to perform the methods described herein.

30 Claims, 53 Drawing Sheets

Related U.S. Application Data continuation of application No. 16/918,855, filed on Jul. 1, 2020, now Pat. No. 11,073,799, which is a continuation of application No. 15/418,537, filed on Jan. 27, 2017, now Pat. No. 10,739,974.

(60) Provisional application No. 62/348,902, filed on Jun. 11, 2016.

(51) Int. Cl.

| | | |
|---|---|---|
| *G06F 3/01* | (2006.01) | |
| *G06F 3/041* | (2006.01) | |
| *G06F 3/04812* | (2022.01) | |
| *G06F 3/04817* | (2022.01) | |
| *G06F 3/0482* | (2013.01) | |
| *G06F 3/04842* | (2022.01) | |
| *G06F 3/04845* | (2022.01) | |
| *G06F 3/04847* | (2022.01) | |
| *G06F 3/0485* | (2022.01) | |
| *G06F 3/0488* | (2022.01) | |
| *G06F 3/04883* | (2022.01) | |
| *G06F 3/04886* | (2022.01) | |
| *G06F 9/451* | (2018.01) | |
| *G06F 16/00* | (2019.01) | |
| *G06F 16/904* | (2019.01) | |
| *G06T 13/00* | (2011.01) | |

(52) U.S. Cl.
CPC ...... *G06F 3/04812* (2013.01); *G06F 3/04817* (2013.01); *G06F 3/0482* (2013.01); *G06F 3/04842* (2013.01); *G06F 3/04845* (2013.01); *G06F 3/04847* (2013.01); *G06F 3/0485* (2013.01); *G06F 3/0488* (2013.01); *G06F 3/04883* (2013.01); *G06F 3/04886* (2013.01); *G06F 9/451* (2018.02); *G06F 16/00* (2019.01); *G06F 16/904* (2019.01); *G06T 13/00* (2013.01); *G06F 2203/04105* (2013.01); *G06F 2203/04804* (2013.01); *G06F 2203/04808* (2013.01)

(58) Field of Classification Search
CPC .. G06F 3/04817; G06F 16/00; G06F 3/04886; G06F 3/016; G06F 3/04842; G06F 3/04812; G06F 16/904; G06F 3/0482; G06F 3/04845; G06F 3/04847; G06F 3/0485; G06F 3/04883; G06F 2203/04804; G06F 2203/04808; G06F 2203/04105; G06T 13/00
See application file for complete search history.

(56) References Cited

U.S. PATENT DOCUMENTS

| | | |
|---|---|---|
| 4,899,136 A | 2/1990 | Beard et al. |
| 4,974,174 A | 11/1990 | Kleinman |
| 5,051,736 A | 9/1991 | Bennett et al. |
| 5,124,959 A | 6/1992 | Yamazaki et al. |
| 5,146,556 A | 9/1992 | Hullot et al. |
| 5,196,838 A | 3/1993 | Meier et al. |
| 5,237,679 A | 8/1993 | Wang et al. |
| 5,305,435 A | 4/1994 | Bronson |
| 5,312,478 A | 5/1994 | Reed et al. |
| 5,333,256 A | 7/1994 | Green et al. |
| 5,430,496 A | 7/1995 | Silverbrook et al. |
| 5,452,414 A | 9/1995 | Rosendahl et al. |
| 5,463,725 A | 10/1995 | Henckel et al. |
| 5,491,778 A | 2/1996 | Gordon et al. |
| 5,497,454 A | 3/1996 | Bates et al. |
| 5,515,486 A | 5/1996 | Amro et al. |
| 5,544,295 A | 8/1996 | Capps |
| 5,546,529 A | 8/1996 | Bowers et al. |
| 5,557,711 A | 9/1996 | Malzbender et al. |
| 5,572,238 A | 11/1996 | Krivacic |
| 5,572,649 A | 11/1996 | Elliott et al. |
| 5,598,524 A | 1/1997 | Johnston et al. |
| 5,610,653 A | 3/1997 | Abecassis |
| 5,612,719 A | 3/1997 | Beernink et al. |
| 5,621,878 A | 4/1997 | Owens et al. |
| 5,625,818 A | 4/1997 | Zarmer et al. |
| 5,642,490 A | 6/1997 | Morgan et al. |
| 5,644,739 A | 7/1997 | Moursund |
| 5,651,107 A | 7/1997 | Frank et al. |
| 5,657,049 A | 8/1997 | Ludolph et al. |
| 5,671,381 A | 9/1997 | Strasnick et al. |
| 5,678,014 A | 10/1997 | Malamud et al. |
| 5,678,015 A | 10/1997 | Goh |
| 5,726,687 A | 3/1998 | Belfiore et al. |
| 5,736,974 A | 4/1998 | Selker |
| 5,745,096 A | 4/1998 | Ludolph et al. |
| 5,745,116 A | 4/1998 | Pisutha-arnond |
| 5,745,718 A | 4/1998 | Cline et al. |
| 5,745,910 A | 4/1998 | Piersol et al. |
| 5,754,179 A | 5/1998 | Hocker et al. |
| 5,754,809 A | 5/1998 | Gandre |
| 5,757,371 A | 5/1998 | Oran et al. |
| 5,760,773 A | 6/1998 | Berman et al. |
| 5,760,774 A | 6/1998 | Grossman et al. |
| 5,774,119 A | 6/1998 | Alimpich et al. |
| 5,796,401 A | 8/1998 | Winer |
| 5,798,752 A | 8/1998 | Buxton |
| 5,801,699 A | 9/1998 | Hocker et al. |
| 5,801,704 A | 9/1998 | Oohara et al. |
| 5,812,862 A | 9/1998 | Smith et al. |
| 5,825,352 A | 10/1998 | Bisset et al. |
| 5,825,357 A | 10/1998 | Malamud et al. |
| 5,835,079 A | 11/1998 | Shieh |
| 5,835,094 A | 11/1998 | Ermel et al. |
| 5,838,326 A | 11/1998 | Card et al. |
| 5,856,824 A | 1/1999 | Shieh |
| 5,861,885 A | 1/1999 | Strasnick et al. |
| 5,870,683 A | 2/1999 | Wells et al. |
| 5,870,734 A | 2/1999 | Kao |
| 5,877,765 A | 3/1999 | Dickman et al. |
| 5,877,775 A | 3/1999 | Theisen et al. |
| 5,880,733 A | 3/1999 | Horvitz et al. |
| 5,880,735 A | 3/1999 | Shinohara et al. |
| 5,880,743 A | 3/1999 | Moran et al. |
| 5,900,876 A | 5/1999 | Yagita et al. |
| 5,914,716 A | 6/1999 | Rubin et al. |
| 5,914,717 A | 6/1999 | Kleewein et al. |
| 5,923,327 A | 7/1999 | Smith et al. |
| 5,923,908 A | 7/1999 | Schrock et al. |
| 5,934,707 A | 8/1999 | Johnson |
| 5,943,039 A | 8/1999 | Anderson et al. |
| 5,943,679 A | 8/1999 | Niles et al. |
| 5,956,025 A | 9/1999 | Goulden et al. |
| 5,960,366 A | 9/1999 | Duwaer |
| 5,963,204 A | 10/1999 | Ikeda et al. |
| 5,973,694 A | 10/1999 | Steele et al. |
| 5,973,702 A | 10/1999 | Orton et al. |
| 5,995,106 A | 11/1999 | Naughton et al. |
| 6,002,398 A | 12/1999 | Wilson |
| 6,005,579 A | 12/1999 | Sugiyama et al. |
| 6,012,072 A | 1/2000 | Lucas et al. |
| 6,023,275 A | 2/2000 | Horvitz et al. |
| 6,043,816 A | 3/2000 | Williams et al. |
| 6,043,818 A | 3/2000 | Nakano et al. |
| 6,049,336 A | 4/2000 | Liu et al. |
| 6,054,989 A | 4/2000 | Robertson et al. |
| 6,072,486 A | 6/2000 | Sheldon et al. |
| 6,088,032 A | 7/2000 | Mackinlay |
| 6,111,573 A | 8/2000 | Mccomb et al. |
| 6,121,969 A | 9/2000 | Jain et al. |
| 6,133,914 A | 10/2000 | Rogers et al. |
| 6,160,551 A | 12/2000 | Naughton et al. |
| 6,166,736 A | 12/2000 | Hugh |
| 6,166,738 A | 12/2000 | Robertson et al. |
| 6,181,325 B1 | 1/2001 | Lee et al. |
| 6,188,407 B1 | 2/2001 | Smith et al. |

(56) References Cited

U.S. PATENT DOCUMENTS

| | | |
|---|---|---|
| 6,195,094 B1 | 2/2001 | Celebiler |
| 6,202,096 B1 | 3/2001 | Arnold et al. |
| 6,211,858 B1 | 4/2001 | Moon et al. |
| 6,215,490 B1 | 4/2001 | Kaply |
| 6,222,465 B1 | 4/2001 | Kumar et al. |
| 6,229,542 B1 | 5/2001 | Miller |
| 6,230,170 B1 | 5/2001 | Zellweger et al. |
| 6,232,957 B1 | 5/2001 | Hinckley |
| 6,253,218 B1 | 6/2001 | Aoki et al. |
| 6,275,935 B1 | 8/2001 | Barlow et al. |
| 6,278,454 B1 | 8/2001 | Krishnan |
| 6,300,951 B1 | 10/2001 | Filetto et al. |
| 6,310,633 B1 | 10/2001 | Graham et al. |
| 6,313,853 B1 | 11/2001 | Lamontagne et al. |
| 6,317,140 B1 | 11/2001 | Livingston |
| 6,333,752 B1 | 12/2001 | Hasegawa et al. |
| 6,336,126 B1 | 1/2002 | Bjorklund et al. |
| 6,353,451 B1 | 3/2002 | Teibel et al. |
| 6,369,794 B1 | 4/2002 | Sakurai et al. |
| 6,396,520 B1 | 5/2002 | Ording |
| 6,429,883 B1 | 8/2002 | Plow et al. |
| 6,452,597 B1 | 9/2002 | Goldberg et al. |
| 6,456,285 B2 | 9/2002 | Hayhurst et al. |
| 6,462,757 B1 | 10/2002 | Kao et al. |
| 6,477,117 B1 | 11/2002 | Narayanaswami et al. |
| 6,483,519 B1 | 11/2002 | Long et al. |
| 6,486,895 B1 | 11/2002 | Robertson et al. |
| 6,496,206 B1 | 12/2002 | Mernyk et al. |
| 6,496,209 B2 | 12/2002 | Horii |
| 6,515,675 B1 | 2/2003 | Bourdev et al. |
| 6,525,997 B1 | 2/2003 | Narayanaswami et al. |
| 6,545,669 B1 | 4/2003 | Kinawi et al. |
| 6,549,218 B1 | 4/2003 | Gershony et al. |
| 6,556,222 B1 | 4/2003 | Narayanaswami |
| 6,570,583 B1 | 5/2003 | Kung et al. |
| 6,571,245 B2 | 5/2003 | Huang et al. |
| 6,590,568 B1 | 7/2003 | Astala et al. |
| 6,597,345 B2 | 7/2003 | Hirshberg |
| 6,597,378 B1 | 7/2003 | Shiraishi et al. |
| 6,609,146 B1 | 8/2003 | Slotznick et al. |
| 6,621,509 B1 | 9/2003 | Eiref et al. |
| 6,628,309 B1 | 9/2003 | Dodson et al. |
| 6,628,310 B1 | 9/2003 | Hiura et al. |
| 6,636,245 B1 | 10/2003 | Estipona et al. |
| 6,636,246 B1 | 10/2003 | Gallo et al. |
| 6,647,534 B1 | 11/2003 | Graham |
| 6,661,438 B1 | 12/2003 | Shiraishi et al. |
| 6,670,970 B1 | 12/2003 | Silverman et al. |
| 6,683,628 B1 | 1/2004 | Nakagawa et al. |
| 6,690,623 B1 | 2/2004 | Maano |
| 6,700,612 B1 | 3/2004 | Anderson et al. |
| 6,710,788 B1 | 3/2004 | Freach et al. |
| 6,714,222 B1 | 3/2004 | Björn et al. |
| 6,734,859 B2 | 5/2004 | Hayashi et al. |
| 6,753,888 B2 | 6/2004 | Kamiwada et al. |
| 6,763,388 B1 | 7/2004 | Tsimelzon |
| 6,768,497 B2 | 7/2004 | Baar et al. |
| 6,774,914 B1 | 8/2004 | Benayoun |
| 6,781,575 B1 | 8/2004 | Hawkins et al. |
| 6,798,429 B2 | 9/2004 | Bradski |
| 6,801,230 B2 | 10/2004 | Driskell et al. |
| 6,809,724 B1 | 10/2004 | Shiraishi et al. |
| 6,816,175 B1 | 11/2004 | Hamp et al. |
| 6,820,111 B1 | 11/2004 | Rubin et al. |
| 6,822,638 B2 | 11/2004 | Dobies et al. |
| 6,847,387 B2 | 1/2005 | Roth |
| 6,850,150 B1 | 2/2005 | Ronkainen |
| 6,874,128 B1 | 3/2005 | Moore et al. |
| 6,880,132 B2 | 4/2005 | Uemura |
| 6,888,536 B2 | 5/2005 | Westerman et al. |
| 6,900,793 B2 | 5/2005 | Goh et al. |
| 6,915,490 B1 | 7/2005 | Ewing |
| 6,931,601 B2 | 8/2005 | Vronay et al. |
| 6,934,911 B2 | 8/2005 | Salmimaa et al. |
| 6,937,228 B2 | 8/2005 | Yu |
| 6,940,494 B2 | 9/2005 | Hoshino et al. |
| 6,957,395 B1 | 10/2005 | Jobs et al. |
| 6,963,349 B1 | 11/2005 | Nagasaki |
| 6,970,749 B1 | 11/2005 | Chinn et al. |
| 6,976,210 B1 | 12/2005 | Silva et al. |
| 6,976,228 B2 | 12/2005 | Bernhardson |
| 6,977,868 B2 | 12/2005 | Brewer et al. |
| 6,978,127 B1 | 12/2005 | Bulthuis et al. |
| 7,003,495 B1 | 2/2006 | Burger et al. |
| 7,007,239 B1 | 2/2006 | Hawkins et al. |
| 7,010,755 B2 | 3/2006 | Anderson et al. |
| 7,017,118 B1 | 3/2006 | Carroll |
| 7,043,701 B2 | 5/2006 | Gordon |
| 7,071,943 B2 | 7/2006 | Adler |
| 7,075,512 B1 | 7/2006 | Fabre et al. |
| 7,080,326 B2 | 7/2006 | Molander et al. |
| 7,081,905 B1 | 7/2006 | Raghunath |
| 7,088,340 B2 | 8/2006 | Kato |
| 7,093,201 B2 | 8/2006 | Duarte |
| 7,107,549 B2 | 9/2006 | Deaton et al. |
| 7,117,453 B2 | 10/2006 | Drucker et al. |
| 7,119,819 B1 | 10/2006 | Robertson et al. |
| 7,126,579 B2 | 10/2006 | Ritter |
| 7,133,859 B1 | 11/2006 | Wong |
| 7,134,092 B2 | 11/2006 | Fung et al. |
| 7,134,095 B1 | 11/2006 | Smith et al. |
| 7,136,064 B2 | 11/2006 | Zuiderveld et al. |
| 7,142,210 B2 | 11/2006 | Schwuttke et al. |
| 7,146,576 B2 | 12/2006 | Chang et al. |
| 7,155,667 B1 | 12/2006 | Kotler et al. |
| 7,162,488 B2 | 1/2007 | Wong et al. |
| 7,173,603 B2 | 2/2007 | Kawasome |
| 7,173,604 B2 | 2/2007 | Marvit et al. |
| 7,178,111 B2 | 2/2007 | Glein et al. |
| 7,194,527 B2 | 3/2007 | Drucker et al. |
| 7,194,698 B2 | 3/2007 | Gottfurcht et al. |
| 7,215,323 B2 | 5/2007 | Gombert et al. |
| 7,216,305 B1 | 5/2007 | Jaeger |
| 7,231,229 B1 | 6/2007 | Hawkins et al. |
| 7,237,240 B1 | 6/2007 | Chen et al. |
| 7,242,406 B2 | 7/2007 | Johnson et al. |
| 7,249,327 B2 | 7/2007 | Nelson et al. |
| 7,278,115 B1 | 10/2007 | Robertson et al. |
| 7,283,845 B2 | 10/2007 | De Bast |
| 7,287,232 B2 | 10/2007 | Tsuchimura et al. |
| 7,292,243 B1 | 11/2007 | Burke |
| 7,310,636 B2 | 12/2007 | Bodin et al. |
| 7,318,198 B2 | 1/2008 | Sakayori et al. |
| 7,340,678 B2 | 3/2008 | Chiu et al. |
| 7,355,593 B2 | 4/2008 | Hill et al. |
| 7,355,609 B1 | 4/2008 | Voas et al. |
| 7,362,331 B2 | 4/2008 | Ording |
| 7,383,497 B2 | 6/2008 | Glenner et al. |
| 7,392,488 B2 | 6/2008 | Card et al. |
| 7,403,211 B2 | 7/2008 | Sheasby et al. |
| 7,403,910 B1 | 7/2008 | Hastings et al. |
| 7,404,151 B2 | 7/2008 | Borchardt et al. |
| 7,406,666 B2 | 7/2008 | Davis et al. |
| 7,412,650 B2 | 8/2008 | Gallo |
| 7,415,677 B2 | 8/2008 | Arend et al. |
| 7,417,680 B2 | 8/2008 | Aoki et al. |
| 7,432,928 B2 | 10/2008 | Shaw et al. |
| 7,433,179 B2 | 10/2008 | Hisano et al. |
| 7,434,177 B1 | 10/2008 | Ording et al. |
| 7,437,005 B2 | 10/2008 | Drucker et al. |
| 7,444,390 B2 | 10/2008 | Tadayon et al. |
| 7,456,823 B2 | 11/2008 | Poupyrev et al. |
| 7,458,014 B1 | 11/2008 | Rubin et al. |
| 7,468,742 B2 | 12/2008 | Ahn et al. |
| 7,478,437 B2 | 1/2009 | Hatanaka et al. |
| 7,479,948 B2 | 1/2009 | Kim et al. |
| 7,480,872 B1 | 1/2009 | Ubillos |
| 7,480,873 B2 | 1/2009 | Kawahara |
| 7,487,467 B1 | 2/2009 | Kawahara et al. |
| 7,490,295 B2 | 2/2009 | Chaudhri et al. |
| 7,493,573 B2 | 2/2009 | Wagner |
| 7,496,595 B2 | 2/2009 | Accapadi |
| 7,506,268 B2 | 3/2009 | Jennings et al. |
| 7,509,321 B2 | 3/2009 | Wong et al. |

(56) References Cited

U.S. PATENT DOCUMENTS

| | | |
|---|---|---|
| 7,509,588 B2 | 3/2009 | Van Os et al. |
| 7,511,710 B2 | 3/2009 | Barrett |
| 7,512,898 B2 | 3/2009 | Jennings et al. |
| 7,523,414 B2 | 4/2009 | Schmidt et al. |
| 7,526,738 B2 | 4/2009 | Ording et al. |
| 7,545,367 B2 | 6/2009 | Sunda et al. |
| 7,546,548 B2 | 6/2009 | Chew et al. |
| 7,546,554 B2 | 6/2009 | Chiu et al. |
| 7,552,402 B2 | 6/2009 | Bilow |
| 7,557,804 B1 | 7/2009 | Mcdaniel et al. |
| 7,561,874 B2 | 7/2009 | Wang et al. |
| 7,584,278 B2 | 9/2009 | Rajarajan et al. |
| 7,587,683 B2 | 9/2009 | Ito et al. |
| 7,589,750 B1 | 9/2009 | Stratton |
| 7,594,185 B2 | 9/2009 | Anderson et al. |
| 7,596,761 B2 | 9/2009 | Lemay et al. |
| 7,596,766 B1 | 9/2009 | Sharma et al. |
| 7,600,192 B1 | 10/2009 | Hashimoto et al. |
| 7,606,819 B2 | 10/2009 | Audet et al. |
| 7,607,150 B1 | 10/2009 | Kobayashi et al. |
| 7,620,894 B1 | 11/2009 | Kahn |
| 7,624,357 B2 | 11/2009 | De Bast |
| 7,636,898 B2 | 12/2009 | Takahashi |
| 7,642,934 B2 | 1/2010 | Scott |
| 7,650,575 B2 | 1/2010 | Cummins et al. |
| 7,657,842 B2 | 2/2010 | Matthews et al. |
| 7,657,845 B2 | 2/2010 | Drucker et al. |
| 7,663,620 B2 | 2/2010 | Robertson et al. |
| 7,665,033 B2 | 2/2010 | Byrne et al. |
| 7,667,703 B2 | 2/2010 | Hong et al. |
| 7,680,817 B2 | 3/2010 | Audet et al. |
| 7,683,883 B2 | 3/2010 | Touma et al. |
| 7,693,992 B2 | 4/2010 | Watson |
| 7,698,658 B2 | 4/2010 | Ohwa et al. |
| 7,710,393 B2 | 5/2010 | Tsuk et al. |
| 7,710,423 B2 | 5/2010 | Drucker et al. |
| 7,716,603 B2 | 5/2010 | Boyden |
| 7,716,604 B2 | 5/2010 | Kataoka et al. |
| 7,719,523 B2 | 5/2010 | Hillis |
| 7,719,542 B1 | 5/2010 | Gough et al. |
| 7,724,242 B2 | 5/2010 | Hillis et al. |
| 7,725,839 B2 | 5/2010 | Michaels |
| 7,728,821 B2 | 6/2010 | Hillis et al. |
| 7,730,401 B2 | 6/2010 | Gillespie et al. |
| 7,730,423 B2 | 6/2010 | Graham |
| 7,735,021 B2 | 6/2010 | Padawer et al. |
| 7,738,911 B2 | 6/2010 | Kim |
| 7,739,604 B1 | 6/2010 | Lyons et al. |
| 7,739,622 B2 | 6/2010 | Deline et al. |
| 7,747,289 B2 | 6/2010 | Wang et al. |
| 7,761,813 B2 | 7/2010 | Kim et al. |
| 7,765,266 B2 | 7/2010 | Kropivny et al. |
| 7,765,488 B2 | 7/2010 | Pagan et al. |
| 7,770,125 B1 | 8/2010 | Young et al. |
| 7,783,990 B2 | 8/2010 | Amadio et al. |
| 7,791,755 B2 | 9/2010 | Mori |
| 7,797,637 B2 | 9/2010 | Marcjan et al. |
| 7,805,684 B2 | 9/2010 | Arvilommi |
| 7,810,038 B2 | 10/2010 | Matsa et al. |
| 7,814,112 B2 | 10/2010 | Gupta et al. |
| 7,840,901 B2 | 11/2010 | Lacey et al. |
| 7,840,907 B2 | 11/2010 | Kikuchi et al. |
| 7,840,912 B2 | 11/2010 | Elias et al. |
| 7,843,454 B1 | 11/2010 | Biswas |
| 7,853,972 B2 | 12/2010 | Brodersen et al. |
| 7,856,602 B2 | 12/2010 | Armstrong |
| 7,873,916 B1 | 1/2011 | Chaudhri et al. |
| 7,880,726 B2 | 2/2011 | Nakadaira et al. |
| 7,904,832 B2 | 3/2011 | Ubillos |
| 7,907,124 B2 | 3/2011 | Hillis et al. |
| 7,907,125 B2 | 3/2011 | Weiss et al. |
| 7,907,476 B2 | 3/2011 | Lee |
| 7,908,569 B2 | 3/2011 | Ala-rantala |
| 7,917,869 B2 | 3/2011 | Anderson |
| 7,924,444 B2 | 4/2011 | Takahashi |
| 7,940,250 B2 | 5/2011 | Forstall |
| 7,954,056 B2 | 5/2011 | Graham |
| 7,956,847 B2 | 6/2011 | Christie |
| 7,956,869 B1 | 6/2011 | Gilra |
| 7,958,457 B1 | 6/2011 | Brandenberg et al. |
| 7,965,276 B1 | 6/2011 | Martin et al. |
| 7,979,879 B2 | 7/2011 | Uchida et al. |
| 7,986,324 B2 | 7/2011 | Funaki et al. |
| 7,995,078 B2 | 8/2011 | Baar |
| 7,996,789 B2 | 8/2011 | Louch et al. |
| 8,020,110 B2 | 9/2011 | Hurst et al. |
| 8,024,671 B2 | 9/2011 | Lee et al. |
| 8,040,331 B2 | 10/2011 | Hill et al. |
| 8,046,705 B2 | 10/2011 | Hunleth et al. |
| 8,046,714 B2 | 10/2011 | Yahiro et al. |
| 8,059,101 B2 | 11/2011 | Westerman et al. |
| 8,064,704 B2 | 11/2011 | Kim et al. |
| 8,065,618 B2 | 11/2011 | Kumar et al. |
| 8,069,404 B2 | 11/2011 | Audet |
| 8,072,439 B2 | 12/2011 | Hillis et al. |
| 8,078,966 B2 | 12/2011 | Audet |
| 8,099,441 B2 | 1/2012 | Surasinghe |
| 8,103,963 B2 | 1/2012 | Ikeda et al. |
| 8,111,255 B2 | 2/2012 | Park |
| 8,125,481 B2 | 2/2012 | Gossweiler et al. |
| 8,130,211 B2 | 3/2012 | Abernathy |
| 8,139,043 B2 | 3/2012 | Hillis |
| 8,151,185 B2 | 4/2012 | Audet |
| 8,152,640 B2 | 4/2012 | Shirakawa et al. |
| 8,156,175 B2 | 4/2012 | Hopkins |
| 8,161,419 B2 | 4/2012 | Palahnuk et al. |
| 8,185,842 B2 | 5/2012 | Chang et al. |
| 8,188,985 B2 | 5/2012 | Hillis et al. |
| 8,191,011 B2 | 5/2012 | Abanami et al. |
| 8,194,036 B1 | 6/2012 | Geiss et al. |
| 8,196,061 B1 | 6/2012 | Bhojan |
| 8,205,172 B2 | 6/2012 | Wong et al. |
| 8,209,628 B1 | 6/2012 | Davidson et al. |
| 8,214,793 B1 | 7/2012 | Muthuswamy |
| 8,230,358 B1 | 7/2012 | Chaudhri |
| 8,232,990 B2 | 7/2012 | King et al. |
| 8,250,071 B1 | 8/2012 | Killalea et al. |
| 8,255,808 B2 | 8/2012 | Lindgren et al. |
| 8,259,163 B2 | 9/2012 | Bell |
| 8,266,550 B1 | 9/2012 | Cleron et al. |
| 8,269,729 B2 | 9/2012 | Han et al. |
| 8,269,739 B2 | 9/2012 | Hillis et al. |
| 8,279,241 B2 | 10/2012 | Fong |
| 8,290,777 B1 | 10/2012 | Nguyen et al. |
| 8,306,515 B2 | 11/2012 | Ryu et al. |
| 8,335,784 B2 | 12/2012 | Gutt et al. |
| 8,365,084 B1 | 1/2013 | Lin et al. |
| 8,423,911 B2 | 4/2013 | Chaudhri |
| 8,427,432 B2 | 4/2013 | Kim et al. |
| 8,434,027 B2 | 4/2013 | Jones |
| 8,443,280 B2 | 5/2013 | Noyes |
| 8,446,371 B2 | 5/2013 | Fyke et al. |
| 8,458,615 B2 | 6/2013 | Chaudhri |
| 8,487,882 B2 | 7/2013 | Inaba et al. |
| 8,499,236 B1 | 7/2013 | Keljo |
| 8,504,937 B2 | 8/2013 | Jobs et al. |
| 8,519,964 B2 | 8/2013 | Platzer et al. |
| 8,519,972 B2 | 8/2013 | Forstall |
| 8,525,839 B2 | 9/2013 | Chaudhri et al. |
| 8,533,623 B2 | 9/2013 | St. Jacques |
| 8,549,429 B2 | 10/2013 | Tsuruta et al. |
| 8,558,808 B2 | 10/2013 | Forstall |
| 8,564,544 B2 | 10/2013 | Jobs et al. |
| 8,566,700 B2 | 10/2013 | Ueda |
| 8,601,370 B2 | 12/2013 | Chiang et al. |
| 8,619,038 B2 | 12/2013 | Chaudhri et al. |
| 8,626,762 B2 | 1/2014 | Seung et al. |
| 8,656,040 B1 | 2/2014 | Bajaj et al. |
| 8,669,945 B2 | 3/2014 | Coddington |
| 8,672,885 B2 | 3/2014 | Kriesel et al. |
| 8,683,349 B2 | 3/2014 | Roberts et al. |
| 8,713,011 B2 | 4/2014 | Asai et al. |
| 8,713,469 B2 | 4/2014 | Park et al. |
| 8,730,188 B2 | 5/2014 | Pasquero et al. |

(56) References Cited

U.S. PATENT DOCUMENTS

| | | |
|---|---|---|
| 8,762,844 B2 | 6/2014 | Kim et al. |
| 8,782,513 B2 | 7/2014 | Migos et al. |
| 8,799,777 B1 | 8/2014 | Lee et al. |
| 8,799,821 B1 | 8/2014 | Sullivan et al. |
| 8,826,170 B1 | 9/2014 | Shah et al. |
| 8,839,128 B2 | 9/2014 | Krishnaraj et al. |
| 8,860,674 B2 | 10/2014 | Lee et al. |
| 8,881,060 B2 | 11/2014 | Chaudhri et al. |
| 8,881,061 B2 | 11/2014 | Chaudhri et al. |
| 8,952,886 B2 | 2/2015 | Tsuk et al. |
| 8,957,866 B2 | 2/2015 | Law et al. |
| 8,966,375 B2 | 2/2015 | Wasko |
| 8,972,898 B2 | 3/2015 | Carter |
| 9,026,508 B2 | 5/2015 | Nagai |
| 9,032,438 B2 | 5/2015 | Ozawa et al. |
| 9,053,462 B2 | 6/2015 | Cadiz et al. |
| 9,082,314 B2 | 7/2015 | Tsai |
| 9,152,312 B1 | 10/2015 | Terleski et al. |
| 9,170,708 B2 | 10/2015 | Chaudhri et al. |
| 9,176,652 B1 | 11/2015 | Patel et al. |
| 9,182,876 B2 | 11/2015 | Kim et al. |
| 9,189,089 B2 | 11/2015 | Sutton et al. |
| 9,229,624 B2 | 1/2016 | Wei et al. |
| 9,237,855 B2 | 1/2016 | Hong et al. |
| 9,239,673 B2 | 1/2016 | Shaffer et al. |
| 9,256,627 B2 | 2/2016 | Surasinghe |
| 9,259,615 B2 | 2/2016 | Weast et al. |
| 9,268,400 B2 | 2/2016 | Gomez Sainz-garcia |
| 9,367,232 B2 | 6/2016 | Platzer et al. |
| 9,377,762 B2 | 6/2016 | Hoobler et al. |
| 9,386,432 B2 | 7/2016 | Chu et al. |
| 9,417,787 B2 | 8/2016 | Fong et al. |
| 9,442,516 B2 | 9/2016 | Migos et al. |
| 9,448,691 B2 | 9/2016 | Suda |
| 9,552,015 B2 | 1/2017 | Capela et al. |
| D778,912 S | 2/2017 | Akana et al. |
| 9,582,187 B2 | 2/2017 | Gil et al. |
| 9,619,139 B2 | 4/2017 | Wada et al. |
| 9,619,143 B2 | 4/2017 | Christie et al. |
| 9,620,312 B2 | 4/2017 | Ely et al. |
| 9,715,277 B2 | 7/2017 | Lee et al. |
| 9,772,749 B2 | 9/2017 | Chaudhri et al. |
| 9,794,397 B2 | 10/2017 | Min et al. |
| 9,870,114 B1 | 1/2018 | Jones et al. |
| D813,239 S | 3/2018 | Akana et al. |
| 9,921,711 B2 | 3/2018 | Oh et al. |
| 9,933,913 B2 | 4/2018 | Van Os et al. |
| 9,965,144 B2 | 5/2018 | Nakamura et al. |
| 9,993,913 B2 | 6/2018 | Mccardle et al. |
| 10,019,097 B2 | 7/2018 | Ely et al. |
| 10,025,458 B2 | 7/2018 | Chaudhri et al. |
| 10,048,802 B2 | 8/2018 | Shedletsky et al. |
| 10,057,470 B2 | 8/2018 | Kim et al. |
| 10,133,439 B1 | 11/2018 | Brichter et al. |
| 10,165,108 B1 | 12/2018 | Douglas |
| 10,175,652 B2 | 1/2019 | Ely et al. |
| 10,216,147 B2 | 2/2019 | Ely et al. |
| 10,222,909 B2 | 3/2019 | Shedletsky et al. |
| 10,250,735 B2 | 4/2019 | Butcher et al. |
| 10,275,117 B2 | 4/2019 | Zambetti et al. |
| D849,749 S | 5/2019 | Akana et al. |
| 10,296,125 B2 | 5/2019 | Ely et al. |
| 10,324,620 B2 | 6/2019 | Balaram |
| 10,331,081 B2 | 6/2019 | Ely et al. |
| 10,331,082 B2 | 6/2019 | Ely et al. |
| 10,359,907 B2 | 7/2019 | Van Os et al. |
| 10,620,780 B2 | 4/2020 | Chaudhri et al. |
| 10,664,074 B2 | 5/2020 | Moussette et al. |
| 10,664,120 B1 | 5/2020 | Jones et al. |
| 10,684,592 B2 | 6/2020 | Chang et al. |
| 10,788,953 B2 | 9/2020 | Chaudhri et al. |
| 10,788,976 B2 | 9/2020 | Chaudhri et al. |
| 10,852,700 B2 | 12/2020 | Abramov |
| 10,884,579 B2 | 1/2021 | Van Os et al. |
| 10,915,224 B2 | 2/2021 | Van Os et al. |
| 11,009,833 B2 | 5/2021 | Essery |
| 11,068,128 B2 | 7/2021 | Zambetti et al. |
| 2001/0012018 A1 | 8/2001 | Hayhurst et al. |
| 2001/0024195 A1 | 9/2001 | Hayakawa |
| 2001/0024212 A1 | 9/2001 | Ohnishi |
| 2001/0038394 A1 | 11/2001 | Tsuchimura et al. |
| 2002/0008691 A1 | 1/2002 | Hanajima et al. |
| 2002/0010707 A1 | 1/2002 | Chang et al. |
| 2002/0015024 A1 | 2/2002 | Westerman et al. |
| 2002/0015042 A1 | 2/2002 | Robotham et al. |
| 2002/0015064 A1 | 2/2002 | Robotham et al. |
| 2002/0016187 A1 | 2/2002 | Hirayama et al. |
| 2002/0018051 A1 | 2/2002 | Singh |
| 2002/0024540 A1 | 2/2002 | Mccarthy |
| 2002/0038299 A1 | 3/2002 | Zernik et al. |
| 2002/0054090 A1 | 5/2002 | Silva et al. |
| 2002/0057287 A1 | 5/2002 | Crow et al. |
| 2002/0067376 A1 | 6/2002 | Martin et al. |
| 2002/0070935 A1 | 6/2002 | Suzuki et al. |
| 2002/0075334 A1 | 6/2002 | Yfantis |
| 2002/0078037 A1 | 6/2002 | Hatanaka et al. |
| 2002/0083101 A1 | 6/2002 | Card et al. |
| 2002/0085037 A1 | 7/2002 | Leavitt et al. |
| 2002/0087747 A1 | 7/2002 | Yamaguchi et al. |
| 2002/0091697 A1 | 7/2002 | Huang et al. |
| 2002/0093531 A1 | 7/2002 | Barile |
| 2002/0097261 A1 | 7/2002 | Gottfurcht et al. |
| 2002/0101457 A1 | 8/2002 | Lang |
| 2002/0104096 A1 | 8/2002 | Cramer et al. |
| 2002/0109721 A1 | 8/2002 | Konaka et al. |
| 2002/0113802 A1 | 8/2002 | Card et al. |
| 2002/0118230 A1 | 8/2002 | Card et al. |
| 2002/0120651 A1 | 8/2002 | Pustejovsky et al. |
| 2002/0122072 A1 | 9/2002 | Selker |
| 2002/0140698 A1 | 10/2002 | Robertson et al. |
| 2002/0140736 A1 | 10/2002 | Chen et al. |
| 2002/0143949 A1 | 10/2002 | Rajarajan et al. |
| 2002/0149561 A1 | 10/2002 | Fukumoto et al. |
| 2002/0152222 A1 | 10/2002 | Holbrook |
| 2002/0152255 A1 | 10/2002 | Smith et al. |
| 2002/0163592 A1 | 11/2002 | Ueda |
| 2002/0167683 A1 | 11/2002 | Hanamoto et al. |
| 2002/0191029 A1 | 12/2002 | Gillespie et al. |
| 2002/0196238 A1 | 12/2002 | Tsukada et al. |
| 2003/0001898 A1 | 1/2003 | Bernhardson |
| 2003/0007012 A1 | 1/2003 | Bate |
| 2003/0016241 A1 | 1/2003 | Burke |
| 2003/0020671 A1 | 1/2003 | Santoro et al. |
| 2003/0030664 A1 | 2/2003 | Parry |
| 2003/0030673 A1 | 2/2003 | Ho |
| 2003/0048295 A1 | 3/2003 | Lilleness et al. |
| 2003/0063072 A1 | 4/2003 | Brandenberg et al. |
| 2003/0063126 A1 | 4/2003 | Yanchar et al. |
| 2003/0076301 A1 | 4/2003 | Tsuk et al. |
| 2003/0076352 A1 | 4/2003 | Uhlig et al. |
| 2003/0080991 A1 | 5/2003 | Crow et al. |
| 2003/0085931 A1 | 5/2003 | Card et al. |
| 2003/0090572 A1 | 5/2003 | Belz et al. |
| 2003/0097361 A1 | 5/2003 | Huang et al. |
| 2003/0098891 A1 | 5/2003 | Molander et al. |
| 2003/0098894 A1 | 5/2003 | Sheldon et al. |
| 2003/0103044 A1 | 6/2003 | Sunda et al. |
| 2003/0122787 A1 | 7/2003 | Zimmerman et al. |
| 2003/0128242 A1 | 7/2003 | Gordon |
| 2003/0142136 A1 | 7/2003 | Carter et al. |
| 2003/0142137 A1 | 7/2003 | Brown et al. |
| 2003/0142288 A1 | 7/2003 | Kinrot et al. |
| 2003/0154190 A1 | 8/2003 | Misawa et al. |
| 2003/0156119 A1 | 8/2003 | Bonadio |
| 2003/0156140 A1 | 8/2003 | Watanabe et al. |
| 2003/0156756 A1 | 8/2003 | Gokturk et al. |
| 2003/0158927 A1 | 8/2003 | Sagey et al. |
| 2003/0160825 A1 | 8/2003 | Weber |
| 2003/0164827 A1 | 9/2003 | Gottesman et al. |
| 2003/0169288 A1 | 9/2003 | Misawa |
| 2003/0169298 A1 | 9/2003 | Ording |
| 2003/0169302 A1 | 9/2003 | Davidsson et al. |
| 2003/0174170 A1 | 9/2003 | Jung et al. |
| 2003/0174172 A1 | 9/2003 | Conrad et al. |

(56) References Cited

U.S. PATENT DOCUMENTS

| | | |
|---|---|---|
| 2003/0184552 A1 | 10/2003 | Chadha |
| 2003/0184587 A1 | 10/2003 | Ording et al. |
| 2003/0184598 A1 | 10/2003 | Graham |
| 2003/0189597 A1 | 10/2003 | Anderson et al. |
| 2003/0195950 A1 | 10/2003 | Huang et al. |
| 2003/0200289 A1 | 10/2003 | Kemp et al. |
| 2003/0206195 A1 | 11/2003 | Matsa et al. |
| 2003/0206197 A1 | 11/2003 | Mcinerney |
| 2003/0210278 A1 | 11/2003 | Kyoya et al. |
| 2003/0226142 A1 | 12/2003 | Rand |
| 2004/0008224 A1 | 1/2004 | Molander et al. |
| 2004/0012718 A1 | 1/2004 | Sullivan et al. |
| 2004/0017404 A1 | 1/2004 | Schileru-key |
| 2004/0021643 A1 | 2/2004 | Hoshino et al. |
| 2004/0027330 A1 | 2/2004 | Bradski |
| 2004/0056809 A1 | 3/2004 | Prassmayer et al. |
| 2004/0056839 A1 | 3/2004 | Yoshihara |
| 2004/0061678 A1 | 4/2004 | Goh et al. |
| 2004/0070608 A1 | 4/2004 | Saka |
| 2004/0073935 A1 | 4/2004 | Kang |
| 2004/0080531 A1 | 4/2004 | Berstis |
| 2004/0085328 A1 | 5/2004 | Maruyama et al. |
| 2004/0103156 A1 | 5/2004 | Quillen et al. |
| 2004/0109013 A1 | 6/2004 | Goertz |
| 2004/0119728 A1 | 6/2004 | Blanco et al. |
| 2004/0119757 A1 | 6/2004 | Corley et al. |
| 2004/0121823 A1 | 6/2004 | Noesgaard et al. |
| 2004/0125081 A1 | 7/2004 | Hayakawa |
| 2004/0125088 A1 | 7/2004 | Zimmerman et al. |
| 2004/0130581 A1 | 7/2004 | Howard et al. |
| 2004/0138569 A1 | 7/2004 | Grunwald et al. |
| 2004/0141009 A1 | 7/2004 | Hinckley et al. |
| 2004/0141011 A1 | 7/2004 | Smethers et al. |
| 2004/0141016 A1 | 7/2004 | Fukatsu et al. |
| 2004/0143430 A1 | 7/2004 | Said et al. |
| 2004/0143598 A1 | 7/2004 | Drucker et al. |
| 2004/0155909 A1 | 8/2004 | Wagner |
| 2004/0160462 A1 | 8/2004 | Sheasby et al. |
| 2004/0196267 A1 | 10/2004 | Kawai et al. |
| 2004/0203835 A1 | 10/2004 | Trottier et al. |
| 2004/0205514 A1 | 10/2004 | Sommerer et al. |
| 2004/0215719 A1 | 10/2004 | Altshuler |
| 2004/0218104 A1 | 11/2004 | Smith et al. |
| 2004/0218451 A1 | 11/2004 | Said et al. |
| 2004/0222975 A1 | 11/2004 | Nakano et al. |
| 2004/0230599 A1 | 11/2004 | Moore et al. |
| 2004/0236769 A1 | 11/2004 | Smith et al. |
| 2004/0239692 A1 | 12/2004 | Balle et al. |
| 2004/0252119 A1 | 12/2004 | Hunleth et al. |
| 2004/0257375 A1 | 12/2004 | Cowperthwaite |
| 2004/0257384 A1 | 12/2004 | Park et al. |
| 2004/0264301 A1 | 12/2004 | Howard et al. |
| 2005/0005246 A1 | 1/2005 | Card et al. |
| 2005/0005248 A1 | 1/2005 | Rockey et al. |
| 2005/0010955 A1 | 1/2005 | Elia et al. |
| 2005/0012862 A1 | 1/2005 | Lee |
| 2005/0024341 A1 | 2/2005 | Gillespie et al. |
| 2005/0026644 A1 | 2/2005 | Lien |
| 2005/0039134 A1 | 2/2005 | Wiggeshoff et al. |
| 2005/0043987 A1 | 2/2005 | Kumar et al. |
| 2005/0052471 A1 | 3/2005 | Nagasaki |
| 2005/0057524 A1 | 3/2005 | Hill et al. |
| 2005/0057530 A1 | 3/2005 | Hinckley et al. |
| 2005/0057548 A1 | 3/2005 | Kim |
| 2005/0060653 A1 | 3/2005 | Fukase et al. |
| 2005/0060664 A1 | 3/2005 | Rogers |
| 2005/0060665 A1 | 3/2005 | Rekimoto |
| 2005/0088423 A1 | 4/2005 | Keely et al. |
| 2005/0091596 A1 | 4/2005 | Anthony et al. |
| 2005/0091609 A1 | 4/2005 | Matthews et al. |
| 2005/0097089 A1 | 5/2005 | Nielsen et al. |
| 2005/0116026 A1 | 6/2005 | Burger et al. |
| 2005/0116941 A1 | 6/2005 | Wallington et al. |
| 2005/0119031 A1 | 6/2005 | Spalink et al. |
| 2005/0120142 A1 | 6/2005 | Hall |
| 2005/0131924 A1 | 6/2005 | Jones |
| 2005/0132281 A1 | 6/2005 | Pan et al. |
| 2005/0134578 A1 | 6/2005 | Chambers et al. |
| 2005/0138570 A1 | 6/2005 | Good et al. |
| 2005/0151742 A1 | 7/2005 | Hong et al. |
| 2005/0177796 A1 | 8/2005 | Takahashi |
| 2005/0204309 A1 | 9/2005 | Szeto |
| 2005/0209051 A1 | 9/2005 | Santomassimo et al. |
| 2005/0210410 A1 | 9/2005 | Ohwa et al. |
| 2005/0210412 A1 | 9/2005 | Matthews et al. |
| 2005/0216913 A1 | 9/2005 | Gemmell et al. |
| 2005/0223068 A1 | 10/2005 | Shohfi et al. |
| 2005/0227642 A1 | 10/2005 | Jensen |
| 2005/0229102 A1 | 10/2005 | Watson et al. |
| 2005/0246331 A1 | 11/2005 | De Vorchik et al. |
| 2005/0246918 A1 | 11/2005 | Tanahashi et al. |
| 2005/0251755 A1 | 11/2005 | Mullins et al. |
| 2005/0259087 A1 | 11/2005 | Hoshino et al. |
| 2005/0262448 A1 | 11/2005 | Vronay et al. |
| 2005/0267756 A1 | 12/2005 | Schultz et al. |
| 2005/0270276 A1 | 12/2005 | Sugimoto et al. |
| 2005/0275636 A1 | 12/2005 | Dehlin et al. |
| 2005/0278757 A1 | 12/2005 | Grossman et al. |
| 2005/0283734 A1 | 12/2005 | Santoro et al. |
| 2005/0289109 A1 | 12/2005 | Arrouye et al. |
| 2005/0289476 A1 | 12/2005 | Tokkonen |
| 2005/0289482 A1 | 12/2005 | Anthony et al. |
| 2006/0004685 A1 | 1/2006 | Pyhalammi et al. |
| 2006/0005207 A1 | 1/2006 | Louch et al. |
| 2006/0007182 A1 | 1/2006 | Sato et al. |
| 2006/0020903 A1 | 1/2006 | Wang et al. |
| 2006/0022955 A1 | 2/2006 | Kennedy |
| 2006/0025110 A1 | 2/2006 | Liu |
| 2006/0026521 A1 | 2/2006 | Hotelling et al. |
| 2006/0026535 A1 | 2/2006 | Hotelling et al. |
| 2006/0026536 A1 | 2/2006 | Hotelling et al. |
| 2006/0028446 A1 | 2/2006 | Liberty et al. |
| 2006/0031874 A1 | 2/2006 | Ok et al. |
| 2006/0033751 A1 | 2/2006 | Keely et al. |
| 2006/0035628 A1 | 2/2006 | Miller et al. |
| 2006/0036568 A1 | 2/2006 | Moore et al. |
| 2006/0036962 A1 | 2/2006 | Jobs et al. |
| 2006/0041846 A1 | 2/2006 | Masselle et al. |
| 2006/0048069 A1 | 3/2006 | Igeta |
| 2006/0051073 A1 | 3/2006 | Jung et al. |
| 2006/0053392 A1 | 3/2006 | Salmimaa et al. |
| 2006/0055700 A1 | 3/2006 | Niles et al. |
| 2006/0064716 A1 | 3/2006 | Sull et al. |
| 2006/0070007 A1 | 3/2006 | Cummins et al. |
| 2006/0071918 A1 | 4/2006 | Mori et al. |
| 2006/0075355 A1 | 4/2006 | Shiono et al. |
| 2006/0075396 A1 | 4/2006 | Surasinghe |
| 2006/0080386 A1 | 4/2006 | Roykkee et al. |
| 2006/0080616 A1 | 4/2006 | Vogel et al. |
| 2006/0080617 A1 | 4/2006 | Anderson et al. |
| 2006/0090022 A1 | 4/2006 | Flynn et al. |
| 2006/0092133 A1 | 5/2006 | Touma et al. |
| 2006/0092770 A1 | 5/2006 | Demas |
| 2006/0097991 A1 | 5/2006 | Hotelling et al. |
| 2006/0098221 A1 | 5/2006 | Ferlitsch et al. |
| 2006/0101122 A1 | 5/2006 | Ishii |
| 2006/0107231 A1 | 5/2006 | Matthews et al. |
| 2006/0112335 A1 | 5/2006 | Hofmeister et al. |
| 2006/0112347 A1 | 5/2006 | Baudisch |
| 2006/0116578 A1 | 6/2006 | Grunwald et al. |
| 2006/0117372 A1 | 6/2006 | Hopkins |
| 2006/0119619 A1 | 6/2006 | Fagans et al. |
| 2006/0123353 A1 | 6/2006 | Matthews et al. |
| 2006/0123359 A1 | 6/2006 | Schatzberger et al. |
| 2006/0123360 A1 | 6/2006 | Anwar et al. |
| 2006/0125799 A1 | 6/2006 | Hillis et al. |
| 2006/0129586 A1 | 6/2006 | Arrouye et al. |
| 2006/0143574 A1 | 6/2006 | Ito et al. |
| 2006/0150215 A1 | 7/2006 | Wroblewski et al. |
| 2006/0153531 A1 | 7/2006 | Kanegae et al. |
| 2006/0161863 A1 | 7/2006 | Gallo |
| 2006/0161870 A1 | 7/2006 | Hotelling et al. |
| 2006/0161871 A1 | 7/2006 | Hotelling et al. |
| 2006/0164418 A1 | 7/2006 | Hao et al. |

(56) References Cited

U.S. PATENT DOCUMENTS

| | | |
|---|---|---|
| 2006/0174211 A1 | 8/2006 | Hoellerer et al. |
| 2006/0187212 A1 | 8/2006 | Park et al. |
| 2006/0189278 A1 | 8/2006 | Scott et al. |
| 2006/0190833 A1 | 8/2006 | Sangiovanni et al. |
| 2006/0197752 A1 | 9/2006 | Hurst et al. |
| 2006/0197753 A1 | 9/2006 | Hotelling |
| 2006/0209035 A1 | 9/2006 | Jenkins et al. |
| 2006/0210958 A1 | 9/2006 | Rimas-ribikauskas et al. |
| 2006/0212828 A1 | 9/2006 | Yahiro et al. |
| 2006/0212833 A1 | 9/2006 | Gallagher et al. |
| 2006/0230346 A1 | 10/2006 | Bhogal et al. |
| 2006/0236266 A1 | 10/2006 | Majava |
| 2006/0239640 A1 | 10/2006 | Watanabe et al. |
| 2006/0242596 A1 | 10/2006 | Armstrong |
| 2006/0242604 A1 | 10/2006 | Wong et al. |
| 2006/0242607 A1 | 10/2006 | Hudson |
| 2006/0242668 A1 | 10/2006 | Chouraqui |
| 2006/0250578 A1 | 11/2006 | Pohl et al. |
| 2006/0253771 A1 | 11/2006 | Baschy |
| 2006/0262116 A1 | 11/2006 | Moshiri et al. |
| 2006/0267966 A1 | 11/2006 | Grossman et al. |
| 2006/0268100 A1 | 11/2006 | Karukka et al. |
| 2006/0271864 A1 | 11/2006 | Satterfield et al. |
| 2006/0271867 A1 | 11/2006 | Wang et al. |
| 2006/0271874 A1 | 11/2006 | Raiz et al. |
| 2006/0277460 A1 | 12/2006 | Forstall et al. |
| 2006/0277481 A1 | 12/2006 | Forstall et al. |
| 2006/0277486 A1 | 12/2006 | Skinner |
| 2006/0278692 A1 | 12/2006 | Matsumoto et al. |
| 2006/0282790 A1 | 12/2006 | Matthews et al. |
| 2006/0284852 A1 | 12/2006 | Hofmeister et al. |
| 2006/0290661 A1 | 12/2006 | Innanen et al. |
| 2007/0005581 A1 | 1/2007 | Arrouye et al. |
| 2007/0013665 A1 | 1/2007 | Vetelainen et al. |
| 2007/0016872 A1 | 1/2007 | Cummins et al. |
| 2007/0016958 A1 | 1/2007 | Bodepudi et al. |
| 2007/0024468 A1 | 2/2007 | Quandel et al. |
| 2007/0028269 A1 | 2/2007 | Nezu et al. |
| 2007/0030362 A1 | 2/2007 | Ota et al. |
| 2007/0031119 A1 | 2/2007 | Iwanaga |
| 2007/0032267 A1 | 2/2007 | Haitani et al. |
| 2007/0035513 A1 | 2/2007 | Sherrard et al. |
| 2007/0036346 A1 | 2/2007 | Kwon |
| 2007/0044029 A1 | 2/2007 | Fisher et al. |
| 2007/0050432 A1 | 3/2007 | Yoshizawa |
| 2007/0050726 A1 | 3/2007 | Wakai et al. |
| 2007/0050727 A1 | 3/2007 | Lewis-bowen et al. |
| 2007/0055940 A1 | 3/2007 | Moore et al. |
| 2007/0055947 A1 | 3/2007 | Ostojic et al. |
| 2007/0061745 A1 | 3/2007 | Anthony et al. |
| 2007/0065044 A1 | 3/2007 | Park et al. |
| 2007/0067272 A1 | 3/2007 | Flynt et al. |
| 2007/0070066 A1 | 3/2007 | Bakhash |
| 2007/0083827 A1 | 4/2007 | Scott et al. |
| 2007/0083828 A1 | 4/2007 | Toriyama et al. |
| 2007/0083911 A1 | 4/2007 | Madden et al. |
| 2007/0091068 A1 | 4/2007 | Liberty |
| 2007/0101292 A1 | 5/2007 | Kupka |
| 2007/0101297 A1 | 5/2007 | Forstall et al. |
| 2007/0106949 A1 | 5/2007 | Narita et al. |
| 2007/0106950 A1 | 5/2007 | Hutchinson et al. |
| 2007/0113207 A1 | 5/2007 | Gritton |
| 2007/0120832 A1 | 5/2007 | Saarinen et al. |
| 2007/0121869 A1 | 5/2007 | Gorti et al. |
| 2007/0123205 A1 | 5/2007 | Lee et al. |
| 2007/0124677 A1 | 5/2007 | De Los Reyes et al. |
| 2007/0126696 A1 | 6/2007 | Boillot |
| 2007/0126732 A1 | 6/2007 | Robertson et al. |
| 2007/0132733 A1 | 6/2007 | Ram |
| 2007/0132789 A1 | 6/2007 | Ording et al. |
| 2007/0136351 A1 | 6/2007 | Dames et al. |
| 2007/0146325 A1 | 6/2007 | Poston et al. |
| 2007/0150810 A1 | 6/2007 | Katz et al. |
| 2007/0150834 A1 | 6/2007 | Muller et al. |
| 2007/0150835 A1 | 6/2007 | Muller et al. |
| 2007/0152958 A1 | 7/2007 | Ahn et al. |
| 2007/0152980 A1 | 7/2007 | Kocienda et al. |
| 2007/0156697 A1 | 7/2007 | Tsarkova |
| 2007/0157089 A1 | 7/2007 | Van Os et al. |
| 2007/0157094 A1 | 7/2007 | Lemay et al. |
| 2007/0157097 A1 | 7/2007 | Peters et al. |
| 2007/0174761 A1 | 7/2007 | Lin et al. |
| 2007/0174785 A1 | 7/2007 | Perttula |
| 2007/0177803 A1 | 8/2007 | Elias et al. |
| 2007/0177804 A1 | 8/2007 | Elias et al. |
| 2007/0179938 A1 | 8/2007 | Ikeda et al. |
| 2007/0180379 A1 | 8/2007 | Osato et al. |
| 2007/0180395 A1 | 8/2007 | Yamashita et al. |
| 2007/0182999 A1 | 8/2007 | Anthony et al. |
| 2007/0188518 A1 | 8/2007 | Vale et al. |
| 2007/0189737 A1 | 8/2007 | Chaudhri et al. |
| 2007/0192741 A1 | 8/2007 | Yoritate et al. |
| 2007/0209004 A1 | 9/2007 | Layard |
| 2007/0211042 A1 | 9/2007 | Kim et al. |
| 2007/0226652 A1 | 9/2007 | Kikuchi et al. |
| 2007/0229458 A1 | 10/2007 | Moon |
| 2007/0233736 A1 | 10/2007 | Xiong et al. |
| 2007/0236475 A1 | 10/2007 | Wherry |
| 2007/0236479 A1 | 10/2007 | Wang et al. |
| 2007/0237492 A1 | 10/2007 | Roberts et al. |
| 2007/0237493 A1 | 10/2007 | Hall et al. |
| 2007/0239760 A1 | 10/2007 | Simon |
| 2007/0239831 A1 | 10/2007 | Basu |
| 2007/0240079 A1 | 10/2007 | Flynt et al. |
| 2007/0243862 A1 | 10/2007 | Coskun et al. |
| 2007/0243905 A1 | 10/2007 | Juh et al. |
| 2007/0245250 A1 | 10/2007 | Schechter et al. |
| 2007/0247425 A1 | 10/2007 | Liberty et al. |
| 2007/0250793 A1 | 10/2007 | Miura et al. |
| 2007/0250794 A1 | 10/2007 | Miura et al. |
| 2007/0265929 A1 | 11/2007 | Danninger |
| 2007/0266011 A1 | 11/2007 | Rohrs et al. |
| 2007/0271532 A1 | 11/2007 | Nguyen et al. |
| 2007/0277121 A1 | 11/2007 | Beckman |
| 2007/0288860 A1 | 12/2007 | Ording et al. |
| 2007/0288862 A1 | 12/2007 | Ording |
| 2007/0288868 A1 | 12/2007 | Rhee et al. |
| 2007/0294231 A1 | 12/2007 | Kaihotsu |
| 2007/0300181 A1 | 12/2007 | Hattori et al. |
| 2008/0001924 A1 | 1/2008 | De Los Reyes et al. |
| 2008/0005702 A1 | 1/2008 | Skourup et al. |
| 2008/0005703 A1 | 1/2008 | Radivojevic et al. |
| 2008/0006762 A1 | 1/2008 | Fadell et al. |
| 2008/0014917 A1 | 1/2008 | Rhoads et al. |
| 2008/0016468 A1 | 1/2008 | Chambers et al. |
| 2008/0016470 A1 | 1/2008 | Misawa et al. |
| 2008/0016471 A1 | 1/2008 | Park |
| 2008/0024454 A1 | 1/2008 | Everest et al. |
| 2008/0034013 A1 | 2/2008 | Cisler et al. |
| 2008/0034309 A1 | 2/2008 | Louch et al. |
| 2008/0034317 A1 | 2/2008 | Fard et al. |
| 2008/0040668 A1 | 2/2008 | Ala-rantala |
| 2008/0052945 A1 | 3/2008 | Matas et al. |
| 2008/0059915 A1 | 3/2008 | Boillot |
| 2008/0062126 A1 | 3/2008 | Algreatly |
| 2008/0062127 A1 | 3/2008 | Brodersen et al. |
| 2008/0062141 A1 | 3/2008 | Chaudhri |
| 2008/0062257 A1 | 3/2008 | Corson |
| 2008/0066135 A1 | 3/2008 | Brodersen et al. |
| 2008/0067626 A1 | 3/2008 | Hirler et al. |
| 2008/0077952 A1 | 3/2008 | St. Jean et al. |
| 2008/0082930 A1 | 4/2008 | Omernick et al. |
| 2008/0089587 A1 | 4/2008 | Kim et al. |
| 2008/0091763 A1 | 4/2008 | Devonshire et al. |
| 2008/0092158 A1 | 4/2008 | Bhatnagar et al. |
| 2008/0094368 A1 | 4/2008 | Ording et al. |
| 2008/0094369 A1 | 4/2008 | Ganatra et al. |
| 2008/0104515 A1 | 5/2008 | Dumitru et al. |
| 2008/0109408 A1 | 5/2008 | Choi et al. |
| 2008/0109839 A1 | 5/2008 | Bruce et al. |
| 2008/0117461 A1 | 5/2008 | Mitsutake et al. |
| 2008/0120568 A1 | 5/2008 | Jian et al. |
| 2008/0122796 A1 | 5/2008 | Jobs et al. |
| 2008/0125180 A1 | 5/2008 | Hoffman et al. |

(56) References Cited

U.S. PATENT DOCUMENTS

| | | |
|---|---|---|
| 2008/0126971 A1 | 5/2008 | Kojima |
| 2008/0130421 A1 | 6/2008 | Akaiwa et al. |
| 2008/0134033 A1 | 6/2008 | Burns et al. |
| 2008/0134088 A1 | 6/2008 | Tse et al. |
| 2008/0136785 A1 | 6/2008 | Baudisch et al. |
| 2008/0136790 A1 | 6/2008 | Hio |
| 2008/0141182 A1 | 6/2008 | Barsness et al. |
| 2008/0147214 A1 | 6/2008 | Lee et al. |
| 2008/0148182 A1 | 6/2008 | Chiang et al. |
| 2008/0151700 A1 | 6/2008 | Inoue et al. |
| 2008/0152201 A1 | 6/2008 | Zhang et al. |
| 2008/0155437 A1 | 6/2008 | Morris |
| 2008/0155453 A1 | 6/2008 | Othmer et al. |
| 2008/0155617 A1 | 6/2008 | Angiolillo et al. |
| 2008/0158145 A1 | 7/2008 | Westerman |
| 2008/0158172 A1 | 7/2008 | Hotelling et al. |
| 2008/0161045 A1 | 7/2008 | Vuorenmaa |
| 2008/0163059 A1 | 7/2008 | Craner |
| 2008/0163119 A1 | 7/2008 | Kim et al. |
| 2008/0164468 A1 | 7/2008 | Chen et al. |
| 2008/0165140 A1 | 7/2008 | Christie et al. |
| 2008/0168073 A1 | 7/2008 | Siegel et al. |
| 2008/0168365 A1 | 7/2008 | Chaudhri |
| 2008/0168367 A1 | 7/2008 | Chaudhri et al. |
| 2008/0168368 A1 | 7/2008 | Louch et al. |
| 2008/0168382 A1 | 7/2008 | Louch et al. |
| 2008/0168401 A1 | 7/2008 | Boule et al. |
| 2008/0168404 A1 | 7/2008 | Ording |
| 2008/0168478 A1 | 7/2008 | Platzer et al. |
| 2008/0172634 A1 | 7/2008 | Choi et al. |
| 2008/0180406 A1 | 7/2008 | Han et al. |
| 2008/0182628 A1 | 7/2008 | Lee et al. |
| 2008/0184112 A1 | 7/2008 | Chiang et al. |
| 2008/0186808 A1 | 8/2008 | Lee |
| 2008/0200154 A1 | 8/2008 | Maharajh et al. |
| 2008/0201225 A1 | 8/2008 | Maharajh et al. |
| 2008/0201649 A1 | 8/2008 | Mattila et al. |
| 2008/0204424 A1 | 8/2008 | Jin et al. |
| 2008/0206600 A1 | 8/2008 | Loloee |
| 2008/0207281 A1 | 8/2008 | Tsuchiya et al. |
| 2008/0215980 A1 | 9/2008 | Lee et al. |
| 2008/0216017 A1 | 9/2008 | Kurtenbach et al. |
| 2008/0222545 A1 | 9/2008 | Lemay et al. |
| 2008/0225007 A1 | 9/2008 | Nakadaira et al. |
| 2008/0229237 A1 | 9/2008 | Pagan et al. |
| 2008/0229254 A1 | 9/2008 | Warner |
| 2008/0231610 A1 | 9/2008 | Hotelling et al. |
| 2008/0244119 A1 | 10/2008 | Tokuhara et al. |
| 2008/0244644 A1 | 10/2008 | Mccausland |
| 2008/0256115 A1 | 10/2008 | Beletski et al. |
| 2008/0259045 A1 | 10/2008 | Kim et al. |
| 2008/0259057 A1 | 10/2008 | Brons |
| 2008/0266407 A1 | 10/2008 | Battles et al. |
| 2008/0268948 A1 | 10/2008 | Boesen |
| 2008/0276201 A1 | 11/2008 | Risch et al. |
| 2008/0279475 A1 | 11/2008 | Lee et al. |
| 2008/0282202 A1 | 11/2008 | Sunday |
| 2008/0288600 A1 | 11/2008 | Clark |
| 2008/0294981 A1 | 11/2008 | Balzano et al. |
| 2008/0300055 A1 | 12/2008 | Lutnick et al. |
| 2008/0300572 A1 | 12/2008 | Rankers et al. |
| 2008/0307350 A1 | 12/2008 | Sabatelli et al. |
| 2008/0307361 A1 | 12/2008 | Louch et al. |
| 2008/0307362 A1 | 12/2008 | Chaudhri et al. |
| 2008/0309632 A1 | 12/2008 | Westerman et al. |
| 2008/0313110 A1 | 12/2008 | Kreamer et al. |
| 2008/0313596 A1 | 12/2008 | Kreamer et al. |
| 2008/0319944 A1 | 12/2008 | Venolia et al. |
| 2008/0320419 A1 | 12/2008 | Matas et al. |
| 2009/0002335 A1 | 1/2009 | Chaudhri |
| 2009/0007017 A1 | 1/2009 | Anzures et al. |
| 2009/0007019 A1 | 1/2009 | Kobayashi et al. |
| 2009/0007026 A1 | 1/2009 | Scott et al. |
| 2009/0009815 A1 | 1/2009 | Karasik et al. |
| 2009/0019385 A1 | 1/2009 | Khatib et al. |
| 2009/0021488 A1 | 1/2009 | Kali et al. |
| 2009/0023433 A1 | 1/2009 | Walley et al. |
| 2009/0024946 A1 | 1/2009 | Gotz et al. |
| 2009/0029681 A1 | 1/2009 | Clemow et al. |
| 2009/0034805 A1 | 2/2009 | Perlmutter et al. |
| 2009/0055742 A1 | 2/2009 | Nordhagen |
| 2009/0055748 A1 | 2/2009 | Dieberger et al. |
| 2009/0058821 A1 | 3/2009 | Chaudhri et al. |
| 2009/0063971 A1 | 3/2009 | White et al. |
| 2009/0064055 A1 | 3/2009 | Chaudhri et al. |
| 2009/0070114 A1 | 3/2009 | Staszak |
| 2009/0070708 A1 | 3/2009 | Finkelstein |
| 2009/0077501 A1 | 3/2009 | Partridge et al. |
| 2009/0085878 A1 | 4/2009 | Heubel et al. |
| 2009/0089712 A1 | 4/2009 | Sato |
| 2009/0098912 A1 | 4/2009 | Kim et al. |
| 2009/0103780 A1 | 4/2009 | Nishihara et al. |
| 2009/0113347 A1 | 4/2009 | Hess et al. |
| 2009/0113350 A1 | 4/2009 | Hibino et al. |
| 2009/0119728 A1 | 5/2009 | Broberg |
| 2009/0122018 A1 | 5/2009 | Vymenets et al. |
| 2009/0125842 A1 | 5/2009 | Nakayama et al. |
| 2009/0132965 A1 | 5/2009 | Shimizu |
| 2009/0133067 A1 | 5/2009 | Sherman et al. |
| 2009/0135152 A1 | 5/2009 | Lii et al. |
| 2009/0138194 A1 | 5/2009 | Geelen |
| 2009/0138827 A1 | 5/2009 | Van Os et al. |
| 2009/0144653 A1 | 6/2009 | Ubillos |
| 2009/0150775 A1 | 6/2009 | Miyazaki et al. |
| 2009/0158200 A1 | 6/2009 | Palahnuk et al. |
| 2009/0163193 A1 | 6/2009 | Fyke et al. |
| 2009/0164936 A1 | 6/2009 | Kawaguchi |
| 2009/0166098 A1 | 7/2009 | Sunder et al. |
| 2009/0172606 A1 | 7/2009 | Dunn et al. |
| 2009/0172744 A1 | 7/2009 | Rothschild |
| 2009/0178008 A1 | 7/2009 | Herz et al. |
| 2009/0183080 A1 | 7/2009 | Thakkar et al. |
| 2009/0183100 A1 | 7/2009 | Eom et al. |
| 2009/0183125 A1 | 7/2009 | Magal et al. |
| 2009/0184936 A1 | 7/2009 | Algreatly |
| 2009/0187825 A1 | 7/2009 | Sandquist et al. |
| 2009/0189911 A1 | 7/2009 | Ono et al. |
| 2009/0193359 A1 | 7/2009 | Anthony et al. |
| 2009/0199128 A1 | 8/2009 | Matthews et al. |
| 2009/0199130 A1 | 8/2009 | Tsern et al. |
| 2009/0204920 A1 | 8/2009 | Beverley et al. |
| 2009/0204928 A1 | 8/2009 | Kallio et al. |
| 2009/0210793 A1 | 8/2009 | Yee et al. |
| 2009/0216806 A1 | 8/2009 | Feuerstein et al. |
| 2009/0217187 A1 | 8/2009 | Kendall et al. |
| 2009/0217206 A1 | 8/2009 | Liu et al. |
| 2009/0217209 A1 | 8/2009 | Chen et al. |
| 2009/0217320 A1 | 8/2009 | Aldrey |
| 2009/0222420 A1 | 9/2009 | Hirata |
| 2009/0222765 A1 | 9/2009 | Ekstrand |
| 2009/0222766 A1 | 9/2009 | Chae et al. |
| 2009/0228126 A1 | 9/2009 | Spielberg et al. |
| 2009/0228807 A1 | 9/2009 | Lemay |
| 2009/0228825 A1 | 9/2009 | Van Os et al. |
| 2009/0231271 A1 | 9/2009 | Heubel et al. |
| 2009/0235155 A1 | 9/2009 | Ueda |
| 2009/0235162 A1 | 9/2009 | Nuccio et al. |
| 2009/0237371 A1 | 9/2009 | Kim et al. |
| 2009/0237372 A1 | 9/2009 | Kim et al. |
| 2009/0241054 A1 | 9/2009 | Hendricks |
| 2009/0241150 A1 | 9/2009 | White et al. |
| 2009/0254867 A1 | 10/2009 | Farouki et al. |
| 2009/0254869 A1 | 10/2009 | Ludwig et al. |
| 2009/0259939 A1 | 10/2009 | Lockett et al. |
| 2009/0265669 A1 | 10/2009 | Kida et al. |
| 2009/0271381 A1 | 10/2009 | Beezer et al. |
| 2009/0271723 A1 | 10/2009 | Matsushima et al. |
| 2009/0278806 A1 | 11/2009 | Duarte et al. |
| 2009/0278812 A1 | 11/2009 | Yasutake et al. |
| 2009/0282369 A1 | 11/2009 | Jones |
| 2009/0293014 A1 | 11/2009 | Meuninck et al. |
| 2009/0303231 A1 | 12/2009 | Robinet et al. |
| 2009/0313567 A1 | 12/2009 | Kwon et al. |
| 2009/0313584 A1 | 12/2009 | Kerr et al. |

(56) References Cited

U.S. PATENT DOCUMENTS

| | | |
|---|---|---|
| 2009/0313585 A1 | 12/2009 | Hellinger et al. |
| 2009/0315841 A1 | 12/2009 | Cheng et al. |
| 2009/0315848 A1 | 12/2009 | Ku et al. |
| 2009/0315867 A1 | 12/2009 | Sakamoto et al. |
| 2009/0319472 A1 | 12/2009 | Jain et al. |
| 2009/0319888 A1 | 12/2009 | Oygard |
| 2009/0319928 A1 | 12/2009 | Alphin et al. |
| 2009/0319935 A1 | 12/2009 | Figura |
| 2009/0322676 A1 | 12/2009 | Kerr et al. |
| 2009/0327955 A1 | 12/2009 | Mouilleseaux et al. |
| 2009/0327969 A1 | 12/2009 | Estrada |
| 2010/0011304 A1 | 1/2010 | Van Os |
| 2010/0013780 A1 | 1/2010 | Ikeda et al. |
| 2010/0014825 A1 | 1/2010 | Curtis et al. |
| 2010/0023878 A1 | 1/2010 | Douris et al. |
| 2010/0023883 A1 | 1/2010 | Khazaka et al. |
| 2010/0026640 A1 | 2/2010 | Kim et al. |
| 2010/0029327 A1 | 2/2010 | Jee |
| 2010/0031203 A1 | 2/2010 | Morris et al. |
| 2010/0044121 A1 | 2/2010 | Simon et al. |
| 2010/0045616 A1 | 2/2010 | Li et al. |
| 2010/0050133 A1 | 2/2010 | Nishihara et al. |
| 2010/0053151 A1 | 3/2010 | Marti et al. |
| 2010/0058182 A1 | 3/2010 | Jung |
| 2010/0058230 A1 | 3/2010 | Shing et al. |
| 2010/0063813 A1 | 3/2010 | Richter et al. |
| 2010/0064053 A1 | 3/2010 | Bull et al. |
| 2010/0066763 A1 | 3/2010 | Macdougall et al. |
| 2010/0070926 A1 | 3/2010 | Abanami et al. |
| 2010/0070931 A1 | 3/2010 | Nichols |
| 2010/0077333 A1 | 3/2010 | Yang et al. |
| 2010/0082661 A1 | 4/2010 | Beaudreau et al. |
| 2010/0083165 A1 | 4/2010 | Andrews et al. |
| 2010/0088628 A1 | 4/2010 | Flygh et al. |
| 2010/0088634 A1 | 4/2010 | Tsuruta et al. |
| 2010/0095206 A1 | 4/2010 | Kim |
| 2010/0095238 A1 | 4/2010 | Baudet |
| 2010/0095248 A1 | 4/2010 | Karstens et al. |
| 2010/0100841 A1 | 4/2010 | Shin et al. |
| 2010/0100849 A1 | 4/2010 | Fram |
| 2010/0105454 A1 | 4/2010 | Weber et al. |
| 2010/0107078 A1 | 4/2010 | Hayashi |
| 2010/0107101 A1 | 4/2010 | Shaw et al. |
| 2010/0107115 A1 | 4/2010 | Sareen et al. |
| 2010/0110025 A1 | 5/2010 | Lim et al. |
| 2010/0110044 A1 | 5/2010 | Englund |
| 2010/0115428 A1 | 5/2010 | Shuping et al. |
| 2010/0122195 A1 | 5/2010 | Hwang |
| 2010/0124152 A1 | 5/2010 | Lee |
| 2010/0125807 A1 | 5/2010 | Easterday et al. |
| 2010/0146387 A1 | 6/2010 | Hoover |
| 2010/0146451 A1 | 6/2010 | Jun-dong et al. |
| 2010/0153844 A1 | 6/2010 | Hwang et al. |
| 2010/0153878 A1 | 6/2010 | Lindgren et al. |
| 2010/0157742 A1 | 6/2010 | Relyea et al. |
| 2010/0159909 A1 | 6/2010 | Stifelman |
| 2010/0162108 A1 | 6/2010 | Stallings et al. |
| 2010/0162170 A1 | 6/2010 | Johns et al. |
| 2010/0164908 A1 | 7/2010 | Hill et al. |
| 2010/0169357 A1 | 7/2010 | Ingrassia et al. |
| 2010/0174606 A1 | 7/2010 | Hoyle |
| 2010/0175018 A1 | 7/2010 | Petschnigg et al. |
| 2010/0191701 A1 | 7/2010 | Beyda et al. |
| 2010/0199227 A1 | 8/2010 | Xiao et al. |
| 2010/0199232 A1 | 8/2010 | Mistry et al. |
| 2010/0211872 A1 | 8/2010 | Rolston et al. |
| 2010/0211908 A1 | 8/2010 | Luk et al. |
| 2010/0211919 A1 | 8/2010 | Brown et al. |
| 2010/0214216 A1 | 8/2010 | Nasiri et al. |
| 2010/0214243 A1 | 8/2010 | Birnbaum et al. |
| 2010/0223563 A1 | 9/2010 | Green |
| 2010/0223574 A1 | 9/2010 | Wang et al. |
| 2010/0229129 A1 | 9/2010 | Price et al. |
| 2010/0229130 A1 | 9/2010 | Edge et al. |
| 2010/0235742 A1 | 9/2010 | Hsu et al. |
| 2010/0241699 A1 | 9/2010 | Muthukumarasamy et al. |
| 2010/0241955 A1 | 9/2010 | Price et al. |
| 2010/0241967 A1 | 9/2010 | Lee et al. |
| 2010/0241999 A1 | 9/2010 | Russ et al. |
| 2010/0242066 A1 | 9/2010 | Tseng et al. |
| 2010/0248788 A1 | 9/2010 | Yook et al. |
| 2010/0251085 A1 | 9/2010 | Zearing et al. |
| 2010/0257468 A1 | 10/2010 | Bernardo et al. |
| 2010/0262591 A1 | 10/2010 | Lee et al. |
| 2010/0262634 A1 | 10/2010 | Wang |
| 2010/0262928 A1 | 10/2010 | Abbott |
| 2010/0267424 A1 | 10/2010 | Kim et al. |
| 2010/0281408 A1 | 11/2010 | Fujioka et al. |
| 2010/0283743 A1 | 11/2010 | Coddington |
| 2010/0287053 A1 | 11/2010 | Ganong et al. |
| 2010/0287505 A1 | 11/2010 | Williams |
| 2010/0289217 A1 | 11/2010 | Lavie et al. |
| 2010/0295802 A1 | 11/2010 | Lee |
| 2010/0313164 A1 | 12/2010 | Louch et al. |
| 2010/0315413 A1 | 12/2010 | Izadi et al. |
| 2010/0318709 A1 | 12/2010 | Bell et al. |
| 2010/0325529 A1 | 12/2010 | Sun |
| 2010/0332497 A1 | 12/2010 | Valliani et al. |
| 2010/0333017 A1 | 12/2010 | Ortiz |
| 2010/0333045 A1 | 12/2010 | Guéziec et al. |
| 2011/0003665 A1 | 1/2011 | Burton et al. |
| 2011/0004835 A1 | 1/2011 | Yanchar et al. |
| 2011/0007000 A1 | 1/2011 | Lim et al. |
| 2011/0007029 A1 | 1/2011 | Ben-david |
| 2011/0010672 A1 | 1/2011 | Hope |
| 2011/0012921 A1 | 1/2011 | Cholewin et al. |
| 2011/0014956 A1 | 1/2011 | Lee et al. |
| 2011/0025624 A1 | 2/2011 | Goto |
| 2011/0025719 A1 | 2/2011 | Yanase et al. |
| 2011/0029934 A1 | 2/2011 | Locker et al. |
| 2011/0037712 A1 | 2/2011 | Kim et al. |
| 2011/0041056 A1 | 2/2011 | Griffin et al. |
| 2011/0041098 A1 | 2/2011 | Kajiya et al. |
| 2011/0047459 A1 | 2/2011 | Van Der Westhuizen |
| 2011/0047491 A1 | 2/2011 | Hwang et al. |
| 2011/0055722 A1 | 3/2011 | Ludwig et al. |
| 2011/0055760 A1 | 3/2011 | Drayton et al. |
| 2011/0059733 A1 | 3/2011 | Kim et al. |
| 2011/0061010 A1 | 3/2011 | Wasko et al. |
| 2011/0074719 A1 | 3/2011 | Yeh et al. |
| 2011/0074824 A1 | 3/2011 | Srinivasan et al. |
| 2011/0078597 A1 | 3/2011 | Rapp et al. |
| 2011/0080341 A1 | 4/2011 | Helmes et al. |
| 2011/0080359 A1 | 4/2011 | Jang et al. |
| 2011/0083104 A1 | 4/2011 | Minton |
| 2011/0087955 A1 | 4/2011 | Ho et al. |
| 2011/0087981 A1 | 4/2011 | Jeong et al. |
| 2011/0087999 A1 | 4/2011 | Bichsel et al. |
| 2011/0091182 A1 | 4/2011 | Look et al. |
| 2011/0093821 A1 | 4/2011 | Wigdor et al. |
| 2011/0099299 A1 | 4/2011 | Vasudevan et al. |
| 2011/0107241 A1 | 5/2011 | Moore |
| 2011/0107261 A1 | 5/2011 | Lin et al. |
| 2011/0119610 A1 | 5/2011 | Hackborn et al. |
| 2011/0119629 A1 | 5/2011 | Huotari et al. |
| 2011/0124376 A1 | 5/2011 | Kim et al. |
| 2011/0126148 A1 | 5/2011 | Krishnaraj et al. |
| 2011/0126155 A1 | 5/2011 | Krishnaraj et al. |
| 2011/0131534 A1 | 6/2011 | Subramanian et al. |
| 2011/0141031 A1 | 6/2011 | Mccullough et al. |
| 2011/0145275 A1 | 6/2011 | Stewart |
| 2011/0145691 A1 | 6/2011 | Noyes |
| 2011/0145692 A1 | 6/2011 | Noyes et al. |
| 2011/0145758 A1 | 6/2011 | Rosales et al. |
| 2011/0148786 A1 | 6/2011 | Day et al. |
| 2011/0148798 A1 | 6/2011 | Dahl |
| 2011/0157046 A1 | 6/2011 | Lee et al. |
| 2011/0164042 A1 | 7/2011 | Chaudhri |
| 2011/0164058 A1 | 7/2011 | Lemay |
| 2011/0167058 A1 | 7/2011 | Van Os |
| 2011/0167357 A1 | 7/2011 | Benjamin et al. |
| 2011/0167365 A1 | 7/2011 | Wingrove et al. |
| 2011/0173556 A1 | 7/2011 | Czerwinski et al. |
| 2011/0179097 A1 | 7/2011 | Ala-rantala |

(56) References Cited

U.S. PATENT DOCUMENTS

| | | |
|---|---|---|
| 2011/0179368 A1 | 7/2011 | King et al. |
| 2011/0183613 A1 | 7/2011 | Nocera |
| 2011/0191661 A1 | 8/2011 | Phillips et al. |
| 2011/0191710 A1 | 8/2011 | Jang et al. |
| 2011/0202834 A1 | 8/2011 | Mandryk et al. |
| 2011/0202859 A1 | 8/2011 | Fong |
| 2011/0202866 A1 | 8/2011 | Huang et al. |
| 2011/0209099 A1 | 8/2011 | Hinckley et al. |
| 2011/0209104 A1 | 8/2011 | Hinckley et al. |
| 2011/0210917 A1 | 9/2011 | Lafave et al. |
| 2011/0225549 A1 | 9/2011 | Kim |
| 2011/0227810 A1 | 9/2011 | Mckinney et al. |
| 2011/0239155 A1 | 9/2011 | Christie |
| 2011/0239156 A1 | 9/2011 | Lin et al. |
| 2011/0246918 A1 | 10/2011 | Henderson |
| 2011/0246929 A1 | 10/2011 | Jones et al. |
| 2011/0248916 A1 | 10/2011 | Griffin et al. |
| 2011/0252062 A1 | 10/2011 | Hanatani et al. |
| 2011/0252346 A1 | 10/2011 | Chaudhri |
| 2011/0252349 A1 | 10/2011 | Chaudhri |
| 2011/0252372 A1 | 10/2011 | Chaudhri |
| 2011/0252373 A1 | 10/2011 | Chaudhri |
| 2011/0252375 A1 | 10/2011 | Chaudhri |
| 2011/0261030 A1 | 10/2011 | Bullock |
| 2011/0265021 A1 | 10/2011 | Chien et al. |
| 2011/0267368 A1 | 11/2011 | Casillas et al. |
| 2011/0275940 A1 | 11/2011 | Nims et al. |
| 2011/0282867 A1 | 11/2011 | Palermiti et al. |
| 2011/0283334 A1 | 11/2011 | Choi et al. |
| 2011/0285659 A1 | 11/2011 | Kuwabara et al. |
| 2011/0289423 A1 | 11/2011 | Kim et al. |
| 2011/0289448 A1 | 11/2011 | Tanaka |
| 2011/0295879 A1 | 12/2011 | Logis et al. |
| 2011/0296344 A1 | 12/2011 | Habib et al. |
| 2011/0298723 A1 | 12/2011 | Fleizach et al. |
| 2011/0302513 A1 | 12/2011 | Ademar et al. |
| 2011/0307842 A1 | 12/2011 | Chiang et al. |
| 2011/0310005 A1 | 12/2011 | Chen et al. |
| 2011/0310058 A1 | 12/2011 | Yamada et al. |
| 2011/0314098 A1 | 12/2011 | Farrell et al. |
| 2011/0314422 A1 | 12/2011 | Cameron et al. |
| 2011/0316888 A1 | 12/2011 | Sachs et al. |
| 2012/0005622 A1 | 1/2012 | Park et al. |
| 2012/0023438 A1 | 1/2012 | Xia et al. |
| 2012/0023462 A1 | 1/2012 | Rosing et al. |
| 2012/0023471 A1 | 1/2012 | Fischer et al. |
| 2012/0030569 A1 | 2/2012 | Migos et al. |
| 2012/0030623 A1 | 2/2012 | Hoellwarth |
| 2012/0030627 A1 | 2/2012 | Nurmi et al. |
| 2012/0032988 A1 | 2/2012 | Katayama et al. |
| 2012/0036460 A1 | 2/2012 | Cieplinski et al. |
| 2012/0042272 A1 | 2/2012 | Hong et al. |
| 2012/0062398 A1 | 3/2012 | Durand |
| 2012/0066630 A1 | 3/2012 | Kim et al. |
| 2012/0084644 A1 | 4/2012 | Robert et al. |
| 2012/0084692 A1 | 4/2012 | Bae |
| 2012/0084694 A1 | 4/2012 | Sirpal et al. |
| 2012/0092381 A1 | 4/2012 | Hoover et al. |
| 2012/0092383 A1 | 4/2012 | Hysek et al. |
| 2012/0092812 A1 | 4/2012 | Lewis et al. |
| 2012/0096344 A1 | 4/2012 | Ho et al. |
| 2012/0102387 A1 | 4/2012 | Badoiu et al. |
| 2012/0110031 A1 | 5/2012 | Lahcanski et al. |
| 2012/0117506 A1 | 5/2012 | Koch et al. |
| 2012/0121185 A1 | 5/2012 | Zavesky |
| 2012/0124677 A1 | 5/2012 | Hoogerwerf et al. |
| 2012/0131470 A1 | 5/2012 | Wessling et al. |
| 2012/0133677 A1 | 5/2012 | Suzuki et al. |
| 2012/0147052 A1 | 6/2012 | Homma et al. |
| 2012/0151331 A1 | 6/2012 | Pallakoff et al. |
| 2012/0155223 A1 | 6/2012 | Hoover |
| 2012/0159373 A1 | 6/2012 | Archer et al. |
| 2012/0159380 A1 | 6/2012 | Kocienda et al. |
| 2012/0162261 A1 | 6/2012 | Kim et al. |
| 2012/0166950 A1 | 6/2012 | Frumar et al. |
| 2012/0169617 A1 | 7/2012 | Mäenpää |
| 2012/0179970 A1 | 7/2012 | Hayes |
| 2012/0179998 A1 | 7/2012 | Nesladek et al. |
| 2012/0192068 A1 | 7/2012 | Migos et al. |
| 2012/0192102 A1 | 7/2012 | Migos et al. |
| 2012/0192110 A1 | 7/2012 | Wu et al. |
| 2012/0192118 A1 | 7/2012 | Migos et al. |
| 2012/0216146 A1 | 8/2012 | Korkonen |
| 2012/0223898 A1 | 9/2012 | Watanabe et al. |
| 2012/0240085 A1 | 9/2012 | Sim et al. |
| 2012/0243735 A1 | 9/2012 | Wu et al. |
| 2012/0266093 A1 | 10/2012 | Park et al. |
| 2012/0274508 A1 | 11/2012 | Brown et al. |
| 2012/0274550 A1 | 11/2012 | Campbell et al. |
| 2012/0278745 A1 | 11/2012 | Kim et al. |
| 2012/0280908 A1 | 11/2012 | Rhoads et al. |
| 2012/0284012 A1 | 11/2012 | Rodriguez et al. |
| 2012/0284674 A1 | 11/2012 | Geng et al. |
| 2012/0297342 A1 | 11/2012 | Jang et al. |
| 2012/0304084 A1 | 11/2012 | Kim et al. |
| 2012/0304092 A1 | 11/2012 | Jarrett et al. |
| 2012/0324384 A1 | 12/2012 | Cohen et al. |
| 2012/0324390 A1 | 12/2012 | Tao et al. |
| 2012/0327006 A1 | 12/2012 | Israr et al. |
| 2013/0007666 A1 | 1/2013 | Song et al. |
| 2013/0019175 A1 | 1/2013 | Kotler et al. |
| 2013/0019182 A1 | 1/2013 | Gil et al. |
| 2013/0024796 A1 | 1/2013 | Seo |
| 2013/0024811 A1 | 1/2013 | Gleadall et al. |
| 2013/0038636 A1 | 2/2013 | Fujiwaka |
| 2013/0050109 A1 | 2/2013 | Ban |
| 2013/0055127 A1 | 2/2013 | Saito et al. |
| 2013/0055160 A1 | 2/2013 | Yamada et al. |
| 2013/0061175 A1 | 3/2013 | Matas et al. |
| 2013/0067411 A1 | 3/2013 | Kataoka et al. |
| 2013/0069990 A1 | 3/2013 | Geise et al. |
| 2013/0073932 A1 | 3/2013 | Migos et al. |
| 2013/0076774 A1 | 3/2013 | Yu et al. |
| 2013/0080951 A1 | 3/2013 | Chuang et al. |
| 2013/0097566 A1 | 4/2013 | Berglund |
| 2013/0111342 A1 | 5/2013 | Alameh et al. |
| 2013/0111384 A1 | 5/2013 | Kim et al. |
| 2013/0111400 A1 | 5/2013 | Miwa |
| 2013/0117689 A1 | 5/2013 | Lessing et al. |
| 2013/0117698 A1 | 5/2013 | Park et al. |
| 2013/0120295 A1 | 5/2013 | Kim et al. |
| 2013/0127719 A1 | 5/2013 | Yasutake et al. |
| 2013/0127850 A1 | 5/2013 | Bindon |
| 2013/0135228 A1 | 5/2013 | Won et al. |
| 2013/0135234 A1 | 5/2013 | Hisano et al. |
| 2013/0135236 A1 | 5/2013 | Yano |
| 2013/0139102 A1 | 5/2013 | Miura et al. |
| 2013/0142016 A1 | 6/2013 | Pozzo Di Borgo et al. |
| 2013/0145316 A1 | 6/2013 | Heo |
| 2013/0147747 A1 | 6/2013 | Takagi |
| 2013/0152017 A1 | 6/2013 | Song et al. |
| 2013/0154933 A1 | 6/2013 | Sheik-nainar |
| 2013/0156275 A1 | 6/2013 | Amacker et al. |
| 2013/0170324 A1 | 7/2013 | Tu et al. |
| 2013/0185648 A1 | 7/2013 | Kim |
| 2013/0194066 A1 | 8/2013 | Rahman et al. |
| 2013/0198176 A1 | 8/2013 | Kim |
| 2013/0205244 A1 | 8/2013 | Decker et al. |
| 2013/0208013 A1 | 8/2013 | Yuu et al. |
| 2013/0226444 A1 | 8/2013 | Johansson et al. |
| 2013/0227472 A1 | 8/2013 | Sosinski et al. |
| 2013/0234924 A1 | 9/2013 | Janefalkar et al. |
| 2013/0254705 A1 | 9/2013 | Mooring et al. |
| 2013/0262564 A1 | 10/2013 | Wall et al. |
| 2013/0275918 A1 | 10/2013 | Antonini et al. |
| 2013/0305187 A1 | 11/2013 | Phillips et al. |
| 2013/0311954 A1 | 11/2013 | Minkkinen et al. |
| 2013/0321340 A1 | 12/2013 | Seo et al. |
| 2013/0332886 A1 | 12/2013 | Cranfill et al. |
| 2013/0342457 A1 | 12/2013 | Cox et al. |
| 2014/0002348 A1 | 1/2014 | Ogawa |
| 2014/0015786 A1 | 1/2014 | Honda |
| 2014/0028554 A1 | 1/2014 | De Los Reyes et al. |
| 2014/0040826 A1 | 2/2014 | Wei et al. |

(56) References Cited

U.S. PATENT DOCUMENTS

| | | |
|---|---|---|
| 2014/0055495 A1 | 2/2014 | Kim et al. |
| 2014/0064572 A1 | 3/2014 | Panzer et al. |
| 2014/0068483 A1 | 3/2014 | Platzer et al. |
| 2014/0075368 A1 | 3/2014 | Kim et al. |
| 2014/0098102 A1 | 4/2014 | Raffle et al. |
| 2014/0108978 A1 | 4/2014 | Yu et al. |
| 2014/0109024 A1 | 4/2014 | Miyazaki |
| 2014/0135631 A1 | 5/2014 | Brumback et al. |
| 2014/0139637 A1 | 5/2014 | Mistry et al. |
| 2014/0143678 A1 | 5/2014 | Mistry et al. |
| 2014/0143737 A1 | 5/2014 | Mistry et al. |
| 2014/0143784 A1 | 5/2014 | Mistry et al. |
| 2014/0157321 A1 | 6/2014 | Kurita et al. |
| 2014/0160078 A1 | 6/2014 | Seo et al. |
| 2014/0165006 A1 | 6/2014 | Chaudhri et al. |
| 2014/0173517 A1 | 6/2014 | Chaudhri et al. |
| 2014/0181089 A1 | 6/2014 | Desmond et al. |
| 2014/0189584 A1 | 7/2014 | Weng et al. |
| 2014/0195972 A1 | 7/2014 | Lee et al. |
| 2014/0198234 A1 | 7/2014 | Kobayashi et al. |
| 2014/0200742 A1 | 7/2014 | Mauti, Jr. |
| 2014/0215457 A1 | 7/2014 | Gava et al. |
| 2014/0223372 A1 | 8/2014 | Dostie et al. |
| 2014/0237360 A1 | 8/2014 | Chaudhri et al. |
| 2014/0237402 A1 | 8/2014 | Pang et al. |
| 2014/0248590 A1 | 9/2014 | Mccormick |
| 2014/0250374 A1 | 9/2014 | Ohki et al. |
| 2014/0276244 A1 | 9/2014 | Kamyar |
| 2014/0282011 A1 | 9/2014 | Dellinger et al. |
| 2014/0282214 A1 | 9/2014 | Shirzadi et al. |
| 2014/0289222 A1 | 9/2014 | Sharpe et al. |
| 2014/0289659 A1 | 9/2014 | Harrison et al. |
| 2014/0293755 A1 | 10/2014 | Geiser et al. |
| 2014/0317555 A1 | 10/2014 | Choi et al. |
| 2014/0328147 A1 | 11/2014 | Yang et al. |
| 2014/0328151 A1 | 11/2014 | Serber |
| 2014/0337324 A1 | 11/2014 | Chao et al. |
| 2014/0344700 A1 | 11/2014 | Jenkins et al. |
| 2014/0359602 A1 | 12/2014 | Sawaya et al. |
| 2014/0365126 A1 | 12/2014 | Vulcano et al. |
| 2014/0365956 A1 | 12/2014 | Karunamuni et al. |
| 2015/0012853 A1 | 1/2015 | Chaudhri et al. |
| 2015/0015500 A1 | 1/2015 | Lee et al. |
| 2015/0026615 A1 | 1/2015 | Choi et al. |
| 2015/0046871 A1 | 2/2015 | Lewis |
| 2015/0065821 A1 | 3/2015 | Conrad |
| 2015/0067555 A1 | 3/2015 | Joo et al. |
| 2015/0078680 A1 | 3/2015 | Shakib et al. |
| 2015/0085621 A1 | 3/2015 | Hong et al. |
| 2015/0089407 A1 | 3/2015 | Suzuki |
| 2015/0105125 A1 | 4/2015 | Min et al. |
| 2015/0112752 A1 | 4/2015 | Wagner et al. |
| 2015/0117162 A1 | 4/2015 | Tsai et al. |
| 2015/0121224 A1 | 4/2015 | Krasnahill, Jr. |
| 2015/0160812 A1 | 6/2015 | Yuan et al. |
| 2015/0172438 A1 | 6/2015 | Yang |
| 2015/0185947 A1 | 7/2015 | Tsai et al. |
| 2015/0199110 A1 | 7/2015 | Nakazato |
| 2015/0234518 A1 | 8/2015 | Teller et al. |
| 2015/0242092 A1 | 8/2015 | Van et al. |
| 2015/0242989 A1 | 8/2015 | Lee et al. |
| 2015/0249733 A1 | 9/2015 | Miura |
| 2015/0261412 A1 | 9/2015 | Guillama et al. |
| 2015/0277692 A1 | 10/2015 | Liu |
| 2015/0281945 A1 | 10/2015 | Seo et al. |
| 2015/0287162 A1 | 10/2015 | Canan et al. |
| 2015/0301506 A1 | 10/2015 | Koumaiha |
| 2015/0331589 A1 | 11/2015 | Kawakita |
| 2015/0366518 A1 | 12/2015 | Sampson |
| 2015/0378555 A1 | 12/2015 | Ramanathan et al. |
| 2015/0378569 A1 | 12/2015 | Sato et al. |
| 2015/0379476 A1 | 12/2015 | Chaudhri et al. |
| 2016/0011758 A1 | 1/2016 | Meggs et al. |
| 2016/0019360 A1 | 1/2016 | Pahwa et al. |
| 2016/0034133 A1 | 2/2016 | Wilson et al. |
| 2016/0034148 A1 | 2/2016 | Wilson et al. |
| 2016/0034153 A1 | 2/2016 | Lejeune et al. |
| 2016/0034167 A1 | 2/2016 | Wilson et al. |
| 2016/0048296 A1 | 2/2016 | Gan et al. |
| 2016/0054710 A1 | 2/2016 | Jo et al. |
| 2016/0058336 A1 | 3/2016 | Blahnik et al. |
| 2016/0058337 A1 | 3/2016 | Blahnik et al. |
| 2016/0062541 A1 | 3/2016 | Anzures et al. |
| 2016/0062571 A1 | 3/2016 | Dascola et al. |
| 2016/0062572 A1 | 3/2016 | Yang et al. |
| 2016/0062573 A1 | 3/2016 | Dascola et al. |
| 2016/0062598 A1 | 3/2016 | Kocienda et al. |
| 2016/0077495 A1 | 3/2016 | Brown et al. |
| 2016/0092063 A1 | 3/2016 | Lee |
| 2016/0117141 A1 | 4/2016 | Ro et al. |
| 2016/0124626 A1 | 5/2016 | Lee et al. |
| 2016/0139798 A1 | 5/2016 | Takikawa et al. |
| 2016/0162164 A1 | 6/2016 | Phillips et al. |
| 2016/0170436 A1 | 6/2016 | Farrar et al. |
| 2016/0170598 A1 | 6/2016 | Zambetti et al. |
| 2016/0170608 A1 | 6/2016 | Zambetti et al. |
| 2016/0179310 A1 | 6/2016 | Chaudhri et al. |
| 2016/0182805 A1 | 6/2016 | Emmett et al. |
| 2016/0196419 A1 | 7/2016 | Kuscher |
| 2016/0202866 A1 | 7/2016 | Zambetti |
| 2016/0209939 A1 | 7/2016 | Zambetti et al. |
| 2016/0224211 A1 | 8/2016 | Xu et al. |
| 2016/0231883 A1 | 8/2016 | Zambetti |
| 2016/0253065 A1 | 9/2016 | Platzer et al. |
| 2016/0269540 A1 | 9/2016 | Butcher et al. |
| 2016/0313913 A1 | 10/2016 | Leem et al. |
| 2016/0327911 A1 | 11/2016 | Eim et al. |
| 2016/0358311 A1 | 12/2016 | Chen et al. |
| 2017/0010678 A1 | 1/2017 | Tuli |
| 2017/0010751 A1 | 1/2017 | Shedletsky et al. |
| 2017/0039535 A1 | 2/2017 | Park et al. |
| 2017/0075305 A1 | 3/2017 | Ryu et al. |
| 2017/0089735 A1 | 3/2017 | Ruh |
| 2017/0104902 A1 | 4/2017 | Kim et al. |
| 2017/0147198 A1 | 5/2017 | Herz et al. |
| 2017/0149795 A1 | 5/2017 | Day, II |
| 2017/0208466 A1 | 7/2017 | Seo et al. |
| 2017/0212667 A1 | 7/2017 | Miyazaki |
| 2017/0230236 A1 | 8/2017 | Kim et al. |
| 2017/0255169 A1 | 9/2017 | Lee et al. |
| 2017/0269692 A1 | 9/2017 | Eck et al. |
| 2017/0322711 A1 | 11/2017 | Robinson et al. |
| 2017/0331901 A1 | 11/2017 | Sarlandie De La Robertie et al. |
| 2017/0344329 A1 | 11/2017 | Oh et al. |
| 2017/0357426 A1 | 12/2017 | Wilson et al. |
| 2017/0357427 A1 | 12/2017 | Wilson et al. |
| 2017/0357433 A1 | 12/2017 | Boule et al. |
| 2017/0374205 A1 | 12/2017 | Panda |
| 2018/0024683 A1 | 1/2018 | Ely et al. |
| 2018/0081453 A1 | 3/2018 | Ely |
| 2018/0150216 A1 | 5/2018 | Choi et al. |
| 2018/0218636 A1 | 8/2018 | Alaouf et al. |
| 2018/0307363 A1 | 10/2018 | Ely et al. |
| 2018/0307388 A1 | 10/2018 | Chaudhri et al. |
| 2018/0335891 A1 | 11/2018 | Shedletsky et al. |
| 2018/0349583 A1 | 12/2018 | Turgeman et al. |
| 2018/0364815 A1 | 12/2018 | Moussette et al. |
| 2019/0012063 A1 | 1/2019 | Kocienda et al. |
| 2019/0028865 A1 | 1/2019 | Raleigh et al. |
| 2019/0056700 A1 | 2/2019 | Matsuno et al. |
| 2019/0072912 A1 | 3/2019 | Pandya et al. |
| 2019/0080072 A1 | 3/2019 | Van Os et al. |
| 2019/0101870 A1 | 4/2019 | Pandya et al. |
| 2019/0138696 A1 | 5/2019 | Carpenter et al. |
| 2019/0163324 A1 | 5/2019 | Shedletsky et al. |
| 2019/0171349 A1 | 6/2019 | Van Os et al. |
| 2019/0173996 A1 | 6/2019 | Butcher et al. |
| 2019/0179514 A1 | 6/2019 | Van Os et al. |
| 2019/0212885 A1 | 7/2019 | Zambetti et al. |
| 2019/0235724 A1 | 8/2019 | Platzer et al. |
| 2019/0238675 A1 | 8/2019 | Soni et al. |
| 2019/0320057 A1 | 10/2019 | Omernick et al. |
| 2019/0347181 A1 | 11/2019 | Cranfill et al. |
| 2019/0369842 A1 | 12/2019 | Dolbakian et al. |

(56) References Cited

U.S. PATENT DOCUMENTS

| | | | |
|---|---|---|---|
| 2020/0000035 A1 | 1/2020 | Calmer |
| 2020/0054549 A1 | 2/2020 | Paufique |
| 2020/0067245 A1 | 2/2020 | Maley |
| 2020/0142554 A1 | 5/2020 | Lin et al. |
| 2020/0167047 A1 | 5/2020 | Dascola et al. |
| 2020/0183572 A1 | 6/2020 | Moore et al. |
| 2020/0192683 A1 | 6/2020 | Lin et al. |
| 2020/0225843 A1 | 7/2020 | Herz et al. |
| 2020/0272293 A1 | 8/2020 | Zambetti et al. |
| 2020/0333945 A1 | 10/2020 | Wilson et al. |
| 2020/0348814 A1 | 11/2020 | Platzer et al. |
| 2020/0348822 A1 | 11/2020 | Dascola et al. |
| 2020/0356242 A1 | 11/2020 | Wilson et al. |
| 2020/0379615 A1 | 12/2020 | Chaudhri et al. |
| 2020/0393957 A1 | 12/2020 | Wilson et al. |
| 2021/0055697 A1 | 2/2021 | Abramov |
| 2021/0109647 A1 | 4/2021 | Van Os et al. |
| 2021/0110014 A1 | 4/2021 | Turgeman et al. |
| 2021/0112152 A1 | 4/2021 | Omernick et al. |
| 2021/0132758 A1 | 5/2021 | Xu |
| 2021/0141506 A1 | 5/2021 | Chaudhri et al. |
| 2021/0195013 A1 | 6/2021 | Butcher et al. |
| 2021/0271374 A1 | 9/2021 | Chaudhri et al. |
| 2021/0311438 A1 | 10/2021 | Wilson et al. |
| 2022/0043560 A1 | 2/2022 | Kocienda et al. |
| 2022/0083183 A1 | 3/2022 | Patton |
| 2022/0101719 A1 | 3/2022 | Bojic et al. |
| 2022/0137765 A1 | 5/2022 | Platzer et al. |
| 2022/0202384 A1 | 6/2022 | Saiki et al. |
| 2022/0206649 A1 | 6/2022 | Chaudhri et al. |
| 2022/0377167 A1 | 11/2022 | Omernick et al. |
| 2022/0413684 A1 | 12/2022 | Van Os et al. |
| 2022/0417358 A1 | 12/2022 | Butcher et al. |
| 2023/0024225 A1 | 1/2023 | Zambetti et al. |
| 2023/0049771 A1 | 2/2023 | Dascola et al. |
| 2023/0152940 A1 | 5/2023 | Chaudhri et al. |
| 2023/0244355 A1 | 8/2023 | Van Os et al. |
| 2023/0359349 A1 | 11/2023 | Herz et al. |
| 2023/0370538 A1 | 11/2023 | Omernick et al. |
| 2023/0409165 A1 | 12/2023 | Dascola et al. |
| 2023/0409166 A1 | 12/2023 | Kocienda et al. |
| 2023/0418434 A1 | 12/2023 | Chaudhri et al. |
| 2024/0053878 A1 | 2/2024 | Wilson et al. |
| 2024/0176479 A1 | 5/2024 | Chaudhri et al. |

FOREIGN PATENT DOCUMENTS

| | | |
|---|---|---|
| AU | 2015101022 A4 | 9/2015 |
| CA | 2349649 A1 | 1/2002 |
| CA | 2800123 C | 7/2016 |
| CH | 700242 A2 | 7/2010 |
| CN | 1392977 A | 1/2003 |
| CN | 1464719 A | 12/2003 |
| CN | 1695105 A | 11/2005 |
| CN | 1773875 A | 5/2006 |
| CN | 1786906 A | 6/2006 |
| CN | 1811899 A | 8/2006 |
| CN | 1940833 A | 4/2007 |
| CN | 1998150 A | 7/2007 |
| CN | 101072410 A | 11/2007 |
| CN | 101202866 A | 6/2008 |
| CN | 101308443 A | 11/2008 |
| CN | 101356493 A | 1/2009 |
| CN | 101390038 A | 3/2009 |
| CN | 101535938 A | 9/2009 |
| CN | 101611374 A | 12/2009 |
| CN | 101627349 A | 1/2010 |
| CN | 101770331 A | 7/2010 |
| CN | 101776968 A | 7/2010 |
| CN | 101796478 A | 8/2010 |
| CN | 101876877 A | 11/2010 |
| CN | 101893992 A | 11/2010 |
| CN | 102033710 A | 4/2011 |
| CN | 102037436 A | 4/2011 |
| CN | 102081502 A | 6/2011 |
| CN | 102112946 A | 6/2011 |
| CN | 102138120 A | 7/2011 |
| CN | 102221931 A | 10/2011 |
| CN | 102244676 A | 11/2011 |
| CN | 102298502 A | 12/2011 |
| CN | 102364438 A | 2/2012 |
| CN | 102446059 A | 5/2012 |
| CN | 102479027 A | 5/2012 |
| CN | 102479053 A | 5/2012 |
| CN | 102801649 A | 11/2012 |
| CN | 102812426 A | 12/2012 |
| CN | 102830911 A | 12/2012 |
| CN | 102946470 A | 2/2013 |
| CN | 102981704 A | 3/2013 |
| CN | 102999249 A | 3/2013 |
| CN | 103076942 A | 5/2013 |
| CN | 103116440 A | 5/2013 |
| CN | 102004614 B | 6/2013 |
| CN | 103154849 A | 6/2013 |
| CN | 103191557 A | 7/2013 |
| CN | 103210366 A | 7/2013 |
| CN | 103528545 A | 1/2014 |
| CN | 103547987 A | 1/2014 |
| CN | 103649897 A | 3/2014 |
| CN | 103713848 A | 4/2014 |
| CN | 103777842 A | 5/2014 |
| CN | 103782252 A | 5/2014 |
| CN | 103870282 A | 6/2014 |
| CN | 103995647 A | 8/2014 |
| CN | 103995724 A | 8/2014 |
| CN | 104281405 A | 1/2015 |
| CN | 104471532 A | 3/2015 |
| CN | 104580576 A | 4/2015 |
| CN | 104717356 A | 6/2015 |
| CN | 104737114 A | 6/2015 |
| CN | 105286843 A | 2/2016 |
| CN | 105302468 A | 2/2016 |
| CN | 105335087 A | 2/2016 |
| CN | 105389107 A | 3/2016 |
| CN | 105607858 A | 5/2016 |
| EP | 0163032 A2 | 12/1985 |
| EP | 0404373 A1 | 12/1990 |
| EP | 0626635 A2 | 11/1994 |
| EP | 0689134 A1 | 12/1995 |
| EP | 0844553 A1 | 5/1998 |
| EP | 1003098 A2 | 5/2000 |
| EP | 1143334 A2 | 10/2001 |
| EP | 1186997 A2 | 3/2002 |
| EP | 1271295 A2 | 1/2003 |
| EP | 1406158 A2 | 4/2004 |
| EP | 1517228 A2 | 3/2005 |
| EP | 1571538 A1 | 9/2005 |
| EP | 1674976 A2 | 6/2006 |
| EP | 1724996 A2 | 11/2006 |
| EP | 1944677 A2 | 7/2008 |
| EP | 1956472 A1 | 8/2008 |
| EP | 1959337 A2 | 8/2008 |
| EP | 2150031 A1 | 2/2010 |
| EP | 2151745 A2 | 2/2010 |
| EP | 2194452 A1 | 6/2010 |
| EP | 2204702 A1 | 7/2010 |
| EP | 2302493 A2 | 3/2011 |
| EP | 2525282 A2 | 11/2012 |
| EP | 2551784 A1 | 1/2013 |
| EP | 2565767 A1 | 3/2013 |
| EP | 2565769 A2 | 3/2013 |
| EP | 2610738 A2 | 7/2013 |
| EP | 2741176 A2 | 6/2014 |
| EP | 2911377 A1 | 8/2015 |
| EP | 2955591 A2 | 12/2015 |
| EP | 2993602 A1 | 3/2016 |
| EP | 3152643 A1 | 4/2017 |
| FR | 2819675 A1 | 7/2002 |
| GB | 2329813 A | 3/1999 |
| GB | 2407900 A | 5/2005 |
| GB | 2457939 B | 9/2010 |
| GB | 2489580 A | 10/2012 |
| JP | 2-114318 A | 4/1990 |
| JP | 6-110881 A | 4/1994 |

(56) References Cited

FOREIGN PATENT DOCUMENTS

| | | |
|---|---|---|
| JP | 6-208446 A | 7/1994 |
| JP | 7-325700 A | 12/1995 |
| JP | 8-76926 A | 3/1996 |
| JP | 8-221203 A | 8/1996 |
| JP | 9-73381 A | 3/1997 |
| JP | 9-101874 A | 4/1997 |
| JP | 9-258971 A | 10/1997 |
| JP | 9-292262 A | 11/1997 |
| JP | 9-297750 A | 11/1997 |
| JP | 10-40067 A | 2/1998 |
| JP | 10-214350 A | 8/1998 |
| JP | 10-240488 A | 9/1998 |
| JP | 10-340178 A | 12/1998 |
| JP | 11-39133 A | 2/1999 |
| JP | 11-508116 A | 7/1999 |
| JP | 2000-20213 A | 1/2000 |
| JP | 2000-40158 A | 2/2000 |
| JP | 2000-242390 A | 9/2000 |
| JP | 2001-92430 A | 4/2001 |
| JP | 2001-92586 A | 4/2001 |
| JP | 2001-101202 A | 4/2001 |
| JP | 2001-202170 A | 7/2001 |
| JP | 2001-202178 A | 7/2001 |
| JP | 2001-318751 A | 11/2001 |
| JP | 2002-7016 A | 1/2002 |
| JP | 2002-41197 A | 2/2002 |
| JP | 2002-41206 A | 2/2002 |
| JP | 2002-132412 A | 5/2002 |
| JP | 2002-149312 A | 5/2002 |
| JP | 2002-157078 A | 5/2002 |
| JP | 2002-189567 A | 7/2002 |
| JP | 2002-525705 A | 8/2002 |
| JP | 2002-297514 A | 10/2002 |
| JP | 2002-312105 A | 10/2002 |
| JP | 2003-66941 A | 3/2003 |
| JP | 2003-139546 A | 5/2003 |
| JP | 2003-162731 A | 6/2003 |
| JP | 2003-195998 A | 7/2003 |
| JP | 2003-198705 A | 7/2003 |
| JP | 2003-248538 A | 9/2003 |
| JP | 2003-256142 A | 9/2003 |
| JP | 2003-271310 A | 9/2003 |
| JP | 2003-526820 A | 9/2003 |
| JP | 2003-295994 A | 10/2003 |
| JP | 2003-536125 A | 12/2003 |
| JP | 2004-21522 A | 1/2004 |
| JP | 2004-38260 A | 2/2004 |
| JP | 2004-70492 A | 3/2004 |
| JP | 2004-132741 A | 4/2004 |
| JP | 2004-152075 A | 5/2004 |
| JP | 2004-208217 A | 7/2004 |
| JP | 2004-341892 A | 12/2004 |
| JP | 2005-4396 A | 1/2005 |
| JP | 2005-4419 A | 1/2005 |
| JP | 2005-45744 A | 2/2005 |
| JP | 2005-515530 A | 5/2005 |
| JP | 2005-198064 A | 7/2005 |
| JP | 2005-202703 A | 7/2005 |
| JP | 2005-227826 A | 8/2005 |
| JP | 2005-227951 A | 8/2005 |
| JP | 2005-228088 A | 8/2005 |
| JP | 2005-228091 A | 8/2005 |
| JP | 2005-309933 A | 11/2005 |
| JP | 2005-321915 A | 11/2005 |
| JP | 2005-327064 A | 11/2005 |
| JP | 2006-71582 A | 3/2006 |
| JP | 2006-99733 A | 4/2006 |
| JP | 2006-140990 A | 6/2006 |
| JP | 2006-155232 A | 6/2006 |
| JP | 2006-185273 A | 7/2006 |
| JP | 2006-242717 A | 9/2006 |
| JP | 2006-259376 A | 9/2006 |
| JP | 2007-25998 A | 2/2007 |
| JP | 2007-124667 A | 5/2007 |
| JP | 2007-132676 A | 5/2007 |
| JP | 2007-512635 A | 5/2007 |
| JP | 2007-170995 A | 7/2007 |
| JP | 2007-179544 A | 7/2007 |
| JP | 2007-334984 A | 12/2007 |
| JP | 2008-15698 A | 1/2008 |
| JP | 2008-503007 A | 1/2008 |
| JP | 2008-52705 A | 3/2008 |
| JP | 2008-102860 A | 5/2008 |
| JP | 2008-262251 A | 10/2008 |
| JP | 2008-276801 A | 11/2008 |
| JP | 2008-304959 A | 12/2008 |
| JP | 2008-306667 A | 12/2008 |
| JP | 2009-9350 A | 1/2009 |
| JP | 2009-508217 A | 2/2009 |
| JP | 2009-80710 A | 4/2009 |
| JP | 2009-136456 A | 6/2009 |
| JP | 2009-246553 A | 10/2009 |
| JP | 2009-265793 A | 11/2009 |
| JP | 2009-265929 A | 11/2009 |
| JP | 2009-277192 A | 11/2009 |
| JP | 2009-290847 A | 12/2009 |
| JP | 2010-61402 A | 3/2010 |
| JP | 2010-97353 A | 4/2010 |
| JP | 2010-97552 A | 4/2010 |
| JP | 2010-511939 A | 4/2010 |
| JP | 2010-522935 A | 7/2010 |
| JP | 2010-187096 A | 8/2010 |
| JP | 2010-538394 A | 12/2010 |
| JP | 2011-53790 A | 3/2011 |
| JP | 2012-58979 A | 3/2012 |
| JP | 2012-90111 A | 5/2012 |
| JP | 2012-155698 A | 8/2012 |
| JP | 2012-208645 A | 10/2012 |
| JP | 2012-252384 A | 12/2012 |
| JP | 2013-25357 A | 2/2013 |
| JP | 2013-25409 A | 2/2013 |
| JP | 2013-47919 A | 3/2013 |
| JP | 2013-73513 A | 4/2013 |
| JP | 2013-73528 A | 4/2013 |
| JP | 2013-106271 A | 5/2013 |
| JP | 2013-516698 A | 5/2013 |
| JP | 2013-120468 A | 6/2013 |
| JP | 2013-137750 A | 7/2013 |
| JP | 2013-530433 A | 7/2013 |
| JP | 2013-164700 A | 8/2013 |
| JP | 2013-191234 A | 9/2013 |
| JP | 2013-200265 A | 10/2013 |
| JP | 2013-203283 A | 10/2013 |
| JP | 2013-206274 A | 10/2013 |
| JP | 2013-211055 A | 10/2013 |
| JP | 2013-218698 A | 10/2013 |
| JP | 2014-503891 A | 2/2014 |
| JP | 2020-161134 A | 10/2020 |
| KR | 2002-0010863 A | 2/2002 |
| KR | 10-0490373 B1 | 5/2005 |
| KR | 10-2009-0035499 A | 4/2009 |
| KR | 10-2009-0100320 A | 9/2009 |
| KR | 10-2010-0003589 A | 1/2010 |
| KR | 10-2010-0019887 A | 2/2010 |
| KR | 10-2010-0109277 A | 10/2010 |
| KR | 10-2011-0078008 A | 7/2011 |
| KR | 10-2011-0093090 A | 8/2011 |
| KR | 10-2011-0093729 A | 8/2011 |
| KR | 10-2012-0050883 A | 5/2012 |
| KR | 10-2012-0057800 A | 6/2012 |
| KR | 10-2012-0071468 A | 7/2012 |
| KR | 10-2012-0079707 A | 7/2012 |
| KR | 10-2012-0091495 A | 8/2012 |
| KR | 10-2013-0011437 A | 1/2013 |
| KR | 10-2013-0016329 A | 2/2013 |
| KR | 10-2013-0052751 A | 5/2013 |
| KR | 10-2015-0022599 A | 3/2015 |
| KR | 10-2015-0140212 A | 12/2015 |
| TW | 201027419 A | 7/2010 |
| TW | 201119339 A | 6/2011 |
| TW | I405106 B | 8/2013 |
| TW | 201403406 A | 1/2014 |
| TW | 201426492 A | 7/2014 |
| TW | 201432552 A | 8/2014 |

(56) References Cited

FOREIGN PATENT DOCUMENTS

| | | | |
|---|---|---|---|
| WO | 96/06401 | A1 | 2/1996 |
| WO | 98/44431 | A2 | 10/1998 |
| WO | 99/38149 | A1 | 7/1999 |
| WO | 00/16186 | A2 | 3/2000 |
| WO | 01/46790 | A2 | 6/2001 |
| WO | 02/13176 | A2 | 2/2002 |
| WO | 03/060622 | A2 | 7/2003 |
| WO | 2005/041020 | A1 | 5/2005 |
| WO | 2005/055034 | A1 | 6/2005 |
| WO | 2006/012343 | A2 | 2/2006 |
| WO | 2006/020304 | A2 | 2/2006 |
| WO | 2006/020305 | A2 | 2/2006 |
| WO | 2006/037545 | A2 | 4/2006 |
| WO | 2006/092464 | A1 | 9/2006 |
| WO | 2006/117438 | A1 | 11/2006 |
| WO | 2006/119269 | A2 | 11/2006 |
| WO | 2007/002621 | A2 | 1/2007 |
| WO | 2007/031816 | A1 | 3/2007 |
| WO | 2007/032908 | A1 | 3/2007 |
| WO | 2006/020304 | A3 | 5/2007 |
| WO | 2007/069835 | A1 | 6/2007 |
| WO | 2007/094894 | A2 | 8/2007 |
| WO | 2007/142256 | A1 | 12/2007 |
| WO | 2008/017936 | A2 | 2/2008 |
| WO | 2008/030779 | A2 | 3/2008 |
| WO | 2008/030879 | A2 | 3/2008 |
| WO | 2008/067498 | A2 | 6/2008 |
| WO | 2008/090902 | A1 | 7/2008 |
| WO | 2007/100944 | A3 | 8/2008 |
| WO | 2008/099251 | A1 | 8/2008 |
| WO | 2008/106777 | A1 | 9/2008 |
| WO | 2008/114491 | A1 | 9/2008 |
| WO | 2009/032638 | A2 | 3/2009 |
| WO | 2009/032750 | A1 | 3/2009 |
| WO | 2009/082814 | A1 | 7/2009 |
| WO | 2009/084368 | A1 | 7/2009 |
| WO | 2009/089222 | A2 | 7/2009 |
| WO | 2009/155991 | A1 | 12/2009 |
| WO | 2010/134729 | A2 | 11/2010 |
| WO | 2011/126501 | A1 | 10/2011 |
| WO | 2011/126502 | A1 | 10/2011 |
| WO | 2012/078079 | A2 | 6/2012 |
| WO | 2012/103117 | A1 | 8/2012 |
| WO | 2012/129359 | A1 | 9/2012 |
| WO | 2013/017736 | A1 | 2/2013 |
| WO | 2013/103570 | A1 | 7/2013 |
| WO | 2013/149055 | A1 | 10/2013 |
| WO | 2013/157330 | A1 | 10/2013 |
| WO | 2014/058816 | A1 | 4/2014 |
| WO | 2014/105276 | A1 | 7/2014 |
| WO | 2016/025395 | A2 | 2/2016 |

OTHER PUBLICATIONS

Applicant-Initiated Interview Summary received for U.S. Appl. No. 17/878,792, mailed on Sep. 8, 2023, 4 pages.
Decision on Appeal received for U.S. Appl. No. 16/832,285, mailed on May 15, 2023, 12 pages.
Final Office Action received for U.S. Appl. No. 17/728,725, mailed on Jul. 31, 2023, 15 pages.
Hughes John, "Specifying a Visual File System in Z", IEEE Xplore, Retrieved from: https://ieeexplore.ieee.org/document/199162/metrics#metrics, 2002, 3 pages.
Intention to Grant received for European Patent Application No. 17810723.1, mailed on Jun. 12, 2023, 9 pages.
Lin Xu, "The Mis-operation Research Based on Cognitive Psychology", China Academic Journal Electronic Publishing House. Online available at: http://www.cnki.net, 2011, 71 pages (Official Copy Only) {See Communication Under Rule 37 CFR § 1.98(a) (3)}.
Non-Final Office Action received for U.S. Appl. No. 15/421,865, mailed on Jul. 11, 2023, 32 pages.
Non-Final Office Action received for U.S. Appl. No. 17/878,792, mailed on Jun. 23, 2023, 19 pages.
Non-Final Office Action received for U.S. Appl. No. 17/950,972, mailed on Jul. 18, 2023, 15 pages.
Notice of Acceptance received for Australian Patent Application No. 2022202583, mailed on Aug. 7, 2023, 3 pages.
Notice of Allowance received for Canadian Patent Application No. 3,109,701, mailed on Apr. 4, 2023, 1 page.
Notice of Allowance received for Chinese Patent Application No. 202010125835.5, mailed on Jul. 27, 2023, 5 pages (1 page of English Translation and 4 pages of Official Copy).
Notice of Allowance received for U.S. Appl. No. 15/411,110, mailed on Aug. 2, 2023, 2 pages.
Notice of Allowance received for U.S. Appl. No. 15/411,110, mailed on May 23, 2023, 8 pages.
Notice of Allowance received for U.S. Appl. No. 17/698,979, mailed on Jun. 28, 2023, 8 pages.
Office Action received for Australian Patent Application No. 2022235585, mailed on Jul. 27, 2023, 4 pages.
Office Action received for Chinese Patent Application No. 202010125835.5, mailed on Mar. 11, 2023, 11 pages (05 pages of English Translation and 06 pages of Official Copy).
Office Action received for European Patent Application No. 17813879.8, mailed on Jun. 22, 2023, 7 pages.
Record of Oral Hearing received for U.S. Appl. No. 16/832,285, mailed on Apr. 25, 2023, 15 pages.
Applicant-Initiated Interview Summary received for U.S. Appl. No. 17/950,972, mailed on Nov. 17, 2023, 4 pages.
Decision to Refuse received for European Patent Application No. 20203888.1, mailed on Nov. 28, 2023, 13 pages.
Minutes of the Oral Proceedings received for European Patent Application No. 20203888.1, mailed on Nov. 24, 2023, 6 pages.
Non-Final Office Action received for U.S. Appl. No. 17/410,169, mailed on Dec. 5, 2023, 48 pages.
Non-Final Office Action received for U.S. Appl. No. 18/130,847, mailed on Dec. 5, 2023, 8 pages.
Summons to Attend Oral Proceedings received for European Patent Application No. 20203888.1, mailed on Oct. 10, 2023, 2 pages.
Final Office Action received for U.S. Appl. No. 17/878,792, mailed on Jan. 8, 2024, 23 pages.
Notice of Allowance received for U.S. Appl. No. 17/728,725, mailed on Jan. 11, 2024, 10 pages.
Notice of Hearing received for Indian Patent Application No. 202018015998, mailed on Dec. 15, 2023, 3 pages.
Notice of Hearing received for Indian Patent Application No. 202018016000, mailed on Dec. 15, 2023, 3 pages.
Office Action received for Chinese Patent Application No. 202110957983.8, mailed on Dec. 27, 2023, 23 pages (13 pages of English Translation and 10 pages of Official Copy).
Advisory Action received for U.S. Appl. No. 12/689,834, mailed on Aug. 19, 2015, 3 pages.
Advisory Action received for U.S. Appl. No. 09/477,419, mailed on Dec. 4, 2002, 3 pages.
Advisory Action received for U.S. Appl. No. 10/213,929, mailed on Sep. 22, 2006, 3 pages.
Advisory Action received for U.S. Appl. No. 11/069,977, mailed on Aug. 6, 2012, 3 pages.
Advisory Action received for U.S. Appl. No. 11/069,977, mailed on May 13, 2009, 2 pages.
Advisory Action received for U.S. Appl. No. 11/069,977, mailed on May 26, 2011, 3 pages.
Advisory Action received for U.S. Appl. No. 11/960,669, mailed on Nov. 3, 2011, 3 pages.
Advisory Action received for U.S. Appl. No. 12/242,851, mailed on Nov. 15, 2013, 4 pages.
Advisory Action received for U.S. Appl. No. 12/888,362, mailed on Sep. 4, 2015, 3 Pages.
Advisory Action received for U.S. Appl. No. 12/888,362, mailed on May 7, 2013, 3 pages.
Advisory Action received for U.S. Appl. No. 13/077,850, mailed on Apr. 24, 2014, 3 pages.
Advisory Action received for U.S. Appl. No. 13/077,855, mailed on Jun. 15, 2016, 4 pages.
Advisory Action received for U.S. Appl. No. 13/077,862, mailed on Apr. 7, 2016, 3 pages.

(56) References Cited

OTHER PUBLICATIONS

Advisory Action received for U.S. Appl. No. 13/077,874, mailed on Aug. 19, 2016, 3 pages.
Advisory Action received for U.S. Appl. No. 14/261,112, mailed on Apr. 23, 2015, 3 pages.
Advisory Action received for U.S. Appl. No. 14/261,112, mailed on Nov. 30, 2017, 3 pages.
Advisory Action received for U.S. Appl. No. 14/710,125, mailed on Mar. 14, 2017, 3 pages.
Advisory Action received for U.S. Appl. No. 14/839,912, mailed on Nov. 14, 2019, 6 pages.
Advisory Action received for U.S. Appl. No. 14/913,349, mailed on Oct. 29, 2019, 4 pages.
Advisory Action received for U.S. Appl. No. 15/049,052, mailed on Sep. 11, 2017, 2 pages.
Advisory Action received for U.S. Appl. No. 15/411,110, mailed on Jun. 29, 2021, 4 pages.
Advisory Action received for U.S. Appl. No. 15/421,865, mailed on Apr. 16, 2020, 7 pages.
Agarwal Deepesh, "DexClock—Live Clock and Date Blended Into Beautiful Artwork As Your Desktop Wallpaper", available at: https://www.megaleecher.net/DexCiock_Wallpaper_Designs, Jul. 6, 2013, 4 pages.
Appeal Decision received for U.S. Appl. No. 13/077,862, mailed on Mar. 22, 2019, 10 pages.
*Apple Inc.* vs. *Samsung Electronics Co. Ltd. et al.*, Judgment in Interlocutory proceeding, Case No. 396957/KG ZA 11-730, civil law sector, Aug. 24, 2011, pp. 1-65.
*Apple Inc.* vs. *Samsung Electronics Co. Ltd., et al.*, Samsung's Motion to Supplement Invalidity Contentions, Case No. 11-cv-01846-LHK, filed Jan. 27, 2012 together with Exhibit 6, Jan. 27, 2012, 47 pages.
*Apple Inc.* vs. *Samsung Electronics Co. Ltd., et al.*, Samsung's Patent Local Rule 3-3 and 3-4 Disclosures, Case No. 11-cv-01846-LHK, dated Oct. 7, 2011, together with Exhibits G-1 through G-7 and Exhibit H, Oct. 7, 2011, 287 pages.
Apple Iphone School, "Customize 1.19 Update for the iPhone", 4:02 minutes video, available at <http://www.youtube.com/watch?v=5ogDzOM89oc>, uploaded on Dec. 8, 2007, 2 pages.
Apple Iphone School, "SummerBoard 3.0a9 for iPhone", 4:50 minutes video, available at <http://www.youtube.com/watch?v=s_P_9mrZTKs>, uploaded on Oct. 21, 2007, 2 pages.
Apple, "iPhone User's Guide", Available at <http://mesnotices.20minutes.fr/manuel-notice-mode-emploi/APPLE/IPHONE%2D%5FE#>, Retrieved on Mar. 27, 2008, Jun. 2007, 137 pages.
Apple, "Iphone User's Guide", iPhone first generation, Available at: <http://pocketpccentral.net/iphone/products/1 g_iphone.htm>, Jun. 29, 2007, 124 pages.
Apple, "Keynote '08 User's Guide", © Apple Inc., 2008, 204 pages.
Appleltouchreviews, ""The Best Cydia Tweak For Your iPhone, iPod Touch & iPad-Iconoclasm"", Available online at: https://www.youtube.com/watch?v=EhriZRINufQ, Apr. 23, 2011, 2 pages.
Applicant-Initiated Interview Summary received for U.S. Appl. No. 14/839,912, mailed on Nov. 5, 2019, 5 pages.
Applicant-Initiated Interview Summary received for U.S. Appl. No. 14/913,349, mailed on Oct. 7, 2019, 4 pages.
Applicant-Initiated Interview Summary received for U.S. Appl. No. 14/913,349, mailed on Oct. 12, 2022, 2 pages.
Applicant-Initiated Interview Summary received for U.S. Appl. No. 15/411,110, mailed on Apr. 21, 2020, 5 pages.
Applicant-Initiated Interview Summary received for U.S. Appl. No. 15/411,110, mailed on Nov. 17, 2020, 7 pages.
Applicant-Initiated Interview Summary received for U.S. Appl. No. 15/411,110, mailed on Oct. 28, 2019, 6 pages.
Applicant-Initiated Interview Summary received for U.S. Appl. No. 15/411,110, mailed on Oct. 31, 2022, 6 pages.
Applicant-Initiated Interview Summary received for U.S. Appl. No. 15/418,537, mailed on Dec. 23, 2019, 6 pages.
Applicant-Initiated Interview Summary received for U.S. Appl. No. 15/421,865, mailed on Dec. 15, 2020, 6 pages.
Applicant-Initiated Interview Summary received for U.S. Appl. No. 15/421,865, mailed on Feb. 3, 2020, 5 pages.
Applicant-Initiated Interview Summary received for U.S. Appl. No. 15/421,865, mailed on Feb. 28, 2022, 5 pages.
Applicant-Initiated Interview Summary received for U.S. Appl. No. 15/421,865, mailed on Jun. 30, 2021, 6 pages.
Applicant-Initiated Interview Summary received for U.S. Appl. No. 15/930,300, mailed on Oct. 27, 2020, 3 pages.
Applicant-Initiated Interview Summary received for U.S. Appl. No. 16/020,804, mailed on Apr. 13, 2020, 3 pages.
Applicant-Initiated Interview Summary received for U.S. Appl. No. 16/130,838, mailed on Apr. 19, 2021, 5 pages.
Applicant-Initiated Interview Summary received for U.S. Appl. No. 16/130,838, mailed on Jul. 20, 2020, 6 pages.
Applicant-Initiated Interview Summary received for U.S. Appl. No. 16/130,838, mailed on Mar. 26, 2020, 8 pages.
Applicant-Initiated Interview Summary received for U.S. Appl. No. 16/267,817, mailed on Dec. 1, 2020, 5 pages.
Applicant-Initiated Interview Summary received for U.S. Appl. No. 16/267,817, mailed on Jul. 14, 2020, 5 pages.
Applicant-Initiated Interview Summary received for U.S. Appl. No. 16/270,801, mailed on Mar. 11, 2020, 3 pages.
Applicant-Initiated Interview Summary received for U.S. Appl. No. 16/270,902, mailed on Mar. 11, 2020, 3 pages.
Applicant-Initiated Interview Summary received for U.S. Appl. No. 16/737,372, mailed on Aug. 31, 2022, 2 pages.
Applicant-Initiated Interview Summary received for U.S. Appl. No. 16/737,372, mailed on Mar. 1, 2022, 2 pages.
Applicant-Initiated Interview Summary received for U.S. Appl. No. 16/737,372, mailed on Oct. 5, 2021, 2 pages.
Applicant-Initiated Interview Summary received for U.S. Appl. No. 16/775,528, mailed on Aug. 30, 2021, 4 pages.
Applicant-Initiated Interview Summary received for U.S. Appl. No. 16/775,528, mailed on Feb. 23, 2021, 4 pages.
Applicant-Initiated Interview Summary received for U.S. Appl. No. 16/775,528, mailed on Jan. 13, 2022, 4 pages.
Applicant-Initiated Interview Summary received for U.S. Appl. No. 16/832,285, mailed on Nov. 19, 2021, 19 pages.
Applicant-Initiated Interview Summary received for U.S. Appl. No. 16/994,392, mailed on Dec. 3, 2021, 2 pages.
Applicant-Initiated Interview Summary received for U.S. Appl. No. 16/994,392, mailed on Mar. 10, 2022, 2 pages.
Applicant-Initiated Interview Summary received for U.S. Appl. No. 17/190,869, mailed on Dec. 10, 2021, 2 pages.
Applicant-Initiated Interview Summary received for U.S. Appl. No. 17/410,169, mailed on Apr. 25, 2023, 6 pages.
Applicant-Initiated Interview Summary received for U.S. Appl. No. 17/410,169, mailed on Nov. 7, 2022, 5 pages.
Applicant-Initiated Interview Summary received for U.S. Appl. No. 17/508,894, mailed on Mar. 10, 2023, 4 pages.
Applicant-Initiated Interview Summary received for U.S. Appl. No. 17/728,725, mailed on Apr. 19, 2023, 2 pages.
Askabouttech, "How to Change Android Smartwatch Wallpaper", also online available at: https://www.youtube.com/watch?v=SBYrsyuHqBA (Year: 2014), Jul. 12, 2014, 5 pages.
Asus Eee News, Mods, and Hacks: Asus Eee PC Easy Mode Internet Tab Options Tour, asuseeehacks.blogspot.com, Available online at <http://asuseeehacks.blogspot.com/2007/11/asus-eee-pc-user-interface-tour.html>, Nov. 10, 2007, 33 pages.
Baidu Experience, "iPhone how to move icon", Online available at: https://jingyan.baidu.com/article/eb9f7b6da4eacb869264e84f.html, Apr. 28, 2014, 4 pages.
Barsch Bill, "3D Desktop! TouchScreen and XGL on Linux!", 2:42 minutes video, available at <http://www.youtube.com/watch?v=Yx9FgLr9oTk>, uploaded on Aug. 15, 2006, 2 pages.
Blickenstorfer Conrad H., "Neonode N2 A new version of the phone that pioneered touchscreens", Pen Computing Magazine, Online Available at: http://www.pencomputing.com/WinCE/neonode-n2-review.html, Nov. 4, 2007, 9 pages.
Board Opinion received for Chinese Patent Application No. 200780041309.3, mailed on Apr. 1, 2016, 16 pages.
Board Opinion received for Chinese Patent Application No. 201480001676.0, mailed on Oct. 21, 2019, 10 pages.

(56) References Cited

OTHER PUBLICATIONS

Bott et al., "Table of Contents/Chapter 20: Putting Pictures on Folder Icons", Microsoft Windows XP Inside Out Deluxe, Second Editionhttp://proquest.safaribooksonline.com/book/operating-systems/9780735642171, Oct. 6, 2004, pp. 1-8 and 669.
Brewster et al., "Multimodal 'Eyes-Free' Interaction Techniques Wearable Devices", CHI 2003, Interaction techniques for Constrained Displays, Apr. 5-1 0, 2003, pp. 473-480.
Brewster et al., "Tactons: Structured Tactile Messages for Non-Visual Information Display", 5th Australasian User Interface Conference, 2004, pp. 15-23.
Brewster et al., "Using Non-Speech Sounds in Mobile Computing Devices", First Workshop on Human-Computer Interaction with Mobile Devices, 1998, pp. 1-3.
Brief Communication Regarding Oral Proceedings received for European Patent Application No. 17810723.1, mailed on Nov. 11, 2022, 11 pages.
Brown et al., "Multidimensional Tactons for Non-Visual Information Presentation in Mobile Devices", MobileHCI'06, Proceedings of the 8th conference on Human-computer interaction with mobile devices and services, Sep. 12-15, 2006, pp. 231-238.
Certificate of Examination received for Australian Patent Application No. 2017101561, mailed on Jun. 25, 2018, 2 pages.
Certificate of Examination received for Australian Patent Application No. 2018101076, mailed on Apr. 11, 2019, 2 pages.
Cha Bonnie, "HTC Touch Diamond (Sprint)", CNET Reviews, available at <http://www.cnet.com/products/htc-touch/>, updated on Sep. 12, 2008, 8 pages.
Chester et al., "Mastering Excel 97", Sybex Inc., Fourth Edition, pp. 6, 35, and 44-45.
Clifton Marc, "Detect if Another Process is Running and Bring it to the Foreground", Online Available at: https://www.codeproject.com/Articles/2976/Detect-if-another-process-is-running-andbring-it, Sep. 30, 2002, 6 pages.
cocoabuilder.com, "Single Instance of a Cocoa Application", Available at: http://www.cocoabuilder.com/archive/cocoa/167892-single-instance-of-cocoa-application.html, Jul. 19, 2006, 4 pages.
Collomb et al., "Improving drag-and-drop on wall-size displays", proceedings of Graphics Intertace, May 9, 2005, pp. 25-32.
Communication of the Board of Appeal received for European Patent Application No. 09170697.8, mailed on Jan. 25, 2021, 6 pages.
Corrected Notice of Allowance received for U.S. Appl. No. 12/689,834, mailed on Feb. 8, 2018, 4 pages.
Corrected Notice of Allowance received for U.S. Appl. No. 12/689,834, mailed on May 17, 2018, 2 pages.
Corrected Notice of Allowance received for U.S. Appl. No. 12/888,362, mailed on Apr. 25, 2018, 3 pages.
Corrected Notice of Allowance received for U.S. Appl. No. 12/888,362, mailed on Jun. 6, 2018, 3 pages.
Corrected Notice of Allowance received for U.S. Appl. No. 13/077,874, mailed on Dec. 9, 2016, 2 pages.
Corrected Notice of Allowance received for U.S. Appl. No. 14/142,640, mailed on Feb. 5, 2020, 4 pages.
Corrected Notice of Allowance received for U.S. Appl. No. 14/142,648, mailed on May 20, 2020, 2 pages.
Corrected Notice of Allowance received for U.S. Appl. No. 14/641,287, mailed on Aug. 9, 2018, 2 pages
Corrected Notice of Allowance received for U.S. Appl. No. 14/641,287, mailed on Sep. 12, 2018, 2 pages.
Corrected Notice of Allowance received for U.S. Appl. No. 14/913,349, mailed on Nov. 3, 2022, 2 pages.
Corrected Notice of Allowance received for U.S. Appl. No. 14/913,349, mailed on Oct. 3, 2022, 3 pages.
Corrected Notice of Allowance received for U.S. Appl. No. 14/913,349, mailed on Sep. 1, 2022, 2 pages.
Corrected Notice of Allowance received for U.S. Appl. No. 15/930,300, mailed on Dec. 24, 2020, 3 pages.
Corrected Notice of Allowance received for U.S. Appl. No. 16/775,528, mailed on Mar. 25, 2022, 2 pages.
Corrected Notice of Allowance received for U.S. Appl. No. 16/994,392, mailed on Aug. 4, 2022, 2 pages.
Corrected Notice of Allowance received for U.S. Appl. No. 16/994,392, mailed on Jul. 19, 2022, 2 pages.
Corrected Notice of Allowance received for U.S. Appl. No. 17/002,622, mailed on Dec. 13, 2021, 2 pages.
Corrected Notice of Allowance received for U.S. Appl. No. 17/002,622, mailed on Feb. 16, 2022, 2 pages.
Corrected Notice of Allowance received for U.S. Appl. No. 17/002,622, mailed on Jan. 25, 2022, 2 pages.
Corrected Notice of Allowance received for U.S. Appl. No. 17/019,062, mailed on Dec. 8, 2021, 2 pages.
Corrected Notice of Allowance received for U.S. Appl. No. 17/130,674, mailed on Jul. 29, 2022, 2 pages.
Corrected Notice of Allowance received for U.S. Appl. No. 17/521,768, mailed on Jul. 29, 2022, 2 pages.
Corrected Notice of Allowance received for U.S. Appl. No. 17/698,979, mailed on Feb. 17, 2023, 2 pages.
Cowart Robert, "Mastering Windows 3.1", Sybex, Special Edition, 1993, pp. 66-67.
Cuyamaca LRC Computer Labs, "Topics in CommonSpace Application", Available at <http://www.cuyamaca.net/librarylab/Technical%20Help/cmspace.asp>, Retrieved on May 19, 2014, 16 pages.
Cyr Jim, "Apple Watch—Customize Modular Watch Face", available online at: https://www.youtube.com/watch?v=02W93HbKIK8, May 13, 2015, 2 pages.
Deanhill, "Run a Program or Switch to an Already Running Instance", Available Online at <https://autohotkey.com/board/topic/7129-run-a-program-or-switch-to-an-already-running-instance/>, Feb. 1, 2006, 16 pages.
Decision of Appeal received for Korean Patent Application No. 10-2021-7017259, mailed on Jun. 29, 2022, 28 pages.
Decision of Board of Appeal received for European Patent Application No. 09170697.8 mailed on Oct. 24, 2016, 24 pages.
Decision of Board of Appeal received for European Patent Application No. 09170697.8, mailed on Apr. 23, 2021, 17 pages.
Decision on Acceptance received for Australian Patent Application No. 2017202587, mailed on Oct. 8, 2019, 19 pages.
Decision on Appeal received for Korean Patent Application No. 10-2016-7008449, mailed on Jul. 30, 2019, 29 pages.
Decision on Appeal received for Korean Patent Application No. 10-2018-7010872, mailed on Jan. 20, 2020, 20 pages.
Decision on Appeal received for U.S. Appl. No. 14/142,640, mailed on Oct. 7, 2019, 9 pages.
Decision on Appeal received for U.S. Appl. No. 14/142,648, mailed on Feb. 28, 2020, 6 pages.
Decision on Appeal received for U.S. Appl. No. 14/261,112, mailed on Oct. 29, 2020, 20 pages.
Decision on Appeal received for U.S. Appl. No. 14/710,125, mailed on Mar. 11, 2019, 7 pages.
Decision on Appeal received for U.S. Appl. No. 14/913,349, mailed on Apr. 20, 2022, 13 pages.
Decision to Grant received for Danish Patent Application No. PA201570781, mailed on Jul. 17, 2017, 2 pages.
Decision to Grant received for Danish Patent Application No. PA201670117, mailed on Nov. 20, 2017, 2 pages.
Decision to Grant received for Danish Patent Application No. PA201770794, mailed on Nov. 11, 2019, 2 pages.
Decision to Grant received for European Patent Application No. 08829660.3, mailed on May 6, 2022, 2 pages.
Decision to Grant received for European Patent Application No. 09170697.8, mailed on Apr. 29, 2022, 2 pages.
Decision to Grant received for European Patent Application No. 09700333.9, mailed on Nov. 7, 2013, 2 pages.
Decision to Grant received for European Patent Application No. 10762813.3, mailed on May 11, 2018, 3 pages.
Decision to Grant received for European Patent Application No. 12177813.8, mailed on Nov. 24, 2016, 3 pages.
Decision to Grant received for European Patent Application No. 12189764.9, mailed on Nov. 25, 2021, 2 pages.
Decision to Grant received for European Patent Application No. 12194312.0, mailed on Feb. 1, 2018, 2 pages.

(56) References Cited

OTHER PUBLICATIONS

Decision to Grant received for European Patent Application No. 12194315.3, mailed on Oct. 12, 2017, 2 pages.
Decision to Grant received for European Patent Application No. 12704175.4, mailed on Jul. 19, 2018, 2 pages.
Decision to Grant received for European Patent Application No. 13795330.3, mailed on Jan. 16, 2020, 2 pages.
Decision to Grant received for European Patent Application No. 14772001.5, mailed on Dec. 5, 2019, 2 pages.
Decision to Grant received for European Patent Application No. 17198398.4, mailed on Jun. 14, 2019, 3 pages.
Decision to Grant received for European Patent Application No. 17210062.0, mailed on Oct. 1, 2020, 2 pages.
Decision to Grant received for European Patent Application No. 19199004.3, mailed on Jan. 21, 2021, 2 pages.
Decision to Refuse received for European Patent Application No. 06846840.4 , mailed on Mar. 4, 2010, 10 pages.
Decision to Refuse received for European Patent Application No. 07814689.1, mailed on May 11, 2012, 15 pages.
Decision to Refuse received for European Patent Application No. 09170697.8, mailed on Jul. 10, 2018, 31 pages.
Decision to Refuse received for European Patent Application No. 09170697.8, mailed on Oct. 23, 2013, 12 pages.
Decision to Refuse received for European Patent Application No. 14734674.6, mailed on Jun. 29, 2022, 15 pages.
Decision to Refuse received for Japanese Patent Application No. 2020-123882, mailed on Mar. 3, 2023, 6 pages.
Delltech, "Windows XP: The Complete Reference: Working with Graphics", http://web.archive.org/web/20050405151925/http:/delltech.150m.corn/XP/graphics/3.htm, Chapter 18, Apr. 5, 2005, 4 pages.
Esther, "Instructions for Kobo Books: How to change to scrolling mode and do table of contents navigation—Google Groups", XP055513050, retrieved from the Internet: URL: https://groups.google.com/forum/print/msg/viphone/-dkqODh_31N8acJK2dGPe8J?ctz=4607561_ 48_52_123900_48_ 436380 [retrieved on Oct. 5, 2018]., Aug. 28, 2010, 3 pages.
European Search Report received for European Patent Application No. 19199004.3, mailed on Nov. 12, 2019, 6 pages.
European Search Report received for European Patent Application No. 20217518.8, mailed on Apr. 16, 2021, 4 pages.
Examiner-Initiated Interview Summary received for U.S. Appl. No. 14/913,349, mailed on Oct. 27, 2020, 3 pages.
Examiner-Initiated Interview Summary received for U.S. Appl. No. 14/913,349, mailed on Sep. 22, 2021, 2 pages.
Examiner's Answer to Appeal Brief received for U.S. Appl. No. 14/142,648, mailed on Apr. 10, 2018, 15 pages.
Examiner's Answer to Appeal Brief received for U.S. Appl. No. 14/261,112, mailed on Oct. 29, 2019, 10 pages.
Examiner's Answer to Appeal Brief received for U.S. Appl. No. 14/710,125, mailed on Jan. 26, 2018, 6 pages.
Examiner's Answer to Appeal Brief received for U.S. Appl. No. 14/913,349, mailed on Sep. 30, 2021, 23 pages.
Examiner's Answer to Appeal Brief received for U.S. Appl. No. 15/411,110, mailed on Feb. 1, 2022, 9 pages.
Examiner's Answer to Appeal Brief received for U.S. Appl. No. 16/832,285, mailed on Sep. 7, 2022, 30 pages.
Examiner's Pre-Review Report received for Japanese Patent Application No. 2014-253365, mailed on Dec. 12, 2017, 7 pages.
Examiner's Pre-Review Report received for Japanese Patent Application No. 2018-121118, mailed on Jun. 2, 2020, 4 pages.
Examiner's Pre-Review Report received for Japanese Patent Application No. 2019-024663, mailed on Aug. 31, 2021, 4 pages.
ExpansysTV, "HTC Touch Dual Demonstration by expansys", 5:26 minutes video, available at <http://www.youtube.com/watch?v=Tupk8MYLhMk>, uploaded on Oct. 1, 2007, 2 pages.
Extended European Search Report received for European Patent Application No. 09170697.8, mailed on Apr. 28, 2010, 3 pages.
Extended European Search Report received for European Patent Application No. 12177813.8, mailed on Feb. 1, 2013, 6 pages.
Extended European Search Report received for European Patent Application No. 12189764.9, mailed on Jan. 4, 2013, 6 pages.
Extended European Search Report received for European Patent Application No. 12194312.0 mailed on Jan. 16, 2013, 7 pages.
Extended European Search Report received for European Patent Application No. 12194315.3, mailed on Jan. 16, 201, 7 pages.
Extended European Search Report received for European Patent Application No. 17198398.4, mailed on Feb. 8, 2018, 8 pages.
Extended European Search Report received for European Patent Application No. 17210062.0, mailed on Feb. 20, 2018, 12 pages.
Extended European Search Report received for European Patent Application No. 17810723.1, mailed on Nov. 12, 2019, 9 pages.
Extended European Search Report received for European Patent Application No. 17810739.7, mailed on Mar. 22, 2019, 9 pages.
Extended European Search Report received for European Patent Application No. 17813879.8, mailed on Jan. 8, 2020, 8 pages.
Extended European Search Report received for European Patent Application No. 18185408.4, mailed on Oct. 17, 2018, 10 pages.
Extended European Search Report received for European Patent Application No. 19176224.4, mailed on Dec. 13, 2019, 7 pages.
Extended European Search Report received for European Patent Application No. 20203888.1, mailed on Feb. 10, 2021, 8 pages.
Fadhley Mohdn., "LauncherX", Online Available at <http://www.palmx.org/mambo/index2.php?option=com_content&task=view&id=65&1temid>, Nov. 21, 2002, 3 pages.
Feist Jonathan, "Android customization—how to create a custom clock widget using Zooper Widget", Available Online at: https://www.androidauthority.com/zooper-widget-clock-366476/, May 15, 2014, 10 pages.
Final Office Action received for U.S. Appl. No. 09/477,419, mailed on Aug. 15, 2002, 13 pages.
Final Office Action received for U.S. Appl. No. 10/213,929, mailed on Dec. 14, 2004, 13 pages.
Final Office Action received for U.S. Appl. No. 10/213,929, mailed on Jul. 25, 2007, 25 pages.
Final Office Action received for U.S. Appl. No. 10/213,929, mailed on Mar. 22, 2006, 22 pages.
Final Office Action received for U.S. Appl. No. 11/069,977, mailed on Feb. 3, 2009, 12 pages.
Final Office Action received for U.S. Appl. No. 11/069,977, mailed on Mar. 10, 2011, 18 pages.
Final Office Action received for U.S. Appl. No. 11/069,977, mailed on Mar. 11, 2010, 17 pages.
Final Office Action received for U.S. Appl. No. 11/069,977, mailed on Mar. 29, 2012, 19 pages.
Final Office Action received for U.S. Appl. No. 11/620,686, mailed on Aug. 3, 2009, 11 pages.
Final Office Action received for U.S. Appl. No. 11/620,686, mailed on Jul. 12, 2010, 10 pages.
Final Office Action received for U.S. Appl. No. 11/620,687, mailed on Aug. 18, 2009, 7 pages.
Final Office Action received for U.S. Appl. No. 11/849,938, mailed on Jan. 30, 2013, 31 pages.
Final Office Action received for U.S. Appl. No. 11/849,938, mailed on May 27, 2011, 21 pages.
Final Office Action received for U.S. Appl. No. 11/850,010 mailed on Oct. 17, 2011, 11 pages.
Final Office Action received for U.S. Appl. No. 11/850,010, mailed on Apr. 18, 2016, 16 pages.
Final Office Action received for U.S. Appl. No. 11/850,010, mailed on Aug. 14, 2018, 21 pages.
Final Office Action received for U.S. Appl. No. 11/850,010, mailed on Feb. 15, 2013, 12 pages.
Final Office Action received for U.S. Appl. No. 11/850,010, mailed on May 8, 2014, 11 pages.
Final Office Action received for U.S. Appl. No. 11/850,010, mailed on May 11, 2018, 24 pages.
Final Office Action received for U.S. Appl. No. 11/850,011, mailed on Dec. 1, 2010, 15 pages.
Final Office Action received for U.S. Appl. No. 11/960,669, mailed on Aug. 18, 2011, 13 pages.
Final Office Action received for U.S. Appl. No. 11/969,809, mailed on Jul. 14, 2011, 26 pages.

(56) References Cited

OTHER PUBLICATIONS

Final Office Action received for U.S. Appl. No. 12/006,172, mailed on Mar. 2, 2012, 16 pages.
Final Office Action received for U.S. Appl. No. 12/207,316, mailed on Feb. 15, 2013, 24 pages.
Final Office Action received for U.S. Appl. No. 12/207,316, mailed on Mar. 4, 2011, 32 pages.
Final Office Action received for U.S. Appl. No. 12/242,851, mailed on Dec. 12, 2011, 13 pages.
Final Office Action received for U.S. Appl. No. 12/242,851, mailed on Jul. 1, 2016, 90 pages.
Final Office Action received for U.S. Appl. No. 12/242,851, mailed on May 10, 2013, 20 pages.
Final Office Action received for U.S. Appl. No. 12/364,470, mailed on May 5, 2010, 16 pages.
Final Office Action received for U.S. Appl. No. 12/364,470, mailed on Oct. 19, 2011, 20 pages.
Final Office Action received for U.S. Appl. No. 12/689,834, mailed on Mar. 26, 2015, 30 pages.
Final Office Action received for U.S. Appl. No. 12/689,834, mailed on May 4, 2017, 41 pages.
Final Office Action received for U.S. Appl. No. 12/689,834, mailed on Oct. 15, 2012, 22 pages.
Final Office Action received for U.S. Appl. No. 12/848,062, mailed on Dec. 12, 2012, 12 pages.
Final Office Action received for U.S. Appl. No. 12/888,362, mailed on Apr. 29, 2015, 12 pages.
Final Office Action received for U.S. Appl. No. 12/888,362, mailed on Jan. 3, 2013, 13 pages.
Final Office Action received for U.S. Appl. No. 12/888,375, mailed on Nov. 7, 2012, 14 pages.
Final Office Action received for U.S. Appl. No. 12/888,376, mailed on Feb. 8, 2013, 11 pages.
Final Office Action Received for U.S. Appl. No. 13/077,850, mailed on Nov. 7, 2013, 14 pages.
Final Office Action Received for U.S. Appl. No. 13/077,855, mailed on Mar. 17, 2014, 11 pages.
Final Office Action received for U.S. Appl. No. 13/077,855, mailed on Mar. 24, 2016, 19 pages.
Final Office Action Received for U.S. Appl. No. 13/077,855, mailed on Nov. 7, 2013, 14 pages.
Final Office Action Received for U.S. Appl. No. 13/077,862, mailed on Nov. 8, 2013, 15 pages.
Final Office Action received for U.S. Appl. No. 13/077,862, mailed on Oct. 22, 2015, 16 pages.
Final Office Action Received for U.S. Appl. No. 13/077,867, mailed on May 23, 2013, 10 pages.
Final Office Action received for U.S. Appl. No. 13/077,874, mailed on Dec. 3, 2014, 23 pages.
Final Office Action received for U.S. Appl. No. 13/077,874, mailed on May 5, 2016, 26 pages.
Final Office Action received for U.S. Appl. No. 13/536,768, mailed on Apr. 22, 2016, 31 pages.
Final Office Action received for U.S. Appl. No. 13/536,768, mailed on Aug. 24, 2017, 39 pages.
Final Office Action received for U.S. Appl. No. 13/536,768, mailed on Nov. 5, 2014, 27 pages.
Final Office Action received for U.S. Appl. No. 14/142,640, mailed on Mar. 8, 2016, 35 pages.
Final Office Action received for U.S. Appl. No. 14/142,648, mailed on Dec. 7, 2016, 12 pages.
Final Office Action received for U.S. Appl. No. 14/261,112, mailed on Aug. 10, 2017, 35 pages.
Final Office Action received for U.S. Appl. No. 14/261,112, mailed on Mar. 3, 2016, 31 pages.
Final Office Action received for U.S. Appl. No. 14/261,112, mailed on Nov. 7, 2018, 34 pages.
Final Office Action received for U.S. Appl. No. 14/261,112, mailed on Oct. 9, 2014, 29 pages.
Final Office Action received for U.S. Appl. No. 14/641,287, mailed on Jul. 20, 2017, 18 pages.
Final Office Action received for U.S. Appl. No. 14/710,125, mailed on Oct. 27, 2016, 13 pages.
Final Office Action received for U.S. Appl. No. 14/839,912, mailed on Jul. 30, 2019, 42 pages.
Final Office Action received for U.S. Appl. No. 14/839,912, mailed on Sep. 13, 2018, 31 pages.
Final Office Action received for U.S. Appl. No. 14/913,349, mailed on Jul. 22, 2019, 20 pages.
Final Office Action received for U.S. Appl. No. 14/913,349, mailed on Jul. 30, 2018, 18 pages.
Final Office Action received for U.S. Appl. No. 14/913,349, mailed on Oct. 30, 2020, 33 pages.
Final Office Action received for U.S. Appl. No. 15/049,052, mailed on Mar. 1, 2018, 15 pages.
Final Office Action received for U.S. Appl. No. 15/049,052, mailed on May 17, 2017, 13 pages.
Final Office Action received for U.S. Appl. No. 15/049,052, mailed on Oct. 2, 2018, 16 pages.
Final Office Action received for U.S. Appl. No. 15/411,110, mailed on Apr. 12, 2023, 27 pages.
Final Office Action received for U.S. Appl. No. 15/411,110, mailed on Mar. 5, 2020, 30 pages.
Final Office Action received for U.S. Appl. No. 15/411,110, mailed on Mar. 15, 2021, 28 pages.
Final Office Action received for U.S. Appl. No. 15/418,537, mailed on Sep. 23, 2019, 53 pages.
Final Office Action received for U.S. Appl. No. 15/421,865, mailed on Dec. 2, 2019, 19 pages.
Final Office Action received for U.S. Appl. No. 15/421,865, mailed on Jul. 12, 2022, 27 pages.
Final Office Action received for U.S. Appl. No. 15/421,865, mailed on Mar. 19, 2021, 20 pages.
Final Office Action received for U.S. Appl. No. 15/426,836, mailed on Mar. 29, 2019, 49 pages.
Final Office Action received for U.S. Appl. No. 16/130,838, mailed on May 29, 2020, 25 pages.
Final Office Action received for U.S. Appl. No. 16/267,817, mailed on Aug. 24, 2020, 23 pages.
Final Office Action received for U.S. Appl. No. 16/737,372, mailed on Jan. 28, 2022, 20 pages.
Final Office Action received for U.S. Appl. No. 16/775,528, mailed on May 25, 2021, 15 pages.
Final Office Action received for U.S. Appl. No. 16/832,285, mailed on Jan. 19, 2022, 66 pages.
Final Office Action received for U.S. Appl. No. 16/994,392, mailed on Jan. 18, 2022, 12 pages.
Final Office Action received for U.S. Appl. No. 17/410,169, mailed on Feb. 6, 2023, 47 pages.
Fujitsu Ltd, "SX/G Manual of Icons on Desktop, Edition 14/14A V14", 1st Edition, Mar. 27, 1998, 4 pages.
Gade Lisa, "Sprint HTC Touch", Smartphone Reviews by Mobile Tech Review, Available online at <http://www.mobiletechreview.com/phones/HTC-Touch.htm>, Nov. 2, 2007, 7 pages.
Geek, "How to Put the Day of the Week into the Windows Taskbar Clock", available online at: https://www.howtogeek.com/194103/how-to-put-the-day-of-the-week-into-the-windows-taskbar-clock/, 2014, 3 pages.
Gsmarena Team, "HTC Touch review", Online Available at: <twww.gsmarena.com/htc_touch-review-189p3.php>, Nov. 28, 2007, 5 pages.
Gsmarena Team, "HTC Touch Review: Smart to Touch the Spot", available at <http://www.gsmarena.com/htc_touch-review-189.php>, Nov. 28, 2007, 18 pages.
Hayama et al., "To change images of scaled-down representation", Windows XP SP3 & SP2, Dec. 1, 2008., 6 pages.
Helal et al., "Drishti: An Integrated Navigation System for Visually Impaired and Disabled", Fifth International Symposium on Wearable Computers (ISWC'01), IEEE, 2001, pp. 149-156.
Higuchi Tadahiro, "Try API!, Making a cool application with Visual Basic 6.0", 1st edition, Japan, AI Publishing, AI Mook 221, Jul. 16, 1999, 23 pages.

(56) References Cited

OTHER PUBLICATIONS

Honeywell, "TH8000 Series Programmable Thermostats", Retrieved from the internet: URL: https://ia802507.us.archive.org/1/items/generalmanual_000075065/generalmanual_000075065.pdf, 2004, 44 pages.
"How to move and arrange icons on iPhone", Available online on: "https://www.youtube.com/watch?v=5XKAk4wSons", Retrieved on Sep. 10, 2015, Dec. 11, 2011, 1 page.
HTC Europe Co. Ltd and Apple Inc. invalidity Claim dated Jul. 29, 2011, together with amended Particulars of Claim and amended Grounds of invalidity, Jul. 29, 2011, 22 pages.
HTC Europe Co. Ltd and Apple Inc. Invalidity Claim No. HC 12 C 01465, together with annexes, dated Apr. 5, 2012, 12 pages.
Huang et al., "Effects of Visual Vibratory Perception by Cross-Modali Matching with Tactile Sensation", Retrieved from the Internet:<URL: http://media.nuas.ac.jp/~robin/Research/ADC99.html>, 1999, pp. 1-7.
Intention to Grant received for Danish Patent Application No. PA201570781, mailed on Dec. 8, 2016, 2 pages.
Intention to Grant received for Danish Patent Application No. PA201670117, mailed on Apr. 21, 2017, 2 pages.
Intention to Grant received for Danish Patent Application No. PA201770794, mailed on Aug. 15, 2019, 2 pages.
Intention to Grant received for European Patent Application No. 08829660.3, mailed on Dec. 17, 2021, 8 pages.
Intention to Grant received for European Patent Application No. 09170697.8, mailed on Dec. 16, 2021, 8 pages.
Intention to Grant received for European Patent Application No. 09700333.9, mailed on Jun. 20, 2013, 7 pages.
Intention to Grant received for European Patent Application No. 10762813.3, mailed on Dec. 18, 2017, 11 pages.
Intention to Grant received for European Patent Application No. 12177813.8, mailed on Jul. 6, 2016, 8 pages.
Intention to Grant received for European Patent Application No. 12189764.9, mailed on Mar. 5, 2021, 14 pages.
Intention to Grant received for European Patent Application No. 12189764.9, mailed on Sep. 28, 2021, 14 pages.
Intention to Grant received for European Patent Application No. 12194312.0, mailed on Aug. 3, 2017, 8 pages.
Intention to Grant received for European Patent Application No. 12194315.3, mailed on May 31, 2017, 8 pages.
Intention to Grant received for European Patent Application No. 12704175.4, mailed on Mar. 22, 2018, 8 pages.
Intention to Grant received for European Patent Application No. 13795330.3, mailed on Aug. 9, 2019, 13 pages.
Intention to Grant received for European Patent Application No. 14772001.5, mailed on Jul. 18, 2019, 16 pages.
Intention to Grant received for European Patent Application No. 14772001.5, mailed on Mar. 22, 2019, 17 pages.
Intention to Grant received for European Patent Application No. 17198398.4, mailed on Jan. 28, 2019, 8 pages.
Intention to Grant received for European Patent Application No. 17210062.0, mailed on Jun. 23, 2020, 8 pages.
Intention to Grant received for European Patent Application No. 17810723.1, mailed on Dec. 16, 2022, 9 pages.
Intention to Grant received for European Patent Application No. 19199004.3, mailed on Sep. 14, 2020, 9 pages.
International Preliminary Report on Patentability received for PCT Patent Application No. PCT/US2006/062685, mailed on Jul. 1, 2008, 6 pages.
International Preliminary Report on Patentability received for PCT Patent Application No. PCT/US2007/077639, mailed on Mar. 10, 2009, 6 pages.
International Preliminary Report on Patentability received for PCT Patent Application No. PCT/US2007/077643, mailed on Mar. 10, 2009, 7 pages.
International Preliminary Report on Patentability received for PCT Patent Application No. PCT/US2008/050047, mailed on Sep. 15, 2009, 11 pages.
International Preliminary Report on Patentability received for PCT Patent Application No. PCT/US2008/050430, mailed on Jul. 7, 2009, 10 pages.
International Preliminary Report on Patentability received for PCT Patent Application No. PCT/US2008/074625, mailed on Mar. 9, 2010, 6 pages.
International Preliminary Report on Patentability received for PCT Patent Application No. PCT/US2009/030225, mailed on Jul. 15, 2010, 10 pages.
International Preliminary Report on Patentability received for PCT Patent Application No. PCT/US2010/050056, mailed on Oct. 18, 2012, 21 pages.
International Preliminary Report on Patentability received for PCT Patent Application No. PCT/US2012/022401, mailed on Aug. 8, 2013, 12 pages.
International Preliminary Report on Patentability received for PCT Patent Application No. PCT/US2013/067634, mailed on May 12, 2016, 9 pages.
International Preliminary Report on Patentability received for PCT Patent Application No. PCT/US2014/040414, mailed on Dec. 23, 2015, 10 pages.
International Preliminary Report on Patentability received for PCT Patent Application No. PCT/US2014/053957, mailed on Mar. 17, 2016, 8 pages.
International Preliminary Report on Patentability received for PCT Patent Application No. PCT/US2015/019303, mailed on Mar. 16, 2017, 22 pages.
International Preliminary Report on Patentability received for PCT Patent Application No. PCT/US2015/047704, mailed on Mar. 16, 2017, 19 pages.
International Preliminary Report on Patentability received for PCT Patent Application No. PCT/US2017/034834, mailed on Dec. 20, 2018, 9 pages.
International Preliminary Report on Patentability received for PCT Patent Application No. PCT/US2017/035331, mailed on Dec. 20, 2018, 13 pages.
International Preliminary Report on Patentability received for PCT Patent Application No. PCT/US2017/037057, mailed on Dec. 27, 2018, 24 pages.
International Search Report and Written Opinion received for PCT Patent Application No. PCT/US2007/077639, mailed on Jul. 8, 2008, 7 pages.
International Search Report and Written Opinion received for PCT Patent Application No. PCT/US2007/077643, mailed on May 8, 2008, 9 pages.
International Search Report and Written Opinion received for PCT Patent Application No. PCT/US2008/050047, mailed on Sep. 3, 2009, 15 pages.
International Search Report and Written Opinion received for PCT Patent Application No. PCT/US2008/050430, mailed on Sep. 1, 2008, 13 pages.
International Search Report and Written Opinion received for PCT Patent Application No. PCT/US2008/074625, mailed on Jan. 8, 2009, 8 pages.
International Search Report and Written Opinion received for PCT Patent Application No. PCT/US2009/030225, mailed on Feb. 25, 2010, 15 pages.
International Search Report and Written Opinion received for PCT Patent Application No. PCT/US2010/050056, mailed on May 13, 2011, 26 pages.
International Search Report and Written Opinion received for PCT Patent Application No. PCT/US2012/022401, mailed on Jul. 6, 2012, 16 pages.
International Search Report and Written Opinion received for PCT Patent Application No. PCT/US2013/067634, mailed on Apr. 16, 2014, 11 pages.
International Search Report and Written Opinion received for PCT Patent Application No. PCT/US2014/040414, mailed on Sep. 16, 2014, 12 pages.
International Search Report and Written Opinion received for PCT Patent Application No. PCT/US2014/053957, mailed on Feb. 19, 2015, 11 pages.

(56) References Cited

OTHER PUBLICATIONS

International Search Report and Written Opinion received for PCT Patent Application No. PCT/US2015/019303, mailed on Sep. 28, 2015, 27 pages.
International Search Report and Written Opinion received for PCT Patent Application No. PCT/US2015/047704, mailed on Feb. 22, 2016, 25 pages.
International Search Report and Written Opinion received for PCT Patent Application No. PCT/US2016/035090, mailed on Oct. 4, 2016, 17 pages.
International Search Report and Written Opinion received for PCT Patent Application No. PCT/US2017/034834, mailed on Aug. 23, 2017, 10 pages.
International Search Report and Written Opinion received for PCT Patent Application No. PCT/US2017/035331, mailed on Oct. 6, 2017, 18 pages.
International Search Report and Written Opinion received for PCT Patent Application No. PCT/US2017/037057, mailed on Aug. 29, 2017, 26 pages.
Invitation to Pay Additional Fees received for PCT Patent Application No. PCT/US2010/050056, mailed on Jan. 5, 2011, 5 pages.
Invitation to Pay Additional Fees received for PCT Patent Application No. PCT/US2012/022401, mailed on May 4, 2012, 8 pages.
Invitation to Pay Additional Fees received for PCT Patent Application No. PCT/US2015/047704, mailed on Dec. 16, 2015, 10 pages.
Invitation to Pay Additional Fees received for PCT Patent Application No. PCT/US2016/035090, mailed on Jul. 15, 2016, 2 pages.
Invitation to Pay Additional Fees received for PCT Patent Application No. PCT/US2017/035322, mailed on Aug. 7, 2017, 4 pages.
Invitation to Pay Additional Fees received for PCT Patent Application No. PCT/US2017/035331, mailed on Aug. 7, 2017, 4 pages.
Jobs Steve, "iPhone Introduction in 2007 (Complete)", available at <https://www.youtube.com/watch?v=9hUlxyE2Ns8>, Jan. 10, 2013, 3 pages.
Kondo Daisuke, "Windows XP Tablet PC Edition Quick Review Challenging by Microsoft", PCfan No.9, No. 28, Japan, Mainichi Communication., Oct. 15, 2002, pp. 12-17.
Ldinos, "Bejeweled Blitz—PC Game", Online available at: https://www.youtube.com/watch?v=8-p3FAxjKTs, Apr. 7, 2010, 1 page.
Leeon N, "LG Tritan (U.S. Cellular)", CNET editor's review, updated Sep. 25, 2009, 2009, 4 pages.
Mac People, "Useful Technique for Web Browser", Ascii Media Works Inc., vol. 15, No. 6., Jun. 1, 2009, pp. 36-47.
Macintosh Human Interface Guidelines (chapter 1), Online available at: http://interface.free.fr/Archives/Apple_HIGuidelines.pdf, 1995, 14 pages.
Mcguffin et al., "Acquisition of Expanding Targets", ACM, Apr. 20-25, 2002, 8 pages.
Microsoft Help and Support, "How to Arrange or Move Icons on the Desktop", http://support.microsoft.com/kb/289587, Mar. 29, 2007, 2 pages.
Microsoft Press, "Microsoft® Windows® XP Inside Out Deluxe", Microsoft Manual, XP Inside Out, Second Edition, Oct. 6, 2004, 8 pages.
Microsoft Windows, "Microsoft Windows (Copyright 2009)", 2 pages.
Microsoft, "Working screenshot of Microsoft Office 2003", Aug. 19, 2003, 14 pages.
Miller Matthew, "HTC Touch and Touch FLO Interface", 7:53 minutes video, available at <http://www.youtube.com/watch?v=6oUp4wOcUc4>, uploaded on Jun. 6, 2007, Jun. 6, 2007, 2 pages.
Minutes of Meeting received for European Patent Application No. 09170697.8, mailed on Jul. 10, 2018, 6 pages.
Minutes of the Oral Proceedings received for European Patent Application No. 12189764.9, mailed on Oct. 13, 2020, 6 pages.
Minutes of the Oral Proceedings received for European Patent Application No. 13795330.3, mailed on Aug. 2, 2019, 7 pages.
Minutes of the Oral Proceedings received for European Patent Application No. 14734674.6, mailed on Jun. 13, 2022, 9 pages.
Minutes of the Oral Proceedings received for European Patent Application No. 17210062.0, mailed on Jun. 17, 2020, 5 pages.
Minutes of the Oral Proceedings received for European Patent Application No. 17810723.1, mailed on Dec. 9, 2022, 7 pages.
mobilissimo.ro, "HTC Touch—Touch FLO Demo", Online Available at: <<https://www.youtube.com/watch?v=YQ8TQ9Rr_7E>, Jun. 5, 2007, 1 page.
Motorola Mobility Opposition Grounds to Apple Inc. European Patent EP 2126678 dated Apr. 11, 2012, together with Exhibits E3, E4, and E5 re: CHT 2005, Apr. 2-7, 2005, Portland Oregon, USA, Apr. 2012, 53 pages.
MS Excel 2013, Jan. 29, 2013, 2 pages.
Nakata Atsushi, "Tablet PC aiming at spread pen input by changing target user", Nikkei Windows for IT Professionals, Nikkei Business Publications, Inc. No. 69., Dec. 1, 2002, pp. 14-16.
Naver Blog, "iPhone iOS 4 folder management", Jun. 27, 2010, 2 pages.
Nishida et al., "Drag-and-Guess: Drag-and-Drop with Prediction", Interact'07 Proceedings of the 11th IFIP TC 13 International Conference on Human-Computer interaction, Sep. 10, 2007, pp. 461-474.
Nokia 7710, https://www.nokia.com/en_int/phones/sites/default/files/user-guides/Nokia_7710_UG_en.pdf, 2005, pp. 1-153.
Non-Final Office Action received for U.S. Appl. No. 09/477,419, mailed on Apr. 17, 2002, 10 pages.
Non-Final Office Action received for U.S. Appl. No. 09/477,419, mailed on Apr. 22, 2003, 13 pages.
Non-Final Office Action received for U.S. Appl. No. 10/213,929, mailed on Aug. 24, 2005, 12 pages.
Non-Final Office Action received for U.S. Appl. No. 10/213,929, mailed on Feb. 12, 2007, 27 pages.
Non-Final Office Action received for U.S. Appl. No. 10/213,929, mailed on May 5, 2004, 11 pages.
Non-Final Office Action received for U.S. Appl. No. 11/069,977, mailed on Aug. 9, 2011, 18 pages.
Non-Final Office Action received for U.S. Appl. No. 11/069,977, mailed on Jul. 31, 2009, 13 pages.
Non-Final Office Action received for U.S. Appl. No. 11/069,977, mailed on Oct. 4, 2010, 15 pages.
Non-Final Office Action received for U.S. Appl. No. 11/069,977, mailed on Sep. 19, 2008, 12 pages.
Non-Final Office Action received for U.S. Appl. No. 11/459,602, mailed on Sep. 4, 2008, 13 pages.
Non-Final Office Action received for U.S. Appl. No. 11/620,686, mailed on Dec. 22, 2009, 10 pages.
Non-Final Office Action received for U.S. Appl. No. 11/620,686, mailed on Dec. 31, 2008, 17 pages.
Non-Final Office Action received for U.S. Appl. No. 11/620,687, mailed on Dec. 22, 2008, 9 pages.
Non-Final Office Action received for U.S. Appl. No. 11/620,687, mailed on Jan. 11, 2010, 9 pages.
Non-Final Office Action received for U.S. Appl. No. 11/849,938, mailed on Dec. 14, 2011, 26 pages.
Non-Final Office Action received for U.S. Appl. No. 11/849,938, mailed on Oct. 12, 2010, 19 pages.
Non-Final Office Action received for U.S. Appl. No. 11/850,010 mailed on May 16, 2012, 12 pages.
Non-Final Office Action received for U.S. Appl. No. 11/850,010 mailed on May 2, 2011, 10 pages.
Non-Final Office Action received for U.S. Appl. No. 11/850,010, mailed on Dec. 17, 2014, 10 pages.
Non-Final Office Action received for U.S. Appl. No. 11/850,010, mailed on Jul. 24, 2017, 19 pages.
Non-Final Office Action received for U.S. Appl. No. 11/850,010, mailed on Jun. 25, 2015, 10 pages.
Non-Final Office Action received for U.S. Appl. No. 11/850,010, mailed on Oct. 24, 2013, 13 pages.
Non-Final Office Action received for U.S. Appl. No. 11/850,011, mailed on Aug. 11, 2010, 19 pages.
Non-Final Office Action received for U.S. Appl. No. 11/960,669, mailed on Mar. 17, 2011, 23 pages.
Non-Final Office Action received for U.S. Appl. No. 11/969,809, mailed on Mar. 14, 2011, 25 pages.

(56) References Cited

OTHER PUBLICATIONS

Non-Final Office Action received for U.S. Appl. No. 12/006,172, mailed on Jun. 22, 2011, 23 pages.
Non-Final Office Action received for U.S. Appl. No. 12/207,316, mailed on Aug. 25, 2010, 25 pages.
Non-Final Office Action received for U.S. Appl. No. 12/207,316, mailed on Jun. 21, 2012, 29 pages.
Non-Final Office Action received for U.S. Appl. No. 12/242,851, mailed on Apr. 15, 2011, 20 pages.
Non-Final Office Action received for U.S. Appl. No. 12/242,851, mailed on Jun. 26, 2015, 33 pages.
Non-Final Office Action received for U.S. Appl. No. 12/242,851, mailed on Oct. 6, 2014, 27 pages.
Non-Final Office Action received for U.S. Appl. No. 12/242,851, mailed on Sep. 20, 2012, 19 pages.
Non-Final Office Action received for U.S. Appl. No. 12/364,470, mailed on Mar. 4, 2011, 17 pages.
Non-Final Office Action received for U.S. Appl. No. 12/364,470, mailed on Nov. 13, 2009, 15 pages.
Non-Final Office Action received for U.S. Appl. No. 12/364,470, mailed on Sep. 2, 2010, 26 pages.
Non-Final Office Action received for U.S. Appl. No. 12/689,834, mailed on Aug. 26, 2016, 26 pages.
Non-Final Office Action received for U.S. Appl. No. 12/689,834, mailed on Jun. 10, 2014, 25 pages.
Non-Final Office Action received for U.S. Appl. No. 12/689,834, mailed on May 24, 2012, 21 pages.
Non-Final Office Action received for U.S. Appl. No. 12/788,278, mailed on Oct. 16, 2012, 19 pages.
Non-Final Office Action received for U.S. Appl. No. 12/848,062, mailed on Jun. 15, 2012, 11 pages.
Non-Final Office Action received for U.S. Appl. No. 12/849,767, mailed on Jul. 9, 2012, 16 pages.
Non-Final Office Action received for U.S. Appl. No. 12/888,362, mailed on Jul. 20, 2012, 15 pages.
Non-Final Office Action received for U.S. Appl. No. 12/888,362, mailed on Sep. 4, 2014, 10 pages.
Non-Final Office Action received for U.S. Appl. No. 12/888,366, mailed on Jul. 31, 2012, 10 pages.
Non-Final Office Action received for U.S. Appl. No. 12/888,370, mailed on Aug. 22, 2012, 13 pages.
Non-Final Office Action Received for U.S. Appl. No. 12/888,373, mailed on Sep. 10, 2012, 12 pages.
Non-Final Office Action received for U.S. Appl. No. 12/888,375, mailed on Jun. 7, 2012, 11 pages.
Non-Final Office Action received for U.S. Appl. No. 12/888,375, mailed on Sep. 30, 2013, 10 pages.
Non-Final Office Action received for U.S. Appl. No. 12/888,376, mailed on Aug. 29, 2014, 12 pages.
Non-Final Office Action received for U.S. Appl. No. 12/888,376, mailed on Oct. 2, 2012, 12 pages.
Non-Final Office Action received for U.S. Appl. No. 12/888,377, mailed on Sep. 13, 2012, 13 pages.
Non-Final Office Action received for U.S. Appl. No. 13/077,850, mailed on Mar. 28, 2013, 15 pages.
Non-Final Office Action received for U.S. Appl. No. 13/077,850, mailed on Sep. 10, 2015, 14 pages.
Non-Final Office Action received for U.S. Appl. No. 13/077,855, mailed on Aug. 13, 2015, 13 pages.
Non-Final Office Action received for U.S. Appl. No. 13/077,855, mailed on Mar. 28, 2013, 15 pages.
Non-Final Office Action received for U.S. Appl. No. 13/077,862, mailed on Dec. 29, 2014, 11 pages.
Non-Final Office Action received for U.S. Appl. No. 13/077,862, mailed on Jul. 17, 2020, 20 pages.
Non-Final Office Action received for U.S. Appl. No. 13/077,862, mailed on Mar. 15, 2013, 10 pages.
Non-Final Office Action received for U.S. Appl. No. 13/077,862, mailed on Nov. 21, 2019, 18 pages.
Non-Final Office Action received for U.S. Appl. No. 13/077,867, mailed on Dec. 21, 2012, 9 pages.
Non-Final Office Action received for U.S. Appl. No. 13/077,867, mailed on Jul. 20, 2012, 10 pages.
Non-Final Office Action received for U.S. Appl. No. 13/077,874, mailed on Dec. 3, 2015, 23 pages.
Non-Final Office Action received for U.S. Appl. No. 13/077,874, mailed on Jun. 19, 2014, 15 pages.
Non-Final Office Action received for U.S. Appl. No. 13/104,903, mailed on Nov. 13, 2012, 9 pages.
Non-Final Office Action received for U.S. Appl. No. 13/104,911, mailed on Feb. 20, 2013, 11 pages.
Non-Final Office Action received for U.S. Appl. No. 13/536,768, mailed on Feb. 3, 2017, 32 pages.
Non-Final Office Action received for U.S. Appl. No. 13/536,768, mailed on Feb. 13, 2014, 25 pages.
Non-Final Office Action received for U.S. Appl. No. 13/536,768, mailed on Oct. 22, 2015, 26 pages.
Non-Final Office Action received for U.S. Appl. No. 14/142,640, mailed on Jun. 5, 2015, 29 pages.
Non-Final Office Action received for U.S. Appl. No. 14/142,648, mailed on Apr. 12, 2016, 11 pages.
Non-Final Office Action received for U.S. Appl. No. 14/261,112, mailed on Apr. 5, 2018, 40 pages.
Non-Final Office Action received for U.S. Appl. No. 14/261,112, mailed on Jul. 8, 2015, 29 pages.
Non-Final Office Action received for U.S. Appl. No. 14/261,112, mailed on Jun. 18, 2014, 25 pages.
Non-Final Office Action received for U.S. Appl. No. 14/261,112, mailed on Nov. 29, 2016, 34 pages.
Non-Final Office Action received for U.S. Appl. No. 14/641,287, mailed on Feb. 27, 2017, 18 pages.
Non-Final Office Action received for U.S. Appl. No. 14/710,125, mailed on Apr. 12, 2016, 12 pages.
Non-Final Office Action received for U.S. Appl. No. 14/839,889, mailed on Mar. 7, 2017, 26 pages.
Non-Final Office Action received for U.S. Appl. No. 14/839,912, mailed on Feb. 12, 2018, 30 pages.
Non-Final Office Action received for U.S. Appl. No. 14/839,912, mailed on Feb. 26, 2019, 36 pages.
Non-Final Office Action received for U.S. Appl. No. 14/839,912, mailed on Jun. 8, 2017, 26 pages.
Non-Final Office Action received for U.S. Appl. No. 14/839,914, mailed on Oct. 19, 2017, 46 pages.
Non-Final Office Action received for U.S. Appl. No. 14/913,349, mailed on Apr. 2, 2019, 15 pages.
Non-Final Office Action received for U.S. Appl. No. 14/913,349, mailed on Apr. 22, 2020, 20 pages.
Non-Final Office Action received for U.S. Appl. No. 14/913,349, mailed on Jan. 2, 2020, 25 pages.
Non-Final Office Action received for U.S. Appl. No. 14/913,349, mailed on Jan. 11, 2018, 6 pages.
Non-Final Office Action received for U.S. Appl. No. 15/033,551, mailed on May 24, 2018, 26 pages.
Non-Final Office Action received for U.S. Appl. No. 15/049,052, mailed on May 31, 2018, 15 pages.
Non-Final Office Action received for U.S. Appl. No. 15/049,052, mailed on Nov. 29, 2016, 13 pages.
Non-Final Office Action received for U.S. Appl. No. 15/049,052, mailed on Sep. 21, 2017, 14 pages.
Non-Final Office Action received for U.S. Appl. No. 15/153,617, mailed on Apr. 2, 2018, 12 pages.
Non-Final Office Action received for U.S. Appl. No. 15/275,294, mailed on Dec. 23, 2016, 18 pages.
Non-Final Office Action received for U.S. Appl. No. 15/411,110, mailed on Dec. 13, 2018, 23 pages.
Non-Final Office Action received for U.S. Appl. No. 15/411,110, mailed on Jul. 14, 2022, 28 pages.
Non-Final Office Action received for U.S. Appl. No. 15/411,110, mailed on Jul. 22, 2019, 29 pages.
Non-Final Office Action received for U.S. Appl. No. 15/411,110, mailed on Jun. 26, 2020, 32 pages.

(56) References Cited

OTHER PUBLICATIONS

Non-Final Office Action received for U.S. Appl. No. 15/418,537, mailed on Dec. 13, 2018, 53 pages.
Non-Final Office Action received for U.S. Appl. No. 15/421,865, mailed on Dec. 29, 2021, 23 pages.
Non-Final Office Action received for U.S. Appl. No. 15/421,865, mailed on Mar. 21, 2019, 18 pages.
Non-Final Office Action received for U.S. Appl. No. 15/421,865, mailed on Oct. 7, 2020, 20 pages.
Non-Final Office Action received for U.S. Appl. No. 15/426,836, mailed on Oct. 18, 2018, 40 pages.
Non-Final Office Action received for U.S. Appl. No. 16/020,804, mailed on Nov. 20, 2019, 13 pages.
Non-Final Office Action received for U.S. Appl. No. 16/130,838, mailed on Dec. 31, 2020, 29 pages.
Non-Final Office Action received for U.S. Appl. No. 16/130,838, mailed on Jan. 7, 2020, 16 pages.
Non-Final Office Action received for U.S. Appl. No. 16/267,817, mailed on Apr. 15, 2020, 25 pages.
Non-Final Office Action received for U.S. Appl. No. 16/270,801, mailed on Mar. 27, 2020, 11 pages.
Non-Final Office Action received for U.S. Appl. No. 16/270,902, mailed on Mar. 27, 2020, 11 pages.
Non-Final Office Action received for U.S. Appl. No. 16/737,372, mailed on Apr. 29, 2022, 19 pages.
Non-Final Office Action received for U.S. Appl. No. 16/737,372, mailed on Jul. 27, 2021, 22 pages.
Non-Final Office Action received for U.S. Appl. No. 16/775,528, mailed on Nov. 20, 2020, 15 pages.
Non-Final Office Action received for U.S. Appl. No. 16/775,528, mailed on Sep. 13, 2021, 14 pages.
Non-Final Office Action received for U.S. Appl. No. 16/832,285, mailed on Jul. 26, 2021, 62 pages.
Non-Final Office Action received for U.S. Appl. No. 16/994,392, mailed on Jun. 9, 2021, 27 pages.
Non-Final Office Action received for U.S. Appl. No. 17/002,622, mailed on Jul. 6, 2021, 14 pages.
Non-Final Office Action received for U.S. Appl. No. 17/130,674, mailed on Mar. 3, 2022, 8 pages.
Non-Final Office Action received for U.S. Appl. No. 17/190,869, mailed on Sep. 27, 2021, 26 pages.
Non-Final Office Action received for U.S. Appl. No. 17/321,313, mailed on Jul. 19, 2022, 18 pages.
Non-Final Office Action received for U.S. Appl. No. 17/349,226, mailed on Mar. 16, 2023, 9 pages.
Non-Final Office Action received for U.S. Appl. No. 17/410,169, mailed on Sep. 16, 2022, 42 pages.
Non-Final Office Action received for U.S. Appl. No. 17/508,894, mailed on Dec. 15, 2022, 10 pages.
Non-Final Office Action received for U.S. Appl. No. 17/728,725, mailed on Feb. 16, 2023, 11 pages.
Notice of Acceptance received for Australian Patent Application No. 2012200475, mailed on Aug. 24, 2015, 2 pages.
Notice of Acceptance received for Australian Patent Application No. 2012202140, mailed on May 28, 2014, 2 pages.
Notice of Acceptance received for Australian Patent Application No. 2012209199, mailed on Jan. 27, 2016, 3 pages.
Notice of Acceptance received for Australian Patent Application No. 2012261534, mailed on Jan. 6, 2015, 2 pages.
Notice of Acceptance received for Australian Patent Application No. 2013404001, mailed on Nov. 21, 2017, 3 pages.
Notice of Acceptance received for Australian Patent Application No. 2014204422, mailed on Apr. 28, 2016, 2 pages.
Notice of Acceptance received for Australian Patent Application No. 2014274556, mailed on Jul. 27, 2016, 2 pages.
Notice of Acceptance received for Australian Patent Application No. 2014315324, mailed on Sep. 28, 2017, 3 pages.
Notice of Acceptance received for Australian Patent Application No. 2016203168, mailed on Feb. 14, 2018, 3 pages.
Notice of Acceptance received for Australian Patent Application No. 2016203309, mailed on Feb. 14, 2018, 3 pages.
Notice of Acceptance received for Australian Patent Application No. 2016213886, mailed on Feb. 9, 2018, 3 pages.
Notice of Acceptance received for Australian Patent Application No. 2017201768, mailed on Nov. 21, 2018, 3 pages.
Notice of Acceptance received for Australian Patent Application No. 2017202587, mailed on Nov. 6, 2019, 3 pages.
Notice of Acceptance received for Australian Patent Application No. 2017276153, mailed on Feb. 19, 2018, 4 pages.
Notice of Acceptance received for Australian Patent Application No. 2017276153, mailed on Jan. 17, 2018, 3 pages.
Notice of Acceptance received for Australian Patent Application No. 2017276285, mailed on Apr. 3, 2019, 3 pages.
Notice of Acceptance received for Australian Patent Application No. 2017277813, mailed on Jun. 16, 2020, 3 pages.
Notice of Acceptance received for Australian Patent Application No. 2017277851, mailed on Dec. 9, 2019, 3 pages.
Notice of Acceptance received for Australian Patent Application No. 2018200272, mailed on Apr. 23, 2019, 3 pages.
Notice of Acceptance received for Australian Patent Application No. 2018203512, mailed on Jul. 26, 2019, 3 pages.
Notice of Acceptance received for Australian Patent Application No. 2019200692, mailed on Apr. 7, 2020, 3 pages.
Notice of Acceptance received for Australian Patent Application No. 2019204835, mailed on Dec. 7, 2020, 3 pages.
Notice of Acceptance received for Australian Patent Application No. 2019206101, mailed on Dec. 11, 2020, 3 pages.
Notice of Acceptance received for Australian Patent Application No. 2019210673, mailed on Oct. 17, 2020, 3 pages.
Notice of Acceptance received for Australian Patent Application No. 2019219816, mailed on Sep. 23, 2020, 3 pages.
Notice of Acceptance received for Australian Patent Application No. 2020201723, mailed on May 6, 2021, 3 pages.
Notice of Acceptance received for Australian Patent Application No. 2020239774, mailed on Jan. 5, 2022, 3 pages.
Notice of Acceptance received for Australian Patent Application No. 2021200102, mailed on Mar. 16, 2021, 3 pages.
Notice of Acceptance received for Australian Patent Application No. 2021201687, mailed on Jun. 8, 2022, 3 pages.
Notice of Acceptance received for Australian Patent Application No. 2021201748, mailed on Jun. 23, 2022, 3 pages.
Notice of Allowance received for Australian Patent Application No. 2010350739, mailed on Sep. 8, 2014, 2 pages.
Notice of Allowance received for Australian Patent Application No. 2015202076, mailed on Apr. 5, 2017, 3 pages.
Notice of Allowance received for Australian Patent Application No. 2016202837, mailed on Apr. 21, 2017, 3 pages.
Notice of Allowance received for Canadian Patent Application No. 2,845,297, mailed on Nov. 10, 2014, 1 page.
Notice of Allowance received for Canadian Patent Application No. 2,890,778, mailed on Apr. 24, 2017, 1 page.
Notice of Allowance received for Canadian Patent Application No. 2,983,178, mailed on Oct. 20, 2020, 1 page.
Notice of Allowance received for Chinese Patent Application No. 200780041309.3, mailed on Jul. 31, 2017, 2 pages.
Notice of Allowance received for Chinese Patent Application No. 200980000229.2, mailed on Oct. 24, 2014, 4 pages.
Notice of Allowance received for Chinese Patent Application No. 201010592864.9, mailed on Jan. 30, 2015, 4 pages.
Notice Of Allowance received for Chinese Patent Application No. 201280006317.5, mailed on Feb. 17, 2017, 2 pages.
Notice of Allowance received for Chinese Patent Application No. 201310724733.5, mailed on Dec. 27, 2018, 2 pages.
Notice of Allowance received for Chinese Patent Application No. 201380080659.6, mailed on Jul. 29, 2019, 2 pages.
Notice of Allowance received for Chinese Patent Application No. 201410250648.4, mailed on Aug. 20, 2018, 2 pages.
Notice of Allowance received for Chinese Patent Application No. 201410250688.9, mailed on May 21, 2018, 3 pages.
Notice of Allowance received for Chinese Patent Application No. 201410251370.2, mailed on Jul. 31, 2018, 2 pages.

(56) References Cited

OTHER PUBLICATIONS

Notice of Allowance received for Chinese Patent Application No. 201410251400.X, mailed on Aug. 20, 2018, 3 pages.
Notice of Allowance received for Chinese Patent Application No. 201480060044.1, mailed on Mar. 29, 2019, 3 pages.
Notice of Allowance received for Chinese Patent Application No. 201580046331.1, mailed on Jun. 24, 2020, 4 pages.
Notice of Allowance received for Chinese Patent Application No. 201710240907.9, mailed on Nov. 25, 2019, 2 pages.
Notice of Allowance received for Chinese Patent Application No. 201780033621.1, mailed on Mar. 10, 2022, 2 pages.
Notice of Allowance received for Chinese Patent Application No. 201780033973.7, mailed on Jul. 7, 2021, 5 pages.
Notice of Allowance received for Chinese Patent Application No. 201780034059.4, mailed on Feb. 19, 2023, 2 pages.
Notice of Allowance received for Chinese Patent Application No. 201910446753.8, mailed on Jun. 29, 2022, 2 pages.
Notice of Allowance received for Chinese Patent Application No. 201910447678.7, mailed on Jun. 20, 2022, 2 pages.
Notice of Allowance received for Chinese Patent Application No. 201910965046.X, mailed on Mar. 8, 2023, 2 pages.
Notice of Allowance received for Danish Patent Application No. PA201570776, mailed on Feb. 8, 2017, 2 pages.
Notice of Allowance received for Japanese Patent Application No. 2009-051921, mailed on Jan. 20, 2014, 2 pages.
Notice of Allowance received for Japanese Patent Application No. 2013-011209, mailed on Jun. 13, 2016, 2 pages.
Notice of Allowance received for Japanese Patent Application No. 2013-127963, mailed on Oct. 9, 2015, 3 pages.
Notice of Allowance received for Japanese Patent Application No. 2013252338, mailed on Jun. 23, 2017, 3 pages.
Notice of Allowance received for Japanese Patent Application No. 2014-139095, mailed on Apr. 1, 2016, 3 pages.
Notice of Allowance received for Japanese Patent Application No. 2014-253365, mailed on Nov. 26, 2018, 3 pages.
Notice of Allowance received for Japanese Patent Application No. 2015-532193, mailed on Jan. 23, 2017, 3 pages.
Notice of Allowance received for Japanese Patent Application No. 2016-091460, mailed on Oct. 9, 2018, 3 pages.
Notice of Allowance received for Japanese Patent Application No. 2016-092789, mailed on Feb. 3, 2017, 3 pages.
Notice of Allowance received for Japanese Patent Application No. 2016-130565, mailed on Aug. 28, 2017, 3 pages.
Notice of Allowance received for Japanese Patent Application No. 2016-527367, mailed on Jul. 30, 2018, 4 pages.
Notice of Allowance received for Japanese Patent Application No. 2016-537946, mailed on Mar. 26, 2018, 4 pages.
Notice of Allowance received for Japanese Patent Application No. 2017-042050, mailed on Apr. 24, 2017, 3 pages.
Notice of Allowance received for Japanese Patent Application No. 2017-102031, mailed on Jun. 23, 2017, 3 pages.
Notice of Allowance received for Japanese Patent Application No. 2017-142812, mailed on Jul. 19, 2019, 4 pages.
Notice of Allowance received for Japanese Patent Application No. 2017-204561, mailed on Mar. 12, 2019, 4 pages.
Notice of Allowance received for Japanese Patent Application No. 2017-223021, mailed on Dec. 18, 2020, 3 pages.
Notice of Allowance received for Japanese Patent Application No. 2018-083313, mailed on Jul. 1, 2019, 4 pages.
Notice of Allowance received for Japanese Patent Application No. 2018-121118, mailed on Sep. 27, 2021, 3 pages.
Notice of Allowance received for Japanese Patent Application No. 2018-201088, mailed on Sep. 18, 2020, 4 pages.
Notice of Allowance received for Japanese Patent Application No. 2019-024663, mailed on Sep. 26, 2022, 23 pages.
Notice of Allowance received for Japanese Patent Application No. 2019-138053, mailed on Jul. 2, 2021, 4 pages.
Notice of Allowance received for Japanese Patent Application No. 2019-144763, mailed on Nov. 29, 2021, 4 pages.
Notice of Allowance received for Japanese Patent Application No. 2020-046707, mailed on Aug. 15, 2022, 4pages.
Notice of Allowance received for Japanese Patent Application No. 2021-126843, mailed on Jan. 6, 2023, 4 pages.
Notice of Allowance received for Korean Patent Application No. 10-2011-7026583, mailed on Apr. 29, 2015, 3 pages.
Notice of Allowance received for Korean Patent Application No. 10-2012-7029270, mailed on Sep. 23, 2014, 2 pages.
Notice of Allowance received for Korean Patent Application No. 10-2013-7022057, mailed on Apr. 27, 2015, 2 pages.
Notice of Allowance received for Korean Patent Application No. 10-2014-7011273, mailed on Apr. 28, 2015, 3 pages.
Notice of Allowance received for Korean Patent Application No. 10-2014-7033660, mailed on Sep. 25, 2015, 3 pages.
Notice of Allowance Received for Korean Patent Application No. 10-2014-7036624, mailed on Sep. 26, 2016, 3 pages.
Notice of Allowance received for Korean Patent Application No. 10-2015-7013849, mailed on Mar. 28, 2016, 3 pages.
Notice of Allowance received for Korean Patent Application No. 10-2016-7008449, mailed on Aug. 9, 2019, 6 pages.
Notice of Allowance received for Korean Patent Application No. 10-2016-7014051, mailed on Nov. 27, 2018, 4 pages.
Notice of Allowance received for Korean Patent Application No. 10-2016-7017508, mailed on Apr. 27, 2017, 3 pages.
Notice of Allowance received for Korean Patent Application No. 10-2018-7010872, mailed on Feb. 10, 2020, 6 pages.
Notice of Allowance received for Korean Patent Application No. 10-2019-7005262, mailed on Mar. 25, 2020, 5 pages.
Notice of Allowance received for Korean Patent Application No. 10-2019-7007748, mailed on May 6, 2020, 5 pages.
Notice of Allowance received for Korean Patent Application No. 10-2020-7018655, mailed on Feb. 25, 2022, 4 pages.
Notice of Allowance received for Korean Patent Application No. 10-2020-7022802, mailed on Mar. 4, 2021, 6 pages.
Notice of Allowance received for Taiwanese Patent Application No. 103130517, mailed on May 14, 2018, 5 pages.
Notice of Allowance received for Taiwanese Patent Application No. 104107317, mailed on Oct. 18, 2017, 7 pages.
Notice of Allowance received for U.S. Appl. No. 09/477,419, mailed on May 19, 2005, 5 pages.
Notice of Allowance received for U.S. Appl. No. 10/213,929, mailed on Nov. 15, 2007, 9 pages.
Notice of Allowance received for U.S. Appl. No. 11/069,977, mailed on Apr. 8, 2013, 16 pages.
Notice of Allowance received for U.S. Appl. No. 11/069,977, mailed on May 15, 2013, 13 pages.
Notice of Allowance received for U.S. Appl. No. 11/459,602, mailed on Jan. 9, 2009, 6 pages.
Notice of Allowance received for U.S. Appl. No. 11/849,938, mailed on Nov. 27, 2013, 2 pages.
Notice of Allowance received for U.S. Appl. No. 11/849,938, mailed on October 10, 2013, 28 pages.
Notice of Allowance received for U.S. Appl. No. 11/850,010, mailed on Feb. 6, 2019, 25 pages.
Notice of Allowance received for U.S. Appl. No. 11/850,011, mailed on Feb. 11, 2011, 5 pages.
Notice of Allowance received for U.S. Appl. No. 11/850,011, mailed on Feb. 18, 2011, 4 pages.
Notice of Allowance received for U.S. Appl. No. 11/969,809, mailed on Apr. 26, 2013, 17 pages
Notice of Allowance received for U.S. Appl. No. 12/242,851, mailed on Dec. 27, 2016, 20 pages.
Notice of Allowance received for U.S. Appl. No. 12/364,470, mailed on Nov. 24, 2017, 9 pages.
Notice of Allowance received for U.S. Appl. No. 12/689,834, mailed on Jan. 17, 2018, 9 pages.
Notice of Allowance received for U.S. Appl. No. 12/788,278, mailed on May 1, 2013, 8 pages.
Notice of Allowance received for U.S. Appl. No. 12/848,062, mailed on Mar. 25, 2014, 9 pages.
Notice of Allowance received for U.S. Appl. No. 12/849,767, mailed on Apr. 25, 2014, 5 pages.

(56) References Cited

OTHER PUBLICATIONS

Notice of Allowance received for U.S. Appl. No. 12/849,767, mailed on Jan. 8, 2013, 9 pages.
Notice of Allowance received for U.S. Appl. No. 12/888,362, mailed on Apr. 11, 2018, 7 pages.
Notice of Allowance received for U.S. Appl. No. 12/888,366, mailed on Dec. 14, 2012, 11 pages.
Notice of Allowance received for U.S. Appl. No. 12/888,370, mailed on Feb. 12, 2013, 10 pages.
Notice of Allowance received for U.S. Appl. No. 12/888,370, mailed on Jul. 1, 2014, 8 pages.
Notice of Allowance received for U.S. Appl. No. 12/888,373, mailed on Feb. 22, 2013, 12 pages.
Notice of Allowance received for U.S. Appl. No. 12/888,373, mailed on Jul. 1, 2014, 8 pages.
Notice of Allowance received for U.S. Appl. No. 12/888,376, mailed on May 29, 2015, 14 pages.
Notice of Allowance received for U.S. Appl. No. 12/888,377, mailed on Jan. 30, 2013, 12 pages.
Notice of Allowance received for U.S. Appl. No. 13/077,850, mailed on May 5, 2016, 15 pages.
Notice of Allowance received for U.S. Appl. No. 13/077,855, mailed on Jan. 30, 2017, 7 pages.
Notice of Allowance received for U.S. Appl. No. 13/077,862, mailed on Jun. 20, 2019, 9 pages.
Notice of Allowance received for U.S. Appl. No. 13/077,862, mailed on Sep. 20, 2019, 2 pages.
Notice of Allowance received for U.S. Appl. No. 13/077,867, mailed on Mar. 12, 2014, 7 pages.
Notice of Allowance received for U.S. Appl. No. 13/077,867, mailed on Sep. 18, 2013, 8 pages.
Notice of Allowance received for U.S. Appl. No. 13/077,874, mailed on Nov. 22, 2016, 13 pages.
Notice of Allowance received for U.S. Appl. No. 13/104,903, mailed on Apr. 29, 2013, 6 pages.
Notice of Allowance received for U.S. Appl. No. 13/104,911, mailed on Jun. 10, 2013, 6 pages.
Notice of Allowance received for U.S. Appl. No. 14/011,639, mailed on Feb. 16, 2016, 5 pages.
Notice of Allowance received for U.S. Appl. No. 14/011,639, mailed on Sep. 29, 2015, 11 pages.
Notice of Allowance received for U.S. Appl. No. 14/142,640, mailed on Dec. 11, 2019, 7 pages.
Notice of Allowance received for U.S. Appl. No. 14/142,648, mailed on Jul. 15, 2020, 6 pages.
Notice of Allowance received for U.S. Appl. No. 14/142,648, mailed on Mar. 13, 2020, 5 pages.
Notice of Allowance received for U.S. Appl. No. 14/261,112, mailed on Apr. 9, 2021, 2 pages.
Notice of Allowance received for U.S. Appl. No. 14/261,112, mailed on Nov. 18, 2020, 6 pages.
Notice of Allowance received for U.S. Appl. No. 14/641,287, mailed on Jun. 28, 2018, 8 pages.
Notice of Allowance received for U.S. Appl. No. 14/710,125, mailed on Apr. 19, 2019, 8 pages.
Notice of Allowance received for U.S. Appl. No. 14/710,125, mailed on May 7, 2019, 9 pages.
Notice of Allowance received for U.S. Appl. No. 14/839,914, mailed on Jun. 22, 2018, 12 pages.
Notice of Allowance received for U.S. Appl. No. 14/913,349, mailed on Jul. 15, 2022, 6 pages.
Notice of Allowance received for U.S. Appl. No. 15/033,551, mailed on Nov. 14, 2018, 10 pages.
Notice of Allowance received for U.S. Appl. No. 15/049,052, mailed on Sep. 16, 2019, 5 pages.
Notice of Allowance received for U.S. Appl. No. 15/056,913, mailed on May 24, 2017, 19 pages.
Notice of Allowance received for U.S. Appl. No. 15/153,617, mailed on Nov. 23, 2018, 10 pages.
Notice of Allowance received for U.S. Appl. No. 15/275,294, mailed on Jun. 30, 2017, 8 pages.
Notice of Allowance received for U.S. Appl. No. 15/418,537, mailed on Apr. 6, 2020, 9 pages.
Notice of Allowance received for U.S. Appl. No. 15/426,836, mailed on Dec. 16, 2019, 16 pages.
Notice of Allowance received for U.S. Appl. No. 15/930,300, mailed on Aug. 5, 2020, 14 pages.
Notice of Allowance received for U.S. Appl. No. 16/020,804, mailed on May 28, 2020, 18 pages.
Notice of Allowance received for U.S. Appl. No. 16/130,838, mailed on Jun. 16, 2021, 12 pages.
Notice of Allowance received for U.S. Appl. No. 16/267,817, mailed on Dec. 18, 2020, 11 pages.
Notice of Allowance received for U.S. Appl. No. 16/270,801, mailed on Sep. 16, 2020, 9 pages.
Notice of Allowance received for U.S. Appl. No. 16/270,902, mailed on Sep. 22, 2020, 9 pages.
Notice of Allowance received for U.S. Appl. No. 16/378,291, mailed on Mar. 25, 2020, 11 pages.
Notice of Allowance received for U.S. Appl No. 16/428,634, mailed on May 8, 2020, 16 pages.
Notice of Allowance received for U.S. Appl. No. 16/737,372, mailed on Feb. 1, 2023, 2 pages.
Notice of Allowance received for U.S. Appl. No. 16/737,372, mailed on Feb. 10, 2023, 2 pages.
Notice of Allowance received for U.S. Appl. No. 16/737,372, mailed on Jan. 25, 2023, 7 pages.
Notice of Allowance received for U.S. Appl. No. 16/775,528, mailed on Feb. 24, 2022, 18 pages.
Notice of Allowance received for U.S. Appl. No. 16/775,528, mailed on Jun. 15, 2022, 6 pages.
Notice of Allowance received for U.S. Appl. No. 16/918,855, mailed on Apr. 6, 2021, 7 pages.
Notice of Allowance received for U.S. Appl. No. 16/926,530, mailed on Jun. 24, 2021, 10 pages.
Notice of Allowance received for U.S. Appl. No. 16/994,392, mailed on Jul. 11, 2022, 26 pages.
Notice of Allowance received for U.S. Appl. No. 17/002,622, mailed on Nov. 22, 2021, 7 pages.
Notice of Allowance received for U.S. Appl. No. 17/019,062, mailed on Aug. 10, 2021, 22 pages.
Notice of Allowance received for U.S. Appl. No. 17/019,062, mailed on Nov. 24, 2021, 20 pages.
Notice of Allowance received for U.S. Appl. No. 17/130,674, mailed on Jun. 15, 2022, 9 pages.
Notice of Allowance received for U.S. Appl. No. 17/190,869, mailed on Jan. 10, 2022, 10 pages.
Notice of Allowance received for U.S. Appl. No. 17/321,313, mailed on Oct. 24, 2022, 9 pages.
Notice of Allowance received for U.S. Appl. No. 17/349,226, mailed on May 24, 2023, 7 pages.
Notice of Allowance received for U.S. Appl. No. 17/349,226, mailed on Sep. 20, 2022, 7 pages.
Notice of Allowance received for U.S. Appl. No. 17/508,894, mailed on Apr. 19, 2023, 19 pages.
Notice of Allowance received for U.S. Appl. No. 17/521,768, mailed on Jul. 15, 2022, 10 pages.
Notice of Allowance received for U.S. Appl. No. 17/586,454, mailed on Apr. 17, 2023, 22 pages.
Notice of Allowance received for U.S. Appl. No. 17/698,979, mailed on Feb. 6, 2023, 10 pages.
Notice of Allowance received for U.S. Appl. No. 17/894,918, mailed on Jan. 25, 2023, 9 pages.
Notice of Hearing received for Indian Patent Application No. 201617008296, mailed on Sep. 11, 2022, 3 pages.
Office Action received for Danish Patent Application No. PA201670595, mailed on Nov. 25, 2016, 9 pages.
Office Action received for Danish Patent Application No. PA201770794, mailed on Dec. 19, 2017, 8 pages.
Office Action received for European Patent Application No. 13795330.3, mailed on Oct. 9, 2017, 8 pages.

(56) References Cited

OTHER PUBLICATIONS

Office Action received for Korean Patent Application No. 10-2018-7010872, mailed on Dec. 21, 2018, 7 pages.
Office Action received for Australian Patent Application No. 2009204252, mailed on Sep. 16, 2014, 6 pages.
Office Action received for Australian Patent Application No. 2010350739, mailed on Aug. 23, 2013, 3 pages.
Office Action received for Australian Patent Application No. 2012200475, mailed on Aug. 4, 2015, 3 pages.
Office Action received for Australian Patent Application No. 2012200475, mailed on Jun. 29, 2015, 3 pages.
Office Action received for Australian Patent Application No. 2012200475, mailed on Nov. 19, 2013, 4 pages.
Office Action received for Australian Patent Application No. 2012202140, mailed on Aug. 12, 2013, 2 pages.
Office Action received for Australian Patent Application No. 2012209199, mailed on Dec. 17, 2015, 3 pages.
Office Action received for Australian Patent Application No. 2012209199, mailed on Jan. 15, 2015, 3 pages.
Office Action received for Australian Patent Application No. 2012261534, mailed on Dec. 3, 2013, 3 pages.
Office Action received for Australian Patent Application No. 2013404001, mailed on Aug. 3, 2017, 5 pages.
Office Action received for Australian Patent Application No. 2013404001, mailed on Nov. 26, 2016, 3 pages.
Office Action received for Australian Patent Application No. 2014100582, mailed on Aug. 7, 2014, 5 pages.
Office Action received for Australian Patent Application No. 2014100582, mailed on Feb. 4, 2015, 3 pages.
Office Action received for Australian Patent Application No. 2014204422, mailed on Aug. 7, 2015, 3 pages.
Office Action Received for Australian Patent Application No. 2014274537, mailed on Aug. 14, 2015, 3 pages.
Office Action received for Australian Patent Application No. 2014274537, mailed on Jul. 25, 2016, 3 pages.
Office Action received for Australian Patent Application No. 2014274556, mailed on Aug. 28, 2015, 2 pages.
Office Action received for Australian Patent Application No. 2014315324, mailed on Aug. 8, 2017, 3 pages.
Office Action received for Australian Patent Application No. 2014315324, mailed on Oct. 21, 2016, 3 pages.
Office Action received for Australian Patent Application No. 2015202076, mailed on May 5, 2016, 3 pages.
Office Action received for Australian Patent Application No. 2015215876, mailed on Aug. 1, 2016, 4 pages.
Office Action received for Australian Patent Application No. 2015215876, mailed on Jul. 26, 2017, 6 pages.
Office Action received for Australian Patent Application No. 2015215876, mailed on Jun. 28, 2017, 4 pages.
Office Action received for Australian Patent Application No. 2015215876, mailed on May 24, 2017, 4 pages.
Office Action received for Australian Patent Application No. 2016202837, mailed on Jan. 10, 2017, 2 pages.
Office Action received for Australian Patent Application No. 2016203168, mailed on Feb. 8, 2017, 2 pages.
Office Action received for Australian Patent Application No. 2016203309, mailed on Feb. 8, 2017, 11 pages.
Office Action received for Australian Patent Application No. 2016213886, mailed on May 18, 2017, 2 pages.
Office Action received for Australian Patent Application No. 2017100207, mailed on Apr. 6, 2017, 4 pages.
Office Action received for Australian Patent Application No. 2017100207, mailed on Jul. 10, 2017, 3 pages.
Office Action received for Australian Patent Application No. 2017101561, mailed on Dec. 22, 2017, 4 pages.
Office Action received for Australian Patent Application No. 2017201768, mailed on Feb. 28, 2018, 4 pages.
Office Action received for Australian Patent Application No. 2017202587, mailed on Apr. 26, 2019, 4 pages.
Office Action received for Australian Patent Application No. 2017202587, mailed on Jul. 4, 2018, 4 pages.
Office Action received for Australian Patent Application No. 2017202587, mailed on Jul. 4, 2019, 4 pages.
Office Action received for Australian Patent Application No. 2017276285, mailed on Nov. 26, 2018, 2 pages.
Office Action received for Australian Patent Application No. 2017277813, mailed on Jun. 11, 2019, 3 pages.
Office Action received for Australian Patent Application No. 2017277813, mailed on Mar. 20, 2020, 4 pages.
Office Action received for Australian Patent Application No. 2017277851, mailed on Jul. 5, 2019, 3 pages.
Office Action received for Australian Patent Application No. 2018101076, mailed on Oct. 16, 2018, 5 pages.
Office Action received for Australian Patent Application No. 2018200272, mailed on Jan. 17, 2019, 2 pages.
Office Action received for Australian Patent Application No. 2018203512, mailed on Apr. 15, 2019, 4 pages.
Office Action received for Australian Patent Application No. 2019200692, mailed on Dec. 24, 2019, 2 pages.
Office Action received for Australian Patent Application No. 2019204835, mailed on Sep. 16, 2020, 6 pages.
Office Action received for Australian Patent Application No. 2019206101, mailed on Jul. 14, 2020, 4 pages.
Office Action received for Australian Patent Application No. 2019210673, mailed on Jul. 28, 2020, 4 pages.
Office Action received for Australian Patent Application No. 2019210673, mailed on Sep. 28, 2020, 2 pages.
Office Action received for Australian Patent Application No. 2019219816, mailed on Apr. 17, 2020, 3 pages.
Office Action received for Australian Patent Application No. 2020201723, mailed on Feb. 4, 2021, 6 pages.
Office Action received for Australian Patent Application No. 2020239774, mailed on Jun. 28, 2021, 8 pages.
Office Action received for Australian Patent Application No. 2020239774, mailed on Oct. 5, 2021, 3 pages.
Office Action received for Australian Patent Application No. 2021201687, mailed on Mar. 16, 2022, 5 pages.
Office Action received for Australian Patent Application No. 2021201748, mailed on Mar. 18, 2022, 6 pages.
Office Action received for Australian Patent Application No. 2022202583, mailed on Mar. 24, 2023, 4 pages.
Office Action received for Canadian Patent Application No. 2,845,297, mailed on Apr. 23, 2014, 2 pages.
Office Action received for Canadian Patent Application No. 2,890,778, mailed on May 19, 2016, 6 pages.
Office Action received for Canadian Patent Application No. 2,983,178, mailed on Aug. 16, 2018, 5 pages.
Office Action received for Canadian Patent Application No. 2,983,178, mailed on Jul. 22, 2019, 6 pages.
Office Action received for Canadian Patent Application No. 3,109,701, mailed on Feb. 7, 2022, 4 pages.
Office Action received for Chinese Patent Application No. 200780041309.3, mailed on Feb. 8, 2017, 4 pages.
Office Action received for Chinese Patent Application No. 200980000229.2, mailed on Jan. 6, 2014, 6 pages.
Office Action received for Chinese Patent Application No. 200980000229.2, mailed on Jun. 27, 2014, 7 pages.
Office Action received for Chinese Patent Application No. 201010592864.9, mailed on Jul. 31, 2012, 6 pages.
Office Action received for Chinese Patent Application No. 201010592864.9, mailed on May 6, 2013, 5 pages.
Office Action received for Chinese Patent Application No. 201280006317.5, mailed on Jan. 11, 2016, 10 pages.
Office Action received for Chinese Patent Application No. 201280006317.5, mailed on Jul. 11, 2016, 6 pages.
Office Action received for Chinese Patent Application No. 201310724733.5, mailed on Apr. 9, 2018, 11 pages.
Office Action received for Chinese Patent Application No. 201310724733.5, mailed on Aug. 15, 2018, 2 pages.
Office Action received for Chinese Patent Application No. 201310724733.5, mailed on Aug. 28, 2018, 6 pages.

(56) References Cited

OTHER PUBLICATIONS

Office Action received for Chinese Patent Application No. 201310724733.5, mailed on Oct. 30, 2017, 14 pages.
Office Action received for Chinese Patent Application No. 2013107247335, mailed on Apr. 12, 2016, 14 pages.
Office Action received for Chinese Patent Application No. 2013107247335, mailed on Apr. 21, 2017, 18 pages.
Office Action received for Chinese Patent Application No. 2013107247335, mailed on Dec. 30, 2016, 13 pages.
Office Action received for Chinese Patent Application No. 201380080659.6, mailed on Apr. 4, 2018, 15 pages.
Office Action received for Chinese Patent Application No. 201380080659.6, mailed on Mar. 4, 2019, 9 pages.
Office Action received for Chinese Patent Application No. 201380080659.6, mailed on Oct. 26, 2018, 11 pages.
Office action received for Chinese Patent Application No. 201410250648.4, mailed on Feb. 14, 2018, 6 pages.
Office Action received for Chinese Patent Application No. 2014102506484, mailed on Jun. 29, 2017, 13 pages.
Office Action received for Chinese Patent Application No. 2014102506484, mailed on Oct. 9, 2016, 6 pages.
Office Action received for Chinese Patent Application No. 201410250688.9, mailed on Nov. 16, 2017, 6 pages.
Office Action received for Chinese Patent Application No. 2014102506889, mailed on Jun. 1, 2017, 12 pages.
Office Action received for Chinese Patent Application No. 2014102506889, mailed on Sep. 28, 2016, 7 pages.
Office Action received for Chinese Patent Application No. 201410251370.2, mailed on Feb. 11, 2018, 14 pages.
Office Action received for Chinese Patent Application No. 2014102513702, mailed on May 12, 2017, 8 pages.
Office Action received for Chinese Patent Application No. 2014102513702, mailed on Sep. 5, 2016, 7 pages.
Office Action received for Chinese Patent Application No. 201410251400.X, mailed on Feb. 8, 2018, 6 pages.
Office Action received for Chinese Patent Application No. 201410251400.X, mailed on Jul. 4, 2016, 8 pages.
Office Action received for Chinese Patent Application No. 201410251400.X, mailed on May 26, 2017, 11 pages.
Office Action received for Chinese Patent Application No. 201480001676.0, mailed on Mar. 20, 2018, 12 pages.
Office Action received for Chinese Patent Application No. 201480001676.0, mailed on May 12, 2017, 15 pages.
Office Action received for Chinese Patent Application No. 201480001676.0, mailed on Nov. 27, 2018, 8 pages.
Office Action received for Chinese Patent Application No. 201480060044.1, mailed on Jan. 26, 2018, 15 pages.
Office Action received for Chinese Patent Application No. 201480060044.1, mailed on Sep. 25, 2018, 6 pages.
Office Action received for Chinese Patent Application No. 201580046331.1, mailed on Apr. 23, 2020, 15 pages.
Office Action received for Chinese Patent Application No. 201580046331.1, mailed on Aug. 2, 2019, 18 pages.
Office Action received for Chinese Patent Application No. 201710240907.9, mailed on Jun. 5, 2019, 10 pages.
Office Action received for Chinese Patent Application No. 201780033621.1, mailed on Dec. 14, 2021, 8 pages.
Office Action received for Chinese Patent Application No. 201780033621.1, mailed on Dec. 22, 2020, 30 pages.
Office Action received for Chinese Patent Application No. 201780033621.1, mailed on May 24, 2021, 18 pages.
Office Action received for Chinese Patent Application No. 201780033973.7, mailed on Jan. 22, 2021, 27 pages.
Office Action received for Chinese Patent Application No. 201780034059.4, mailed on Oct. 9, 2022, 11 pages.
Office Action received for Chinese Patent Application No. 201910446753.8, mailed on Mar. 2, 2022, 11 pages.
Office Action received for Chinese Patent Application No. 201910447678.7, mailed on Mar. 21, 2022, 14 pages.
Office Action received for Chinese Patent Application No. 201910447678.7, mailed on Nov. 29, 2021, 17 pages.
Office Action received for Chinese Patent Application No. 201910965046.X, mailed on Dec. 5, 2022, 11 pages.
Office Action received for Danish Patent Application No. PA201570776, mailed on Aug. 19, 2016, 3 pages.
Office Action received for Danish Patent Application No. PA201570776, mailed on Jan. 26, 2016, 12 pages.
Office Action received for Danish Patent Application No. PA201570781, mailed on Aug. 19, 2016, 3 pages.
Office Action received for Danish Patent Application No. PA201670117, mailed on Jan. 12, 2017, 3 pages.
Office Action received for Danish Patent Application No. PA201670117, mailed on Jun. 13, 2016, 10 pages.
Office Action received for Danish Patent Application No. PA201670595, mailed on Aug. 23, 2018, 5 pages.
Office Action received for Danish Patent Application No. PA201670595, mailed on May 31, 2017, 3 pages.
Office Action received for Danish Patent Application No. PA201670595, mailed on Nov. 30, 2017, 4 pages.
Office Action received for Danish Patent Application No. PA201770103, mailed on Dec. 11, 2018, 2 pages.
Office Action received for Danish Patent Application No. PA201770103, mailed on Jan. 16, 2018, 2 pages.
Office Action received for Danish Patent Application No. PA201770794, mailed on Apr. 5, 2018, 4 pages.
Office Action received for Danish Patent Application No. PA201770794, mailed on Jun. 13, 2019, 2 pages.
Office Action received for Danish Patent Application No. PA201770794, mailed on Oct. 30, 2018, 3 pages.
Office Action received for European Patent Application No. 07814689.1, mailed on Mar. 4, 2011, 6 pages.
Office Action received for European Patent Application No. 08705639.6, mailed on Dec. 19, 2013, 7 pages.
Office Action received for European Patent Application No. 08829660.3, mailed on Aug. 2, 2013, 7 pages.
Office Action received for European Patent Application No. 08829660.3, mailed on Jan. 3, 2020, 6 pages.
Office Action received for European Patent Application No. 08829660.3, mailed on Jan. 11, 2019, 7 pages.
Office Action received for European Patent Application No. 08829660.3, mailed on Jul. 5, 2016, 5 pages.
Office Action received for European Patent Application No. 08829660.3, mailed on Oct. 15, 2010, 8 pages.
Office Action received for European Patent Application No. 09170697.8 mailed on Dec. 13, 2011, 4 pages.
Office Action received for European Patent Application No. 09170697.8, mailed on Jul. 6, 2021, 3 pages.
Office Action received for European Patent Application No. 09170697.8, mailed on Mar. 3, 2017, 8 pages.
Office Action received for European Patent Application No. 09700333.9, mailed on Jun. 10, 2011, 5 pages.
Office Action received for European Patent Application No. 09700333.9, mailed on Nov. 26, 2010, 5 pages.
Office Action received for European Patent Application No. 10762813.3, mailed on Mar. 21, 2016, 6 pages.
Office Action received for European Patent Application No. 12189764.9, mailed on Jan. 21, 2019, 7 pages.
Office Action received for European Patent Application No. 12189764.9, mailed on Mar. 1, 2016, 6 pages.
Office Action received for European Patent Application No. 12194312.0, mailed on Jan. 13, 2014, 4 pages.
Office Action received for European Patent Application No. 12194312.0, mailed on Oct. 8, 2013, 5 pages.
Office Action received for European Patent Application No. 12194315.3, mailed on Jan. 13, 2014, 4 pages.
Office Action received for European Patent Application No. 12194315.3, mailed on Oct. 8, 2013, 5 pages.
Office Action received for European Patent Application No. 14734674.6, mailed on Aug. 30, 2019, 6 pages.
Office Action received for European Patent Application No. 14734674.6, mailed on Oct. 5, 2017, 6 pages.

(56) References Cited

OTHER PUBLICATIONS

Office Action received for European Patent Application No. 14772001.5, mailed on Feb. 14, 2018, 5 pages.
Office Action received for European Patent Application No. 14772001.5, mailed on May 30, 2017, 10 pages.
Office Action received for European Patent Application No. 17210062.0, mailed on Jan. 3, 2019, 6 pages.
Office Action received for European Patent Application No. 17810723.1, mailed on Jul. 9, 2021, 8 pages.
Office Action received for European Patent Application No. 17810739.7, mailed on Feb. 17, 2023, 8 pages.
Office Action received for European Patent Application No. 17810739.7, mailed on Nov. 25, 2020, 4 pages.
Office Action received for European Patent Application No. 17813879.8, mailed on Oct. 20, 2021, 7 pages.
Office Action received for European Patent Application No. 19176224.4, mailed on Jan. 18, 2022, 6 pages.
Office Action received for European Patent Application No. 19199004.3, mailed on Nov. 22, 2019, 10 pages.
Office Action received for European Patent Application No. 20203888.1, mailed on Mar. 10, 2022, 6 pages.
Office Action received for European Patent Application No. 20217518.8, mailed on Apr. 30, 2021, 8 pages.
Office Action received for European Patent Application No. 20217518.8, mailed on Jul. 6, 2022, 5 pages.
Office Action received for Indian Patent Application No. 201617008296, mailed on Jan. 14, 2020, 7 pages.
Office Action received for Indian Patent Application No. 202018015998, mailed on Nov. 17, 2021, 6 pages.
Office Action received for Indian Patent Application No. 202018016000, mailed on Nov. 16, 2021, 6 pages.
Office Action received for Japanese Patent Application No. 2013-550664, mailed on Jun. 10, 2016, 3 pages.
Office Action received for Japanese Patent Application No. 2017-223021, mailed on Apr. 8, 2019, 7 pages.
Office Action received for Japanese Patent Application No. 2013-011209, mailed on Feb. 7, 2014, 3 pages.
Office Action received for Japanese Patent Application No. 2013-011209, mailed on Nov. 2, 2015, 9 pages.
Office Action received for Japanese Patent Application No. 2013-011209, mailed on Oct. 27, 2014, 3 pages.
Office Action received for Japanese Patent Application No. 2013-127963, mailed on Aug. 15, 2014, 8 pages.
Office Action received for Japanese Patent Application No. 2013-127963, mailed on Mar. 10, 2014, 7 pages.
Office Action received for Japanese Patent Application No. 2013-252338, mailed on Dec. 4, 2015, 4 pages.
Office Action received for Japanese Patent Application No. 2013-252338, mailed on Jan. 27, 2017, 10 pages.
Office Action received for Japanese Patent Application No. 2013-252338, mailed on Jan. 30, 2015, 4 pages.
Office Action received for Japanese Patent Application No. 2013-252338, mailed on Jun. 24, 2016, 4 pages.
Office Action received for Japanese Patent Application No. 2013-503721, mailed on Feb. 14, 2014, 8 pages.
Office Action Received for Japanese Patent Application No. 2013-503721, mailed on Jun. 6, 2014, 3 pages.
Office Action received for Japanese Patent Application No. 2013-550664, mailed on Aug. 24, 2015, 9 pages.
Office Action received for Japanese Patent Application No. 2013-550664, mailed on Sep. 12, 2014, 10 pages.
Office Action Received for Japanese Patent Application No. 2014-139095, mailed on Aug. 17, 2015, 6 pages.
Office Action received for Japanese Patent Application No. 2014-253365, mailed on Aug. 31, 2018, 6 pages.
Office Action received for Japanese Patent Application No. 2014-253365, mailed on Dec. 14, 2015, 6 pages.
Office Action received for Japanese Patent Application No. 2014-253365, mailed on Jul. 18, 2017, 9 pages.
Office Action received for Japanese Patent Application No. 2014-253365, mailed on Oct. 17, 2016, 11 pages.
Office Action received for Japanese Patent Application No. 2015-532193, mailed on Mar. 22, 2016, 7 pages.
Office Action received for Japanese Patent Application No. 2016-042767, mailed on Mar. 3, 2017, 10 pages.
Office Action received for Japanese Patent Application No. 2016-091460, mailed on Jun. 1, 2018, 3 pages.
Office Action received for Japanese Patent Application No. 2016-091460, mailed on Jun. 26, 2017, 6 pages.
Office Action received for Japanese Patent Application No. 2016-091460, mailed on Nov. 4, 2016, 6 pages.
Office Action received for Japanese Patent Application No. 2016-091460, mailed on Nov. 27, 2017, 7 pages.
Office Action received for Japanese Patent Application No. 2016-527367, mailed on Feb. 26, 2018, 15 pages.
Office Action received for Japanese Patent Application No. 2016-527367, mailed on Jul. 7, 2017, 16 pages.
Office Action received for Japanese Patent Application No. 2016-537946, mailed on Aug. 7, 2017, 8 pages.
Office Action received for Japanese Patent Application No. 2016-537946, mailed on Jan. 30, 2017, 12 pages.
Office Action received for Japanese Patent Application No. 2017-142812, mailed on Nov. 2, 2018, 6 pages.
Office Action received for Japanese Patent Application No. 2017-204561, mailed on Aug. 6, 2018, 7 pages.
Office Action received for Japanese Patent Application No. 2017-204561, mailed on Nov. 6, 2018, 8 pages.
Office Action received for Japanese Patent Application No. 2017-223021, mailed on Jul. 30, 2018, 12 pages.
Office Action received for Japanese Patent Application No. 2017-223021, mailed on Sep. 11, 2020, 20 pages.
Office Action received for Japanese Patent Application No. 2017-223021, mailed on Sep. 24, 2019, 6 pages.
Office Action received for Japanese Patent Application No. 2018-083313, mailed on Feb. 12, 2019, 4 pages.
Office Action received for Japanese Patent Application No. 2018-121118, mailed on Feb. 19, 2021, 17 pages.
Office Action received for Japanese Patent Application No. 2018-121118, mailed on May 14, 2019, 10 pages.
Office Action received for Japanese Patent Application No. 2018-121118, mailed on Nov. 18, 2019, 10 pages.
Office Action received for Japanese Patent Application No. 2018-201088, mailed on Oct. 11, 2019, 9 pages.
Office Action received for Japanese Patent Application No. 2019-024663, mailed on Apr. 27, 2020, 8 pages.
Office Action received for Japanese Patent Application No. 2019-024663, mailed on Feb. 19, 2021, 8 pages.
Office Action received for Japanese Patent Application No. 2019-024663, mailed on Oct. 5, 2020, 7 pages.
Office Action received for Japanese Patent Application No. 2019-138053, mailed on Oct. 2, 2020, 6 pages.
Office Action received for Japanese Patent Application No. 2019-144763, mailed on Jul. 2, 2021, 6 pages.
Office Action received for Japanese Patent Application No. 2019-144763, mailed on Oct. 2, 2020, 6 pages.
Office Action received for Japanese Patent Application No. 2019-24663, mailed on Feb. 10, 2022, 4 pages.
Office Action received for Japanese Patent Application No. 2020-046707, mailed on Jan. 7, 2022, 10 pages.
Office Action received for Japanese Patent Application No. 2020-046707, mailed on Mar. 5, 2021, 8 pages.
Office Action received for Japanese Patent Application No. 2020-123882, mailed on Jul. 29, 2022, 8 pages.
Office Action received for Japanese Patent Application No. 2020-123882, mailed on Sep. 3, 2021, 8 pages.
Office Action received for Japanese Patent Application No. 2021-126843, mailed on Aug. 29, 2022, 6 pages.
Office Action received for Korean Patent Application No. 10-2011-7026583, mailed on Aug. 14, 2014, 6 pages.
Office Action received for Korean Patent Application No. 10-2011-7026583, mailed on Oct. 25, 2013, 4 pages.

(56) References Cited

OTHER PUBLICATIONS

Office Action received for Korean Patent Application No. 10-2012-7029270, mailed on Dec. 4, 2013, 4 pages.
Office Action received for Korean Patent Application No. 10-2013-7022057, mailed on May 28, 2014, 7 pages.
Office Action received for Korean Patent Application No. 10-2014-7011273, mailed on Aug. 14, 2014, 5 pages.
Office Action received for Korean Patent Application No. 10-2014-7033660, mailed on Feb. 23, 2015, 3 pages.
Office Action received for Korean Patent Application No. 10-2014-7036624, mailed on Jan. 29, 2016, 10 pages.
Office Action received for Korean Patent Application No. 10-2015-7013849, mailed on Aug. 20, 2015, 5 pages.
Office Action received for Korean Patent Application No. 10-2016-7008449, mailed on Jan. 12, 2017, 15 pages.
Office Action received for Korean Patent Application No. 10-2016-7008449, mailed on Jan. 16, 2018, 10 pages.
Office Action received for Korean Patent Application No. 10-2016-7008449, mailed on Nov. 27, 2017, 6 pages.
Office Action received for Korean Patent Application No. 10-2016-7014051, mailed on Apr. 30, 2018, 14 pages.
Office Action received for Korean Patent Application No. 10-2016-7014051, mailed on Jun. 20, 2017, 16 pages.
Office Action received for Korean Patent Application No. 10-2016-7017508, mailed on Oct. 20, 2016, 5 pages.
Office Action received for Korean Patent Application No. 10-2018-7010872, mailed on May 21, 2018, 10 pages.
Office Action received for Korean Patent Application No. 10-2019-7005262, mailed on May 3, 2019, 5 pages.
Office Action received for Korean Patent Application No. 10-2019-7007748, mailed on Nov. 15, 2019, 9 pages.
Office Action received for Korean Patent Application No. 10-2020-7018655, mailed on Apr. 26, 2021, 9 pages.
Office Action received for Korean Patent Application No. 10-2020-7018655, mailed on Oct. 13, 2020, 5 pages.
Office Action received for Korean Patent Application No. 10-2020-7022802, mailed on Aug. 28, 2020, 7 pages.
Office Action received for Korean Patent Application No. 10-2021-7017259, mailed on Jan. 10, 2022, 6 pages.
Office Action received for Korean Patent Application No. 10-2021-7017259, mailed on Jul. 19, 2021, 10 pages.
Office Action received for Korean Patent Application No. 10-2021-7017259, mailed on Mar. 3, 2022, 8 pages.
Office Action received for Korean Patent Application No. 10-2018-7010872, mailed on Feb. 13, 2019, 7 pages.
Office Action received for Taiwanese Patent Application No. 103130517, mailed on Feb. 6, 2018, 5 pages.
Office Action received for Taiwanese Patent Application No. 103130517, mailed on Feb. 22, 2016, 7 pages.
Office Action received for Taiwanese Patent Application No. 103130517, mailed on Jul. 29, 2016, 7 pages.
Office Action received for Taiwanese Patent Application No. 104107317, mailed on Mar. 28, 2017, 39 pages.
Office Action received for Taiwanese Patent Application No. 104107329, mailed on Jul. 24, 2020, 7 pages.
Office Action received for Taiwanese Patent Application No. 104107329, mailed on Mar. 5, 2020, 22 pages.
Office Action received for Taiwanese Patent Application No. 104128701, mailed on Jul. 22, 2016, 25 pages.
Office Action received for Taiwanese Patent Application No. 104128701, mailed on Mar. 16, 2017, 8 pages.
Office Action received from European Patent Application No. 06846840.4, mailed on Oct. 13, 2008, 3 pages.
Park Will, "Apple iPhone v1.1.1 SpringBoard Hacked to Display Multiple Pages", available at <http://www.intomobile.com/2007/10/09/apple-iphone-v111-springboard-hacked-to-display-multiple-pages/>, Oct. 9, 2007, 5 pages.
Patel Amit, ""Hexagonal Grids"", Available online at: http://www.redblobgames.com/grids/hexagons/, 36 pages.
Patel Amit, "Amit's Thoughts on Grids", Available online at: http://www-cs-students.stanford.edu/~amitp/game-programming/grids/, Jan. 9, 2006, 22 pages.
PCFan, "Boot Camp Introduction/Data Transition/Operability/Ability Truth Derived from Gap Mac&Win Dual Boot Hard Verification", Daily Communications, vol. 13, No. 14, Jun. 15, 2006, 4 pages.
Pirhonen et al., "Gestural and Audio Metaphors as a Means of Control for Mobile Devices", CHI 2002, Minneapolis, Minnesota, Apr. 20-25, 2002.
Pleading notes Mr B.J. Berghuis van Woortman, in matter of *Apple Inc.* vs *Samsung Electronics*, Case No. KG ZA 11-730 and KG ZA 11-731, Aug. 10-11, 2010, pp. 1-16.
Pleading notes Mr Kleemans, Mr Blomme and Mr Van Oorschot, in matter of *Apple Inc.* vs *Samsung Electronics*, Case No. KG ZA 11-730 and KG ZA 11-731, Aug. 10, 2011, 35 pages.
Pre-Interview First Office Action received for U.S. Appl. No. 16/270,801, mailed on Feb. 10, 2020, 5 pages.
Pre-Interview First Office Action received for U.S. Appl. No. 16/270,902, mailed on Feb. 10, 2020, 5 pages.
Qualcomm Toq—smartwatch—User Manual, Available Online At: URL: https://toq.qualcomm.com/sites/default/files/qualcomm_toq_user_manual.pdf [retrieved on Jun. 25, 2015], Nov. 27, 2013, pp. 1-38.
Record of Oral Hearing received for U.S. Appl. No. 14/142,640, mailed on Nov. 20, 2019, 15 pages.
Record of Oral Hearing received for U.S. Appl. No. 14/142,648, mailed on Mar. 2, 2020, 13 pages.
Record of Oral Hearing received for U.S. Appl. No. 14/261,112, mailed on Sep. 28, 2020, 20 pages.
Record of Oral Hearing received for U.S. Appl. No. 14/913,349 mailed on Sep. 23, 2022, 12 pages.
Ren et al., "The Adaptive Hybrid Cursor: A Pressure-Based Target Selection Technique for Pen-Based User interfaces", Interact '07, Proceedings of the 11th IFIP TC 13 International Conference on Human-Computer Interaction, Sep. 10, 2007, 14 pages.
Response to Notice of Opposition filed for Australian Patent Application No. 2009204252, on Apr. 28, 2014, 4 pages.
Result of Consultation received for European Patent Application No. 08829660.3, mailed on Nov. 18, 2020, 5 pages.
Result of Consultation received for European Patent Application No. 14734674.6, mailed on May 27, 2022, 3 pages.
Result of Consultation received for European Patent Application No. 17210062.0, mailed on Apr. 20, 2020, 2 pages.
Result of Consultation received for European Patent Application No. 17810723.1, mailed on Nov. 30, 2022, 3 pages.
*Samsung Electronics GmbH* vs *Apple Inc*, "List scrolling and document translation, scaling and rotation on a touch-screen display", Opposition, Jan. 30, 2012, 27 pages.
*Samsung Electronics* vs *Apple Inc.*, Statement of Defense Also Counterclaim, Case No. KG ZA 2011-730, Jul. 20, 2011, 44 pages.
*Samsung Electronics* vs *Apple Inc.*, Statement of Defense Also Counterclaim, Case No. KG ZA 2011-731, Jul. 20, 2011, 48 pages.
Search Report and Opinion received for Danish Patent Application No. PA201670608, mailed on Jan. 3, 2017, 15 pages.
Search Report and Opinion received for Danish Patent Application No. PA201670609, mailed on Feb. 1, 2017, 11 pages.
Search Report received for Danish Patent Application No. PA201570781, mailed on Mar. 8, 2016, 10 pages.
Search Report received for Danish Patent Application No. PA201770103, mailed on Jun. 9, 2017, 9 pages.
Shestopalyuk Ruslan, ""Hexagonal grid math"", Feb. 15, 2011, 7 pages.
Shima et al., "Android Application-Development", From basics of development to mashup/hardwareinteraction, a road to "takumi" of Android application-development, Section I, difference from prior platforms, things which can be done with Android, SoftwareDesign, Japan, Gijutsu-Hyohron Co., Ltd., Issue vol. 287 (No. 221), Mar. 18, 2009, pp. 58-65.
Shiota Shinji, "Special Developer's Story", DOS / V magazine, vol. 13, No. 10., Jun. 1, 2004, 12 pages.

(56) References Cited

OTHER PUBLICATIONS

SilverScreen Theme Library, Online Available at <https://web.archive.org/web/20061113121041/http://www.pocketsensei.com/ss_themes.htm>, Nov. 13, 2006, 3 pages.
SilverScreen User Guide, Online Available at <https://web.archive.org/web/20061113121032/http://www.pocketsensei.com/ss_guide.htm>, Nov. 13, 2006, 12 pages.
Stinson Craig, "Windows 95 Official Manual, ASCII Ltd.", ver.1, Mar. 1, 1996, 6 pages.
Summons to Attend Oral proceedings received for European Patent Application No. 06846840.4, mailed on May 18, 2009, 7 pages.
Summons to Attend Oral Proceedings received for European Patent Application No. 07814689.1, mailed on Dec. 1, 2011, 11 pages.
Summons to Attend Oral proceedings received for European Patent Application No. 09170697.8 mailed on Apr. 22, 2013, 6 pages.
Summons to Attend Oral Proceedings received for European Patent Application No. 09170697.8, mailed on Jul. 29, 2016, 9 pages.
Summons to Attend Oral Proceedings received for European Patent Application No. 09170697.8, mailed on Oct. 19, 2017, 12 pages.
Summons to Attend Oral Proceedings received for European Patent Application No. 09700333.9, mailed on Sep. 21, 2012, pages.
Summons to Attend Oral Proceedings received for European Patent Application No. 10762813.3, mailed on Nov. 9, 2016, 9 pages.
Summons to Attend Oral Proceedings received for European Patent Application No. 12189764.9, mailed on Mar. 12, 2020, 11 pages.
Summons to Attend Oral Proceedings received for European Patent Application No. 12189764.9, mailed on May 20, 2020, 11 pages.
Summons to Attend Oral Proceedings received for European Patent Application No. 13795330.3, mailed on Oct. 19, 2018, 13 pages.
Summons to Attend Oral Proceedings received for European Patent Application No. 14734674.6, mailed on Nov. 23, 2021, 7 pages.
Summons to Attend Oral Proceedings received for European Patent Application No. 14772001.5, mailed on Nov. 14, 2018, 5 pages.
Summons to Attend Oral Proceedings received for European Patent Application No. 14772001.5, mailed on Oct. 4, 2018, 15 pages.
Summons to Attend Oral Proceedings received for European Patent Application No. 17210062.0, mailed on Oct. 30, 2019, 7 pages.
Summons to Attend Oral Proceedings received for European Patent Application No. 17810723.1, mailed on Jul. 5, 2022, 8 pages.
Summons to Attend Oral Proceedings received for European Patent Application No. 20203888.1, mailed on Mar. 1, 2023, 8 pages.
Summons to Attend Oral Proceedings received for German Patent Application No. 112006003600.9, mailed on Jun. 2, 2022, 33 pages.
Summons to Oral Proceedings received for European Patent Application No. 09170697.8, mailed on Dec. 17, 2020, 4 pages.
Summons to Oral Proceedings received for European Patent Application No. 12194312.0, mailed on Dec. 8, 2016, 9 pages.
Summons to Oral Proceedings received for European Patent Application No. 12194315.3, mailed on Dec. 8, 2016, 9 pages.
Supplemental Notice of Allowance received for U.S. Appl. No. 11/850,011, mailed on Feb. 24, 2011, 6 pages.
Supplemental Notice of Allowance received for U.S. Appl. No. 16/130,838, mailed on Jun. 28, 2021, 2 pages.
Synergy Solutions, "Launch 'Em Version 3.1", retrieved from the Internet: http://www.fladnag.net/downloads/telephone/palm/APPS/Inchem31/Documentation/LaunchEm.pdf, 2001, pp. 1-39.
Takahashi Masaaki, "Inside Macintosh, Mystery of File V, Mystery of Drag & Drop", NikkeiMAC, Nikkei Business Publications Inc., vol. 17, Aug. 15, 1994, 9 pages.
The Window Club, "How to Set GIF as Background Windows 7", Online Available at <https://www.youtube.com/watch?v=tUec42Qd7ng>, Dec. 24, 2012, pp. 1-5.
Third Party Proceedings received for European Patent Application No. 17210062.0, mailed on Apr. 23, 2020, 6 pages.
Tooeasytoforget, "iPhone—Demo of SummerBoard & Its Features", 5:05 minutes video, available at <http://www.youtube.com/watch?v=CJOb3ftQLac>, uploaded on Sep. 24, 2007, 2 pages.
Turetta Jonathan, "Steve Jobs iPhone 2007 Presentation (HD)", Retrieved from the Internet: URL: https://www.youtube.com/watch?v=vN4U5FqrOdQ&feature=youtu.be, May 13, 2013, 2 pages.
Williamson et al., "Shoogle: Excitatory Multimodal Interaction on Mobile Devices", CHI 2007, San Jose, California, Apr. 28-May 3, 2007, pp. 121-124.
Windows XP, "Enable or disable AutoArrange desktop icons in Windows XP", Windows Tutorials, http://www.freemailtutorials.com/microsoftWindows/autoArrangeIconsOnTheDesktop.php, Nov. 19, 2009, 3 pages.
Wolfe Joanna, "Annotation Technologies: A Software and Research Review", Computers and Composition, vol. 19, No. 4, 2002, pp. 471-497.
Wright Ben, "Palm OS PDA Application Mini-Reviews", Online Available at <http://library.indstate.edu/newsletter/feb04/palmmini.htm>, Feb. 3, 2015, 11 pages.
Xiaoyu et al., "Mobile Browsable Information Access for the Visually Impaired", AMCIS 2004 Proceedings. Paper 424, Dec. 31, 2004.
Zhang et al., "An Ergonomics Study of Menu-Operation on Mobile Phone Interface", In Proceedings of the workshop on Intelligent Information Technology Application., 2007, pp. 247-251.
Zhao et al., "earPod: Eyes-free Menu Selection using Touch Input and Reactive Audio Feedback", CHI 2007 Proceedings of Alternative Interaction, Apr. 28-May 3, 2007, 10 pages.
Office Action received for Japanese Patent Application No. 2023-015606, mailed on Mar. 8, 2024, 10 pages (5 pages of English Translation and 5 pages of Official Copy).
Applicant-Initiated Interview Summary received for U.S. Appl. No. 17/950,823, mailed on Feb. 9, 2024, 4 pages.
Non-Final Office Action received for U.S. Appl. No. 18/121,539, mailed on Feb. 9, 2024, 22 pages.
Notice of Allowance received for U.S. Appl. No. 18/211,112, mailed on Feb. 21, 2024, 22 pages.
Office Action received for Chinese Patent Application No. 202010940700.4, mailed on Dec. 8, 2023, 11 pages (5 pages of English Translation and 6 pages of Official Copy).
Office Action received for Chinese Patent Application No. 202010941320.2, mailed on Dec. 12, 2023, 18 pages (7 pages of English Translation and 11 pages of Official Copy).
Advisory Action received for U.S. Appl. No. 17/728,725, mailed on Nov. 9, 2023, 5 pages.
Applicant-Initiated Interview Summary received for U.S. Appl. No. 17/728,725, mailed on Oct. 27, 2023, 2 pages.
Extended European Search Report received for European Patent Application No. 23201849.9, mailed on Oct. 26, 2023, 9 pages.
Office Action received for Australian Patent Application No. 2022224726, mailed on Nov. 1, 2023, 4 pages.
Office Action received for Japanese Patent Application No. 2022-145450, mailed on Nov. 6, 2023, 8 pages (4 pages of English Translation and 4 pages of Official Copy).
Applicant-Initiated Interview Summary received for U.S. Appl. No. 17/950,972. mailed on Apr. 16, 2024, 4 pages.
Final Office Action received for U.S. Appl. No. 18/139,311, mailed on Mar. 29, 2024, 10 pages.
Notice of Allowance received for U.S. Appl. No. 15/421,865, mailed on Apr. 15, 2024, 12 pages.
Summons to Oral Proceedings received for European Patent Application No. 14734674.6, mailed on Apr. 5, 2024, 4 pages.
Applicant-Initiated Interview Summary received for U.S. Appl. No. 15/421,865, mailed on Oct. 3, 2023, 6 pages.
Brief Communication Regarding Oral Proceedings received for European Patent Application No. 20203888.1, mailed on Sep. 22, 2023, 6 pages.
Corrected Notice of Allowance received for U.S. Appl. No. 17/698,979, mailed on Oct. 2, 2023, 2 pages.
Decision to Grant received for European Patent Application No. 17810723.1, mailed on Sep. 21, 2023, 2 pages.
Motley Latonya, "Course Topics", Windows XP Introduction, Mar. 2005, 19 pages.
Office Action received for Australian Patent Application No. 2022224726, mailed on Aug. 22, 2023, 6 pages.
Sams Teach Yourself Microsoft Windows 2000 Professional in 10 Minutes, InformIT, Online Available at: https://www.informit.com/articles/article.aspx?p=411736&seqNum=158, Sep. 9, 2005, 1 page.

(56) References Cited

OTHER PUBLICATIONS

Taskbar basics, Online Available at: www.microsoft.com/windows98/usingwindows/work/articles/811Nov/WRKfoundation4.asp, Apr. 21, 1999, 1 page.
Windows XP Tutorial—The Windows XP desktop & icons, www.helpwithpcs.com, Mar. 15, 2006, 13 pages.
Zisman Alan, "Clean Up your Windows Desktop and Start Menu", Available online at: https://web.archive.org/web/20060103043656/http://www.zisman.ca/simple95/, Jan. 3, 2006, 7 pages.
Applicant-Initiated Interview Summary received for U.S. Appl. No. 17/410,169, mailed on Jan. 26, 2024, 5 pages.
Final Office Action received for U.S. Appl. No. 17/950,972, mailed on Jan. 23, 2024, 16 pages.
Intention to Grant received for European Patent Application No. 19176224.4, mailed on Jan. 30, 2024, 9 pages.
Non-Final Office Action received for U.S. Appl. No. 17/950,823, mailed on Dec. 18, 2023, 13 pages.
Non-Final Office Action received for U.S. Appl. No. 18/139,311, mailed on Dec. 22, 2023, 11 pages.
Lin, Xu, "The Mis-operation Research Based on Cognitive Psychology", China Academic Journal Electronic Publishing House. Online available at: http://www.cnki.net, 2011, 71 pages.
Applicant-Initiated Interview Summary received for U.S. Appl. No. 17/878,792, mailed on Mar. 8, 2024, 3 pages.
Applicant-Initiated Interview Summary received for U.S. Appl. No. 18/139,311, mailed on Feb. 23, 2024, 2 pages.
Final Office Action received for U.S. Appl. No. 15/421,865, mailed on Mar. 7, 2024, 27 pages.
Final Office Action received for U.S. Appl. No. 17/410,169, mailed on Feb. 23, 2024, 49 pages.
Notice of Acceptance received for Australian Patent Application No. 2022224726, mailed on Mar. 5, 2024, 3 pages.
Notice of Allowance received for U.S. Appl. No. 18/130,847, mailed on Feb. 28, 2024, 9 pages.
Office Action received for Australian Patent Application No. 2022235585, mailed on Feb. 27, 2024, 5 pages.
Office Action received for European Patent Application No. 20217518.8, mailed on Feb. 22, 2024, 7 pages.
Notice of Allowance received for U.S. Appl. No. 17/950,972, mailed on May 22, 2024, 8 pages.
Office Action received for Chinese Patent Application No. 202010941320.2, mailed on Apr. 19, 2024, 18 pages (7 pages of English Translation and 11 pages of Official Copy).
Office Action received for Chinese Patent Application No. 202110957983.8, mailed on May 13, 2024, 18 pages (12 pages of English Translation and 6 pages of Official Copy).
Final Office Action received for U.S. Appl. No. 18/121,539, mailed on Aug. 20, 2024, 29 pages.
Minutes of the Oral Proceedings received for European Patent Application No. 14734674.6, mailed on Sep. 2, 2024, 3 pages.
Notice of Allowance received for U.S. Appl. No. 17/878,792, mailed on Sep. 6, 2024, 8 pages.
Notice of Allowance received for U.S. Appl. No. 17/950,972, mailed on Sep. 10, 2024, 7 pages.
Communication for Board of Appeal received for European Patent Application No. 14734674.6, mailed on Jun. 11, 2024, 10 pages.
Corrected Notice of Allowance received for U.S. Appl. No. 17/950,972, mailed on Jun. 10, 2024, 2 pages.
Intention to Grant received for European Patent Application No. 19176224.4, mailed on Jun. 14, 2024, 9 pages.
Notice of Allowance received for U.S. Appl. No. 17/878,792, mailed on Jun. 5, 2024, 10 pages.
Non-Final Office Action received for U.S. Appl. No. 18/139,311, mailed on Jun. 20, 2024, 11 pages.
Supplemental Notice of Allowance received for U.S. Appl. No. 15/421,865, mailed on Jun. 20, 2024, 3 pages.
Non-Final Office Action received for U.S. Appl. No. 17/410,169, mailed on Sep. 10, 2024, 53 pages.
Applicant-Initiated Interview Summary received for U.S. Appl. No. 18/139,311, mailed on Aug. 8, 2024, 4 pages.
Office Action received for Chinese Patent Application No. 202010941320.2, mailed on Jun. 26, 2024, 15 pages (5 pages of English Translation and 10 pages of Official Copy).
Mercedes-Benz Command Operating Instructions Manual, Online available at: https://www.mbusa.com/content/dam/mb-nafta/us/owners/manuals/2012/audio-and-comand/MY12_SLK_C_E_CLS_M_COMAND.pdf, 2012, 234 pages.
Notice of Allowance received for Japanese Patent Application No. 2023-015606, mailed on Jul. 12, 2024, 4 pages (1 page of English Translation and 3 pages of Official Copy).
Office Action received for Australian Patent Application No. 2022235585, mailed on Jul. 25, 2024, 5 pages.
Office Action received for Chinese Patent Application No. 202110957983.8, mailed on Jul. 6, 2024, 17 pages (11 pages of English Translation and 6 pages of Official Copy).
Office Action received for Chinese Patent Application No. 202310508332.X, mailed on Jun. 26, 2024, 13 pages (7 pages of English Translation and 6 pages of Official Copy).
Applicant-Initiated Interview Summary received for U.S. Appl. No. 17/410,169, mailed on May 8, 2024, 6 pages.
Applicant-Initiated Interview Summary received for U.S. Appl. No. 18/121,539, mailed on May 1, 2024, 5 pages.
Applicant-Initiated Interview Summary received for U.S. Appl. No. 18/139,311, mailed on May 7, 2024, 2 pages.
Final Office Action received for U.S. Appl. No. 17/950,823, mailed on May 7, 2024, 18 pages.
Notice of Allowance received for Chinese Patent Application No. 202010940700.4, mailed on Apr. 23, 2024, 4 pages (1 page of English Translation and 3 pages of Official Copy).
Notice of Allowance received for U.S. Appl. No. 17/728,725, mailed on May 8, 2024, 9 pages.
Office Action received for Japanese Patent Application No. 2022-145450, mailed on Mar. 1, 2024, 9 pages (4 pages of English Translation and 5 pages of Official Copy).
Corrected Notice of Allowance received for U.S. Appl. No. 17/950,972, mailed on Jul. 10, 2024, 2 pages.
Notice of Allowance received for Japanese Patent Application No. 2022-145450. mailed on Jul. 1, 2024, 4 pages (1 page of English Translation and 3 pages of Official Copy).
Office Action received for Australian Patent Application No. 2022235585, mailed on Jul. 8, 2024, 3 pages.
Office Action received for European Patent Application No. 17810739.7, mailed on Jul. 8, 2024, 9 pages.
Office Action received for Japanese Patent Application No. 2023-015606, mailed on Jun. 21, 2024, 4 pages (2 pages of English Translation and 2 pages of Official Copy).
Office Action received for Chinese Patent Application No. 202310508332.X, mailed on Dec. 7, 2024, 14 pages (7 pages of English Translation and 7 pages of Official Copy).

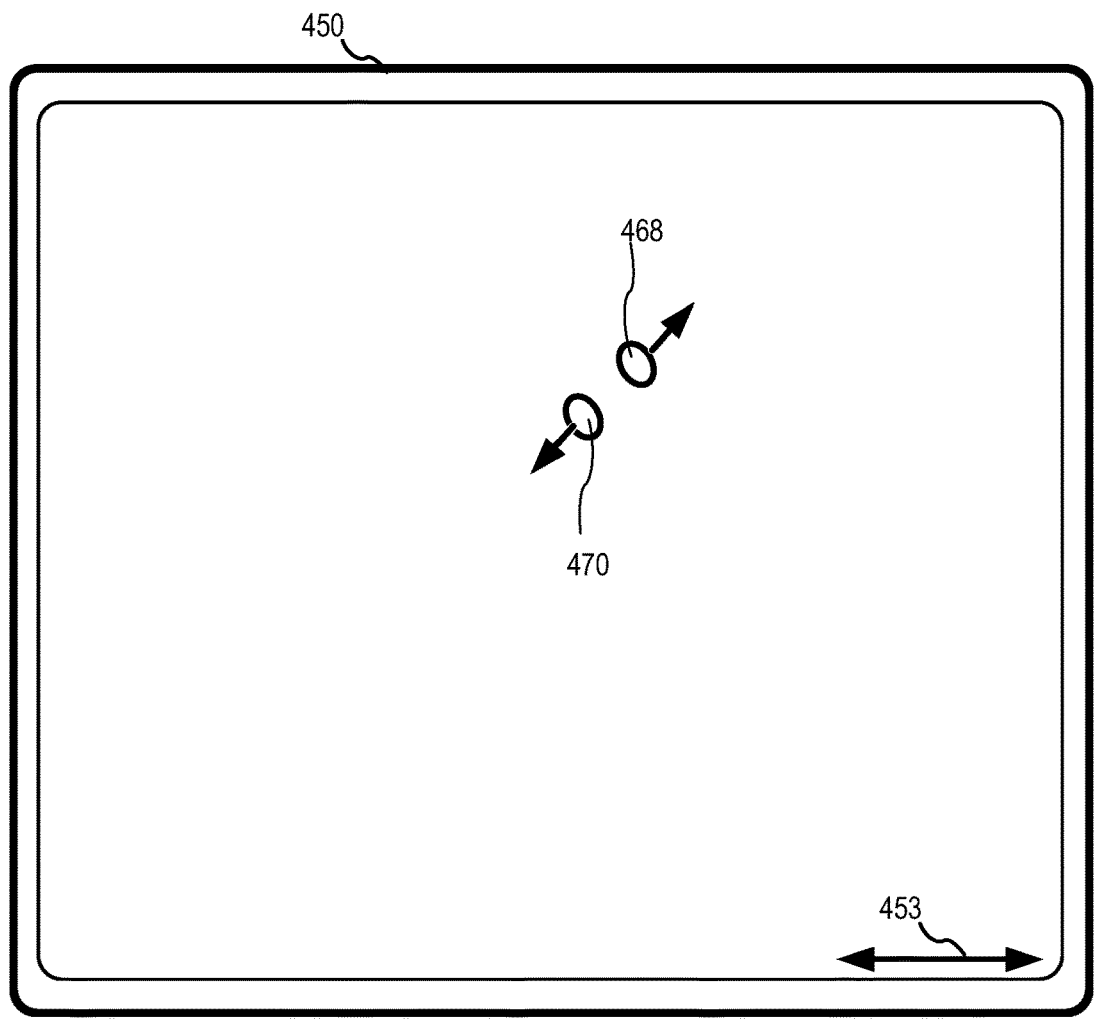
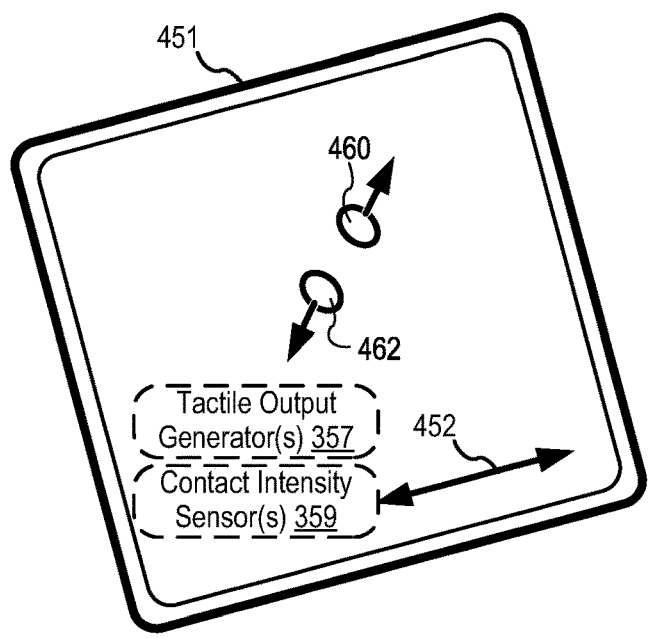
FIG. 4B

2000

2002

At a first electronic device with a display, one or more processors, and memory (the first electronic device is coupled via wireless communication to a second electronic device with a display, one or more processors, memory, and access to a library of one or more user interfaces for display on the second electronic device. Optionally, the library is stored in memory of the first and/or second electronic device):

2004

Display on the display of the first electronic device a first user interface screen comprising at least a first user interface preview image (the first user interface preview image representing a first user interface for display on the second electronic device). The first user interface is configured according to a first watch face type and comprises a clock and at least a first complication. The first user interface preview image comprises representations of the first watch face type, the clock, and the at least first complication. The first user interface is selected based at least in part on one or more criterion selected from: the first user interface is configured according to a watch face type not currently represented in a user interface in the library; the first user interface has a first complication not currently represented in a user interface in the library; and the first user interface has a first complication associated with an application for use on the second electronic device that corresponds with an application installed in the memory of the first electronic device.

2006

Display, as part of the first user interface screen, a second user interface preview image (the second user interface preview image represents a second user interface for display on the second electronic device). The second user interface is configured according to a second watch face type and comprises a clock and at least a second complication. The second user interface preview image comprises representations of the second watch face type, the clock, and the at least second complication of the second user interface. The second user interface is independently selected based at least in part on the one or more criterion.

Optionally, the second watch face type is different from the first watch face type Optionally, the second complication is different from the first complication (A)

At a first electronic device with a display, one or more processors, and memory (the first electronic device is coupled via wireless communication to a second electronic device with a display, one or more processors, memory, and access to a library of one or more user interfaces for display on the second electronic device. Optionally, the library is stored in memory of the first and/or second electronic device):

(B)

↓

2016

First user interface is selected based at least in part on criterion that the first user interface has a complication used above a predetermined frequency on the first electronic device.

↓

2018

Receive user input corresponding to selection of the first user interface preview image.

↓

2020

In response to receiving the user input, cease to display the first user interface screen and display a second user interface screen with the first user interface preview image, a list of complication(s) of the first user interface (including the first complication), and a selection affordance for selecting the first user interface.

↓

2022

Receive a user input corresponding to a selection of the selection affordance.

↓

2024

In response to receiving the user input, send instructions to the second electronic device for displaying the first user interface on the display of the second electronic device.

2002
At a first electronic device with a display, one or more processors, and memory (the first electronic device is coupled via wireless communication to a second electronic device with a display, one or more processors, memory, and access to a library of one or more user interfaces for display on the second electronic device. Optionally, the library is stored in memory of the first and/or second electronic device):

(C)

2026
In response to receiving the user input, store the first user interface as part of the library.

2028
Display, as part of the first user interface screen, an affordance for viewing a user interface from the library.

2030
In response to receiving the user input, display an animation depicting movement of the first user interface preview image toward the affordance for viewing the user interface.

2032
Receiving the user input comprises detecting a contact on the display (which is touch-sensitive) at the first user interface preview image or selection affordance.

2034
In response to receiving the user input, determine whether the first user interface comprises a complication associated with an application not currently installed on the second electronic device

NOT INSTALLED → (D)

INSTALLED → (E)

At a first electronic device with a display, one or more processors, and memory (the first electronic device is coupled via wireless communication to a second electronic device with a display, one or more processors, memory, and access to a library of one or more user interfaces for display on the second electronic device. Optionally, the library is stored in memory of the first and/or second electronic device):

2048

First and second user interfaces are part of a list prioritized at least in part based on the one or more criteria.

Optionally, de-prioritize a user interface of the prioritized list based at least in part on one or more criteria selected from: user interface is already represented in the library, the user interface has a complication that is already represented in the library, and the list comprises a user interface of the same watch type adjacent to the de-prioritized user interface in the list.

2050

Display, as part of the first user interface screen, an affordance for viewing additional user interface preview images.

2052

Receive a user input corresponding to a selection of the affordance.

2054

In response to receiving the user input, cease to display the first user interface screen and display a third user interface screen comprising a plurality of user interface preview images (plurality comprises a fourth user interface with the first complication that is configured according to a watch face type other than the first watch face type).

2002
At a first electronic device with a display, one or more processors, and memory (the first electronic device is coupled via wireless communication to a second electronic device with a display, one or more processors, memory, and access to a library of one or more user interfaces for display on the second electronic device. Optionally, the library is stored in memory of the first and/or second electronic device):

2064
Prior to displaying the first user interface screen, select the first watch type of the first user interface (first watch type is selected at least in part based on a criterion that the application with which the first complication is associated is supported for use in the selected first watch face type).

Optionally, first watch face type is selected based at least in part on a criterion that the watch face type is represented in one or more user interfaces displayed on second device above a predetermined frequency.

Optionally, first watch face type is selected based at least in part on a criterion that the watch face type is represented in one or more user interfaces displayed on second device within a predetermined period of time.

Optionally, first watch face type is selected based at least in part on a criterion that the library comprises a user interface configured according to the first watch face type with a complication that has been edited by the user.

Optionally, first watch face type is selected based at least in part on a criterion that the library does not already comprise a user interface configured according to the first watch face type with the first complication.

Optionally, selecting first watch face type comprises selecting a color based at least in part on a designated color of the application associated with the first complication.

At a first electronic device with a touch-sensitive display, one or more processors, and memory (the first electronic device is coupled via wireless communication to a second electronic device with a display, one or more processors, memory, and access to a library of one or more user interfaces for display on the second electronic device. Optionally, the library is stored in memory of the first and/or second electronic device):

2104

Display on the display of the first electronic device a first user interface screen comprising at least a first user interface preview image (the first user interface preview image representing a first user interface for display on the second electronic device). The first user interface is configured according to a first watch face type and comprises a clock and at least a first complication. The first user interface preview image comprises representations of the first watch face type, the clock, and the at least first complication.

2106

Detect first contact at the first user interface preview image.

2108

In response to detecting the first contact, cease to display the first user interface screen and display a second user interface screen. The second user interface screen comprises: the first user interface preview image, a list of one or more complications of the first user interface (list includes at least the first complication), a selection affordance for selecting the first user interface, and a second user interface preview image that represents a second user interface comprising a clock and the first complication and configured according to a second (different) watch face type.

2110

Detect second contact at the selection affordance.

2112

In response to detecting the second contact, send instructions to the second device for displaying the first user interface.

2102
At a first electronic device with a touch-sensitive display, one or more processors, and memory (the first electronic device is coupled via wireless communication to a second electronic device with a display, one or more processors, memory, and access to a library of one or more user interfaces for display on the second electronic device. Optionally, the library is stored in memory of the first and/or second electronic device):

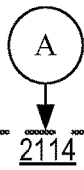

2114
Second user interface screen further comprises: a first editing affordance indicating a first option of an editable aspect of the first user interface; and a second editing affordance indicating a second option for the editable aspect of the first user interface.

Optionally, editable aspect is selected from color, density, background, and font of the first user interface.

Optionally, first complication is a stopwatch affordance, and editable aspect is stopwatch timescale.

Optionally, first complication is affordance associated with an application.

Optionally, editable aspect is the application associated with the affordance.

Optionally, affordance displays set of information obtained from the application, and editable aspect is the set of information.

2116
Second user interface screen further comprises: a description of the watch face type of the first user interface.

2118
Detect a third contact at the second user interface preview image.

2102
At a first electronic device with a touch-sensitive display, one or more processors, and memory (the first electronic device is coupled via wireless communication to a second electronic device with a display, one or more processors, memory, and access to a library of one or more user interfaces for display on the second electronic device. Optionally, the library is stored in memory of the first and/or second electronic device):

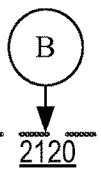

2120
In response to detecting the third contact, cease to display the second user interface screen and display a third user interface screen. The third user interface screen comprises: the second user interface preview image; a list of one or more complications of the second user interface (list comprises the first complication); and a selection affordance for selecting the second user interface.

2122
Detect a fourth contact at the second editing affordance (first option is a currently selected option for the editable aspect, and first user interface preview image represents the first option).

2124
In response to detecting the fourth contact, update the first user interface preview image to represent the second option for the editable aspect.

Optionally, updating the first user interface preview image comprises animation a transition from the first to the second option of the editable aspect.

2126
In response to detecting the second contact at the selection affordance, send instructions to the second device to add the first user interface to the library.

At a first electronic device with a touch-sensitive display, one or more processors, and memory (the first electronic device is coupled via wireless communication to a second electronic device with a display, one or more processors, memory, and access to a library of one or more user interfaces for display on the second electronic device. Optionally, the library is stored in memory of the first and/or second electronic device):

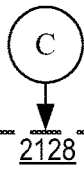

2128

Second user interface screen comprises an affordance for viewing the library of user interfaces. In response to detecting the second contact at the selection affordance, animate the first user interface preview image to translate on-screen toward the affordance for viewing the library.

2130

After adding the first user interface to the stored library, detect a fifth contact at the affordance for viewing the library.

2132

In response to detecting the fifth contact, cease to display the second user interface screen and display a fourth user interface screen. The fourth user interface screen comprises: the first user interface preview image; and a fourth user interface preview image representing a fourth user interface that is part of the library.

2134

Visually distinguish the first user interface preview image to indicate it is newly added to the library.

2136

Display on the first user interface screen a plurality of user interface preview images representing a plurality of user interfaces for display on the second device (plurality includes two or more user interfaces that represent the same watch face type).

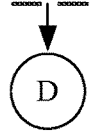

At a first electronic device with a touch-sensitive display, one or more processors, and memory (the first electronic device is coupled via wireless communication to a second electronic device with a display, one or more processors, and memory in which a library of one or more user interfaces for display on the second electronic device is stored):

2204

Display on the display of the first electronic device a first user interface screen comprising at least a first and a second user interface preview image (the first and the second user interface preview images representing a first and a second user interface for display on the second electronic device). The first and second user interfaces are configured according to a watch face type and comprise a clock. The first and second user interfaces are part of the stored library.

2206

Receive a first user input corresponding to a user request to reorder the stored library.

2208

In response to receiving the first user input, cease to display the first user interface screen and display a second user interface screen. The second user interface screen comprises the first and second user interface preview images, and the relative positions of the first and second user interface preview images on the second user interface screen reflect their order in the stored library.

2210

Receive a second user input corresponding to a user request to reorder the second user interface before the first user interface in the stored library.

2212

In response to receiving the second user input, send instructions to the second device for reordering the second user interface before the first user interface in the stored library.

2202
At a first electronic device with a touch-sensitive display, one or more processors, and memory (the first electronic device is coupled via wireless communication to a second electronic device with a display, one or more processors, and memory in which a library of one or more user interfaces for display on the second electronic device is stored):

2226
Receiving the second user input comprises:
Detecting a contact at the re-ordering affordance (a first position).

While continuing to detect the contact, detecting movement of the contact from the first position to a second position without a break in contact (second position is on opposite side of the first user interface preview image).

In response to detecting the contact at the second position, translating the second user interface preview image on-screen in a direction of the movement; and translating the first user interface preview image on-screen in a direction opposite the movement (after translation, relative positions of the first and second user interface preview images reflect the reordering).

2228
Display a delete affordance with the first user interface preview image as part of the second user interface screen.

2230
Display an affordance for revealing an edit option that is displayed in association with the first user interface preview image as part of the second user interface screen.

2232
Detect a contact at the affordance for revealing an edit option.

2202
At a first electronic device with a touch-sensitive display, one or more processors, and memory (the first electronic device is coupled via wireless communication to a second electronic device with a display, one or more processors, and memory in which a library of one or more user interfaces for display on the second electronic device is stored):

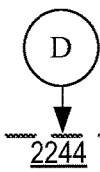

2244
In response to detecting the contact at the affordance for completing editing, cease to display the second user interface screen; re-display the first user interface screen (first user interface screen comprises the first and second user interface preview images); and animate the first user interface preview image to disappear.

2246
After animating the first user interface preview image to disappear, translate the second user interface preview image on-screen to occupy the former position of the first user interface preview image.

2248
While displaying the first user interface screen, detect a swipe at the first or second user interface preview image.

2250
In response to detecting the swipe, scroll the first and second user interface preview images to reveal a third user interface preview image representing a third user interface for display on the second device (third user interface is part of the library).

At a first electronic device with a touch-sensitive display, one or more processors, and memory (the first electronic device is coupled via wireless communication to a second electronic device with a display, one or more processors, and memory in which a library of one or more user interfaces for display on the second electronic device is stored):

2254

Prior to revealing the third user interface preview image, display as part of the first user interface screen a partial view of the third user interface preview image.

2256

Display as part of the second user interface screen text indications of the watch face types of the first and second user interfaces (indications are displayed in association with the first and second user interface preview images).

*FIG. 22F*

CONFIGURING CONTEXT-SPECIFIC USER INTERFACES

CROSS-REFERENCE TO RELATED APPLICATIONS

This application is a continuation of U.S. patent application Ser. No. 17/349,226, entitled "Configuring Context-Specific User Interfaces," filed Jun. 16, 2021, which is a continuation of U.S. patent application Ser. No. 16/918,855, entitled "Configuring Context-Specific User Interfaces," filed Jul. 1, 2020, now U.S. Pat. No. 11,073,799, which is a continuation of U.S. patent application Ser. No. 15/418,537, entitled "Configuring Context-Specific User Interfaces," filed Jan. 27, 2017, now U.S. Pat. No. 10,739,974, which claims priority to U.S. provisional patent application 62/348,902, entitled "Configuring Context-Specific User Interfaces," filed Jun. 11, 2016, the contents of each of which are hereby incorporated by reference in their entirety.

This application relates to the following applications: International Patent Application Serial No. PCT/US2015/034604, titled "Context-Specific User Interfaces," filed Jun. 7, 2015, published as WIPO Publication No. WO/2016/022203; International Patent Application Serial No. PCT/US2015/034606, titled "Context-Specific User Interfaces," filed Jun. 7, 2015, published as WIPO Publication No. WO/2016/022204; International Patent Application Serial No. PCT/US2015/034607, titled "Context-Specific User Interfaces," filed Jun. 7, 2015, published as WIPO Publication No. WO/2016/022205; International Patent Application Serial No. PCT/US2015/055165, titled "Device Configuration User Interface," filed Oct. 12, 2015; International Patent Application Serial No. PCT/US2015/053353, titled "Sharing User-Configurable Graphical Constructs," filed Sep. 30, 2015; and International Patent Application Serial No. PCT/US2016/021403, titled "Sharing User-Configurable Graphical Constructs," filed Mar. 8, 2016. The content of these applications is hereby incorporated by reference in their entirety.

FIELD

The present disclosure relates generally to computer user interfaces, and more specifically to configuring context-specific user interfaces for indicating time, e.g., via wireless communication.

BACKGROUND

Users rely on portable multifunction devices for keeping time, among a variety of other operations including running software applications. It is desirable to allow the user to access an array of information through a single user interface while keeping the interface simple and intuitive to use. Further, a user may want to access different types of information, such as various aspects related to keeping time, or different application data points, in different contexts. Moreover, different users may find it beneficial to have information (e.g., the same information) presented in different formats and/or arrangements. Modern electronic devices often have many customizable features that can be set by a user according to the user's preferences. It is therefore also desirable to allow the user to customize the user interface and the types of information provided through the user interface. Modern electronic devices are also capable of communicating with other electronic devices via, for example, wireless communication. The ability to communicate with other devices may allow devices to share information and interact with each other. Thus, there is also an opportunity to provide techniques for establishing communication between devices and to use the communication to improve a configuration process, e.g., for context-specific user interfaces that indicate time.

SUMMARY

Portable multifunction devices are able to provide many different types of information and interfaces to a user, and a user may wish to configure these user interfaces, and the types of information they provide, in different contexts. Therefore, context-specific user interfaces for keeping time are increasingly desirable. Since some portable multifunction devices have a reduced size display and/or different input modalities as compared to other electronic devices, techniques for configuring user interfaces of a portable multifunction device at another electronic device (e.g., via wireless communication) are also desirable.

Some techniques for managing (e.g., editing) context-specific user interfaces for indicating time using electronic devices, however, are generally cumbersome and inefficient. For example, existing techniques use a complex and time-consuming user interface, which may not be suitable for configuring a device with a reduced display size. Existing techniques require more time than necessary, wasting user time and device energy. This latter consideration is particularly important in battery-operated devices.

Accordingly, the present disclosure provides, inter alia, the benefit of portable electronic devices with faster, more efficient methods and interfaces for configuring context-specific user interfaces. Such methods and interfaces optionally complement or replace other methods for configuring context-specific user interfaces. Such methods and interfaces reduce the cognitive burden on a user and produce a more efficient human-machine interface. Such methods and interfaces may also reduce the number of unnecessary, extraneous, repetitive, and/or redundant inputs, and may create a faster and more efficient user interface arrangement, which may reduce the number of required inputs, reduce processing power, and reduce the amount of time for which user interface(s) need to be displayed in order for desired functions to be accessed and carried out. For battery-operated computing devices, such methods and interfaces conserve power and increase the time between battery charges.

In some embodiments, a method of configuring a context-specific user interface comprises, at a first electronic device with a display, one or more processors, and memory, wherein the first electronic device is coupled via wireless communication to a second electronic device with a display, one or more processors, a memory, and access to a library of one or more user interfaces for display on the second electronic device: displaying on the display of the first electronic device a first user interface screen comprising at least a first user interface preview image, the first user interface preview image representing a first user interface for display on the second electronic device, wherein the first user interface is configured according to a first watch face type and comprises a clock and at least a first complication, wherein the first user interface preview image comprises representations of the first watch face type, the clock, and the at least first complication, and wherein the first user interface is selected based at least in part on one or more criterion selected from the group consisting of: the first user interface is configured according to a watch face type not currently represented in a user interface in the library; the first user interface has a first complication not currently represented in a user interface in the library; and the first user interface has a first complication associated with an application for use on the second electronic device that corresponds with an application installed in the memory of the first electronic device.

In some embodiments, a method of configuring a context-specific user interface comprises, at a first electronic device with a touch-sensitive display, one or more processors, and memory, wherein the first electronic device is coupled via wireless communication to a second electronic device with a display, one or more processors, a memory, and access to a library of one or more user interfaces for display on the second electronic device: displaying on the display of the first electronic device a first user interface screen comprising a first user interface preview image, the first user interface preview image representing a first user interface for display on the second electronic device, wherein the first user interface is configured according to a first watch face type and comprises a clock and at least a first complication, wherein the first user interface preview image comprises representations of the first watch face type, the clock, and the at least first complication, and wherein the first user interface is not already in the library of user interfaces for display on the second electronic device; detecting a first contact at the displayed first user interface preview image; in response to detecting the first contact: ceasing to display the first user interface screen; and displaying on the display of the first electronic device a second user interface screen comprising: the first user interface preview image; a list of one or more complications of the first user interface, wherein the list comprises at least the first complication; a selection affordance for selecting the first user interface; and a second user interface preview image, wherein the second user interface preview image represents a second user interface, wherein the second user interface is configured according to a second watch face type and comprises a clock and the first complication, and wherein the second watch face type is different from the first watch face type; detecting a second contact at the selection affordance; and in response to detecting the second contact: sending instructions to the second electronic device for displaying the first user interface on the display of the second electronic device.

In some embodiments, a method of configuring a context-specific user interface comprises, at a first electronic device with a touch-sensitive display, one or more processors, and memory, wherein the first electronic device is coupled via wireless communication to a second electronic device with a display, one or more processors, and memory, and wherein a library of two or more user interfaces for display on the second electronic device is stored in the memory of the second electronic device: displaying on the display of the first electronic device a first user interface screen comprising at least a first and a second user interface preview image, the first and the second user interface preview images representing a first and a second user interface for display on the second electronic device, wherein the first and the second user interfaces are configured according to a watch face type and comprise a clock, and wherein the first and the second user interfaces are part of the stored library of user interfaces for display on the second electronic device; receiving a first user input corresponding to a user request to reorder the stored library of user interfaces; in response to receiving the first user input: ceasing to display the first user interface screen; and displaying a second user interface screen, wherein the second user interface screen comprises the first and the second user interface preview images, and wherein the relative positions of the first and the second user interface preview images on the second user interface screen reflect an order of the first and the second user interfaces in the stored library; receiving a second user input corresponding to a user request to re-order the second user interface before the first user interface in the stored library; and in response to receiving the second user input: sending instructions to the second electronic device for re-ordering the second user interface before the first user interface in the stored library.

In some embodiments, a non-transitory computer-readable storage medium comprises one or more programs for execution by one or more processors of a first electronic device with a display, the one or more processors, and memory, wherein the first electronic device is coupled via wireless communication to a second electronic device with a display, one or more processors, memory, and access to a library of one or more user interfaces for display on the second electronic device, the one or more programs including instructions which, when executed by the one or more processors of the first electronic device, cause the first electronic device to: display on the display of the first electronic device a first user interface screen comprising at least a first user interface preview image, the first user interface preview image representing a first user interface for display on the second electronic device, wherein the first user interface is configured according to a first watch face type and comprises a clock and at least a first complication, wherein the first user interface preview image comprises representations of the first watch face type, the clock, and the at least first complication, and wherein the first user interface is selected based at least in part on one or more criterion selected from the group consisting of: the first user interface is configured according to a watch face type not currently represented in a user interface in the library; the first user interface has a first complication not currently represented in a user interface in the library; and the first user interface has a first complication associated with an application for use on the second electronic device that corresponds with an application installed in the memory of the first electronic device.

In some embodiments, a non-transitory computer-readable storage medium comprises one or more programs for execution by one or more processors of a first electronic device with a display, the one or more processors, and memory, wherein the first electronic device is coupled via wireless communication to a second electronic device with a display, one or more processors, memory, and access to a library of one or more user interfaces for display on the second electronic device, the one or more programs including instructions which, when executed by the one or more processors of the first electronic device, cause the first electronic device to: display on the display of the first electronic device a first user interface screen comprising a first user interface preview image, the first user interface preview image representing a first user interface for display on the second electronic device, wherein the first user interface is configured according to a first watch face type and comprises a clock and at least a first complication, wherein the first user interface preview image comprises representations of the first watch face type, the clock, and the at least first complication, and wherein the first user interface is not already in the library of user interfaces for display on the second electronic device; detect a first contact at the displayed first user interface preview image; in response to detecting the first contact: cease to display the first user interface screen; and display on the display of the first electronic device a second user interface screen comprising: the first user interface preview image; a list of one or more complications of the first user interface, wherein the list comprises at least the first complication; a selection affordance for selecting the first user interface; and a second user interface preview image, wherein the second user interface preview image represents a second user interface, wherein the second user interface is configured according to a second watch face type and comprises a clock and the first complication, and wherein the second watch face type is different from the first watch face type; detect a second contact at the selection affordance; and in response to detecting the second contact: send instructions to the second electronic device for displaying the first user interface on the display of the second electronic device.

In some embodiments, a non-transitory computer-readable storage medium comprises one or more programs for execution by one or more processors of a first electronic device with a display, the one or more processors, and memory, wherein the first electronic device is coupled via wireless communication to a second electronic device with a display, one or more processors, and memory, wherein a library of two or more user interfaces for display on the second electronic device is stored in the memory of the second electronic device, the one or more programs including instructions which, when executed by the one or more processors of the first electronic device, cause the first electronic device to: display on the display of the first electronic device a first user interface screen comprising at least a first and a second user interface preview image, the first and the second user interface preview images representing a first and a second user interface for display on the second electronic device, wherein the first and the second user interfaces are configured according to a watch face type and comprise a clock, and wherein the first and the second user interfaces are part of the stored library of user interfaces for display on the second electronic device; receive a first user input corresponding to a user request to reorder the stored library of user interfaces; in response to receiving the first user input: cease to display the first user interface screen; and display a second user interface screen, wherein the second user interface screen comprises the first and the second user interface preview images, and wherein the relative positions of the first and the second user interface preview images on the second user interface screen reflect an order of the first and the second user interfaces in the stored library; receive a second user input corresponding to a user request to re-order the second user interface before the first user interface in the stored library; and in response to receiving the second user input: send instructions to the second electronic device for re-ordering the second user interface before the first user interface in the stored library.

In some embodiments, a transitory computer-readable storage medium comprises one or more programs for execution by one or more processors of a first electronic device with a display, the one or more processors, and memory, wherein the first electronic device is coupled via wireless communication to a second electronic device with a display, one or more processors, memory, and access to a library of one or more user interfaces for display on the second electronic device, the one or more programs including instructions which, when executed by the one or more processors of the first electronic device, cause the first electronic device to: display on the display of the first electronic device a first user interface screen comprising a first user interface preview image, the first user interface preview image representing a first user interface for display on the second electronic device, wherein the first user interface is configured according to a first watch face type and comprises a clock and at least a first complication, wherein the first user interface preview image comprises representations of the first watch face type, the clock, and the at least first complication, and wherein the first user interface is selected based at least in part on one or more criterion selected from the group consisting of: the first user interface is configured according to a watch face type not currently represented in a user interface in the library; the first user interface has a first complication not currently represented in a user interface in the library; and the first user interface has a first complication associated with an application for use on the second electronic device that corresponds with an application installed in the memory of the first electronic device.

In some embodiments, a transitory computer-readable storage medium comprises one or more programs for execution by one or more processors of a first electronic device with a display, the one or more processors, and memory, wherein the first electronic device is coupled via wireless communication to a second electronic device with a display, one or more processors, memory, and access to a library of one or more user interfaces for display on the second electronic device, the one or more programs including instructions which, when executed by the one or more processors of the first electronic device, cause the first electronic device to: display on the display of the first electronic device a first user interface screen comprising a first user interface preview image, the first user interface preview image representing a first user interface for display on the second electronic device, wherein the first user interface is configured according to a first watch face type and comprises a clock and at least a first complication, wherein the first user interface preview image comprises representations of the first watch face type, the clock, and the at least first complication, and wherein the first user interface is not already in the library of user interfaces for display on the second electronic device; detect a first contact at the displayed first user interface preview image; in response to detecting the first contact: cease to display the first user interface screen; and display on the display of the first electronic device a second user interface screen comprising: the first user interface preview image; a list of one or more complications of the first user interface, wherein the list comprises at least the first complication; a selection affordance for selecting the first user interface; and a second user interface preview image, wherein the second user interface preview image represents a second user interface, wherein the second user interface is configured according to a second watch face type and comprises a clock and the first complication, and wherein the second watch face type is different from the first watch face type; detect a second contact at the selection affordance; and in response to detecting the second contact: send instructions to the second electronic device for displaying the first user interface on the display of the second electronic device.

In some embodiments, a transitory computer-readable storage medium comprises one or more programs for execution by one or more processors of a first electronic device with a display, the one or more processors, and memory, wherein the first electronic device is coupled via wireless communication to a second electronic device with a display, one or more processors, and memory, wherein a library of two or more user interfaces for display on the second electronic device is stored in the memory of the second electronic device, the one or more programs including instructions which, when executed by the one or more processors of the first electronic device, cause the first electronic device to: display on the display of the first electronic device a first user interface screen comprising at least a first and a second user interface preview image, the first and the second user interface preview images representing a first and a second user interface for display on the second electronic device, wherein the first and the second user interfaces are configured according to a watch face type and comprise a clock, and wherein the first and the second user interfaces are part of the stored library of user interfaces for display on the second electronic device; receive a first user input corresponding to a user request to reorder the stored library of user interfaces; in response to receiving the first user input: cease to display the first user interface screen; and display a second user interface screen, wherein the second user interface screen comprises the first and the second user interface preview images, and wherein the relative positions of the first and the second user interface preview images on the second user interface screen reflect an order of the first and the second user interfaces in the stored library; receive a second user input corresponding to a user request to re-order the second user interface before the first user interface in the stored library; and in response to receiving the second user input: send instructions to the second electronic device for re-ordering the second user interface before the first user interface in the stored library.

In some embodiments, a device comprises: a display; one or more processors; a memory; and one or more programs, wherein the device is coupled via wireless communication to a second device with a display, one or more processors, memory, and access to a library of one or more user interfaces for display on the second device, and wherein the one or more programs are stored in the memory of the device and configured to be executed by the one or more processors of the device, the one or more programs including instructions for: displaying on the display of the device a first user interface screen comprising at least a first user interface preview image, the first user interface preview image representing a first user interface for display on the second device, wherein the first user interface is configured according to a first watch face type and comprises a clock and at least a first complication, wherein the first user interface preview image comprises representations of the first watch face type, the clock, and the at least first complication, and wherein the first user interface is selected based at least in part on one or more criterion selected from the group consisting of: the first user interface is configured according to a watch face type not currently represented in a user interface in the library; the first user interface has a first complication not currently represented in a user interface in the library; and the first user interface has a first complication associated with an application for use on the second device that corresponds with an application installed in the memory of the device.

In some embodiments, a device comprises: a display; one or more processors; a memory; and one or more programs, wherein the device is coupled via wireless communication to a second device with a display, one or more processors, memory, and access to a library of one or more user interfaces for display on the second device, and wherein the one or more programs are stored in the memory of the device and configured to be executed by the one or more processors of the device, the one or more programs including instructions for: displaying on the display of the device a first user interface screen comprising a first user interface preview image, the first user interface preview image representing a first user interface for display on the second device, wherein the first user interface is configured according to a first watch face type and comprises a clock and at least a first complication, wherein the first user interface preview image comprises representations of the first watch face type, the clock, and the at least first complication, and wherein the first user interface is not already in the library of user interfaces for display on the second device; detecting a first contact at the displayed first user interface preview image; in response to detecting the first contact: ceasing to display the first user interface screen; and displaying on the display of the first electronic device a second user interface screen comprising: the first user interface preview image; a list of one or more complications of the first user interface, wherein the list comprises at least the first complication; a selection affordance for selecting the first user interface; and a second user interface preview image, wherein the second user interface preview image represents a second user interface, wherein the second user interface is configured according to a second watch face type and comprises a clock and the first complication, and wherein the second watch face type is different from the first watch face type; detecting a second contact at the selection affordance; and in response to detecting the second contact: sending instructions to the second device for displaying the first user interface on the display of the second device.

In some embodiments, a device comprises: a display; one or more processors; a memory; and one or more programs, wherein the device is coupled via wireless communication to a second device with a display, one or more processors, and memory, wherein a library of two or more user interfaces for display on the second device is stored in the memory of the second device, and wherein the one or more programs are stored in the memory of the device and configured to be executed by the one or more processors of the device, the one or more programs including instructions for: displaying on the display of the device a first user interface screen comprising at least a first and a second user interface preview image, the first and the second user interface preview images representing a first and a second user interface for display on the second device, wherein the first and the second user interfaces are configured according to a watch face type and comprise a clock, and wherein the first and the second user interfaces are part of the stored library of user interfaces for display on the second device; receiving a first user input corresponding to a user request to reorder the stored library of user interfaces; in response to receiving the first user input: ceasing to display the first user interface screen; and displaying a second user interface screen, wherein the second user interface screen comprises the first and the second user interface preview images, and wherein the relative positions of the first and the second user interface preview images on the second user interface screen reflect an order of the first and the second user interfaces in the stored library; receiving a second user input corresponding to a user request to re-order the second user interface before the first user interface in the stored library; and in response to receiving the second user input: sending instructions to the second device for re-ordering the second user interface before the first user interface in the stored library.

In some embodiments, a device comprises: means for displaying on a display of the device a first user interface screen comprising at least a first user interface preview image, the first user interface preview image representing a first user interface for display on a second device coupled via wireless communication to the device, wherein the first user interface is configured according to a first watch face type and comprises a clock and at least a first complication, wherein the first user interface preview image comprises representations of the first watch face type, the clock, and the at least first complication, and wherein the first user interface is selected based at least in part on one or more criterion selected from the group consisting of: the first user interface is configured according to a watch face type not currently represented in a user interface in the library; the first user interface has a first complication not currently represented in a user interface in the library; and the first user interface has a first complication associated with an application for use on the second device that corresponds with an application installed in a memory of the device.

In some embodiments, a device comprises: means for displaying on a display of the device a first user interface screen comprising a first user interface preview image, the first user interface preview image representing a first user interface for display on a second device coupled via wireless communication to the device, wherein the first user interface is configured according to a first watch face type and comprises a clock and at least a first complication, wherein the first user interface preview image comprises representations of the first watch face type, the clock, and the at least first complication, and wherein the first user interface is not already in a library of user interfaces for display on the second device, the second device having access to the library; means for detecting a first contact at the displayed first user interface preview image; means responsive at least in part to detecting the first contact for ceasing to display the first user interface screen; means responsive at least in part to detecting the first contact for displaying on the display of the first electronic device a second user interface screen comprising: the first user interface preview image; a list of one or more complications of the first user interface, wherein the list comprises at least the first complication; a selection affordance for selecting the first user interface; and a second user interface preview image, wherein the second user interface preview image represents a second user interface, wherein the second user interface is configured according to a second watch face type and comprises a clock and the first complication, and wherein the second watch face type is different from the first watch face type; means for detecting a second contact at the selection affordance; and means responsive at least in part to detecting the second contact for sending instructions to the second electronic device for displaying the first user interface on the display of the second electronic device.

In some embodiments, a device comprises: means for displaying on a display of a first device a first user interface screen comprising at least a first and a second user interface preview image, the first and the second user interface preview images representing a first and a second user interface for display on a second device, wherein the device is coupled via wireless communication to the second device, wherein a library of two or more user interfaces for display on the second device is stored in the memory of the second device, wherein the first and the second user interfaces are configured according to a watch face type and comprise a clock, and wherein the first and the second user interfaces are part of the stored library of user interfaces for display on the second electronic device; means for receiving a first user input corresponding to a user request to reorder the stored library of user interfaces; means responsive at least in part to receiving the first user input for ceasing to display the first user interface screen; and means responsive at least in part to receiving the first user input for displaying a second user interface screen, wherein the second user interface screen comprises the first and the second user interface preview images, and wherein the relative positions of the first and the second user interface preview images on the second user interface screen reflect an order of the first and the second user interfaces in the stored library; means for receiving a second user input corresponding to a user request to re-order the second user interface before the first user interface in the stored library; and means responsive at least in part to receiving the second user input for sending instructions to the second device for re-ordering the second user interface before the first user interface in the stored library.

In some embodiments, an electronic device comprises: a display unit; a memory unit; a wireless communications unit, wherein the wireless communications unit couples via wireless communication the electronic device to a second electronic device with a second display unit, a second memory unit, a second processing unit, and an accessing unit configured to provide access to a library of one or more user interfaces for display on the second display unit of the second electronic device; and a processing unit coupled to the display unit, the memory unit, and the wireless communications unit of the electronic device, the processing unit comprising: a display enabling unit configured to enable display, on the display unit, of a first user interface screen comprising at least a first user interface preview image, the first user interface preview image representing a first user interface for display on the second display unit of the second electronic device, wherein the first user interface is configured according to a first watch face type and comprises a clock and at least a first complication, wherein the first user interface preview image comprises representations of the first watch face type, the clock, and the at least first complication, and wherein the first user interface is selected based at least in part on one or more criterion selected from the group consisting of: the first user interface is configured according to a watch face type not currently represented in a user interface in the library; the first user interface has a first complication not currently represented in a user interface in the library; and the first user interface has a first complication associated with an application for use on the second electronic device that corresponds with an application installed in the memory unit of the electronic device.

In some embodiments, an electronic device comprises: a display unit; a touch-sensitive surface unit; a wireless communications unit, wherein the wireless communications unit couples via wireless communication the electronic device to a second electronic device with a second display unit, a second memory unit, a second processing unit, and an accessing unit configured to provide access to a library of one or more user interfaces for display on the second display unit of the second electronic device; and a processing unit coupled to the display unit, the touch-sensitive surface unit, and the wireless communications unit of the electronic device, the processing unit comprising: a display enabling unit configured to enable display, on the display unit, of a first user interface screen comprising a first user interface preview image, the first user interface preview image representing a first user interface for display on the second display unit of the second electronic device, wherein the first user interface is configured according to a first watch face type and comprises a clock and at least a first complication, wherein the first user interface preview image comprises representations of the first watch face type, the clock, and the at least first complication, and wherein the first user interface is not already in the library of user interfaces for display on the second display unit of the second electronic device; a detecting unit configured to detect a first contact on the touch-sensitive surface unit at the displayed first user interface preview image; wherein the display enabling unit is further configured to, in response to detecting the first contact, enable ceasing of the display, on the display unit, of the first user interface screen; wherein the display enabling unit is further configured to, in response to detecting the first contact, enable display, on the display unit, of a second user interface screen comprising: the first user interface preview image; a list of one or more complications of the first user interface, wherein the list comprises at least the first complication; a selection affordance for selecting the first user interface; and a second user interface preview image, wherein the second user interface preview image represents a second user interface, wherein the second user interface is configured according to a second watch face type and comprises a clock and the first complication, and wherein the second watch face type is different from the first watch face type; wherein the detecting unit is further configured to detect a second contact on the touch-sensitive surface unit at the selection affordance; and a sending unit configured to send, via the wireless communications unit and in response to detecting the second contact, instructions to the second electronic device for displaying the first user interface on the second display unit of the second electronic device.

In some embodiments, an electronic device comprises: a display unit; a touch-sensitive surface unit; a wireless communications unit, wherein the wireless communications unit couples via wireless communication the electronic device to a second electronic device with a second display unit, a second memory unit, and a second processing unit, wherein a library of one or more user interfaces for display on the second display unit of the second electronic device is stored in the second memory unit; and a processing unit coupled to the display unit, the touch-sensitive surface unit, and the wireless communications unit of the electronic device, the processing unit comprising: a display enabling unit configured to enable display, on the display unit, of a first user interface screen comprising at least a first and a second user interface preview image, the first and the second user interface preview images representing a first and a second user interface for display on the second display unit of the second electronic device, wherein the first and the second user interfaces are configured according to a watch face type and comprise a clock, and wherein the first and the second user interfaces are part of the stored library of user interfaces for display on the second display unit of the second electronic device; a receiving unit configured to receive a first user input corresponding to a user request to reorder the stored library of user interfaces; wherein the display enabling unit is further configured to enable ceasing of the display, on the display unit, of the first user interface screen in response to receiving the first user input; wherein the display enabling unit is further configured to enable display, on the display unit, of a second user interface screen in response to receiving the first user input, wherein the second user interface screen comprises the first and the second user interface preview images, and wherein the relative positions of the first and the second user interface preview images on the second user interface screen reflect an order of the first and the second user interfaces in the stored library; wherein the receiving unit is further configured to receive a second user input corresponding to a user request to re-order the second user interface before the first user interface in the stored library; and a sending unit configured to send, via the wireless communications unit and in response to receiving the second user input, instructions to the second electronic device for re-ordering the second user interface before the first user interface in the stored library.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for configuring context-specific user interfaces, thereby increasing the effectiveness, efficiency, and user satisfaction with such devices. Such methods and interfaces may complement or replace other methods for managing and/or providing context-specific user interfaces.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 20A-20I illustrate a flow diagram depicting a process for configuring context-specific user interfaces.

FIGS. 21A-21D illustrate a flow diagram depicting a process for configuring context-specific user interfaces.

FIGS. 22A-22F illustrate a flow diagram depicting a process for configuring context-specific user interfaces.

DESCRIPTION OF EMBODIMENTS

Figure 1A:
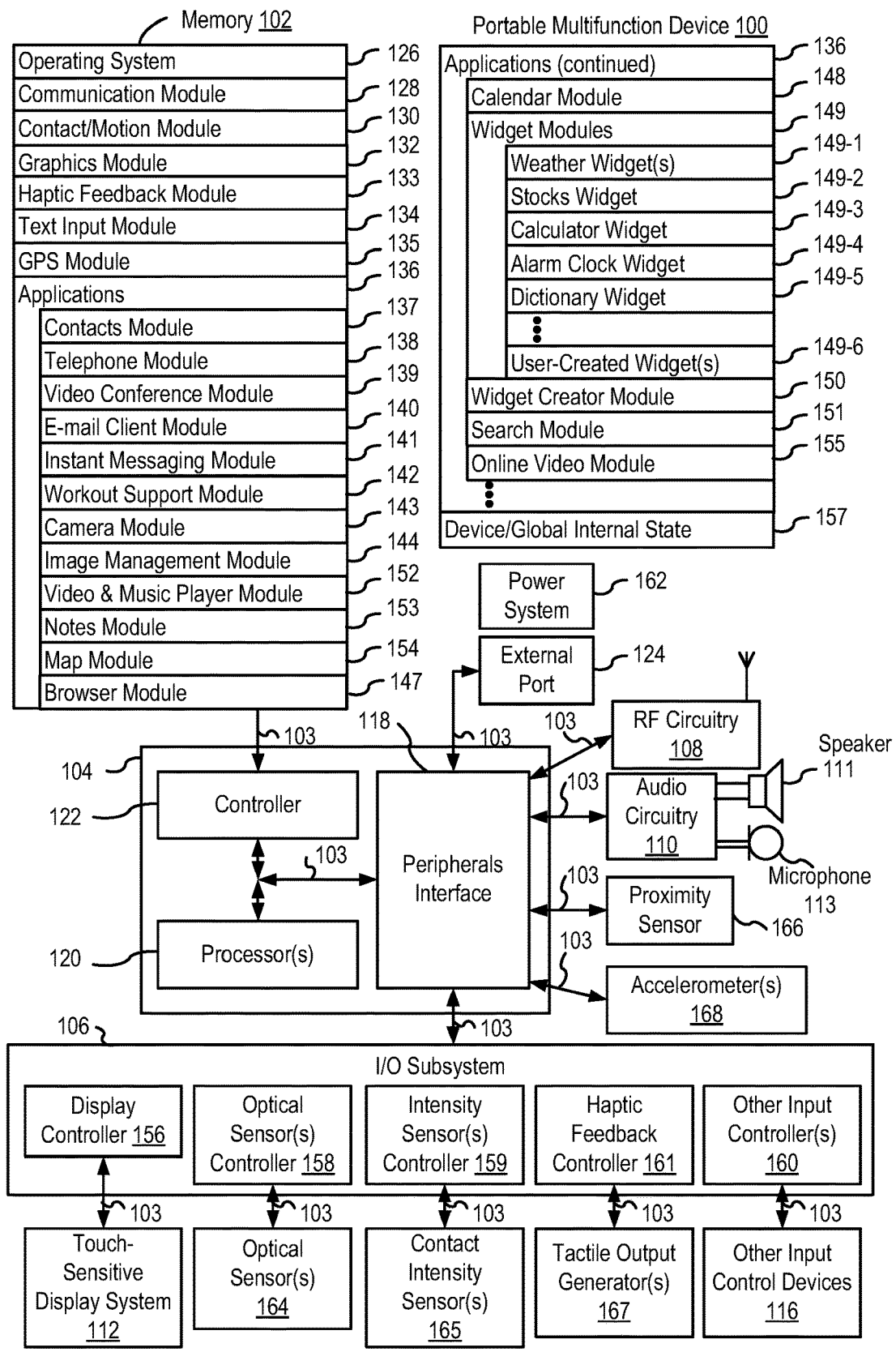
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for providing context-specific user interfaces, e.g., that display the time along with additional information. This is particularly true for portable multifunction devices with reduced-size displays. Providing techniques for configuring context-specific user interfaces for use on such devices at another device conserves display time, processor resources, and battery life for the portable multifunction devices themselves, which are important considerations for these smaller devices. If the other electronic device is a device with a larger display than the reduced-size portable multifunction device, allowing the user to configure a context-specific user interface for use on the smaller device at the larger device allows for larger display sizes, additional input mechanisms, and conserves battery life and processor usage at the smaller device. Such techniques can also reduce the cognitive burden on a user who accesses such interfaces, thereby enhancing productivity.

Below, FIGS. 1A-1B, 2, 3, 4A-4B, and 5A-5B provide a description of exemplary devices for performing the techniques for configuring context-specific user interfaces. FIGS. 6A-19 illustrate exemplary user interfaces for configuring context-specific user interfaces. The user interfaces in the figures are also used to illustrate the processes described below, including the processes in FIGS. 20A-22F.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system."

Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
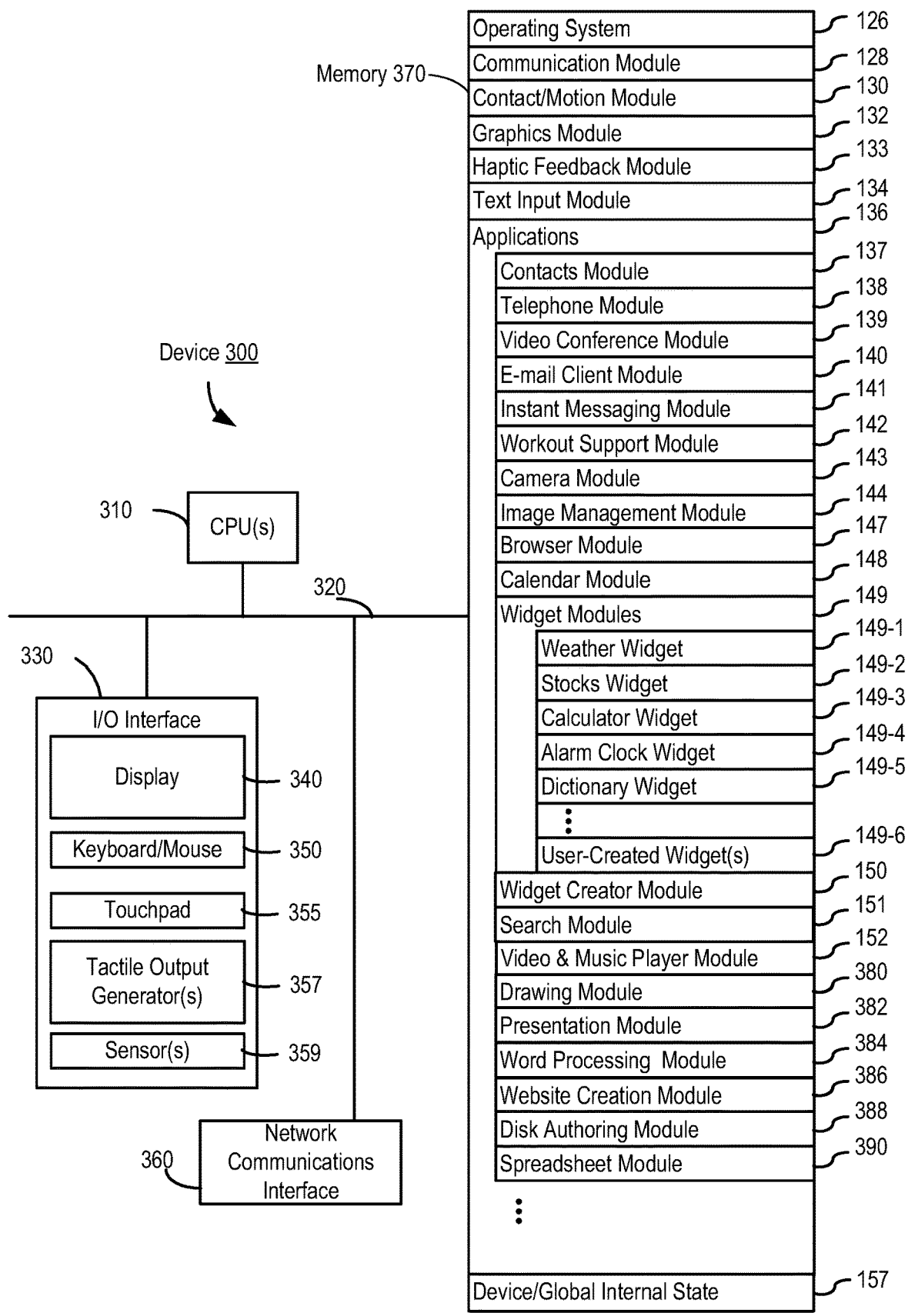
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module;
  Notes module 153;
  Map module 154; and/or
  Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
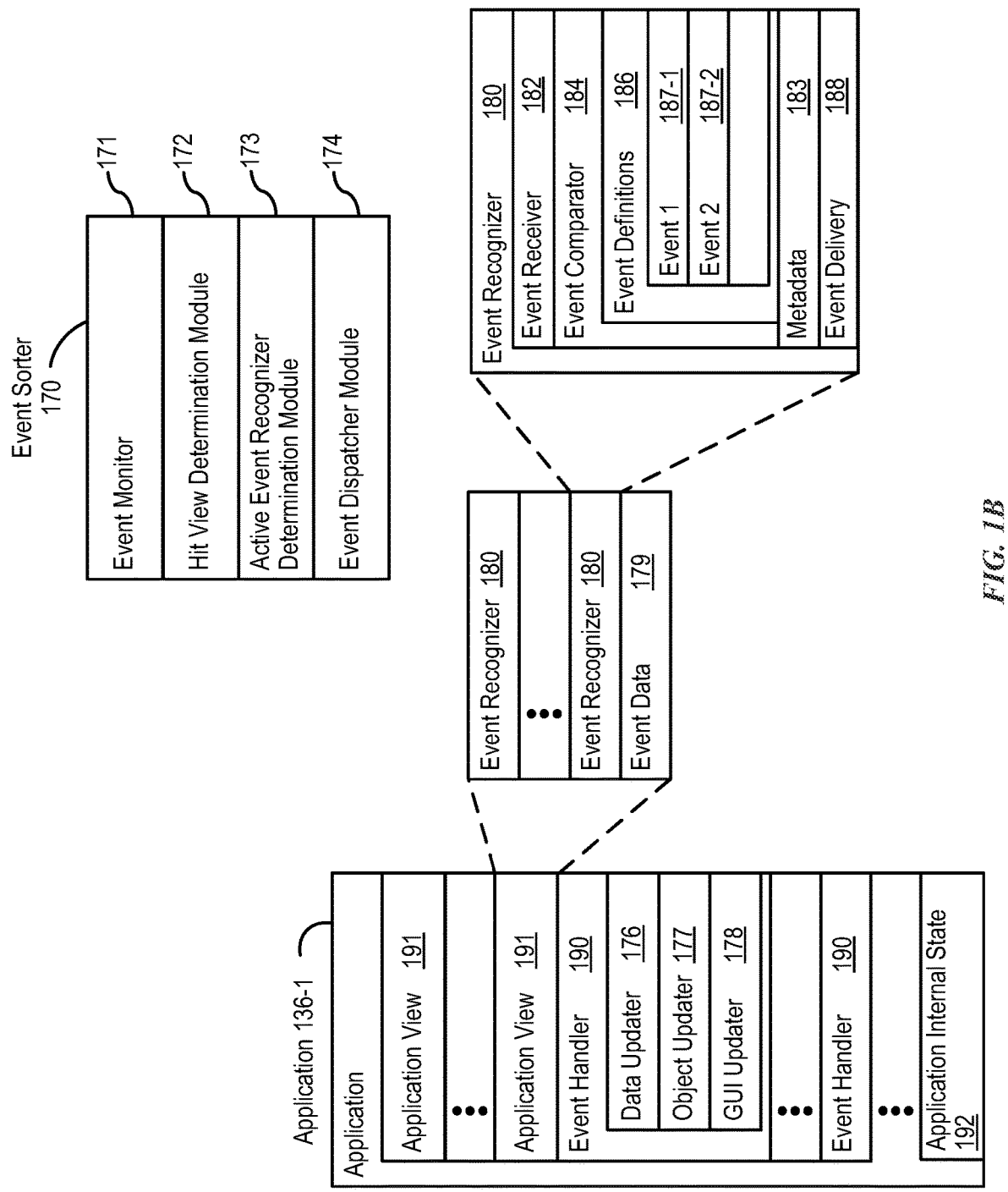
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
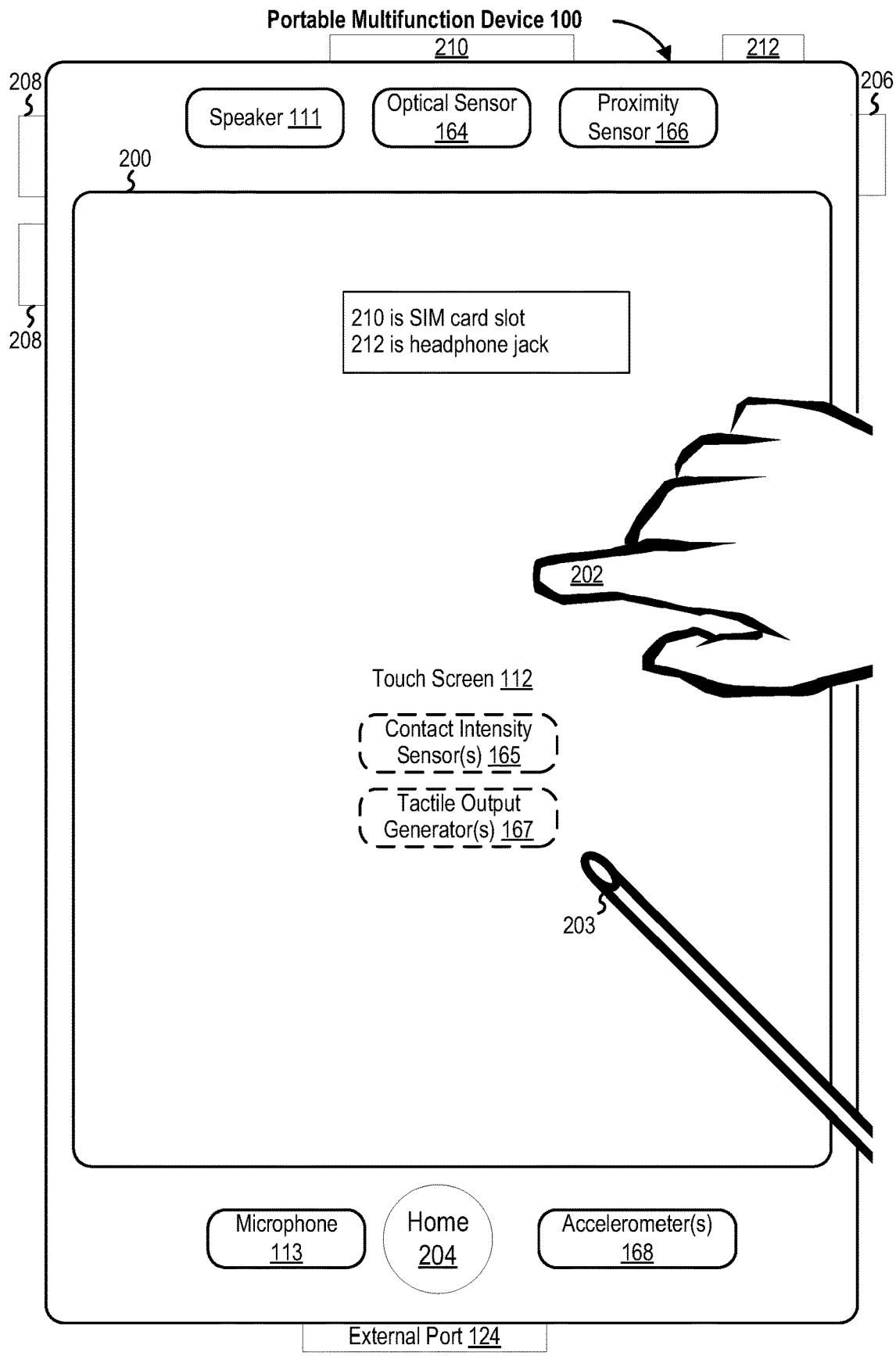
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
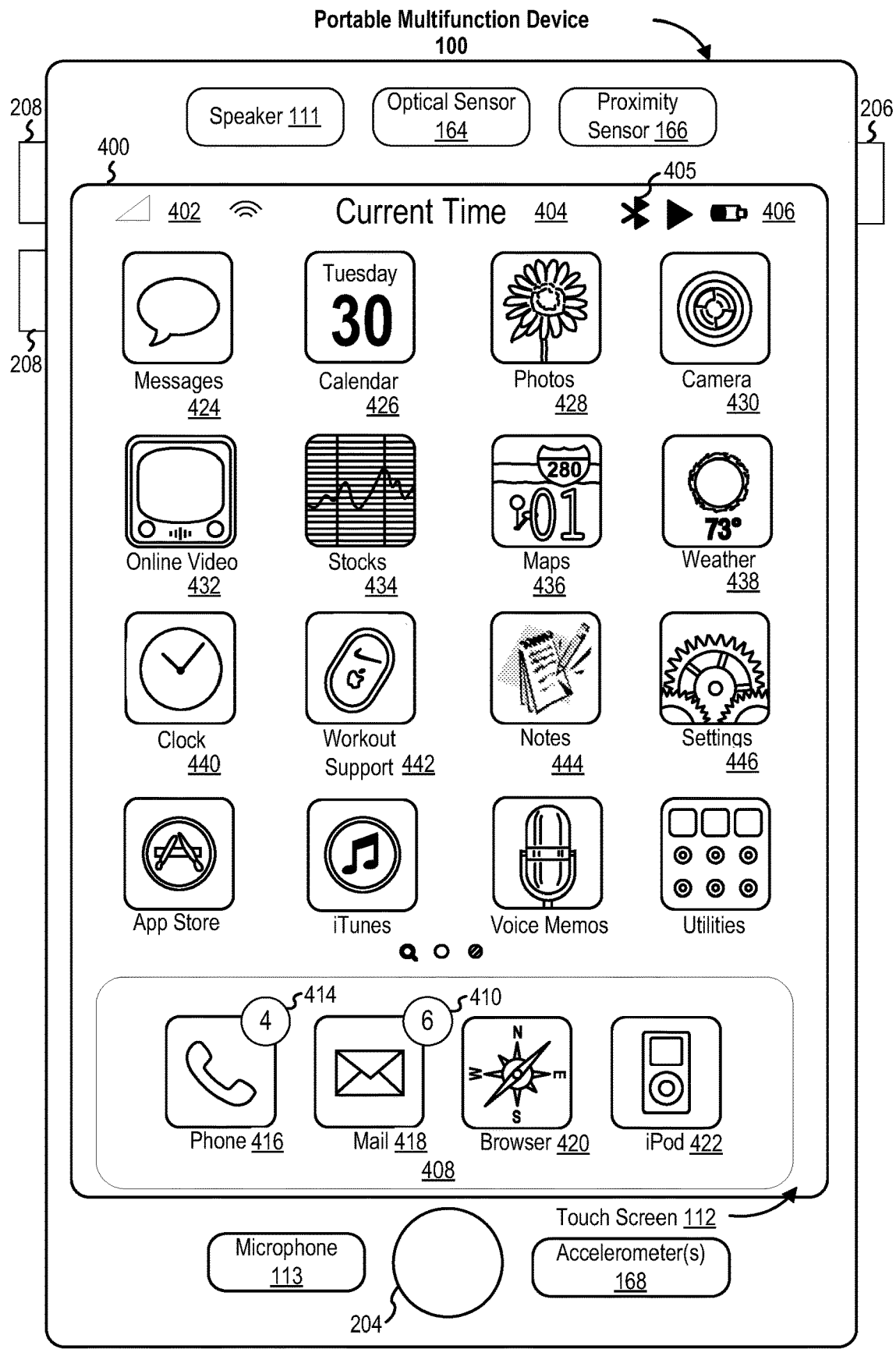
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
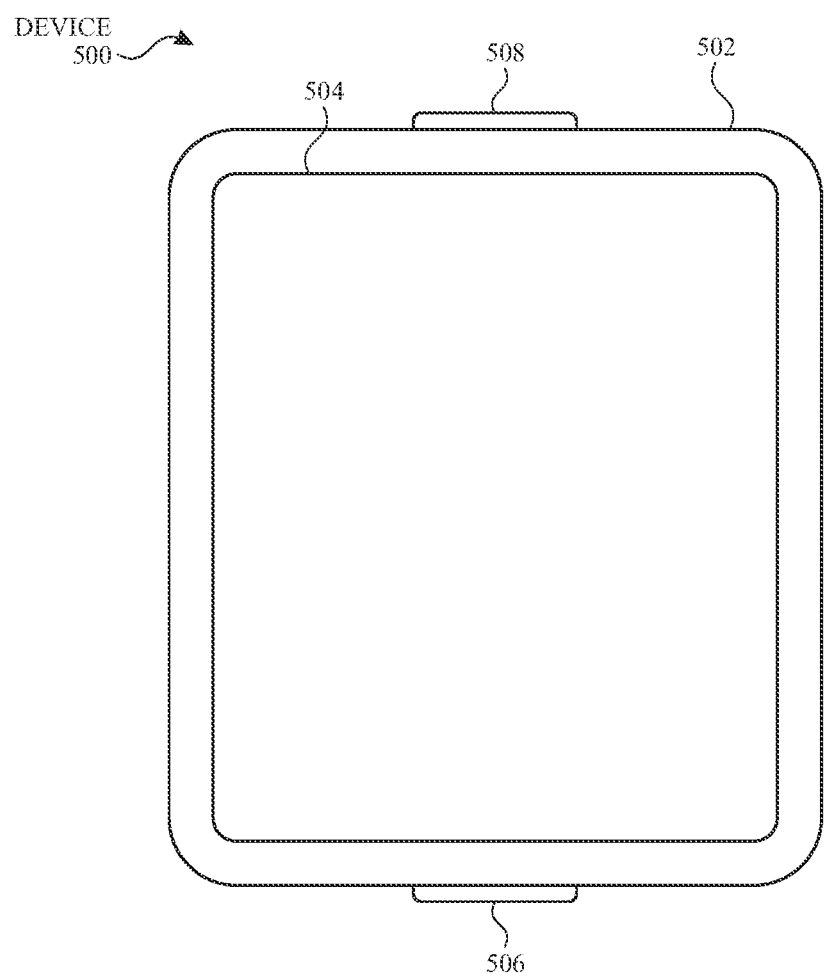
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
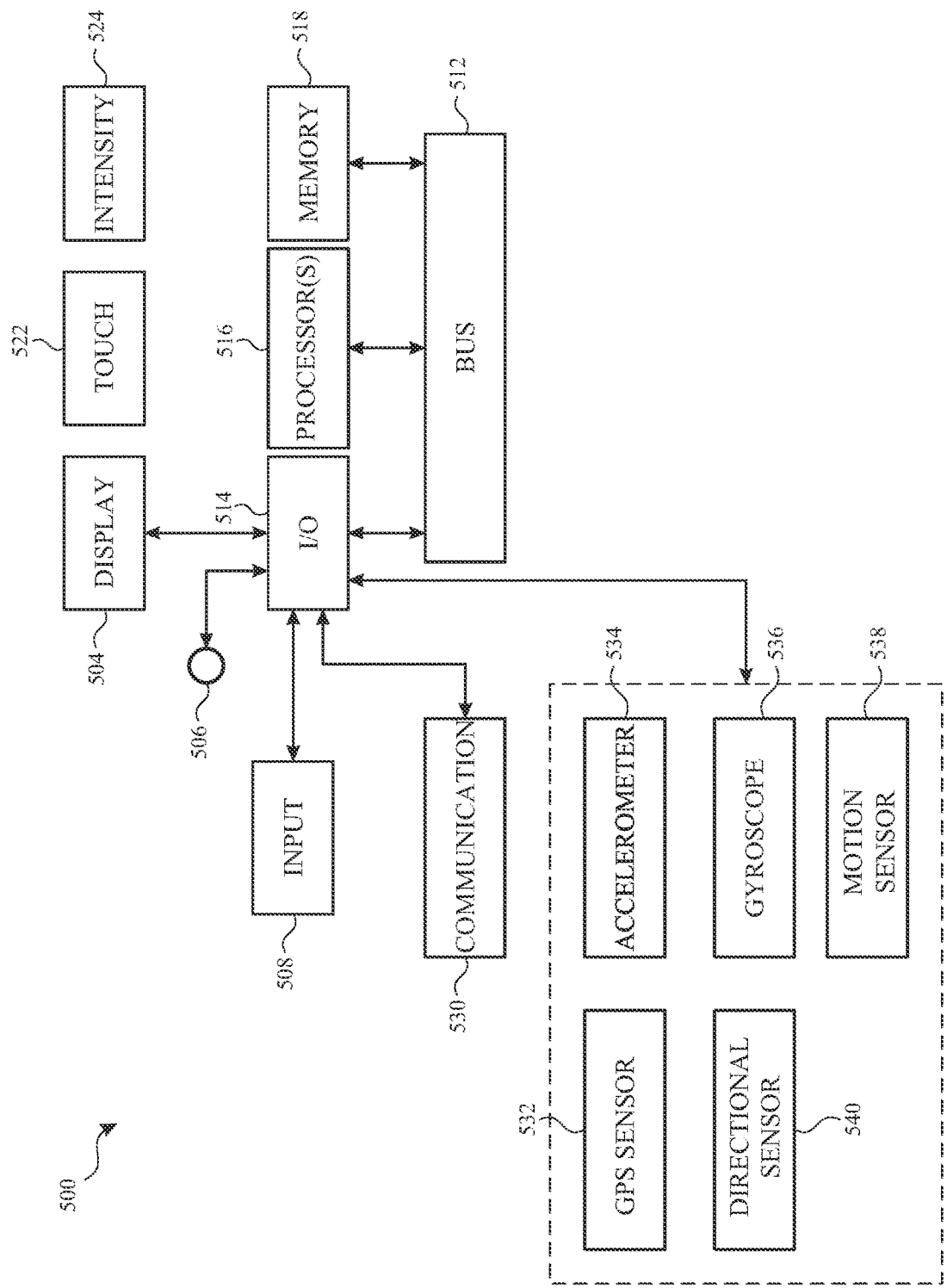
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including the processes in FIGS. 20A-22F. A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1, 3, and 5). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of configuring context-specific user interfaces and associated processes that may be implemented on a multifunction device with a display and a touch-sensitive surface, such as devices 100, 300, and/or 500 (FIGS. 1A, 3A, and/or 5A).

The following examples illustrate exemplary embodiments of context-specific user interfaces. Described herein are overall concepts related to customizable context-specific user interfaces. It is noted that the context-specific user interfaces described herein are editable in a number of ways. A user interface may display or otherwise indicate various types of information related to time, and the type(s) of information may be customizable by the user. A user interface may include aspects such as colors, density of display, and complications (or lack of complications) that are also customizable. As used here, consistent with its accepted meaning in art, a complication refers to any clock face feature other than those used to indicate the hours and minutes of a time (e.g., clock hands or hour/minute indications). Complications may provide different types of information to a user, such as data obtained from an application, and the information conveyed to a user by a complication is also customizable, as described below. In some embodiments, a complication may also serve as an affordance for launching an application.

While FIGS. 6A-10 display particular context-specific user interfaces configured according to particular watch face types, these examples are not intended to limit the scope of the present disclosure. Additional descriptions of context-specific user interfaces, as well as features thereof and techniques related thereto, suitable for use in the techniques described herein may be found in International Patent Application Serial No. PCT/US2015/034604, titled "Context-Specific User Interfaces," filed Jun. 7, 2015, published as WIPO Publication No. WO/2016/022203; International Patent Application Serial No. PCT/US2015/034606, titled "Context-Specific User Interfaces," filed Jun. 7, 2015, published as WIPO Publication No. WO/2016/022204; and International Patent Application Serial No. PCT/US2015/034607, titled "Context-Specific User Interfaces," filed Jun. 7, 2015, published as WIPO Publication No. WO/2016/022205; each of which is incorporated by reference herein in its entirety.

These combinatorial features result in many thousands, if not more, of available context-specific user interfaces. Since describing each of these permutations is not practical, particular aspects are highlighted with particular context-specific user interfaces, but these exemplary descriptions are in no way intended to limit such aspects to such context-specific user interfaces, as specific aspects may be used in other context-specific user interfaces, and specific context-specific user interfaces may have other aspects. These embodiments are meant to illustrate the overall concepts presented, but a skilled artisan will recognize that numerous other embodiments are possible within the scope of the techniques described herein.

Figure 6A:
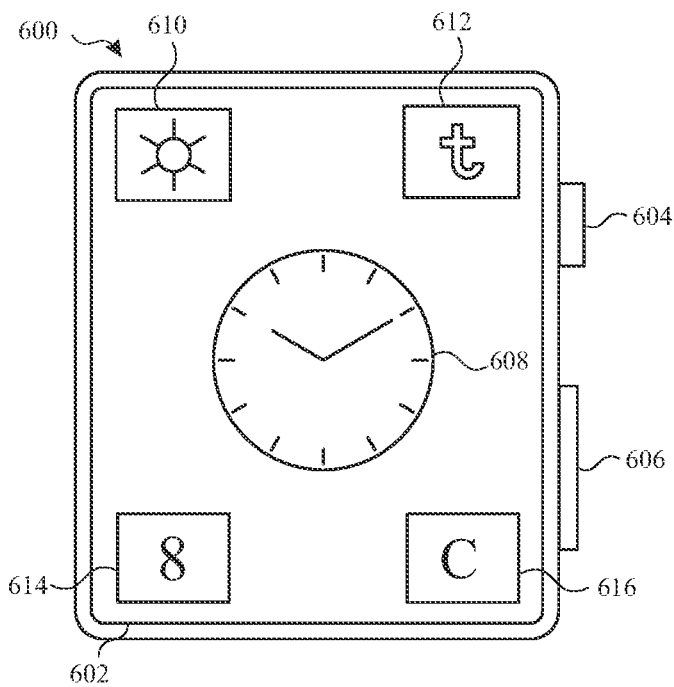
FIGS. 6A and 6B illustrate exemplary context-specific user interfaces.
Figure 6B:
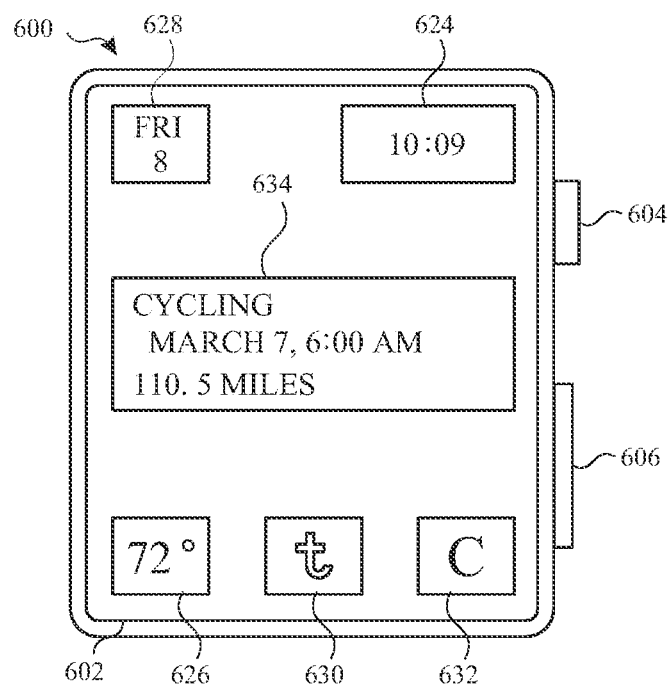

FIGS. 6A & 6B show exemplary context-specific user interfaces that may be operated on device 600. Device 600 may be device 100, 300, or 500 in some embodiments. The electronic device has a display 602 (e.g., 504). In some embodiments, device 600 includes rotatable input mechanism 604 (e.g., 506) and/or input mechanism or button 606 (e.g., 508).

In FIG. 6A, device 600 displays a context-specific user interface on display 602. This exemplary context-specific user interface includes analog clock 608. Clock 608 may optionally include a variety of features or aspects that are independently editable or configurable by the user. For example, the user may independently configure an appearance and/or number of indications of hours or minutes, a color (e.g., a color of the seconds hand), and so on. In some embodiments, a complication may be displayed within clock 608 (e.g., a complication that displays data obtained from a calendar application, such as the current date, or a complication that displays a monogram or other customizable text and/or image(s)).

In addition, the context-specific user interface also includes four complications, 610, 612, 614, and 616, which are displayed as associated with clock 608. In some embodiments, one or more of these complications may obtain data and display information from an application. In some embodiments, the displayed information may be updated, e.g., in accordance with updates to data obtained from the application. For example, complication 610 obtains data and displays information from a weather application (e.g., data identifying a sunny weather condition). Similarly, complication 614 obtains data and displays information from a calendar application (e.g., data identifying the date). Complication 612 obtains data and displays information from a social networking application (e.g., a logo or other data obtained from the social networking application, such as a text element), and complication 616 obtains data and displays information from a fitness application for cycling (e.g., a logo or other data obtained from the cycling application, such as fitness data, or a previous or future scheduled ride or workout).

FIG. 6B illustrates another exemplary context-specific user interface displayed on display 602 of device 600. This screen includes digital clock 624. It also includes five complications: 626, 628, 630, 632, and 634. Like complication 610, complication 626 obtains data and displays information from a weather application (e.g., data identifying a temperature). Similarly, complication 628 obtains data and displays information from a calendar application (e.g., data identifying the day of the week and date). Complication 630 obtains data and displays information from a social networking application (e.g., a logo or other data obtained from the social networking application, such as a text element), and complication 632 obtains data and displays information from a fitness application for cycling (e.g., a logo or other data obtained from the cycling application, such as fitness data, or a previous or future scheduled ride or workout). Complication 634 also obtains data and displays information from a fitness application for cycling, but, compared to 632, 634 displays a different set of information (e.g., a different type and/or amount of content) from the fitness application, including a name of the application and a time, date, and length of a previous cycling workout.

The context-specific user interfaces illustrated in FIGS. 6A & 6B include a clock, such as analog clock 608 or digital clock 624. They also include one or more complications (e.g., 610, 612, 614, and 616 in FIG. 6A or 626, 628, 630, 632, and 634 in FIG. 6B). In addition, each of these context-specific user interfaces is configured according to a watch face type. For example, the watch face type illustrated in FIG. 6A includes an analog clock and four slots or platters that may be configured by the user to display a complication (e.g., as an affordance representing an application, which in some embodiments may be independently selected by the user). In some embodiments, one or more of these slots or platters may be configured by the user not to display a complication (e.g., to display a blank area or the same content as the background of the user interface). Similarly, the watch face type illustrated in FIG. 6B includes a digital clock and five slots or platters that may be configured by the user to display a complication (e.g., as an affordance representing an application, which in some embodiments may be independently selected by the user). In some embodiments, one or more of these slots or platters may be configured by the user not to display a complication (e.g., to display a blank area or the same content as the background of the user interface). In FIG. 6B, the watch face type includes two different types of complication slots or platters: those illustrated by 626, 628, 630, and 632 (e.g., smaller slots that display a first set, type, or amount of application information), and that illustrated by 634 (e.g., a larger slot that displays a second set, type, or amount of application information). As illustrated in FIG. 6B, a complication representing an application may display a different type or amount of information from the application depending upon whether it is displayed in a small or large complication slot or platter.

Figure 7A:
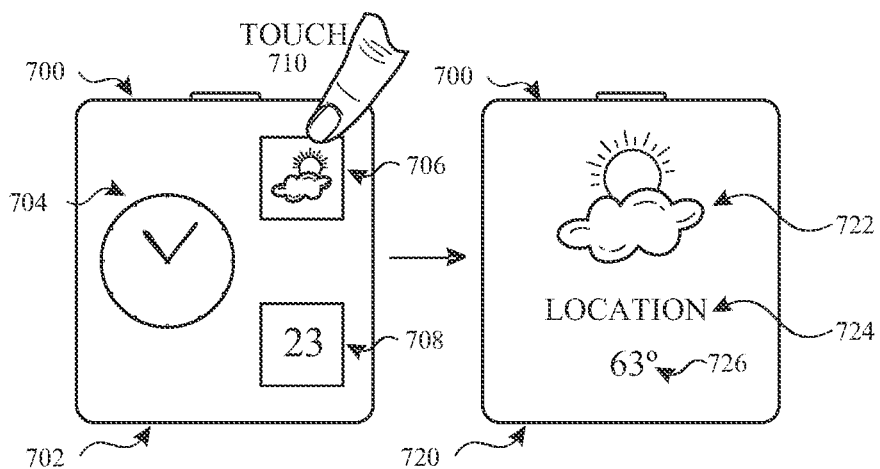
FIGS. 7A-7C illustrate exemplary context-specific user interfaces.

Turning now to FIG. 7A, any or all of the context-specific user interfaces described herein may include one or more complications. One type of complication a user may wish to use is a complication for launching an application. For example, the complication may be an affordance representing an application that displays a set of information from the corresponding application. However, a user may wish to view additional information from the application, or launch the full application itself.

FIG. 7A shows exemplary context-specific user interfaces that may be operated on device 700. Device 700 may be device 100, 300, or 500 in some embodiments. In some embodiments, the electronic device has a touch-sensitive display (e.g., touchscreen 504).

Device 700 displays user interface screen 702. Screen 702 includes clock face 704 and affordances 706 and 708, which are displayed as complications. Affordances 706 and 708 represent applications and include a set of information obtained from the corresponding application. In this example, affordance 706 represents a weather application and displays weather conditions obtained from the weather application. Affordance 708 represents a calendar application and displays the current date obtained from the calendar application. Affordance 706 and affordance 708 are updated in accordance with data from the corresponding application. For example, affordance 706 is updated to display current weather conditions obtained from the weather application. Affordance 708 is updated to display the current date obtained from the calendar application. For example, these complications may be application widgets updated based on application data.

To launch the weather application, a user contacts the display at affordance 706 (e.g., touch 710). In response, device 700 launches the weather application, which is depicted on screen 720, and ceases to display screen 702. Screen 720 shows further weather information, including current weather conditions (e.g., user interface object 722), an indication of the current location (e.g., user interface object 724), and an indication of the current temperature (e.g., user interface object 726).

Figure 7B:
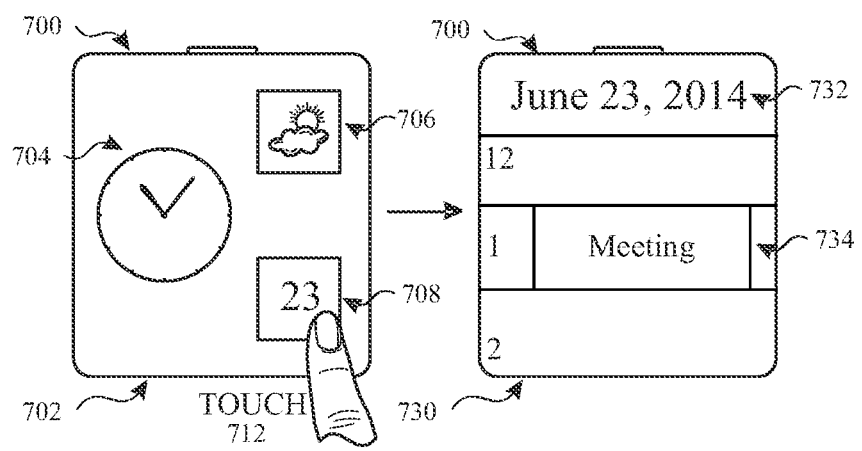

FIG. 7B also depicts device 700 displaying screen 702. As depicted in FIG. 7A, screen 702 includes clock face 704 and affordances 706 and 708, which are displayed as complications.

If a user wishes to launch the calendar application instead of the weather application, the user contacts the display at affordance 708 (e.g., touch 712). In response, device 700 launches the calendar application, which is depicted on screen 730, and ceases to display screen 702. Screen 730 shows further calendar information, including user interface object 732, which depicts the full date, and user interface object 734, which represents a calendar event (in this case, a meeting at 1).

In some embodiments, a user interface screen may display a complication that represents an application and includes a set of information obtained from the corresponding application. In some embodiments, as illustrated by FIGS. 7A and 7B, a user interface screen may display a plurality of complications that represent applications and include sets of information obtained from a plurality of applications, or a plurality of sets of information obtained from a single application.

In some embodiments, as described above, a user may move a rotatable input mechanism (e.g., 604 or 506) to scroll a displayed indication of time forward or backward. In some embodiments, the device may display two or more indications of time, and in response to detecting a movement of the rotatable input mechanism, the device may update one or more of the displayed indications of time and keep another indication of time constant. To illustrate using screen 702 in FIGS. 7A and B as an example, if affordance 708 represents an indication of current time (e.g., a digital display), the device may update the displayed clock face in response to detecting the movement of the rotatable input mechanism while continuing to display the current time with affordance 708. The displayed clock face may be updated, for example, by animating a clockwise or counter-clockwise movement of one or more clock hands, depending on whether the displayed time is scrolled forward or backward.

In some embodiments, the device updates other displayed complications (e.g., those that do not indicate a time per se) in response to detecting the movement of the rotatable input mechanism. For example, in addition to updating the time displayed by clock face 704, the device also updates the forecasted or historical weather condition displayed by affordance 706 to correspond with the time indicated by clock face 704. In these embodiments, the device can forego updating another displayed complication in response to scrolling the displayed time. For example, a displayed stopwatch complication may remain the same while the displayed clock face is updated. In some embodiments, a displayed complication that is not updated in response to detecting the movement of the rotatable input mechanism is visually distinguished, such as by changing a hue, saturation, and/or lightness of the displayed complication. This allows the user to distinguish which complications are updated and which remain constant.

Advantageously, these context-specific user interface methods, which may be applied to any of the context-user interfaces described herein simply by including an application complication, allow the user to view updated information from a particular application while also presenting a quick way to launch the corresponding application in the same user interface object. Moreover, the application and/or application information depicted by the complication may further be customized using the editing methods described in reference to FIG. 10 (see, e.g., screen 1060 and 1070).

A user may navigate screens on, e.g., a portable multifunction device, that include many affordances. These affordances may represent, for example, applications that may be launched on the device. One such affordance may activate a context-specific user interface, such as those described herein. In order to help the user recognize that a particular affordance corresponds to launching a context-specific user interface, an animation that visually connects the affordance to the interface may be desirable.

Figure 7C:
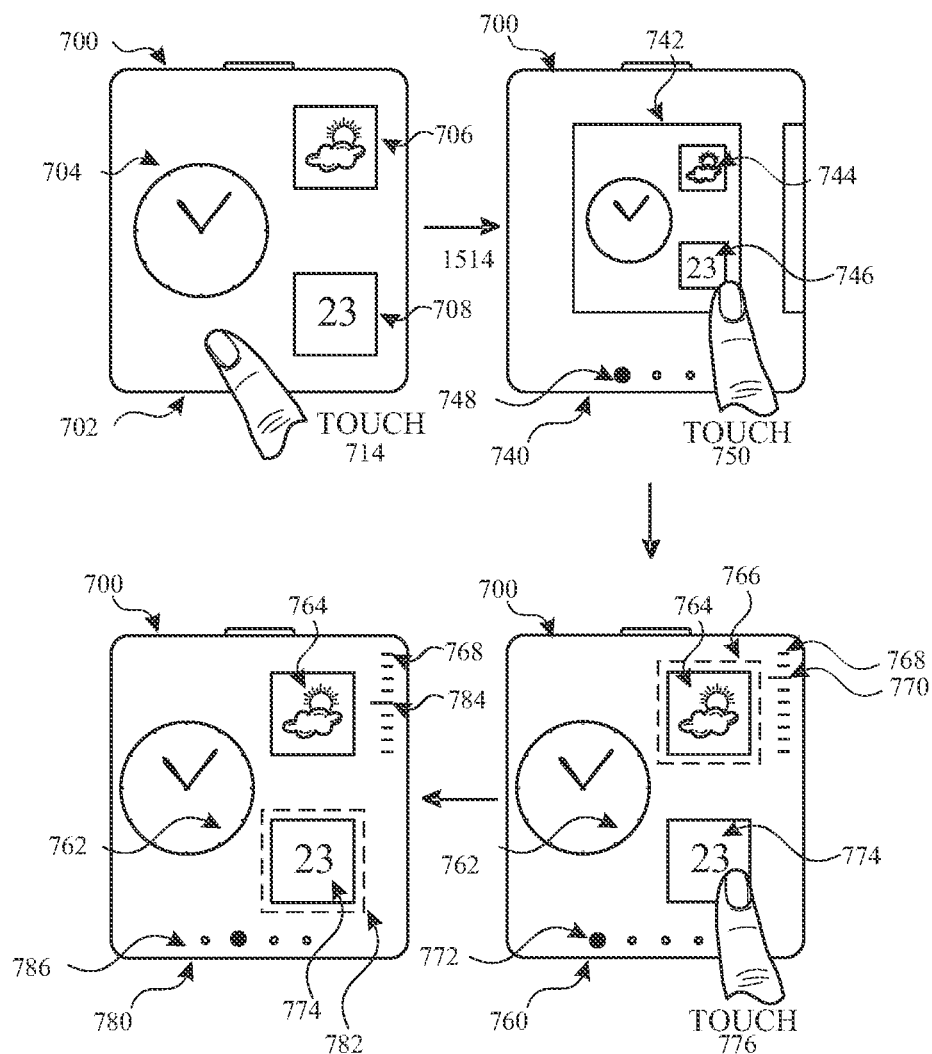

FIG. 7C shows an exemplary user interface for editing a clock face that includes more than one complication, such as the ones depicted in FIGS. 7A and 7B. FIG. 7C again depicts device 700 displaying screen 702, which includes clock face 704, affordance 706 representing a weather application, and affordance 708 representing a calendar application.

Figure 10:
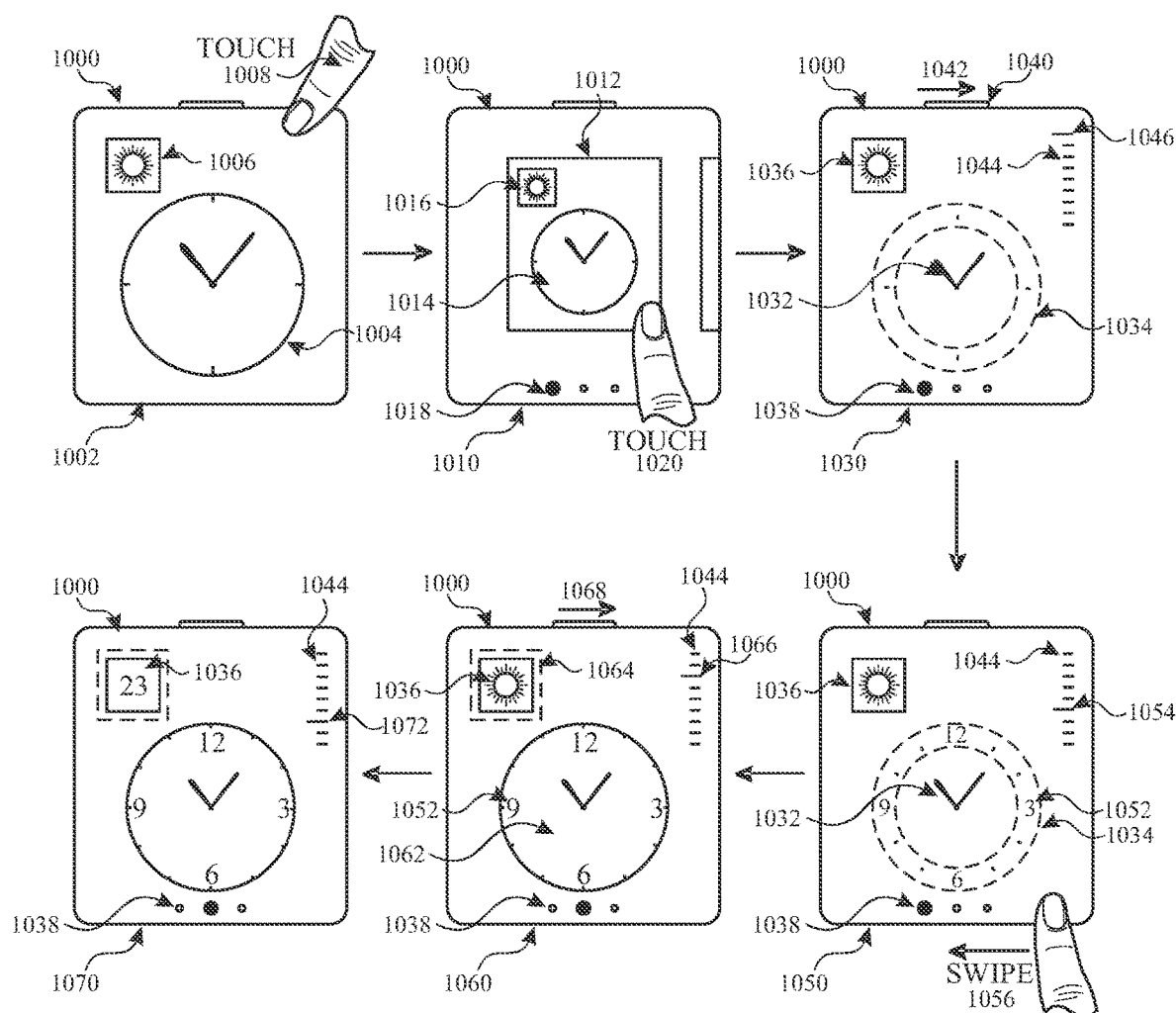
FIG. 10 illustrates exemplary context-specific user interfaces.

As discussed herein in reference to FIG. 10, a user customizes the complications displayed on screen 702 by entering clock face edit mode. The user contacts the touch-sensitive display of device 700 with touch 714. Touch 714 has a characteristic intensity above an intensity threshold, which prompts device 700 to enter a clock face edit mode, shown on screen 740. Device 700 indicates that the user has entered clock face edit mode by visually distinguishing the clock face. In this example, screen 740 shows a smaller version of the display of screen 702 (e.g., 742), which includes a reduced size clock face, reduced size complication 744, which is based on complication 706, and reduced size complication 746, which is based on complication 708.

A user selects this clock face for editing by contacting displayed clock face 742 (e.g., touch 750). In some embodiments, touch 750 is a contact on the touch-sensitive display. In some embodiments, touch 750 is a contact on the touch-sensitive display with a characteristic intensity above an intensity threshold. This causes device 700 to enter into clock face edit mode and display screen 760. Screen 760 displays clock face 762 for editing. Currently, affordance 764 representing the weather application is selected for editing, as highlighted by outline 766. Also displayed is positional indicator 768, which indicates the position of the displayed complication in a series of complication options using line 770. Positional indicator 768 further indicates to the user that a rotatable input mechanism may be used to cycle through options available for editing affordance 764 (e.g., which set of information from the weather application to display, or another application from which a set of information may be displayed). Paging affordance 772 also displays the position of the aspect of clock face 762 currently selected for editing (i.e., complication 764) in a series of editable aspects.

Screen 760 also displays affordance 774, which represents the calendar application. To select this complication for editing, the user contacts displayed affordance 774 (e.g., touch 776). In response, device 700 displays screen 780. Like screen 760, screen 780 displays clock face 762, affordance 764 (which represents the weather application), positional indicator 768, and affordance 774 (which represents the weather application). Affordance 774 is now highlighted for editing, as shown by outline 782. The position of this complication option is depicted by line 784 in positional indicator 768. Finally, paging affordance 786 has been updated to display the position of affordance complication 774 in a series of editable aspects of clock face 762. The user may now edit the set of information displayed by affordance 774 using the rotatable input mechanism (e.g., which set of information from the calendar application to display, or another application from which a set of information may be displayed). In summary, while in clock face edit mode, a user may select a complication for editing when more than one complication is displayed by contacting the displayed complication. In some embodiments, this causes the affordance to be highlighted (e.g., by a visible outline or other means for visibly distinguishing the affordance described herein).

Figure 8A:
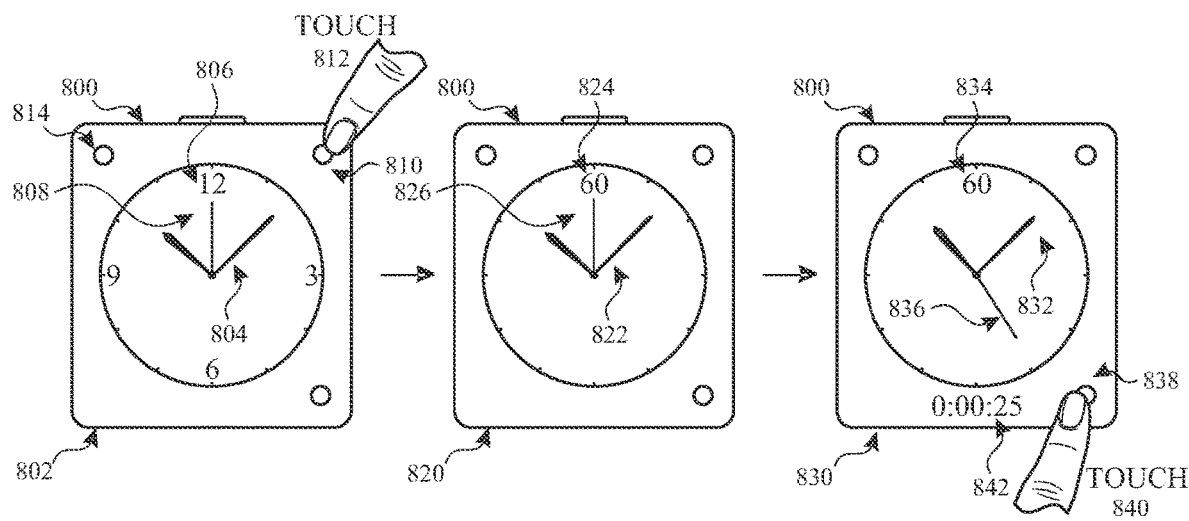
FIGS. 8A and 8B illustrate exemplary context-specific user interfaces.
Figure 8B:
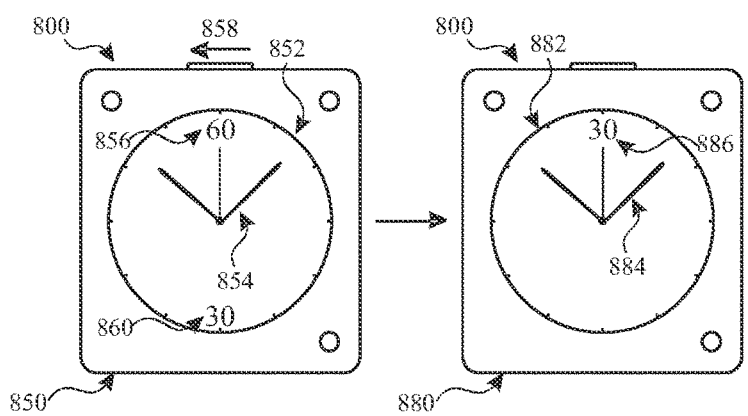

FIGS. 8A & 8B illustrate a different context-specific user interface configured according to a different watch face type. FIG. 8A shows exemplary context-specific user interfaces that may be operated on device 800. Device 800 may be device 100, 300, or 500 in some embodiments. The electronic device has a touch-sensitive display (e.g., touchscreen 504).

A user may wish to keep track of the time of day while also accessing a stopwatch function. For example, in contexts such as running or cycling, a user may wish to operate a stopwatch, record laps, and still maintain a view of the time of day.

As shown in FIG. 8A, device 800 displays a clock face that indicates current time, as depicted on user interface screen 802, on the touch-sensitive display. The clock face includes hour hand and minute hand 804. The clock face also includes one or more indications of an hourly timescale (e.g., numbers 12, 1, 2, 3, and/or tick marks or other visual indicators displayed at the corresponding positions on the clock face), such as 12 o'clock indicator 806. The clock face further includes stopwatch hand 808 (which, in some embodiments described below, also serves as a seconds hand. Note that, as used herein, the term seconds hand refers to a hand on a clock face that indicates seconds, not a second hand of two hands on a clock face).

As exemplified in FIG. 8A, device 800 receives user input, which in this case is touch 812 on start affordance 810. In response, the device replaces the 12 o'clock indicator 806 with stopwatch timescale indicator 824, as shown on screen 820. Stopwatch indicator 824 shows that the stopwatch timescale is a 60 second timescale. A timescale for the stopwatch hand may refer to the amount of time needed for the stopwatch hand to complete one full revolution around the displayed clock face. Note that the clock face on screen 820 includes hour hand and minute hand 822 and stopwatch hand 826, which are the same as hour hand and minute hand 804 and stopwatch hand 808.

Further in response to touch 812, device 800 animates stopwatch hand 826 to reflect passage of time, as shown by comparing screen 820 and 830. As shown on screen 830, the stopwatch hand has moved to a second position on the clock face (note the position of stopwatch hand 836), indicating the passage of time. Given that indicator 834 shows that the stopwatch timescale is 60 seconds, the position of stopwatch hand 836 indicates that 25 seconds have passed. As shown in FIG. 8A, the user accesses this information by touch 840 on lap affordance 838, which causes the display of time 842, indicating the time elapsed since touch 812. Note that hour hand and minute hand 832 are the same as 822 and 804, and these two hands have not changed position in the last 25 seconds. In this example, the hour hand and minute hand are indicating the same time of day (e.g., 10:10) throughout screens 802, 820, and 830.

Stated another way, the device displays the time of day with the hour hand and the minute hand, and it additionally displays a stopwatch hand. In response to receiving data representing user input, the indication(s) of the hour are replaced with indication(s) of a first timescale of the stopwatch hand, but the hour hand and the minute hand continue to indicate the time of day, even though the hour indication(s) have been replaced. This allows the user to view a stopwatch and the time of day simultaneously, while showing that the stopwatch has started and indicating the timescale for the stopwatch. Also in response to receiving the data, the device animates the stopwatch hand to reflect passage of time.

In some embodiments, while animating the stopwatch hand to reflect the passage of time, the device receives second data representing a second user input, and in response to receiving the second data, the device may cease the animation of the stopwatch hand. For example, this may function similar to a "stop" function for the stopwatch.

In some embodiments, the device may display on the touch-sensitive display a first affordance representing a start/stop function (e.g., affordance 810). The first data representing the first user input (e.g., touch 812) and the second data representing the second user input both represent contacts on the displayed first affordance. In other embodiments, the device may display separate affordances for the stopwatch start and stopwatch stop functions.

In some embodiments, the device may display on the touch-sensitive display a second affordance representing a lap function (e.g., affordance 838). The devices receives third data representing a contact on the displayed second affordance after receiving the first data (e.g., after invoking the start function) and before receiving the second data (e.g., before invoking the stop function). In response to receiving the third data, the device displays a third numerical indication of elapsed time between receiving the first data and receiving the third data. For example, this may function similar to a "lap" function for the stopwatch that causes a display of the time elapsed since invoking the start function. As described above, this feature is illustrated on screen 830.

In some embodiments, the device may display on the touch-sensitive display a third affordance representing a stopwatch application, which is depicted as affordance 814 on screen 802. The device receives fourth data representing a contact on the displayed third affordance, and in response to receiving the fourth data, the device launches the stopwatch application. This allows the user to access additional information and/or functionality related to the stopwatch feature directly from this context-specific user interface. In one embodiment, the stopwatch application is an application as described in related application: U.S. Provisional Patent Application Ser. No. 62/044,979, filed on Sep. 2, 2014, entitled "Stopwatch and Timer User Interfaces."

In some embodiments, the first timescale for the stopwatch hand may be 60 seconds, 30 seconds, 6 seconds, or 3 seconds. In some embodiments, the movement of the stopwatch hand is animated at a rate based on the first timescale for the stopwatch hand. For example, the stopwatch hand may move faster if the timescale is 3 seconds than if the timescale is 60 seconds. This allows the stopwatch hand to complete a full revolution around the clock face in the amount of time depicted by the first timescale.

In some embodiments, the device may substitute the one or more indications of an hourly timescale with an indication of a first timescale for the stopwatch hand by removing the one or more indications of the hourly timescale, displaying the indication of the first timescale for the stopwatch hand, and translating the displayed indication of the first timescale for the stopwatch hand in a rotational motion in a clockwise direction. As an illustrative example, if the display includes 12 numerical indications of hourly timescale, and the first timescale for the stopwatch hand is a 6 second timescale, the device may substitute the 12 numerals with a single 6 numeral. In some embodiments, this may be the same 6 numeral that was previously the indicator for the 6 o'clock hour, such that the substitute and display are not perceptible to the user. The device may display the 6 numerical indicating the first timescale for the stopwatch hand at the 6 o'clock position on the clock face, then translate the 6 in a clockwise motion around the clock face until it arrives at the top of the clock face (formerly the 12 o'clock position), at which point the translation stops. This improves the context-specific interface by reinforcing to the user that the clock face has transitioned from indicating hours and minutes to indicating the first timescale for the stopwatch hand.

As illustrated in FIG. 8B, in some embodiments, the device has a rotatable input mechanism (e.g., 506), which may be used as an optional input to change the stopwatch timescale. FIG. 8B shows screen 850 with clock face 852, which includes hour hand and minute hand 854, and stopwatch timescale indicator 856 (showing a 60 second timescale). In response to receiving fifth data representing movement of the rotatable input mechanism (e.g., movement 858), the device 800 changes the stopwatch timescale to a second timescale, as shown by stopwatch timescale indicator 886, part of clock face 882 on screen 880. Note that screen 880 continues to display hour hand and minute hand 884. The second stopwatch timescale is different from the first stopwatch timescale. This allows the user to customize the timescale for the stopwatch hand through rotating the rotatable input mechanism, allowing for a context-specific user interface depending on the user's desired stopwatch timescale.

In some embodiments, the device substitutes the indication of the first timescale for the stopwatch hand with the indication of the second timescale for the stopwatch hand by removing the indication of the first timescale for the stopwatch hand, displaying the indication of the second timescale for the stopwatch hand, and translating the displayed indication of the second timescale for the stopwatch hand in a rotational motion in a clockwise direction.

As shown in FIG. 8B, indicator of the second timescale for the stopwatch hand 860 is displayed at a position on the clock face that indicates its relative position in the first timescale For example, indicator of a 30 second timescale 860 is displayed on clock face 852 at a position based on the sixty second timescale indicated by 856. In response to receiving data representing movement 858, the device removes 856, displays 860, and translates 860 in a rotational motion in a clockwise direction until it reaches the former position of the indicator of the first timescale for the stopwatch hand (e.g., (e.g., the former position of 856, as depicted by the position of 886 on clock face 882).

In some embodiments, after receiving the first data representing the first user input, the device animates the stopwatch hand to represent a rotational motion about an origin and ceases the animation to display the stopwatch hand at a position at $\pi/2$ radians (e.g., the 12 o'clock position) relative to the rotational motion about the origin. For example, the stopwatch hand may function as a seconds hand of the clock face before the first data is received. When the first data is received, the seconds hand may be animated to depict a rotation around the clock face (e.g., by rotating about the center point of the clock face) until it resets at the 12 o'clock position. This signals to the user that the seconds hand has now become the stopwatch hand.

Figure 9A:
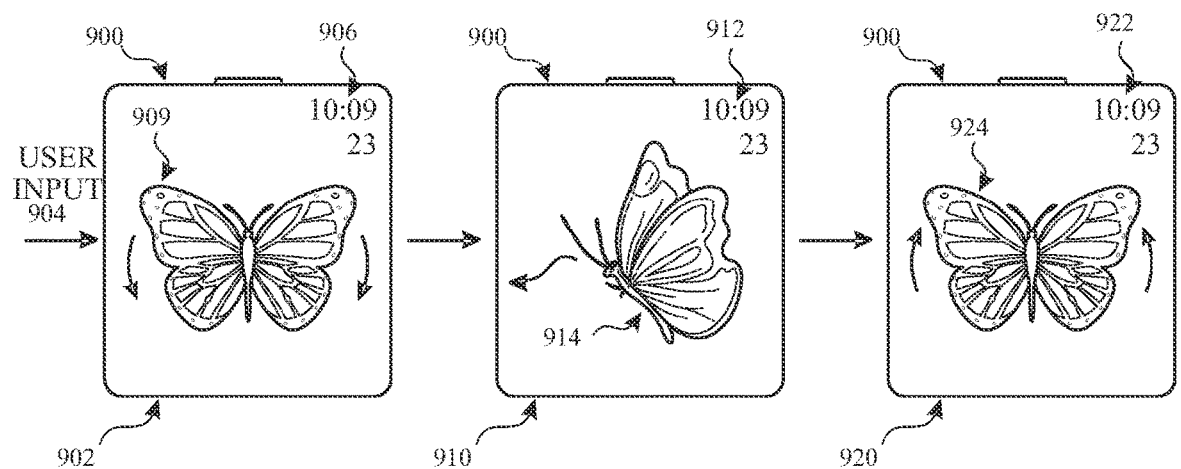
FIGS. 9A and 9B illustrate exemplary context-specific user interfaces.
Figure 9B:
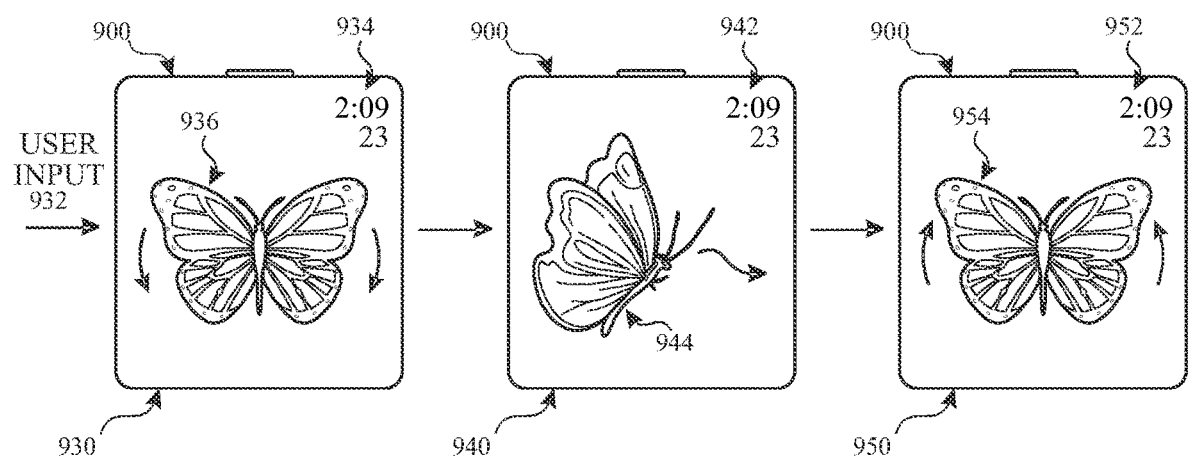

FIGS. 9A-9B illustrate yet another context-specific user interface configured according to a different watch face type.

FIG. 9A shows exemplary context-specific user interfaces that may be operated on device 900. Device 900 may be device 100, 300, or 500 in some embodiments. The electronic device has a touch-sensitive display (e.g., touchscreen 504).

A user may wish to view a displayed animation on an electronic device in response to an input. Because a user may look at an electronic device many times per day, particularly if the user relies on the device for timekeeping, it may be advantageous to provide the user a different experience each time the display is viewed. This keeps the user interested and engaged with the electronic device.

As shown in FIG. 9A, device 900 displays user interface screen 902 in response to detecting user input 904 at 10:09. Screen 902 includes user interface object 906, which indicates the time, as well as user interface object 909, which depicts a butterfly. After displaying screen 902, device 900 animates butterfly 909 by sequentially displaying three animated sequences that are all different from each other. The first animated sequence is shown by butterfly 909, which depicts the butterfly opening its wings. Next, screen 910 displays the second animated sequence, which depicts butterfly 914 flying from right to left on the display. Note that screen 910 also displays user interface object 912, which indicates the time. Finally, screen 920 displays the third animated sequence, which depicts butterfly 924 closing its wings. Screen 920 again displays user interface object 922 indicating the time.

Later in the day, as shown in FIG. 9B, device 930 detects a second user input 932. In response, device 900 accesses data representing the previously displayed animated sequence (i.e., the sequence shown by butterfly 914). Device 900 displays screen 930. Screen 930 includes user interface object 934, which indicates the time is now 2:09, and user interface object 936, which depicts a butterfly.

Device 900 then animates butterfly 936 by sequentially displaying three animated sequences. Butterfly 936 on screen 930 is animated using the same sequence as butterfly 909 on screen 902, showing the butterfly opening its wings. Next, screen 940 shows butterfly 934, which is animated to fly from left to right on the display. The animated sequence of butterfly 934 is different from the animated sequence of butterfly 914 on screen 910 (data representing the sequence of butterfly 914 had previously been accessed). This ensures that the user will view a different animation, as compared to the last user input. This makes the animation appear more realistic and/or engaging to the user, as this variation imparts a more random, lifelike quality to the animated user interface object.

Finally, screen 950 shows butterfly 954, which is animated using the same sequence (a butterfly closing its wings) as butterfly 924 on screen 920. Screens 940 and 950 also include user interface objects 942 and 942, respectively, which indicate the time.

FIGS. 9A and 9B show two butterflies (936 and 909) that are displayed in response to user inputs. Butterfly 936 is related to 909, but it need not be identical. In some embodiments, user interface object 936 may be the same as user interface object 909. In other embodiments, user interface object 936 may be an object related, but not identical, user interface object 909. For example, these user interface objects may be animals of the same general type but with different appearances (e.g., different colors, different postures, different species, and so forth).

The animated user interface object may be an animal, such as a butterfly or jellyfish, or it may be a plant, like a flower. In some embodiments, it may be a non-living object, single-celled organism, cartoon, human, and so forth. This context-specific user interface is not limited by the particular animated user interface object. The animated sequences may be specific to the displayed objects. For example, a jellyfish may swim across the screen in various directions, a flower may open, close, or be blown about the wind, and so on. In some embodiments, the animated user interface object may be an emoji, e.g., that wakes up and changes facial expression or one or more facial features upon animation.

As illustrated by comparing butterfly 909 to butterfly 924, or butterfly 936 to butterfly 954, the third animated sequence may be based on a reverse of the first animated sequence. For example, if the first sequence depicts a butterfly opening its wings, the third sequence may depict a butterfly closing its wings. Since these sequences bookend the full animated sequence, this feature imparts a cohesive feel to the entire sequence. In some embodiments, the state of the user interface object at the beginning of the first animated sequence (e.g., butterfly 909 has closed wings, which are then animated to open) corresponds with the state of the user interface object at the end of the third animated sequence (e.g., butterfly 924 is animated to end on closed wings), thereby providing the user with the impression of one seamless animation.

A variety of user inputs may serve as the user input to display the screens exemplified in FIGS. 9A and 9B In some embodiments, the user input may be a touch on the display, a rotation of a rotatable input mechanism, a depression of a depressible and rotatable input mechanism, or a swipe on the display. In some embodiments, the user input may be a user movement of the electronic device (e.g., a movement of the device such as raising of the user's wrist, if the device is wearable, or other movement indicative that the user is viewing the display). Advantageously, this feature enables the device to seemingly display a different animation each time the display is viewed.

In some embodiments, the user interface object displayed in response to user input may be the same after each input. In some embodiments, the user interface object could be different each time. For example, a user interface object may be reflected (e.g., about a horizontal and/or a vertical axis), flipped, and/or rotated to create a new user interface object. This is a source of variety for the displayed user interface object and the animated sequences. For example, rotating a single object horizontally, vertically, and horizontally and vertically creates four new objects, which when coupled with an animation that directs the movement of the object creates even more variations. These aspects add combinatorial possibilities which greatly increase the number of available animations for a single object, thus reducing the number of pre-programmed animated sequences. It also helps animate objects with fewer intrinsic features and/or movements, such as a jellyfish.

The user may also change the displayed user interface object. For example, device 900 may detect a contact on the touch-sensitive display, and in response, device 900 may substitute the displayed user interface object with a second user interface object. This second user interface object may be related to the first (e.g., the user could select an orange butterfly if the previous one was blue).

In some embodiments, as shown in FIGS. 9A and 9B, the user interface object indicating time may be a representation of a digital clock with numerical indications of an hour and a minute (see, e.g., objects 906, 912, 922, 934, 942, and 952). In some embodiments, the user interface object may display the current time in response to user input.

The context-specific user interfaces described and illustrated herein provide numerous elements and features that a user may customize, depending upon a particular context. As described, these customizable elements enhance the user interfaces, making them more personal and interactive to the user.

At the same time, a user also wants a device that is easy and intuitive to use. Providing a multitude of features only serves to frustrate the user if the user interface does not provide comprehensible ways to edit these features. Described below are user interfaces for editing context-specific user interfaces that provide easy and intuitive methods that facilitate user customization.

Importantly, it is to be appreciated that, while particular embodiments such as clock faces may be described with respect to particular editing features, these editing features may also apply to one or more of the other user interfaces described herein. For example, a method for customizing a color of a clock face may be used to change the color of a seconds hand, change an animated object (e.g., a butterfly), or change a clock face background (e.g., a photo or image of a scene). Similarly, methods for customizing complications may be used to add and/or edit various complications on any clock face, regardless of whether an embodiment of that clock face bearing a particular complication was described herein. A skilled artisan will recognize that the methods described below provide user interface functionalities that may be applied to elements and aspects of various context-specific user interfaces in numerous combinations, such that each possible combination would be impossible to elaborate individually.

It is to be further appreciated that references to a "clock face" with respect to clock face editing and/or selection as described herein are not in any way limited to a traditional notion of a "clock face," e.g., a circular display with hour indications and one or more hands to indicate time, or a representation of a digital clock. Any context-specific user interface with an indication of time described herein may properly be termed a clock face.

Attention is now directed to FIG. 10. FIG. 10 shows exemplary context-specific user interfaces that may be operated on device 1000. Device 1000 may be device 100, 300, or 500 in some embodiments. The electronic device has a touch-sensitive display (e.g., touchscreen 504) configured to detect the intensity of contacts. Exemplary components for detecting the intensity of contacts, as well as techniques for their detection, have been referenced and described in greater detail above.

Device 1000 displays user interface screen 1002, which includes clock face 1004. Clock face 1004 also includes complication 1006 that displays a set of information from a weather application (e.g., current weather conditions). In this example, the user wishes to change multiple aspects of clock face 1004. Specifically, the user decides to change the hour indications on clock face 1004 and complication 1006.

The user contacts the touch-sensitive display of device 1000 with touch 1008. In some embodiments, touch 1008 is a touch gesture that prompts device 100 to enter a clock face edit mode, such as a touch with a characteristic intensity above an intensity threshold, a touch with a duration above a threshold duration (e.g., a long press or "press and hold"-type user input), and so forth. Touch 1008 has a characteristic intensity above an intensity threshold, which prompts device 1000 to enter a clock face edit mode, shown on screen 1010. Clock face edit mode allows the user to edit one or more aspects of a clock face. Device 1000 indicates that the user has entered clock face edit mode by visually distinguishing the clock face. In this example, screen 1010 shows a smaller version of the display of screen 1002 (e.g., 1012), which includes reduced size clock face 1014 based on clock face 1004. Reduced size complication 1016, which is based on complication 1006, is also displayed. This display indicates to the user that the user is in clock face edit mode while giving the user an indication of what the edited clock face will look like on the display. In some embodiments, a user may be able to select a different clock face by swiping displayed screen 1010. In some embodiments, the user may access clock face edit mode and a clock face selection mode through a shared interface. Exemplary descriptions of clock face selection mode are provided in International Patent Application Serial No. PCT/US2015/034607, titled "Context-Specific User Interfaces," filed Jun. 7, 2015, published as WIPO Publication No. WO/2016/022205.

Screen 1010 also displays paging affordance 1018. Paging affordances may indicate where the user is within a sequence of options, as well as how many options are available in the sequence. In clock face edit mode, paging affordances may indicate which editable aspect of the clock face a user is editing, where this aspect falls within a sequence of editable aspects, and the total number of editable aspects in the sequence (if clock face selection is available on this screen, paging affordance 1018 may depict the currently selected clock face within a sequence of selectable clock faces and/or clock face options, as described below). A paging affordance may be advantageous in clock face edit mode to help the user navigate the interface and explore all of the editable options available within each type of clock face.

The user selects the displayed clock face for editing by contacting 1012 through touch 1020. In response to detecting touch 1020, device 1000 visually indicates an element of the clock face for editing. As shown on screen 1030, the hour indications have been selected for editing, as indicated by outline 1034 around the position of the hour indications. The other elements of the clock face are still retained, as shown by hour hand and minute hand 1032 and complication 1036.

In this example, three aspects of the clock face are available for user editing. This is depicted by paging affordance 1038. The first editable aspect is the hour indications (e.g., their number and/or appearance). This is relayed to the user by paging affordance 1038. By viewing outline 1034 in combination with paging affordance 1038, the user recognizes that the hour indications are the first of three editable aspects of this clock face.

Device 1000 also has rotatable input mechanism 1040. The user may move rotatable input mechanism 1040 to cycle through different options for editing different aspects of the clock face. On screen 1030, the user may select different options for the hour indications (which are currently editable, as depicted by outline 1034) through movement 1042. Advantageously, using a rotatable input mechanism to cycle through editing options (rather than using, e.g., a touch interaction) frees up touch interactions with the screen to instead provide other functionalities, thus expanding the interactability of the device. Using a rotatable input mechanism is also helpful in cases where smaller elements of the display are being edited, as finer-scale touch gestures may be difficult on a reduced-size display for users with large fingers.

Also displayed on screen 1030 is positional indicator 1044, shown as a column of 9 lines. Positional indicator 1044 is an indicator of a current position along a series of positions. This is may be used, for example, in combination with rotatable input mechanism 1040. On screen 1030, positional indicator 1044 indicates to the user the position of the currently selected option (e.g., by line 1046) within a series of all selectable options.

Upon detecting movement 1042, device 1000 displays screen 1050. In response to detecting movement 1042, device 1000 edits the hour indications, in this case by increasing the number of indications and adding numerals. This is shown by indications 1052, still highlighted by outline 1034. The other elements of the clock face, hour hand and minute hand 1032 and complication 1036, remain the same. Positional indicator 1044 has been updated to indicate the position of this hour indication option, highlighted by line 1054, within a series of positions of hour indication options.

As indicated by paging affordance 1038, the hour indications are the first editable aspect of this clock face within a sequence of editable aspects. The user may select a second editable aspect by swiping the touch-sensitive display (e.g., swipe 1056). In response to detecting the swipe, device 1000 displays screen 1060. Screen 1060 includes clock face 1062, which now has 12 hour indications, including 4 numerical indications, as depicted by hour indications 1052. Note that these hour indications are the hour indications that were selected by the user on the previous screen (see indications 1052). Paging affordance 1038 has now been updated to indicate that editing complications is the second editable aspect within the sequence of editable aspects in this clock face.

On screen 1060, complication 1036 is currently editable, as indicated to the user by outline 1064. Currently, complication 1036 is displaying current weather conditions using information from a weather application. This option is option 3 in a series of options, as indicated by updated positional indicator 1044 and line 1066. Positional indicator 1044 lets the user know that the currently selected feature (i.e., complication 1036) is editable by the rotatable input mechanism.

While screen 1060 depicts a single complication, it should be understood that multiple complications may be displayed. When multiple complications are displayed, a user may select a particular complication for editing by contacting the corresponding position of the complication. Outline 1064 then transitions from the previously selected complication or element to the currently selected complication or element and rotatable input mechanism may then be used to edit the complication or element at the selected location. This concept is described in greater detail in reference to FIGS. 7A-7C.

It is to be noted that positional indicator 1044 is displayed on screens 1030, 1050, and 1060, even though the available options depicted by the indicators are different. A positional indicator may be a universal indicator of options available through a particular type of user input, such as a movement of the rotatable input mechanism. Rather than displaying positions within a particular context, such as editing a certain feature or displaying data from a particular application, a positional indicator shows the user positions available through a type of user input, no matter the particular context in which the user input is being used. This better indicates to the user which user input should be used for this functionality. In some embodiments, a positional indicator is displayed on the display at a position adjacent to the user input for which it is used (e.g., next to the rotatable input mechanism to indicate positions accessible by moving the rotatable input mechanism).

A positional indicator (e.g., positional indicator 1044) may be responsive to one or more inputs. For example, as shown in FIG. 10, the positional indicator 1044 may indicate options available through a movement of the rotatable input mechanism. As described above, the user may scroll through the available options using movement of the rotatable input mechanism. However, a user may also wish to scroll through the available options using a second type of input, such as a contact (e.g., a swipe) on the touch-sensitive display. In some embodiments, a user viewing screen 1030 may swipe the touch-sensitive display in a different direction than the swipe used for removing a visual indication of a first element of the clock face for editing and visually indicating a second element of the clock face for editing (e.g., a downward swipe on the display). For example, to scroll through the available options shown in FIG. 10, the user may swipe in a substantially horizontal direction (e.g., swipe 1056) to scroll through editable aspects (e.g., with swipes moving left-to-right resulting in scrolling through the sequence of editable aspects in one direction, and swipes moving right-to-left resulting in scrolling through the sequence of editable aspects in a different direction, as depicted by updating the paging affordance 1038). In this example, the user may swipe in a substantially vertical direction (e.g., perpendicular to swipe 1056) to scroll through available options (e.g., with swipes moving downwards resulting in scrolling through the sequence of available options in one direction, and swipes moving upwards resulting in scrolling through the sequence of available options in a different direction, as depicted by updating the positional indicator 1044). In some embodiments, the user may swipe the display at or near the location of the displayed positional indicator to scroll through the sequence of available options.

In some embodiments, upon detecting the swipe, the device may update an indicator of position (e.g., an indicator of position along a series of positions that indicates a position of a currently selected option for the editable aspect along a series of selectable options for the editable aspect of the visually indicated element of the clock face) to indicate a second position along the series. In some embodiments, upon detecting the swipe, the device may edit an aspect of the visually indicated element of the clock face. In some embodiments, the device may visually distinguish the positional indicator (e.g., by changing a color, size, shape, animation, or other visual aspect) based on the type of input used to scroll the indicator. For example, in some embodiments, in response to detecting a movement of the rotatable input mechanism, the device may display the positional indicator in a first color (e.g., green), and in some embodiments, in response to detecting a swipe, the device may display the positional indicator in a second color different from the first color (e.g., white).

In clock face edit mode depicted on screen 1060, the user may be able to cycle through different types of information from the weather application, or change the application from which the information is drawn. In this case, the user moves rotatable input mechanism using movement 1068, which causes device 1000 to display screen 1070. This updates complication 1036 to display the current date, which is obtained from a calendar application. This option is indicated within positional indicator 1044 by line 1072. Note that paging affordance 1038 still indicates the second position because the user is still engaged in editing complications, the second editable aspect of this clock face. A determination that the contact has a characteristic intensity above a predetermined threshold may be user to distinguish the contact from other gestures, such as a tap or the beginning of a swipe.

Having finished editing the clock face, the user may now exit clock face selection mode and display the edited clock face on the display. In some embodiments, this may be done by detecting a user contact with a characteristic intensity above an intensity threshold. In accordance with a determination that the characteristic intensity is above the intensity threshold, the device may exit clock face edit mode and cease to visually distinguish the displayed clock face for editing (e.g., by increasing the size of the displayed clock face). In some embodiments, in accordance with a determination that the characteristic intensity is above the intensity threshold, the device may save this edited clock face as a new clock face that is accessible through clock face selection mode (described below). In accordance with a determination that the characteristic intensity is not above the intensity threshold (where the clock face includes an affordance representing an application, and where the contact is on the affordance representing the application), the device may launch the application represented by the affordance.

In some embodiments, the device may have a rotatable and depressible input mechanism (e.g., 506), and in response to detecting a depression of the rotatable and depressible input mechanism, the device may exit clock face edit mode, display the currently edited clock face, and/or save the currently edited clock face for later user selection, as described above.

FIG. 10 illustrates an exemplary embodiment of clock face edit mode, but a number of other potential embodiments are possible within the scope of the techniques described herein. For example, in FIG. 10, an element was indicated for editing by visibly distinguishing an outline around the element (e.g., by displaying a visible outline, or by distinguishing a pre-existing outline already visible around the element), as illustrated by outlines 1034 and 1064. In some embodiments, the outline may be animated to depict a rhythmic expansion and contraction (e.g., animation similar to pulsing or breathing). In some embodiments, the element indicated for editing itself may be animated to depict a rhythmic expansion and contraction. In some embodiments, the element may be animated to depict flashing. In some embodiments, a color of the element may be changed (e.g., a change in color and/or intensity). Any or all of these indications may be used to visually indicate the element that is currently editable.

As shown in FIG. 10, movement of a rotatable input mechanism may be employed as the user input for editing an aspect of the element indicated for editing. In some embodiments, if an outline is used to indicate the currently editable element, the outline may disappear when the rotatable input mechanism is being moved, and reappear when the movement stops. In this way, the user is able to see what the edited element will look like on the clock face as a whole, without any possible obstruction or distraction from the outline.

In some embodiments, in response to detecting the movement, the device may change a color of the element. This could include, e.g., changing a color of a clock face background (e.g., substituting a color if the clock face background is a particular color, or selecting a different image if the clock face background includes an image), changing a color of part or all of a seconds hand (if included on the clock face), changing a color of an hour and/or minute indication, and/or changing a color of a number or colon in the display of a representation of a digital clock. Since a seconds hand is a smaller element than a background (and therefore may be more difficult for the user to perceive), changing the color of the seconds hand may include an animated color change. For example, the seconds hand could first change a color of a particular point (e.g., a dot depicted along the seconds hand), then propagate this color change in either direction along the seconds hand. Alternatively, the color change could begin at the origin of the clock face and propagate outward. Animating a color change, particularly a change of a smaller element of the clock face, may be helpful to draw the user's attention to the color change.

In other embodiments, in response to detecting movement of the rotatable input mechanism, the device may change an aspect of a complication. For example, this could be used to change application data displayed by an application complication. In some embodiments, the complication may indicate a first set of information obtained by an application (e.g., application data. For example, if the application is a weather application, a set of information could be a forecasted weather condition, a current temperature, etc.), and upon editing, the complication could be updated to indicate a second set of information from the same application (e.g., if the application is a weather application, the display could be edited from showing a current temperature to showing current precipitation). In other embodiments, upon editing, the complication could be updated to indicate a set of information from a different application (e.g., if the application is a weather application, the display could be edited from showing weather to showing data from a calendar application, as illustrated by complication 1036).

In other embodiments, in response to detecting movement of the rotatable input mechanism, the device may change an aspect of display density. For example, as illustrated in FIG. 10, this could be used to edit the number of visible divisions of time (e.g., the number of displayed hour and/or minute indications, such as numbers 1-12 or other marks/symbols positioned along the clock face at the hour positions). In response to detecting movement of the rotatable input mechanism, the device may increase or decrease the number of visible divisions of time. As illustrated on screens 1030, 1050, and 1060, this could involve changing the number of visible divisions (e.g., from 4 to 12) and/or changing the number of numerical/symbolic hour indications (e.g., from 0 to 4).

In some embodiments, as illustrated in FIG. 10, an indicator of positions along a series of positions may be displayed (e.g., positional indicator 1044). In response to detecting movement of the rotatable input mechanism, the device may update the indicator from indicating a first to indicating a second position along the series of positions. In some embodiments, the indicated position may reflect a currently selected option for the currently editable aspect along a series of selectable options for the currently editable aspect. As described above, in some embodiments, the indicator is displayed on the display at a position adjacent to the rotatable input mechanism, thereby strengthening the user's association between the indicator and the input. In some embodiments, if the currently editable aspect is color, the device may display a positional indicator that includes a series of colors, such that the currently selected color option matches the color of the position currently indicated by the positional indicator (e.g., the color could be a similar or identical color). In some embodiments, the number of positions displayed in a position indicator increases or decreases depending on the number of options for the currently selected editable aspect.

In some embodiments, upon reaching the last position indicated by the positional indicator, the device may provide an indication to the user that the last option has been displayed. For example, the device may depict a dimming of one or more of the selected element, an outline around the selected element, and the positional indicator. In some embodiments, the device may animate one or more of the selected element, an outline around the selected element, and the positional indicator to expand and contract (e.g., like a rubber band). In some embodiments, the device may animate one or more of the selected element, an outline around the selected element, and the positional indicator to move on the display (e.g., by bouncing). These features may be advantageous to provide an indication to the user that the last option in the series of options has been reached.

In some embodiments, a user may select the element on the clock face for editing by contacting the touch-sensitive display at the position of the displayed element. In other embodiments, the element may be selected by swiping the touch-sensitive display, or rotating the rotatable input mechanism. Regardless of the input, selecting a second element for editing may involve removing a visual indication from the previous element and visually indicating a second element for editing (visually indicating may include any or all of the techniques described above).

In some embodiments, if the element selected for editing is indicated by an outline around the element, changing an element for editing could involve translating the outline on-screen away from the first element and/or translating a visible on-screen in a continuous on-screen movement towards the second element until the outline is displayed around the second element.

As illustrated in FIG. 10, clock face edit mode allows the user to alter multiple editable aspects of the clock faces described herein. In some embodiments, in response to detecting a swipe on the touch-sensitive display (e.g., swipe 1056), the device may select a second element of the clock face for editing, which in response to detecting another user input (e.g., a movement of the rotatable input mechanism), may be edited. This allows the user to cycle through different editable aspects of the displayed clock face, such as colors, number and/or type of complications, and display density.

A user may wish to match a color of a displayed clock face to an image. In some embodiments, the device may receive a user input, and in response to receiving the user input, the device may enter a color selection mode. While in the color selection mode, the device may receive data representing an image, and in response to receiving the data, the device may select a color of the image and update a displayed clock face by changing a color on the clock face (e.g., a clock face background, hour and/or minute indication, and/or seconds hand) to match the color of the image. In some embodiments, the color selected may have the greatest prevalence of the colors in the image. This allows the user to further customize a clock face to display a designated color. For example, if the user is wearing a blue shirt, the user could take an image of the blue shirt and match the color of the clock face to the shirt. In some embodiments, the data representing the image may be obtained from an image stored on the device, an image stored on an external device in wireless communication with the device (e.g., Wi-Fi, Bluetooth™, near field communication ("NFC"), or any of the other cellular and/or other wireless communication techniques described herein), or an image taken using a camera on the device, such as camera module 143 or optical sensor 164.

As described above, the techniques illustrated and described in reference to FIGS. 7C and 10 may be used to edit or configure various aspects of context-specific user interfaces on portable multifunction device. However, it may be advantageous to allow the user to use an electronic device (e.g., a first device) to configure a context-specific user interface for a different portable multifunction device (e.g., a second device). In some embodiments, the first device has a larger display than the second device, thereby making it easier for the user to see and/or provide touch gestures on the first device. The user may wish to configure a user interface for the second device while operating the first device without switching over to the second device. For example, the user may download an application on the first device and wish to install a corresponding application configured for use on the second device. The user may then wish to configure the second device to display a user interface with a complication representing the newly installed corresponding application.

Figure 11:
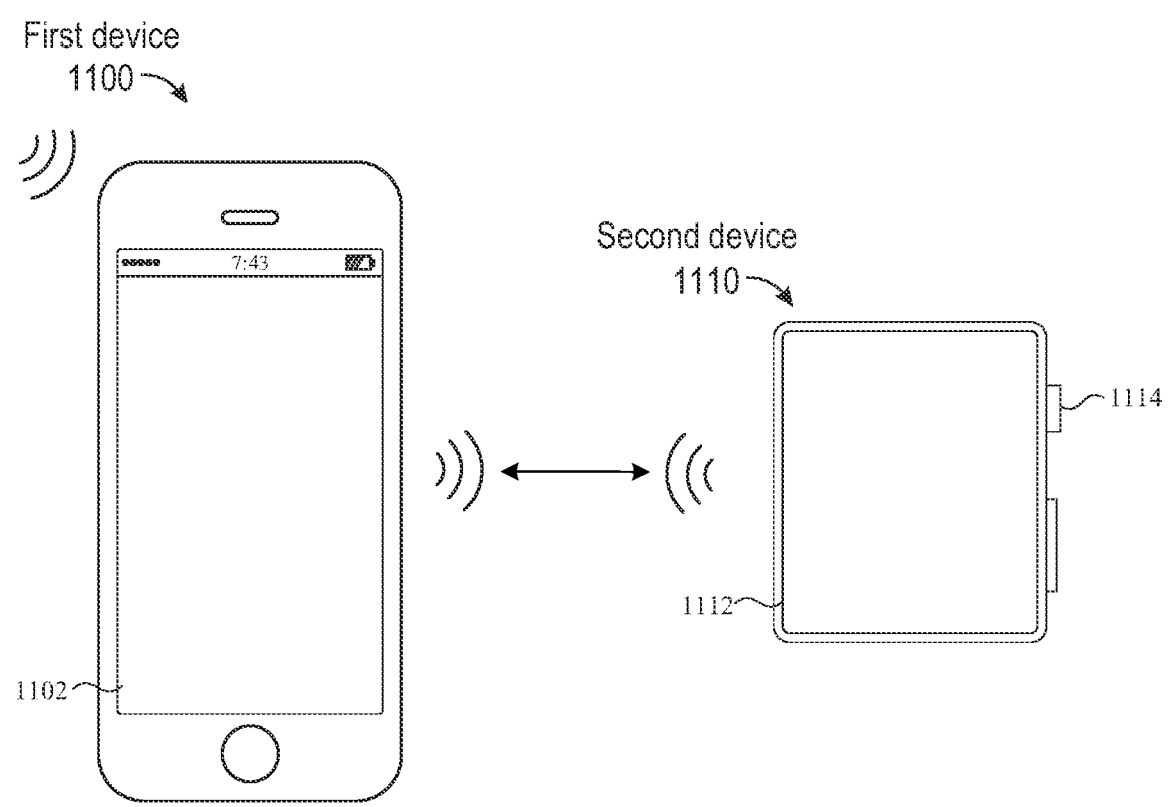
FIG. 11 illustrates exemplary electronic devices in accordance with some embodiments.

FIG. 11 illustrates an exemplary first electronic device 1100 and an exemplary second electronic device 1110. In some embodiments, device 1100 may be one or more of devices 100 (FIG. 1), 300 (FIG. 3), and/or 500 (FIG. 5). For purposes of illustration, first device 1100 is a personal electronic device, similar to portable multifunction device 100 as depicted in FIG. 4A, with a touch-sensitive display 1102. In some embodiments, second device 1110 may be one or more of devices 100 (FIG. 1), 300 (FIG. 3), and/or 500 (FIG. 5). For purposes of illustration, external device 1110 is a personal electronic device, similar to device 500 as depicted in FIG. 5A, with a touch-sensitive display 1112 and a rotatable input mechanism 1114.

As depicted in FIG. 11, device 1100 is capable of receiving information over a wireless network. In some embodiments, device 1100 is coupled via wireless communication to device 1110. FIG. 11 also indicates that device 1100 is capable of operating in a paired relationship with external device 1110 to exchange data between the two devices. In a paired relationship, device 1100 and device 1110 are registered with one another and can perform two-way wireless communication. In some embodiments, wireless communication, for purposes of a paired relationship, occurs over a peer-to-peer wireless communication protocol such as Bluetooth and/or Bluetooth Low Energy (BTLE). In some embodiments, the wireless communication uses more than one wireless communication protocol. For example, WiFi may be used in addition to BTLE. In these embodiments, an initial communication between two devices may occur over a lower powered protocol, such as BTLE, even if the protocol yields a slower data transfer speed. Subsequent communications may occur over a secondary network that is relatively faster, such as WiFi. Additional exemplary techniques related to initiating and operating in a paired relationship are described in the following co-pending applications: International Patent Application Serial No. PCT/US2015/023699, titled "Companion Application for Activity Cooperation," filed Mar. 31, 2015 published as WIPO Publication No. WO/2015/0183403; U.S. patent application Ser. No. 14/474,466, titled "Predefined Wireless Pairing," filed Sep. 2, 2014, published as US PG Pub. No. 20150350865; International Patent Application Serial No. PCT/US2015/047507, titled "Reduced-size Configuration Interface," filed Aug. 28, 2015 published as WIPO Publication No. WO/2016/036603; and U.S. Provisional patent application titled "Reduced-size Configuration Interface," filed Mar. 8, 2015, naming Lawrence Y. Yang et al. as inventors.

A user may wish for data representing a context-specific user interface to be transmitted between devices. For example, users may wish to share context-specific user interfaces they have configured or customized with another user. Referring to FIG. 11, a user may wish to configure a context specific user interface using device for display on device 1110 using device 1100. As such, it is desirable to provide techniques for transmitting data representing a context specific user interface.

Context-specific user interfaces may be thought of as user-configurable graphical constructs. User-configurable graphical constructs (e.g., context-specific user interfaces) may be broken down into modular constituents. A user-configurable graphical construct may include one or more graphical elements, which may themselves be independently configurable. Examples of graphical elements include without limitation aspects of the user interface, such as a clock, display density, color, and one or more optional complications. Each graphical element, as displayed to the user, may be thought to contain two dimensions of relevant information: what particular graphical asset(s) make up the graphical element (e.g., graphical assets selected from a discrete set of graphical assets stored in memory of device 1100 and/or 1110), and how the graphical asset(s) are arranged within the user-configurable graphical construct (e.g., where they are displayed). Stated another way, the graphical asset(s) and their arrangement make up a graphical element, and a plurality of graphical elements makes up a user-configurable graphical construct. Graphical assets need not themselves be graphical (they are assets making up a graphical element, rather than strictly "graphical" assets). In some embodiments, a clock may contain a graphical element or a set of graphical elements. Examples of graphical assets may include, for example, images or icons, text elements, animations, sound files, data obtained from an application, and so forth.

Returning to FIGS. 6A and 6B, the user interface screen on display 602 may be thought of as a user-configurable graphical construct (in this instance, a context-specific user interface). This exemplary user-configurable graphical construct includes clock 608 (e.g., a graphical element or set of graphical elements). In some embodiments, clock 608 may be independently configurable by the user, e.g., using one or more of the concepts described in reference to FIG. 10. For example, the user may independently configure an appearance and/or number of indications of hours or minutes, a color (e.g., a color of the seconds hand), and so on. In some embodiments, a complication may be displayed within clock 608 (e.g., a complication that displays data obtained from a calendar application, such as the current date, or a complication that displays a monogram or other customizable text and/or image(s)).

Complications 610, 612, 614, and 616 may be thought of as graphical elements. Each of these graphical elements is rendered on the displayed user-configurable graphical construct using one or more graphical assets (e.g., icons, application data, colors, text, and the like) and using an arrangement of the one or more graphical assets in the user-configurable graphical construct. For example, graphical element 610 is rendered using data obtained from a weather application (e.g., data identifying a sunny weather condition), a graphical asset representing a sun, and an indication that graphical element 610 is to be displayed in the upper left corner of the user interface screen. Similarly, graphical element 614 is rendered using data obtained from a calendar application (e.g., data identifying the date), a graphical asset representing a numerical date indication (e.g., a text element), and an indication that graphical element 614 is to be displayed in the lower left corner of the user interface screen.

If a user wishes to share a user-configurable graphical construct with a second user, and each user's device stores in memory a discrete set of graphical assets from which the graphical elements may be generated, the methods, devices, systems, and computer-readable storage media described herein need only transmit and receive data representing a user-configurable graphical construct, rather than transmitting or receiving the full user-configurable graphical construct, e.g., as an asset. Similarly, if a user wishes to configure a user-configurable graphical construct (e.g., a context-specific user interface) for display on device 1110 using device 1100, and each device stores in memory a discrete set of graphical assets from which the graphical elements may be generated, the methods, devices, systems, and computer-readable storage media described herein need only transmit and receive data representing a user-configurable graphical construct, rather than transmitting or receiving the full user-configurable graphical construct, e.g., as an asset. Advantageously, such methods, devices, systems, and computer-readable storage media described herein may reduce bandwidth requirements, thus conserving processor, memory, and/or battery usage, which are particularly relevant for portable multifunction devices.

Figure 12:
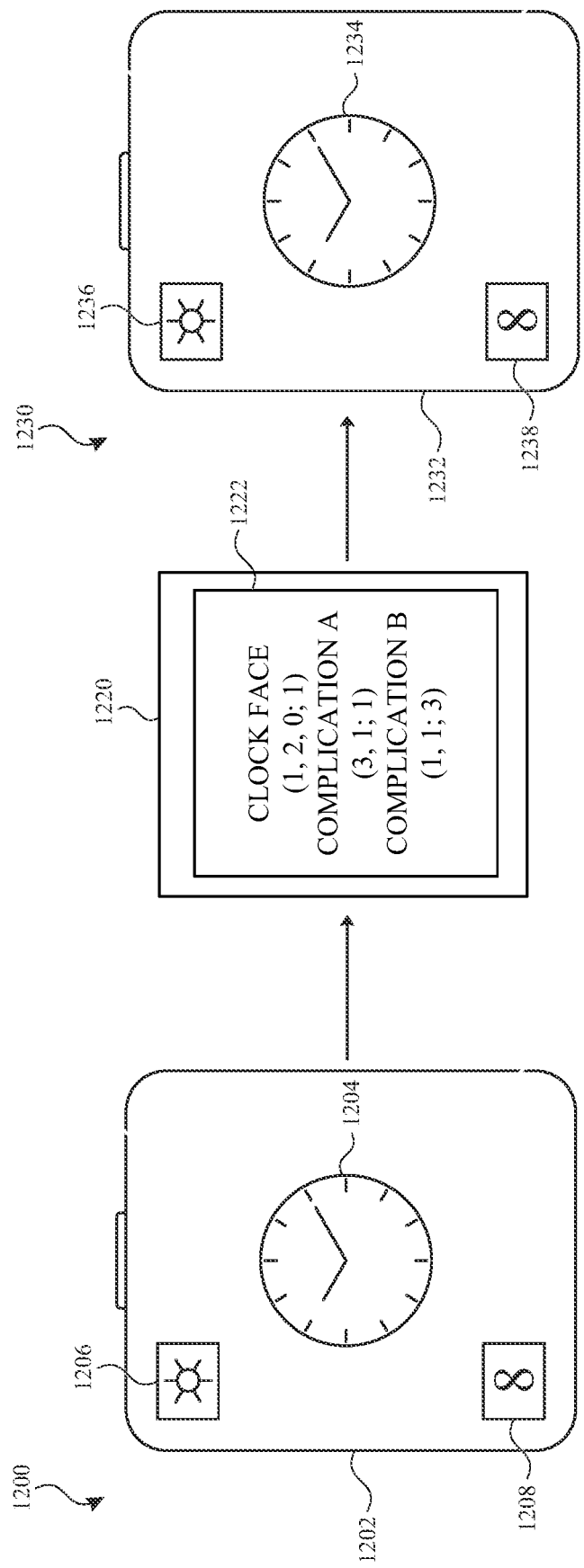
FIG. 12 illustrates exemplary user interfaces for sharing context-specific user interfaces.

The concept of sharing data representing a user-configurable graphical construct with graphical assets and elements is illustrated in FIG. 12. This exemplary user-configurable graphical construct is optionally operated on device 1200 and/or 1230, each of which may optionally be devices 100, 300, 500, or 3200, in accordance with some embodiments. The electronic devices have a display (e.g., 504). It will be appreciated that similar techniques may be adapted for transmitting data representing a context-specific user interface between devices 1100 and 1110 in FIG. 11, e.g., via wireless communication.

Device 1200 displays user interface screen 1202, which includes clock 1204 and complications 1206 and 1208, representing a weather application and a calendar application, respectively. Each of graphical elements 1204, 1206, and 1208 is made of graphical assets. In this example, the user of device 1200 wants to share data representing this user-configurable graphical construct with the user of device 1230.

In order to share these data, device 1200 transmits data 1220, which represents the user-configurable graphical construct. Data 1220 includes metadata or information 1222 representing each graphical element. For example, metadata 1222 contains data indicating each graphical asset of clock 1204 (e.g., a style of clock, a density of the clock, and a color scheme of the clock) as well as data indicating the arrangement of the graphical assets in the user-configurable graphical construct (e.g., display the clock in the middle of screen 1202). Metadata 1222 further contains data for each of the two complications, indicating which graphical assets to use (e.g., which application data to display, and which icon, image or text element to display) and how they are arranged (e.g., which corner of screen 1202).

As shown on screen 1232 of device 1230, data 1220 includes all of the information necessary to compile the graphical assets required for the user-configurable graphical construct. Data 1220 does not include the graphical assets themselves; it merely contains metadata or information 1222 that device 1230 then uses to select the relevant graphical assets from the discrete set stored in memory and display them in the indicated arrangement.

Upon receiving data 1220, device 1230 displays screen 1232, which includes complications 1236 and 1238, which are based on complications 1206 and 1208. In some embodiments, graphical elements 1206 and 1236, and/or graphical elements 1208 and 1238, may be the same as those sent by device 1200. In some embodiments, the complications as displayed on the sender and recipient devices may differ, since they may obtain and display local application data. For example, a sender in Alaska may send to a friend in Hawaii data representing a user-configurable graphical construct with a complication showing data from a weather application (e.g., 1206). As viewed from on the sender's device, complication 1206 shows Alaskan weather data, but when displayed by the recipient device 1230, complication 1236 shows local weather data from Hawaii.

Figure 13:
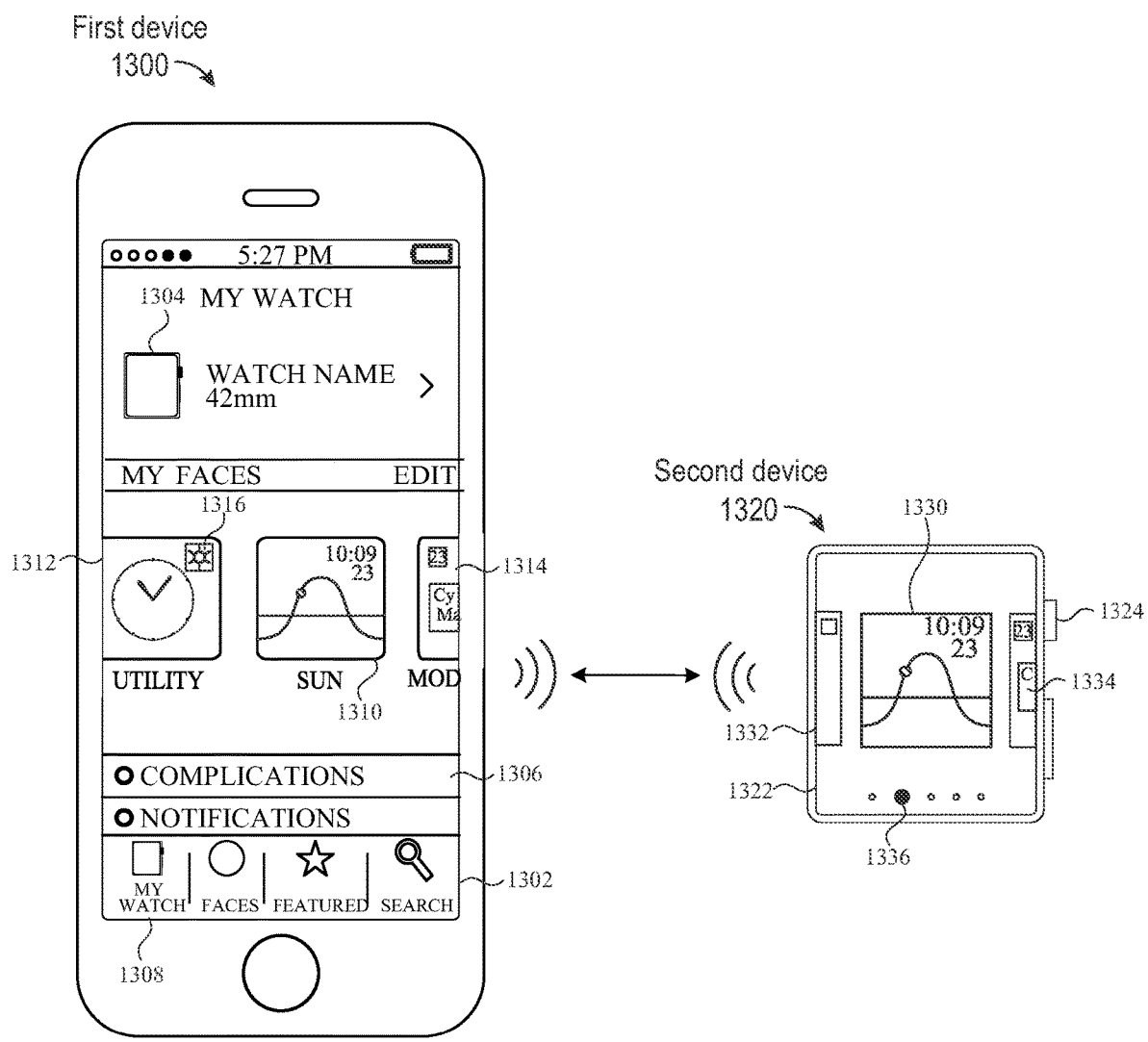
FIG. 13 illustrates exemplary user interfaces in accordance with some embodiments.

FIG. 13 illustrates exemplary electronic device 1300 and an exemplary electronic device 1320. In some embodiments, device 1300 may be one or more of devices 100 (FIG. 1), 300 (FIG. 3), and/or 500 (FIG. 5). For purposes of illustration, first device 1300 is a personal electronic device, similar to portable multifunction device 100 as depicted in FIG. 4A, with a touch-sensitive display 1302. In some embodiments, second device 1320 may be one or more of devices 100 (FIG. 1), 300 (FIG. 3), and/or 500 (FIG. 5). For purposes of illustration, external device 1320 is a personal electronic device, similar to device 500 as depicted in FIG. 5A, with a touch-sensitive display 1322 and a rotatable input mechanism 1324. Devices 1300 and 1320 are coupled via wireless communication. In some embodiments, devices 1300 and 1320 are in a paired relationship, e.g., as described in reference to FIG. 11.

Device 1320 has access to a library of context-specific user interfaces for display on display 1322. For example, the library can be stored in memory of device 1320, stored in memory of device 1300 and accessible to device 1320, and/or stored at an external server accessible to devices 1300 and 1320. In some embodiments, context-specific user interfaces are stored in the library as unique or complete assets. In some embodiments, the library stores context-specific user interfaces as configurations that are rendered for display by device 1320 (e.g., by rendering a set of graphical assets stored in memory according to the configuration, which specifies the particular graphical asset(s) used and their arrangement within the user interface).

In some embodiments, device 1320 enters a user interface or clock face selection mode that allows the user to select a user interface for display. Further descriptions of clock face selection mode may be found in International Patent Application Serial No. PCT/US2015/034607, titled "Context-Specific User Interfaces," filed Jun. 7, 2015, published as WIPO Publication No. WO/2016/022205. This selection mode is illustrated on screen 1322, which includes preview image or representation 1330 that represents a context-specific user interface from the library for display by device 1320. As represented by preview image 1330, the context-specific user interface includes indications of the current time, date, a sinusoidal wave that indicates the path of the Sun through the day, and an affordance representing the current position of the Sun along the path. Preview images 1332 and 1334 from the library are displayed in partial view, indicating to the user that the library contains additional user interfaces. Paging affordance 1336 indicates the total number of user interfaces in the stored library as well as the position of the currently selected user interface (e.g., the user interface represented by 1330) within the library.

FIG. 13 also illustrates a user interface, at device 1300, for selecting, reordering, and/or editing context-specific user interfaces from the stored library for display on device 1320. The user interface screen shown on display 1302 includes depiction 1304 of device 1320, which optionally includes a depiction of device name, size, and/or other device features. In some embodiments, depiction 1304 serves as an affordance that, when contacted by the user, displays additional information and/or functionality related to device 1320, such as options for pairing or de-pairing device 1320 with another electronic device. The user interface screen shown on display 1302 includes complications bar 1306. In some embodiments, complications bar 1306 allows the user to view a list of complications that can be configured for display as part of a context-specific user interface from the library, as well as optional affordances for selecting and/or editing particular complications. In some embodiments, the user scrolls on the depicted user interface screen (e.g., with a horizontal swipe) to view particular complication options. Screen 1302 further includes affordance 1308 for viewing one or more user interfaces from the library. In some embodiments, the user touches affordance 1308, and in response device 1300 displays the user interface illustrated on screen 1302.

Also shown on the user interface screen of display 1302 are preview images 1310, 1312, and 1314. Preview images 1310, 1312, and 1314 represent context-specific user interfaces from the library for display on device 1320. As represented by preview images 1310 and 1312, both corresponding user interfaces include a clock. In addition, the user interface represented by 1312 includes a complication, as described herein. In some embodiments, the preview image(s) are displayed with an associated text element indicating the type of watch face for the corresponding context-specific user interface (e.g., "sun" for the user interface represented by 1310, "utility" for the user interface represented by 1312, etc.). The user interface screens shown on displays 1302 and 1322 indicate to the user what user interfaces are stored in the library and the order or sequence of the user interfaces within the library.

In some embodiments, the preview image includes a representation of one or more complications of the user interface. For example, preview image 1312 includes representation 1316, which represents a complication of the user interface represented by 1312. In this example, representation 1316 represents a complication that displays an affordance representing a weather application. As discussed above, complications can obtain data and display information obtained from an associated application (optionally, the information is updated in accordance with updates to the data). In some embodiments, device 1300 obtains "live" data from the weather application and displays information updated according to updates to the data in representation 1316 (e.g., the sun depicted in 1316 indicates current weather conditions, representing live data obtained from the weather application). Advantageously, this allows the user to visualize how the user interface looks when displayed on device 1320 at the current time. In other embodiments, device 1300 displays a "placeholder" representation of application data. For example, the sun depicted in 1316 can be an icon or affordance that represents to the user the content of the live data that would be displayed in the complication. For example, the placeholder may be installed as part of the app and/or designated as part of a software development kit used to develop the application. Advantageously, this allows the user to understand the function of the complication within the user interface but does not require processor resources and/or communication bandwidth to obtain live data to generate the preview image.

Preview image 1314 is shown in partial view. This alerts the user to the fact that additional preview images representing the rest of the stored library are viewable in this interface, e.g., by scrolling. In some embodiments, the user swipes the display at one or more of preview images 1310, 1312, and 1314 (e.g., a horizontal swipe), and in response to detecting the swipe, device 1300 scrolls the displayed preview images to reveal one or more additional preview images representing user interfaces from the library.

In some embodiments, information in one or more preview images shown on display 1302 and/or 1322 is updated live, e.g., while the user is in face selection mode of device 1320 or viewing preview images at display 1302. For example, in some embodiments, a representation of a clock on one or more of 1310, 1312, 1314, 1330, 1332, and/or 1334 is rendered live, e.g., such that the preview image displays current time. In some embodiments, a representation of one or more complications on one or more of 1310, 1312, 1314, 1330, 1332, and/or 1334 is rendered live, e.g., such that the preview image displays current complication data (e.g., information from an application updated in accordance with updates to application data). In some embodiments, a representation of one or more complications on a currently centered preview image (e.g., displayed in complete view, such as 1310 or 1330) is rendered live, while a representation of one or more complications on a currently non-centered preview image (e.g., displayed in partial view, such as 1312, 1314, 1332 or 1334) is not rendered live (e.g., it displays placeholder data, or data obtained at a previous refresh, such as the last time the represented user interface was displayed, or the last time the preview image was centered on the display). In some embodiments, a representation of one or more complications on a currently centered preview image (e.g., displayed in complete view, such as 1310 or 1330) and representation(s) on preview images immediately adjacent to the currently centered preview image are rendered live (e.g., 1312, 1314, 1332 or 1334), while a representation of one or more complications on a preview image that is not currently centered and not adjacent to a currently centered preview image is not rendered live (e.g., it displays placeholder data, or data obtained at a previous refresh, such as the last time the represented user interface was displayed, or the last time the preview image was centered on the display). In some embodiments, a representation that is not rendered live may be rendered using data updated at a longer interval than a representation that is rendered live. In some embodiments, one or more elements or user interface objects represented in a preview image other than those representing a clock or a complication may be shown as a static element (e.g., not rendered according to updated data).

FIGS. 14A-14D illustrate exemplary electronic device 1300. In some embodiments, device 1300 is one or more of devices 100 (FIG. 1), 300 (FIG. 3), and/or 500 (FIG. 5). For purposes of illustration, first device 1300 is a personal electronic device, similar to portable multifunction device 100 as depicted in FIG. 4A, with a touch-sensitive display 1302. In some embodiments, device 1300 is coupled to a second device (e.g., 1320; not shown), which may be one or more of devices 100 (FIG. 1), 300 (FIG. 3), and/or 500 (FIG. 5). For example, device 1300 can be coupled via wireless communication to a personal electronic device similar to device 1320 or device 500 as depicted in FIG. 5A, with a touch-sensitive display and a rotatable input mechanism.

The techniques illustrated in FIGS. 14A-14F provide user interfaces that allow a user to manage the stored library of context-specific user interfaces for display at another device, e.g., as described above. These techniques allow the user to conserve battery life of the second device by providing an interface for library management at device 1300. In some embodiments, e.g., where device 1300 has a larger display than the second device on which the user interface(s) are displayed (e.g., 1320), these techniques provide enhanced visibility and screen "real estate" for additional functionalities and/or inputs. In some embodiments, they also provide an alternative interface for users with large hands or fine motor skill deficits, who may prefer to use a larger touch-sensitive display and surface for inputs than a smaller screen and/or rotatable input mechanism.

Figure 14A:
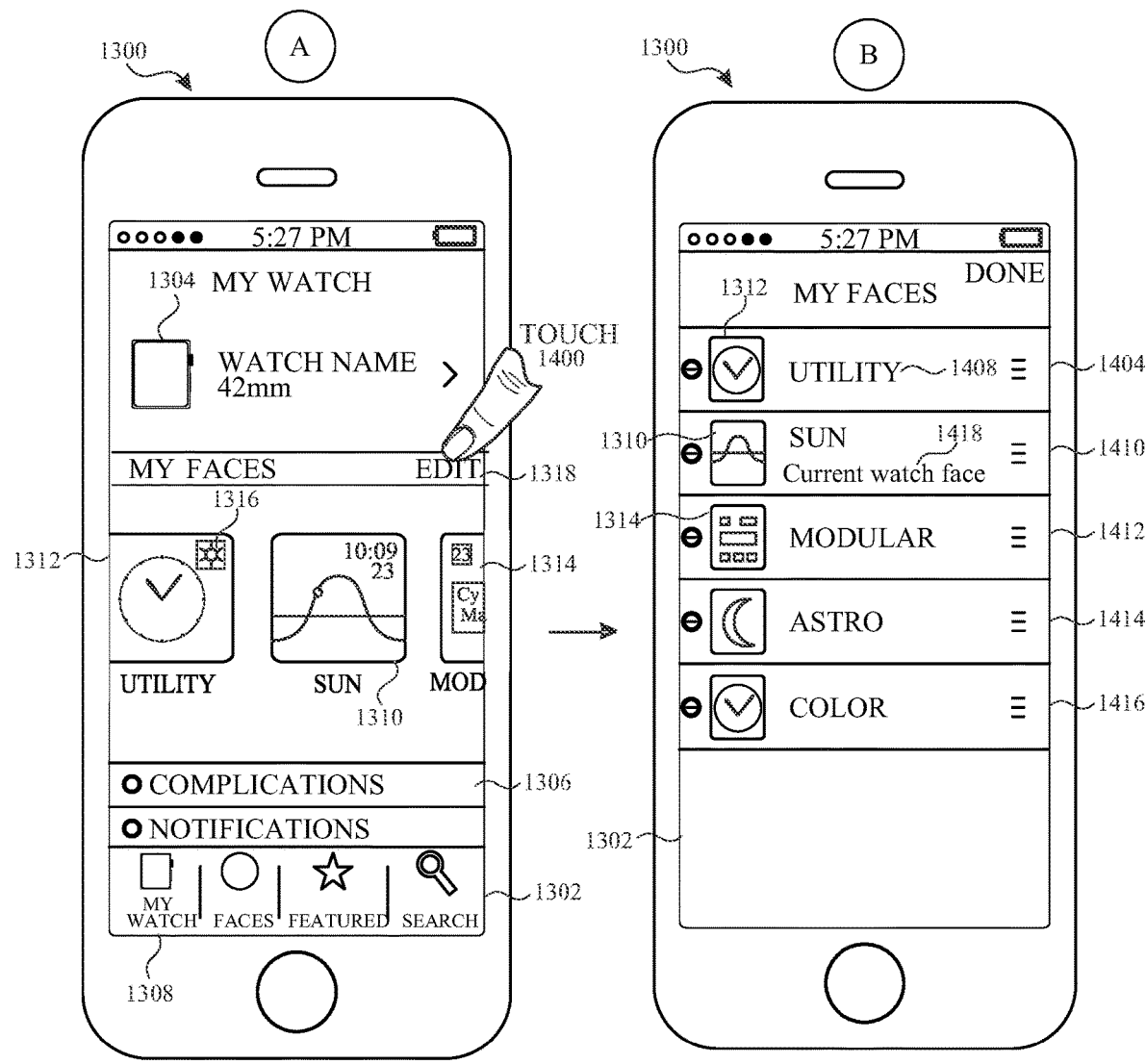
FIGS. 14A-14F illustrate exemplary user interfaces in accordance with some embodiments.

FIG. 14A at (A) illustrates a user interface screen similar to the one shown on display 1302 in FIG. 13. Device 1300 receives a user input corresponding to a user request to reorder the stored library of context-specific user interfaces for display on a second device (e.g., 1320). In this example, the user input is touch 1400 on edit affordance 1318. In response to detecting touch 1400, device 1300 displays the user interface screen shown in FIG. 14A at (B).

The user interface screen shown in FIG. 14A at (B) includes user interface objects 1404, 1410, 1412, 1414, and 1416, representing context-specific user interfaces from the stored library. In some embodiments, each context-specific user interface from the library is represented on the user interface screen, e.g., by a corresponding user interface object (in some embodiments, the user interface screen may be scrollable, e.g., to reveal additional user interface representations). In some embodiments, the order of the user interface objects reflects the order of the represented context-specific user interfaces in the stored library. For example, the order of user interface objects 1404, 1410, and 1412 from top to bottom in FIG. 14A at (B) reflects the order of user interface preview images 1312, 1310, and 1314 from left to right in FIG. 14A at (A), as well as the order of 1332, 1330, and 1334 on device 1320 in FIG. 13. The configuration of the user interface screen shown in FIG. 14A at (B) allows for a larger number of user interfaces from the library to be represented (e.g., all 5 are represented at (B), as compared to 2 full user interface preview images and a partial view of another at (A)), thereby allowing the user to view a larger portion of the stored library for managing.

User interface objects can contain various affordances for identifying and/or modifying the corresponding user interface, and/or its position in the sequence of the stored library. In some embodiments, the user interface screen displays one or more user interface preview images, e.g., 1310, 1312, and 1314, corresponding to user interfaces from the library. In some embodiments, the user interface preview images displayed on the user interface screens shown in FIG. 14A at (A) and (B) are similar, related, or identical. In some embodiments, the user interface preview images shown in FIG. 14A at (B) are modified as compared to those displayed on the user interface screen shown in FIG. 14A at (A), e.g., displayed at a smaller size and/or level of detail. In some embodiments, the user interface screen displays one or more text indications, e.g., such as text element 1408, that indicate the watch face type according to which one or more user interfaces from the library is configured. In some embodiments, the user interface screen includes an indication, e.g., 1418, of the currently selected and/or currently displayed (e.g., on device 1320) user interface.

Figure 14B:
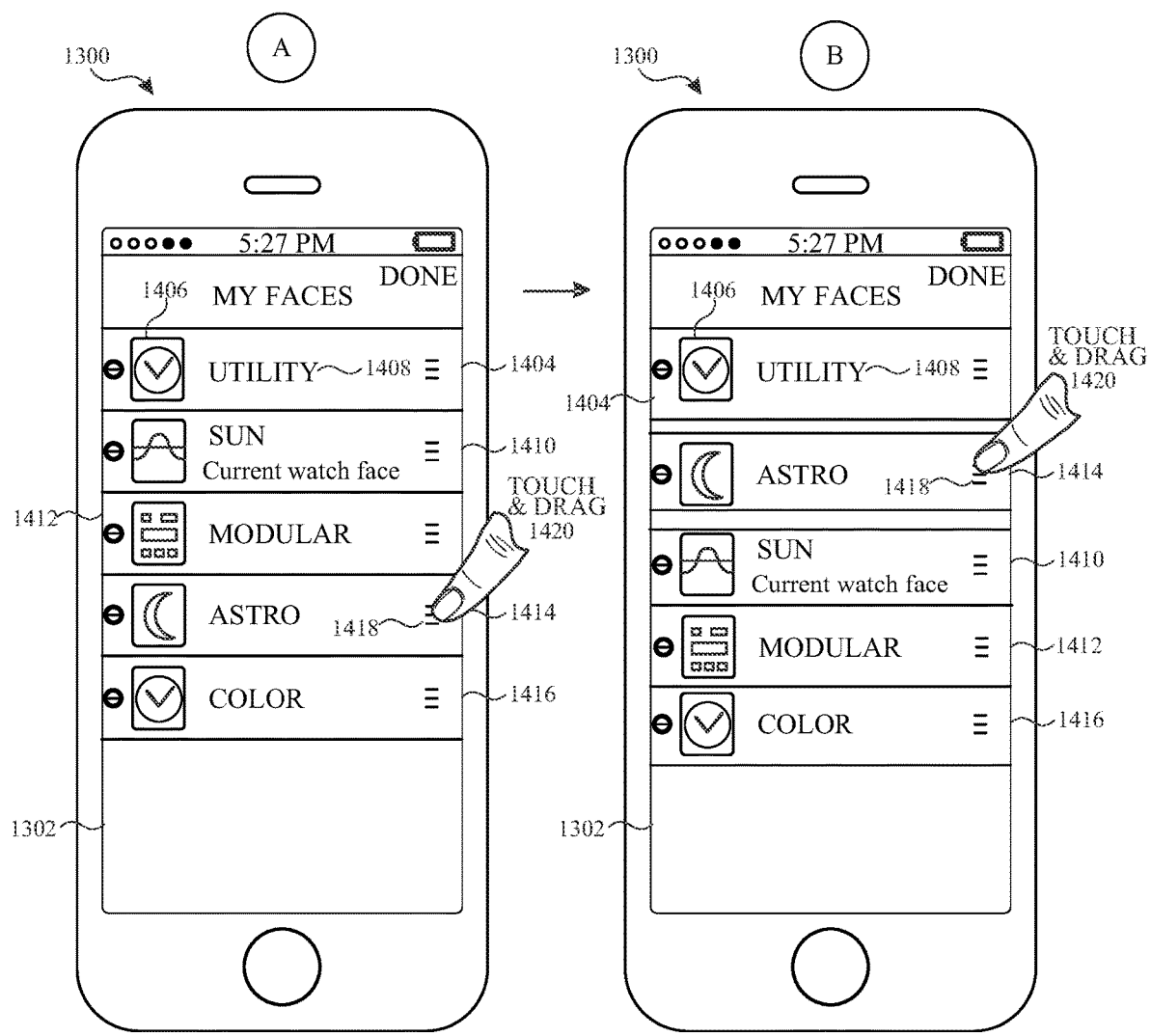

As shown in FIG. 14B at (A), the user provides a user input corresponding to a user request to re-order the stored library. For example, user interface object 1414 (representing the "astro" user interface) includes a re-ordering affordance 1418 displayed in association with (e.g., adjacent to, or in a common, demarcated area of the display with) the corresponding user interface preview image and/or watch face type indication. In some embodiments, the user input is a touch gesture on display 1302, such as touch-and-drag gesture 1420. Device 1300 detects a contact on display 1302 at re-ordering affordance 1418 and, while continuing to detect the contact, detects movement of the contact without a break to a position on display 1302 above user interface object 1410, representing the "sun" user interface of the library. During and/or after the movement of the contact (e.g., touch and drag 1420), device 1300 translates user interface objects 1410, 1412, and 1416 downward on display 1302 to accommodate a concomitant upward movement of 1414. In some embodiments, during touch and drag 1420, user interface object 1414 is displayed as semi-transparent, allowing the user to see the on-screen translation of the other user interface objects, portions of which can be displayed "behind" 1414. During touch and drag 1420, device 1300 translates user interface object 1414 in a direction of the gesture (in this example, upward on-screen; cf. FIG. 14B at (A) and (B)).

Figure 14C:
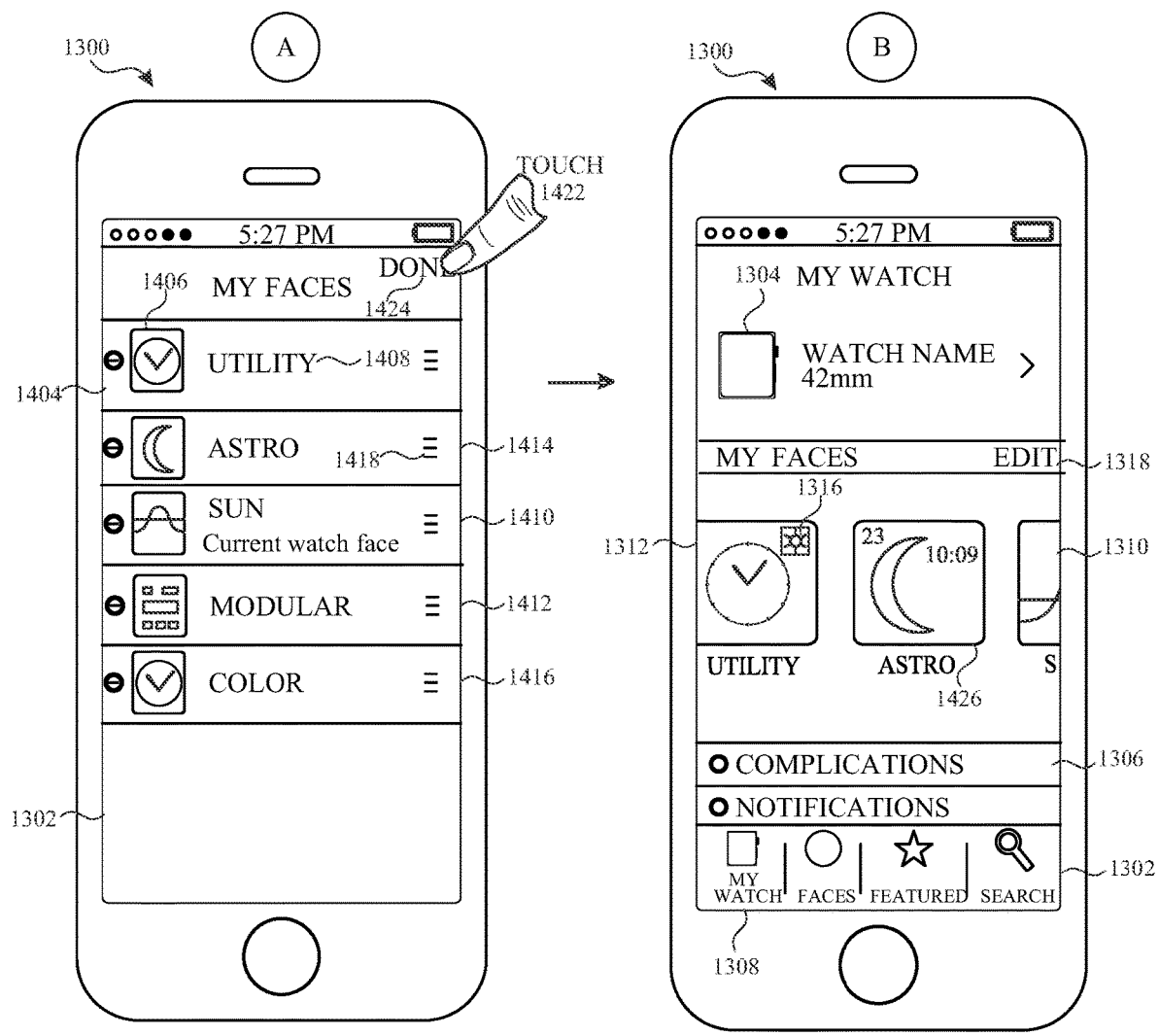

In response to detecting a break in the contact of gesture 1420, device 1300 places user interface object 1414 at a position in the ordered list according to the position of the break of contact and re-orders the subsequent user interface objects accordingly. This is illustrated in FIG. 14C at (A), which shows user interface object 1414 at a re-ordered position between user interface objects 1404 and 1410 on the displayed user interface screen. In some embodiments, the user provides an input for completing editing of the stored library. In this example, the user provides touch 1422 on display 1302 at the location of "done" affordance 1424.

In response to detecting touch 1422, device 1300 displays the user interface screen shown in FIG. 14C at (B). The user interface screen shown in FIG. 14C at (B) is similar to the user interface screen shown in FIG. 14A at (A). However, in FIG. 14C at (B), the user interface screen displays user interface preview image 1426, representing the same user interface from the library as that represented by user interface object 1414. As compared to FIG. 14A at (A), preview image 1426 is now shown between user interface preview image 1312 and a partial view of 1310 at a position that reflects the re-ordering of the library. This position indicates to the user that the user interface represented by 1426 has been re-ordered in the stored library. Device 1300 also sends instructions to the second electronic device (e.g., 1320) for re-ordering the second user interface before the first user interface in the stored library. In some embodiments, device 1300 sends the instructions directly to device 1320. In other embodiments, e.g., if the library is stored at an external server, device 1300 sends the instructions indirectly to device 1320 through the external server or other intermediary device.

Figure 14D:
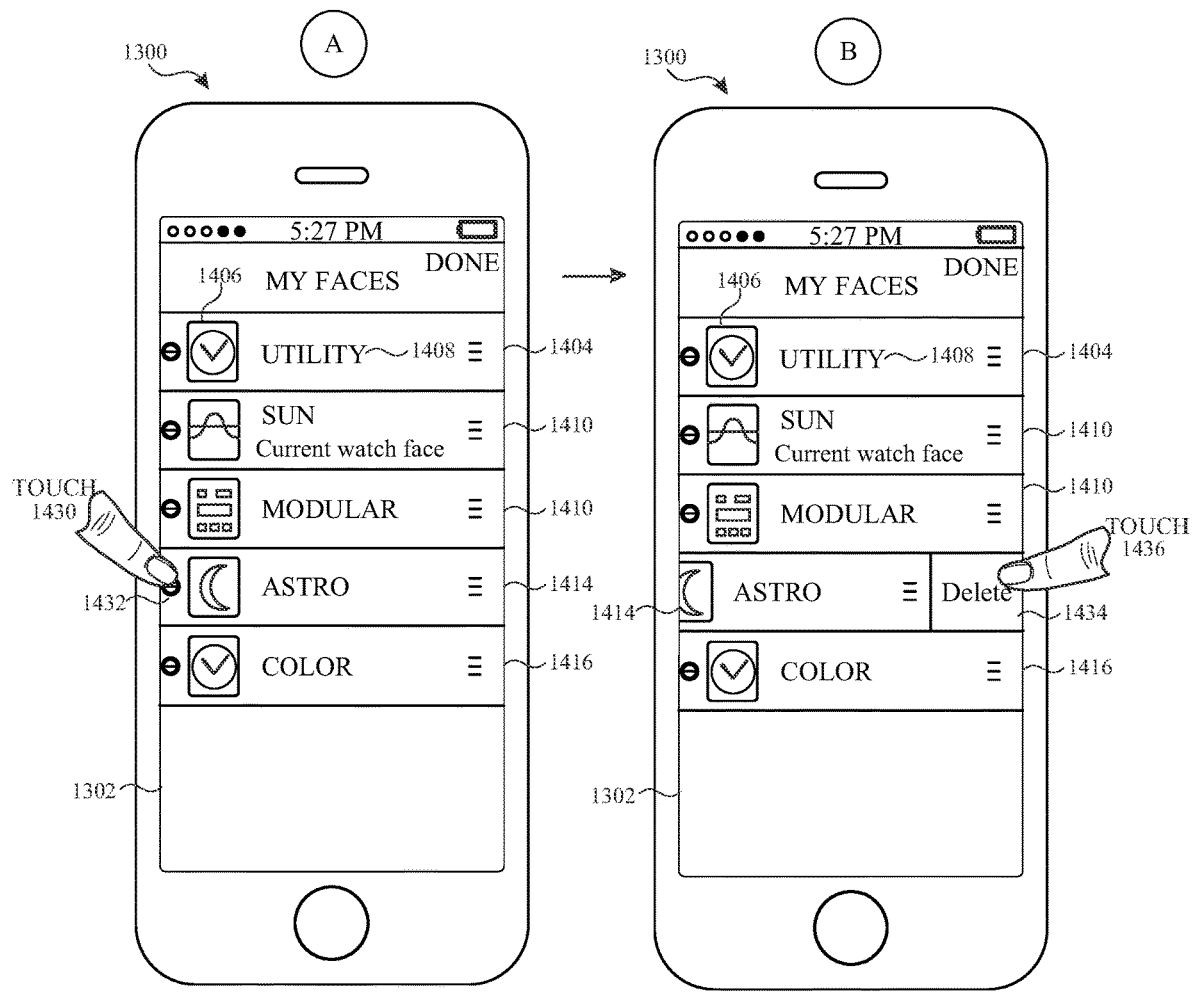

The user can also use the interface to delete a context-specific user interface from the library. FIG. 14D at (A) illustrates a similar user interface screen as compared to FIG. 14A at (B). User interface object 1414 includes affordance 1432 for revealing an edit option displayed in association with (e.g., adjacent to, or in a common, demarcated area of the display with) the corresponding user interface preview image and/or text element. In this example, the user contacts display 1302 with touch 1430 at affordance 1432.

In response to detecting touch 1430, device 1300 displays delete affordance 1434, as shown in FIG. 14D at (B). In some embodiments, one or more components of user interface 1414, such as the associated user interface preview image, text element, and/or re-ordering affordance, as translated on-screen to accommodate the appearance of delete affordance 1434. In this example, the corresponding user interface preview image (e.g., 1414) is translated on-screen such that it is shown in a partial view, aiding the user's understanding that the delete affordance functions to remove the user interface object from the user interface screen and the represented user interface from the library.

Figure 14E:
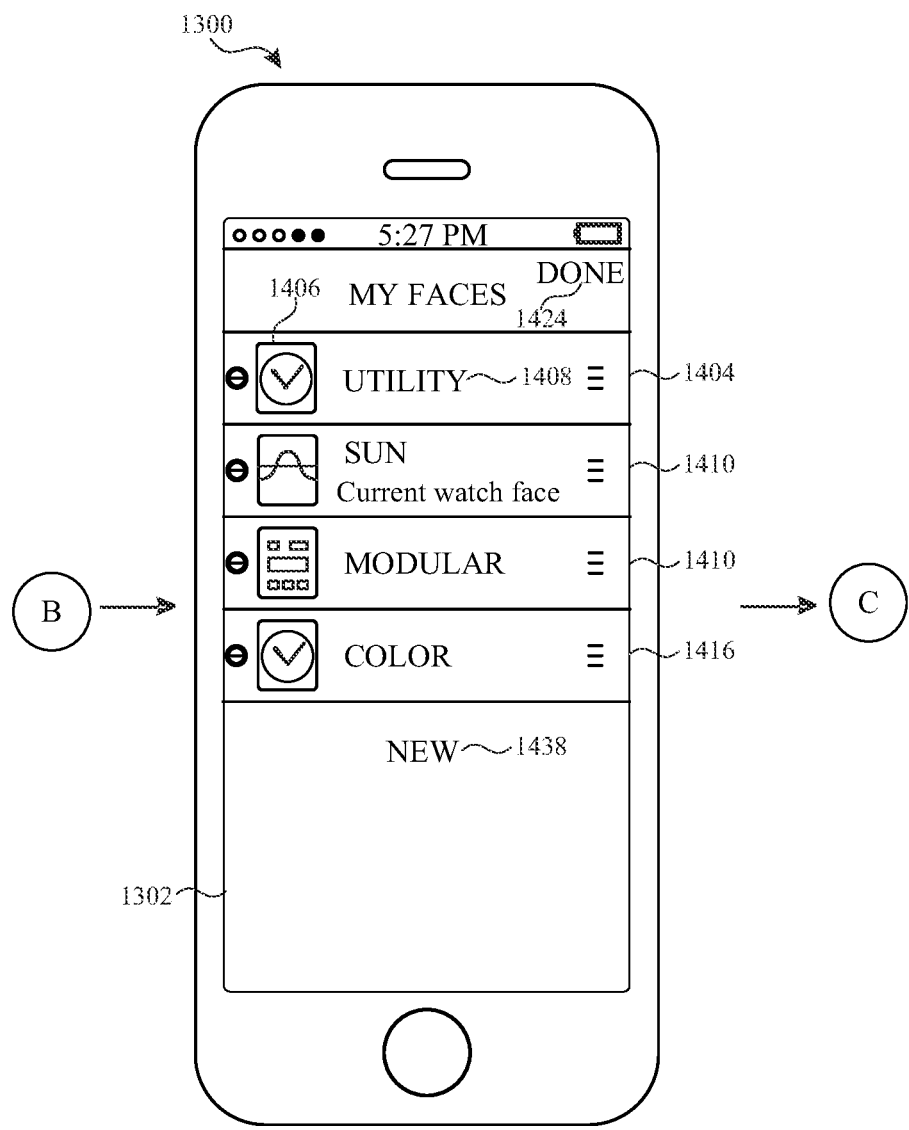

The user provides touch 1436 on the displayed affordance 1434. In response to detecting touch 1436, as shown in FIG. 14E, device 1300 removes user interface object 1414 from the display. In some embodiments, one or more other user interface object(s) (e.g., 1416) are translated on-screen accordingly, e.g., to occupy the former position of 1414. In some embodiments, device 1300 sends instructions to device 1320, as described above, to remove the user interface represented by 1414 from the stored library. In some embodiments, device 1300 sends the instructions after detecting a user touch on a displayed affordance, such as "done" affordance 1424.

In some embodiments, the user interface screen displays a user prompt to add a new user interface to the stored library, e.g., if the user scrolls to the end of the list of user interface images. For example, the user contacts display 1302 at "new" affordance 1438, and in response to detecting the contact, device 1300 displays a new user interface screen that includes a user interface preview image representing a new user interface, optionally with affordances for customizing the watch face type, complications, and other options for the new user interface, as well as an affordance for saving the new user interface as part of the stored library.

Figure 14F:
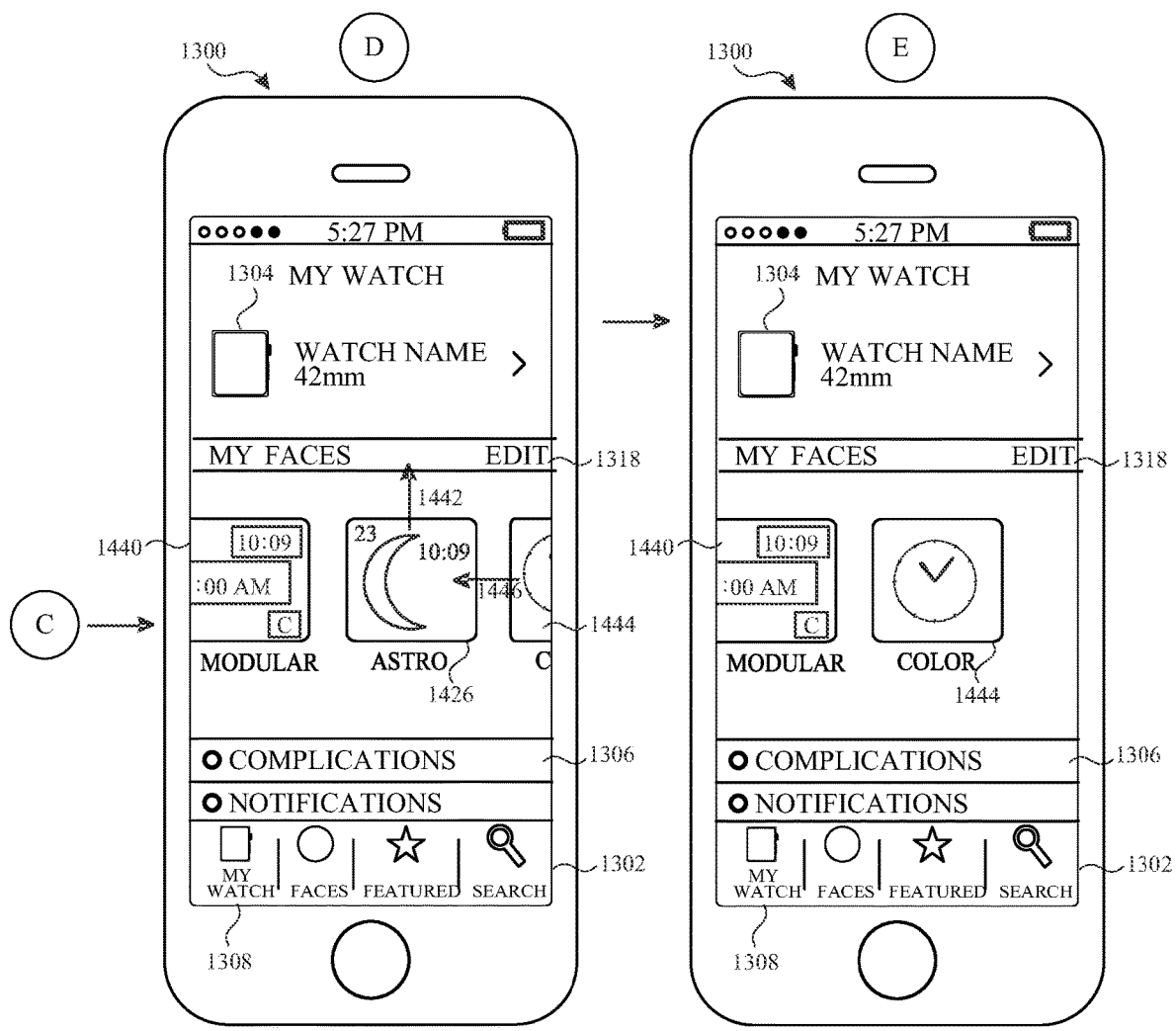

In some embodiments, after detecting the user touch on "done affordance" 1424, device 1300 displays the user interface screen shown on display 1302 in FIG. 14F at (D). This user interface screen includes user interface preview images 1440, 1426, and 1444 in the same order as user interface objects 1410, 1414, and 1416 shown in FIG. 14D at (A), e.g., before the user input to delete the user interface represented by user interface object 1414. Device 1300 animates user interface preview image 1426 to disappear from display 1302, e.g., by animating 1426 to translate away from the row of preview images 1440 and 1444, as depicted by arrow 1442. In some embodiments, device 1300 animates another preview image (in this example, 1444) to translate on-screen, e.g., to occupy the former position of 1426, as depicted by arrow 1446.

Subsequently, as shown in FIG. 14F at (E), device displays a row of user interface preview images that includes 1440 and 1444 (which occupies the former position of 1426) but lacks 1426.

In addition to re-ordering, deleting, and adding user interfaces to the library, it is advantageous to allow the user to edit or customize user interfaces for display on device 1320 at device 1300. These techniques allow the user to conserve battery life of the second device by providing an interface for library management at device 1300. In some embodiments, e.g., where device 1300 has a larger display than the second device on which the user interface(s) are displayed (e.g., 1320), these techniques provide enhanced visibility and screen "real estate" for additional functionalities and/or inputs. They may also provide an easier user interface for users with large hands or fine motor skill deficits, who may prefer a larger touch-sensitive display and surface for inputs than a smaller screen and/or rotatable input mechanism.

Figure 15A:
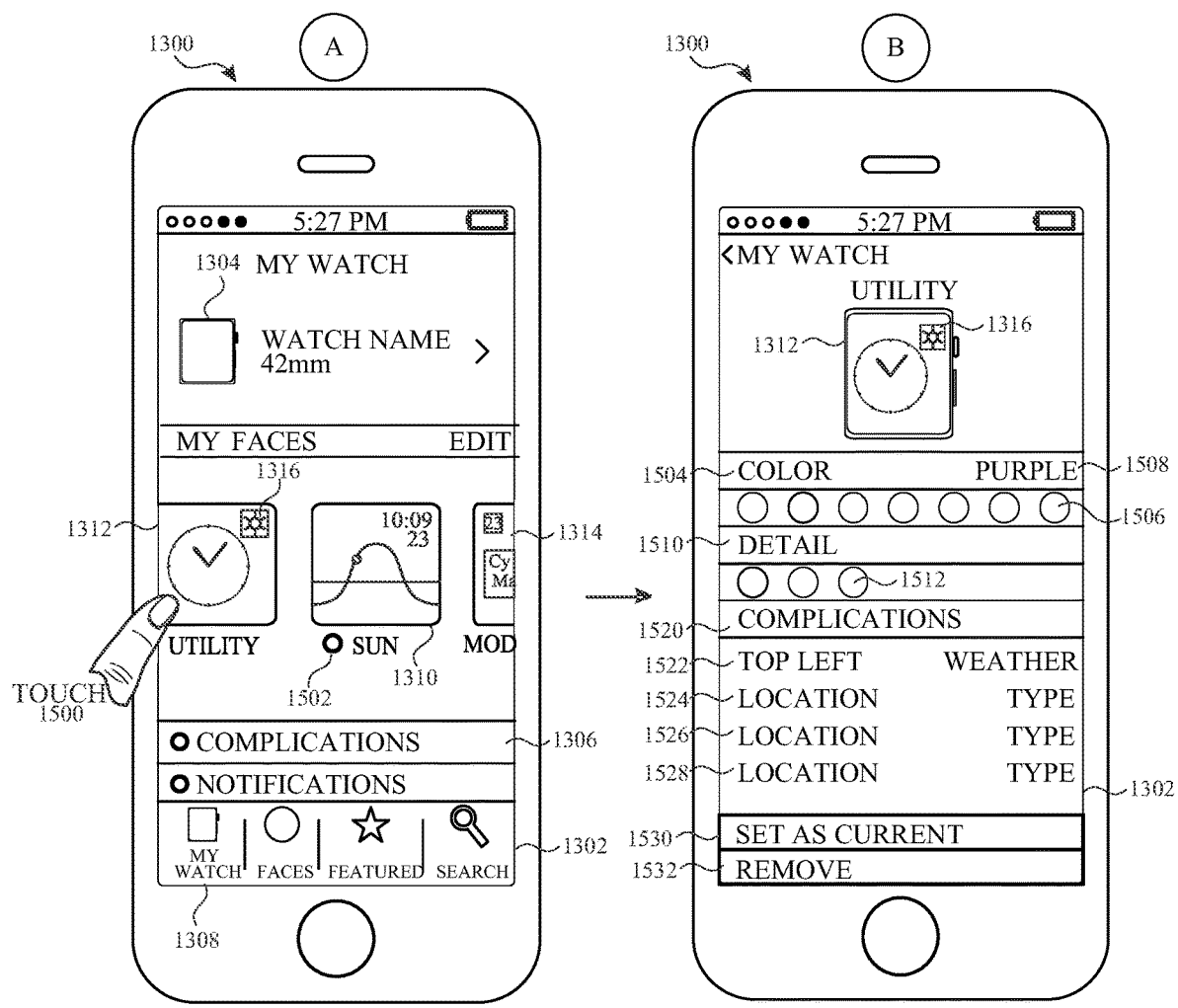
FIGS. 15A-15C illustrate exemplary user interfaces in accordance with some embodiments.

As shown in FIG. 15A at (A), device 1300 displays a user interface screen on display 1302 that includes depiction 1304 of device 1320, complications bar 1306, and affordance 1308 for viewing one or more user interfaces from the library. The user interface screen also includes preview images 1310, 1312, and 1314. The user is able to select a user interface for editing at device 1300 by contacting display 1302 at the corresponding user interface preview image, such as touch 1500 on user interface preview image 1312. In some embodiments, a preview image representing a context-specific user interface that was recently stored in the library (e.g., within the previous day, week, or in the previous user editing session) is indicated by a user interface object, such as dot 1502 displayed in association with preview image 1310.

In response to detecting touch 1500, device 1300 displays the user interface screen shown in FIG. 15A at (B). This user interface allows the user to edit or customize various aspects of user interface(s) from the stored library. For example, the user may customize one or more editable aspects or options described herein in reference to FIG. 10. However, in FIG. 10, the user provides at device 1320 a swipe (e.g., swipe 1056) or other input to view different editable aspects, and movement 1042 of rotatable input mechanism 1040 to view different options for each editable aspect. In the user interface for device 1300 illustrated in FIG. 15A at (B), multiple editable aspects, and their associated options, are presented to the user simultaneously on the same display, thereby promoting the user's understanding of the full scope of available customization options.

The user interface displays one or more editable aspects of the represented user interface, along with one or more options for the one or more editable aspects. As shown in FIG. 15A at (B), display 1302 shows bar 1504 for editing a color of the user interface, along with affordances such as 1506 that indicate options for this editable aspect (e.g., color) of the user interface. Affordance 1506 represents a color option for the represented user interface. In some embodiments, the affordance(s) are displayed in the corresponding color. In some embodiments, the display further includes a text element indicating the currently selected color option, such as indicator 1508. In some embodiments, the number of affordances shown in association with an editable aspect corresponds with the number of available options for each respective aspect (unless the options are too numerous to display at once, in which case the affordances are scrollable to allow the user to navigate through the options).

Display 1302 in FIG. 15A at (B) also shows bar 1510 for editing an amount of detail or display density of the corresponding user interface. Displayed in association with bar 1510 are affordances such as affordance 1512, each representing a detail option for the corresponding user interface. In some embodiments, affordance 1512 displays a representation of the user interface configured according to the corresponding detail option. In some embodiments, affordance 1512 displays a representation of an aspect of the user interface configured according to the corresponding detail option, such as a clock face with a certain number or type of hour indicators.

Display 1302 in FIG. 15A at (B) also shows bar 1520 for editing one or more complications of the user interface. For example, affordances 1522, 1524, 1526, and 1528 represent available complication slots or platters of the user interface and indicate the currently selected complication option for each slot or platter (which may include not displaying a complication at the slot or platter). These indicate to the user how many complication slots or platters are configurable for display on the user interface according to the corresponding watch face type, as well as the currently selected options for each slot or platter. Affordance 1522 indicates the position of the corresponding complication on the user interface (e.g., "top left") and an application represented by the complication (e.g., "Weather" application).

Figure 16A:
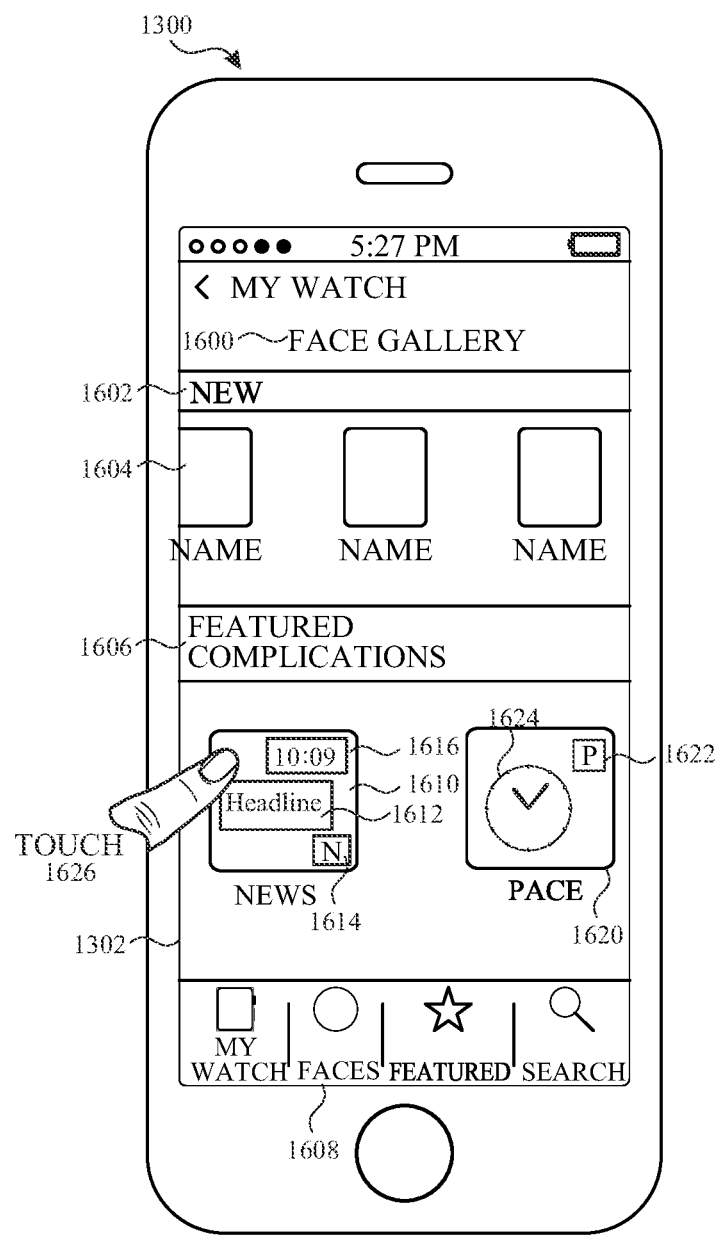
FIGS. 16A-16C illustrate exemplary user interfaces in accordance with some embodiments.
Figure 16B:
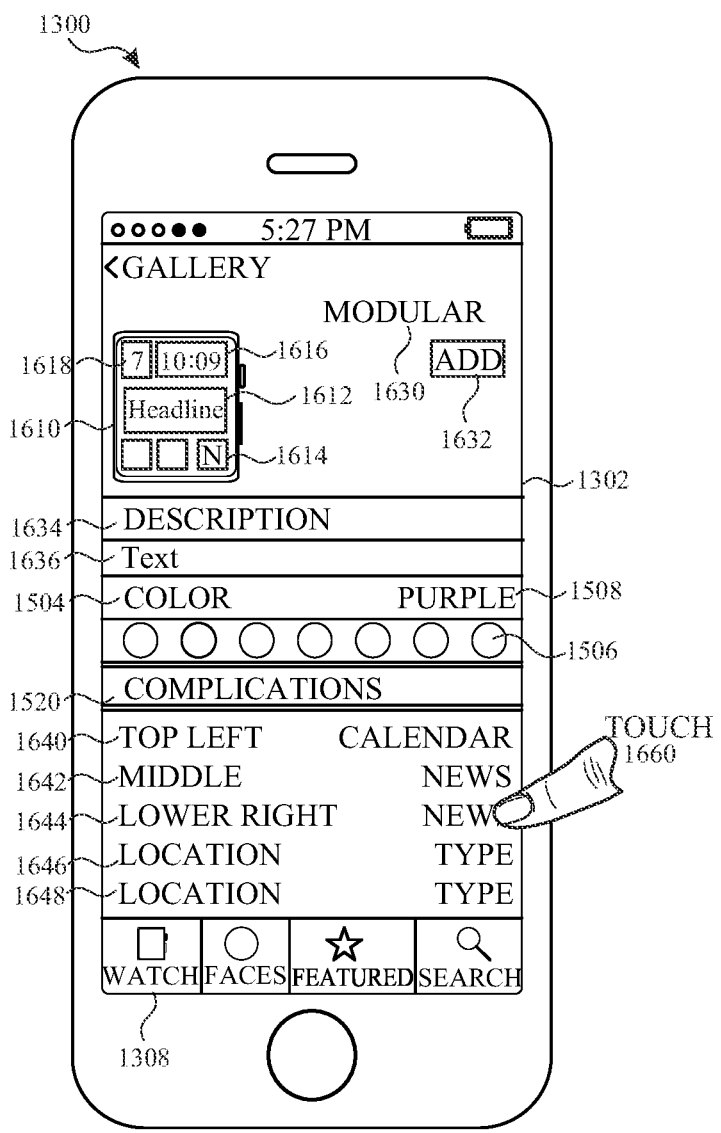

In some embodiments, the user contacts display 1302 at affordance 1522 to edit the indicated complication slot or platter (e.g., as illustrated in FIG. 16B with touch 1660). In response to detecting the contact, device 1300 expands a scrollable menu on display 1302 in which the user swipes horizontally to scroll through the available applications, and optionally contacts a "done" affordance to select a particular option. In some embodiments, the scrollable menu includes one or more applications installed on device 1320 for which a complication is available.

Display 1302 in FIG. 15A at (B) also shows affordance 1530 for setting the presently selected and configured user interface as the current user interface, e.g., of device 1320. In some embodiments, in response to detecting a contact at affordance 1530, device 1300 sends instructions to device 1320 for displaying the represented user interface, e.g., as configured on display 1302. In some embodiments, device 1320 displays the user interface after receiving the instructions. In some embodiments, device 1320 displays the user interface the next time display 1322 is activated. In some embodiments, e.g., if a context-specific user interface is currently displayed on display 1322, device 1320 animates a transition from the previous user interface to the presently selected and configured user interface. In some embodiments, device 1300 sends instructions to device 1320 for providing a haptic output, thereby indicating to the user that the context-specific user interface has changed.

Display 1302 in FIG. 15A at (B) also shows affordance 1532 for removing the selected user interface from the library. In some embodiments, in response to detecting a contact at affordance 1532, device 1300 sends instructions to device 1320 for removing the user interface from the stored library. In some embodiments, in response to detecting a contact at affordance 1532, device 1300 displays a customization page corresponding to a different user interface, e.g., one adjacent to the removed user interface in the library. In some embodiments, in response to detecting a contact at affordance 1532, device 1300 re-displays the user interface screen as illustrated in FIG. 15A at (A), with the re-displayed user interface screen lacking preview image 1312 representing the deleted user interface.

As shown in FIG. 15A at (B), the display includes a preview image of the context-specific user interface currently selected for editing, e.g., 1312. In some embodiments, the preview image visually distinguishes a current aspect for editing, e.g., by highlighting, outlining, or animating the selected element; or dimming one or more non-selected elements. In some embodiments, the preview image is a "live" representation of the user interface that is updated in response to user customization. In some embodiments, user selection of a different option for an editable aspect of the represented user interface causes an animated transition on the preview image from the former option to the currently selected option. For example, a color change of a seconds hand can be animated as a color change originating from the center of the clock face outwards. In some embodiments, the animated transition appears on display 1302 in a different manner than an animated transition between the same options on display 1322. In some embodiments, the user swipes the display (e.g., a lateral swipe, or in some embodiments a lateral swipe originating at a bezel of display 1302) to view and/or edit a different context-specific user interface from the library.

Preview image 1312 also includes representation 1316, which represents a complication on the corresponding user interface. In some embodiments, representation 1316 is updated in response to user customization. For example, the user can change the application represented by the complication, which in turn leads to update of representation 1316 to represent the currently selected application (e.g., by displaying "live" application data or a placeholder representation of application data, as described herein). In some embodiments, the transition of representation 1316 from one application to another is animated as a slot machine-style rollover of displayed content.

Figure 15B:
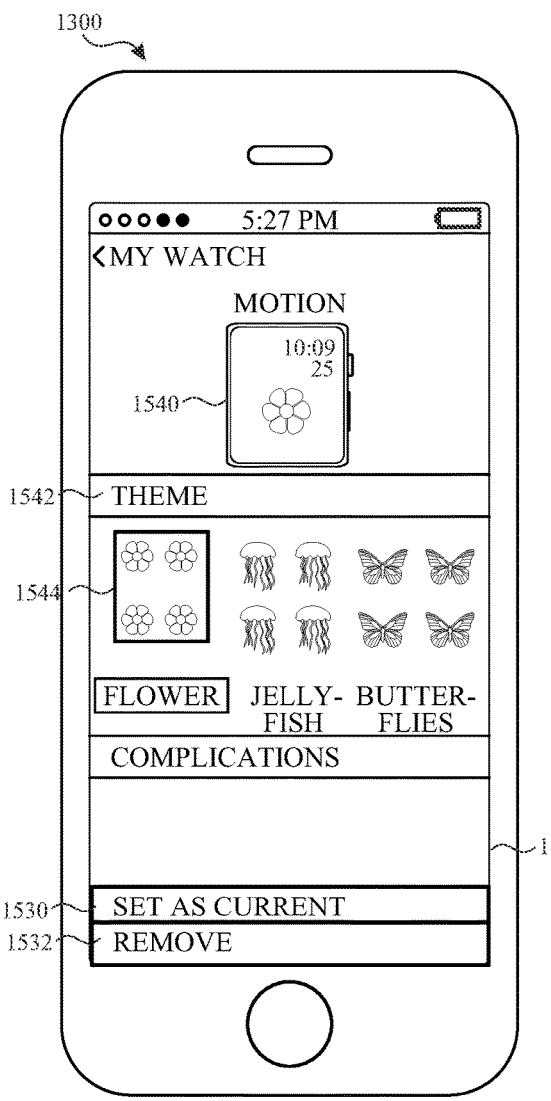
Figure 15C:
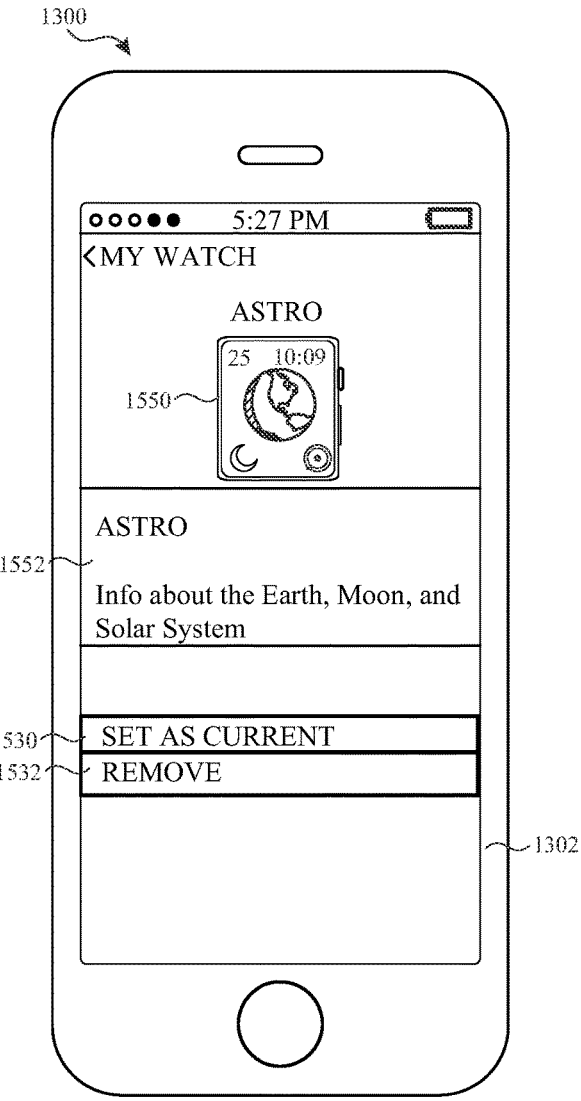

FIGS. 15B and 15C display user interface screens for editing context-specific user interfaces configured according to other watch types at device 1300. The user interface shown in FIG. 15B on display 1302 shows an editing interface for customizing a user interface that displays animated video segments, e.g., as described in reference to FIGS. 9A and 9B. User interface preview image 1540 shows a representation of a user interface with displays of the time, date, and an animated flower. Bar 1542 indicates to the user various selectable options for the theme or animated item of the user interface. Displayed in association with bar 1542 are affordances including affordance 1544 that indicate options for editing the theme or animated object (in this example, a flower, jellyfish, or butterfly). In this example, the option represented by affordance 1544 is highlighted, e.g., by a displayed outline, indicating that this option is the currently selected option for this aspect.

The user interface shown in FIG. 15C on display 1302 shows an editing interface for customizing a user interface that displays astronomical information. User interface preview image 1550 shows a preview image representing a user interface that displays the time, date, a representation of the Earth, and affordances representing the Moon (for accessing lunar data) and the Solar System (for accessing data related to other planets in the Solar System). Text element 1552 provides a brief description of the functionalities for this watch face type. In this example, text element 1552 indicates that the "astro" watch face type displays information about the Earth, Moon, and Solar System, thereby informing the user about the available functionalities of the user interface.

While FIGS. 15A-15C show exemplary editable aspects for context-specific user interfaces, other editable aspects are contemplated. For example, the user can edit a timescale of a displayed stopwatch affordance, e.g., on the user interfaces described in reference to FIGS. 8A and 8B, a displayed image or designated folder or album from which displayed images are obtained (e.g., for display as a user interface background), the type and/or appearance of a character user interface object, and so forth. In some embodiments, the user is able to crop an image, e.g. for display as a user interface background.

In addition to allowing the user to configure, add, delete, and/or reorder user interfaces already stored in the library of context-specific user interfaces, it is also advantageous to provide suggestions to the user for new user interfaces and/or complications for display on a second device (e.g., device 1320) that are not already represented in the library. For example, if the user frequently uses an application configured for use on device 1300, they may wish to use a corresponding version of the application configured for use on device 1320. A user may be unaware of particular watch face types or configurations thereof that are available for use on device 1320. Techniques for suggesting new user interfaces (e.g., not already represented in the stored library) are therefore desirable and provide for more convenient user access to the full range of available applications and/or functionalities at an electronic device (e.g., 1320).

FIG. 16A illustrates exemplary electronic device 1300. In some embodiments, device 1300 is one or more of devices 100 (FIG. 1), 300 (FIG. 3), and/or 500 (FIG. 5). For purposes of illustration, first device 1300 is a personal electronic device, similar to portable multifunction device 100 as depicted in FIG. 4A, with a display 1302 (e.g., a touch-sensitive display). In some embodiments, device 1300 is coupled to a second device (e.g., 1320), which may be one or more of devices 100 (FIG. 1), 300 (FIG. 3), and/or 500 (FIG. 5). For example, device 1300 can be coupled via wireless communication to a personal electronic device similar to device 1320 or device 500 as depicted in FIG. 5A, with a touch-sensitive display and a rotatable input mechanism.

In FIG. 16A, device 1300 displays an exemplary user interface screen on display 1302. The user interface screen includes indicator 1600, which indicates to the user that the user interface screen represents a gallery of potential context-specific user interfaces for display on device 1320. The user interface screen also displays affordance 1608, which the user can contact to access the user interface screen illustrated in FIG. 16A (e.g., by contacting the displayed affordance 1608). Bar 1602 indicates one or more context-specific user interfaces that are "new," or configured according to one or more watch face types that were recently installed in memory of device 1320. For example, in some embodiments, these watch face types were installed in the previous day, week, or other predetermined period of time; and/or in the latest operating system update installed at device 1320. Displayed as associated with bar 1602 are one or more user interface preview images (e.g., preview image 1604) representing user interfaces configured according to the one or more new watch face types. Importantly, in some embodiments, the preview images represent context-specific user interfaces that are not already stored in the library of context-specific user interfaces for display on device 1320. In some embodiments, the user interface in FIG. 16A is accessible on device 1300 even if it is not paired or coupled via wireless communication to device 1320. Thus, the user interface displays options that inform the user about the available functionalities of device 1320 even if the user does not own device 1320 or has not yet paired device 1320 with device 1300.

The user interface screen also displays bar 1606, which indicates to the user that the represented user interfaces include featured complications. This provides an opportunity to introduce to the user new, or not currently used or configured, complications for use on device 1320, e.g., through inclusion in one or more context-specific user interfaces. This user interface serves to introduce the user to new or not currently used (e.g., represented in the stored library of context-specific user interfaces) complications, watch face types, and/or combinations thereof.

Displayed in association with bar 1606 are user interface preview images 1610 and 1620. Preview images 1610 and 1620 represent context-specific user interfaces for display on device 1320. Importantly, in some embodiments, the preview images represent context-specific user interfaces that are not already stored in the library of context-specific user interfaces for display on device 1320.

The user interfaces represented by 1610 and 1620 both include a clock. This is depicted by representation 1616 of a digital clock as part of preview image 1610 and representation 1624 of an analog clock as part of preview image 1620. The user interfaces represented by 1610 and 1620 are both configured according to a watch face type, which includes, e.g., the type of available clock options; a number, size, position, and/or content of available complication slot(s) or platter(s); and/or other optional, configurable elements (e.g., character user interface objects, animated objects, astronomical information, etc.).

The user interfaces represented by 1610 and 1620 both include one or more complications. This is depicted by complication representations 1612 and 1614 as part of preview image 1610 and complication representation 1622 as part of preview image 1620. As described above, in some embodiments, the preview image represents the same features that would be displayed as part of the represented context-specific user interface on device 1320. For example, if a complication obtains live application data and displays information updated in accordance with updates to the data, the complication representation also displays the information. In other embodiments, the preview image schematically represents the features that would be displayed as part of the represented context-specific user interface on device 1320 without using the same features. For example, if a complication obtains live application data and displays information updated in accordance with updates to the data, the complication representation displays placeholder data that indicates to the user the type of data that would be displayed without requiring use of wireless bandwidth and/or processor resources to obtain live data.

In some embodiments, the user swipes display 1302 at user interface preview image 1610 and/or 1620, and in response device 1300 scrolls 1610 and/or 1620 on-screen to reveal additional preview images representing context-specific user interfaces for display 1320, e.g., selected according to one or more criteria described herein.

User interface preview images 1610 and 1620 represent respective context-specific user interfaces that are selected by device 1300 for display based at least in part on one or more criteria described herein. It is contemplated that various criteria described herein may be combined and/or weighted according to various algorithm(s) and/or weighting schema using the guidance provided by the present disclosure. Exemplary criteria for selection are described infra.

In some embodiments, a selected user interface is configured according to a watch face type not currently represented in the library. For example, preview image 1610 represents a user interface configured according to a modular watch face type, and the user does not have a context-specific user interface configured according to the modular watch face type saved in the library.

In some embodiments, a selected user interface is configured with a complication that is not currently represented in a user interface saved in the library. For example, preview image 1610 represents a user interface configured with two complications associated with a news application (e.g., as depicted by representations 1612 and 1614), and the user does not have a user interface with a news complication saved in the library.

In some embodiments, a selected user interface is configured with a complication associated with an application for use on device 1320 that corresponds with an application installed on device 1300. For example, corresponding versions of the news application may be configured for use on a desktop or laptop, tablet, phone, or smartwatch. A user may use the application on one type of device and be unaware that a corresponding version of the application is configured for use and available for another type of device. In this example, preview image 1610 represents a user interface configured with two complications associated with a news application (e.g., as depicted by representations 1612 and 1614). The user has installed on device 1300 a version of the application configured for use on device 1300, but has not installed a corresponding version on device 1320 configured for use on device 1320.

In some embodiments, one or both of the user interfaces represented by preview images 1610 and 1620 are selected according to the criteria described herein. In some embodiments, the user interfaces represented by preview images 1610 and 1620 are independently selected according to criteria described herein. In some embodiments, the user interfaces represented by preview images 1610 and 1620 include representations of different complications, such as complications associated with different applications (e.g., news and pace). In some embodiments, the user interfaces represented by preview images 1610 and 1620 are configured according to different watch face types (e.g., modular and utility).

In some embodiments, a selected user interface is configured with a complication associated with an application for use on device 1320 that corresponds with an application installed on device 1300, but the application for use on device 1320 is not currently installed on device 1320. In this example, the user has installed a version of the news application configured for use on device 1300, but not the version configured for use on device 1320.

In some embodiments, a selected user interface is configured with a complication associated with an application for use on device 1320 that corresponds with an application installed on device 1300, and the application for use on device 1320 was installed on device 1320 within a predetermined period of time. In this example, the user has installed the version of the news application configured for use on device 1300 and recently installed on device 1320 the version configured for use on device 1320. In another example, a new complication for use on device 1320 representing an application with a corresponding application installed at device 1300 has recently been installed as part of an operating system or application update on device 1320.

In some embodiments, a selected user interface is configured with a complication associated with an application for use on device 1320 that corresponds with an application installed on device 1300, and the corresponding application on device 1300 was installed within a predetermined period of time. In this example, the user has recently installed the version of the news application configured for use on device 1300.

In some embodiments, a selected user interface is configured with a complication associated with a designated application for use on device 1320. In this example, the news application is part of a curated or sponsored list of applications for use on device 1320, e.g., as designated by an application store, website, or other external server from which the corresponding application is downloaded.

In some embodiments, a selected user interface is configured with a complication associated with an application for use on device 1320 that corresponds with an application installed on device 1300, and the corresponding application is used above a predetermined frequency on device 1300. In this example, the user frequently uses the version of the news application configured for use on device 1300.

In some embodiments, device 1300 selects a prioritized list of user interfaces to present to the user (e.g., via user interface preview images). For example, the row of user interface preview images shown by 1610 and 1620 can be part of the list. Optionally, the order in which preview images are displayed reflects an order of prioritization. In some embodiments, a user interface of the list is prioritized, e.g., moved up within the prioritized list, based at least in part on one or more of the criteria described herein.

In some embodiments, a user interface of the list is de-prioritized, e.g., moved down within the prioritized list, based on one or more de-prioritization criteria in any combination and/or according to any weighting schema and/or algorithm. For example, in some embodiments, a user interface of the list is de-prioritized because the user interface is already represented in the stored library. In some embodiments, a user interface of the list is de-prioritized because it includes a complication that is already represented in a user interface of the library. In some embodiments, the complication is already represented in a user interface configured according to the same watch face type as the de-prioritized user interface. In some embodiments, a user interface of the list is de-prioritized because a user interface of the same watch face type is adjacent to the de-prioritized user interface in the list (e.g., to avoid presenting to the user two preview images representing two watch faces of the same type adjacent on the display). Advantageously, these criteria prioritize the presentation of user interfaces with newer and/or unused features to the user.

The user interface selected by device 1300 and represented by preview image 1610 contains a complication associated with the news application. The user interface is also configured according to a watch face type (in this example, a "modular" watch face with a digital clock and 5 complication slots or platters that has editable aspects including color and application(s) associated with the complications). In some embodiments, device 1300 selects the watch face type of a user interface (e.g., the user interfaces represented by preview images 1610 and 1620, and/or one or more user interfaces that are part of a prioritized list) based at least in part on one or more watch face type criteria, e.g., as described infra. It will be appreciated that such criteria may be combined or weighted according to various algorithm(s) and/or weighting schema. Inter alia, these criteria help to present to the user new complications as part of context-specific user interface(s) configured according to watch face types in which the user has already demonstrated interest, thus improving the potential for user satisfaction.

In some embodiments, a watch face type is selected because the application (e.g., configured for use on device 1320) associated with a complication of the user interface is supported for use in the selected watch face type. An application can be supported and/or configured for use in a particular complication slot or platter, but not another. For example, a complication can have certain constraints related to the type or amount of displayed data, and an application can be supported for use in association with a complication according to certain complication configuration(s).

In some embodiments, a watch face type is selected because the watch face type is represented in one or more user interfaces already in the library. In some embodiments, a watch face type is selected because one or more user interfaces configured according to the selected watch face type are displayed by device 1320 (e.g., on display 1322) above a predetermined frequency. For example, the user frequently uses one or more context-specific user interfaces configured according to a "modular" watch face type, so device 1300 presents a featured complication as part of a user interface configured according to that watch face type. In some embodiments, a watch face type is selected because one or more user interfaces configured according to the selected watch face type were displayed by device 1320 (e.g., on display 1322) within a predetermined period of time. For example, the user has used one or more context-specific user interfaces configured according to a "modular" watch face type recently, so device 1300 presents a featured complication as part of a user interface configured according to that watch face type.

In some embodiments, a watch face type is selected because one or more user interfaces in the library of the same watch type have been edited by the user (e.g., at device 1300 and/or device 1320 as described herein). For example, the user has edited a complication of a user interface of the same watch type, thereby indicating interest in that watch face type and/or awareness that the watch face type can be edited as described herein.

In some embodiments, a watch face type is selected because the library does not already include a user interface configured according to the same watch face type with the same complication. Alternatively, the presence in the library of a user interface configured according to the same watch face type with the same complication may serve as a de-prioritization criterion for selection of a watch face type. For example, the user has already stored a user interface with a news complication configured according to a "modular" watch face type.

The user selects the user interface represented by preview image 1610 with touch 1626 on display 1302. In response to detecting touch 1626, device 1300 displays the user interface screen illustrated on display 1302 in FIG. 16B. This user interface screen provides the user with information about the editable aspects, selectable options for the editable aspects, watch face type, and other characteristics of the represented user interface. This provides a platform for educating the user about the selected user interface, which in some embodiments is not already stored in the library, and for editing a new context specific user interface before storing it in the library. In some embodiments, in response to detecting touch 1626, device 1300 sends instructions to device 1320 to add the context-specific user interface represented by 1610 to the library and/or display the context-specific user interface represented by 1610 on display 1322.

The user interface screen shown in FIG. 16B includes preview image 1610 with representations 1612, 1614, 1616, and 1618. In some embodiments, as described above in reference to FIG. 15A at (B), one or more of preview image 1610 and/or representations 1612, 1614, 1616, and 1618 is updated in response to user selection of an option for one or more editable aspects of the represented user interface.

The user interface screen shown in FIG. 16B also includes indication 1630, which indicates the watch face type of the user interface represented by 1610 (in this example, "modular"). The user interface screen also includes selection affordance 1632. In some embodiments, the user contacts display 1302 at selection affordance 1632 to select the user interface represented by 1610. In some embodiments, in response to detecting the contact at selection affordance 1632, device 1300 sends instructions to device 1320 to display the context-specific user interface represented by 1610 (e.g., as configured on the user interface screen illustrated in FIG. 16B) on display 1322. In some embodiments, in response to detecting the contact at selection affordance 1632, device 1300 sends instructions to device 1320 to add the context-specific user interface represented by 1610 (e.g., as configured on the user interface screen illustrated in FIG. 16B) to the library. In some embodiments, the context-specific user interface represented by 1610 (e.g., as configured on the user interface screen illustrated in FIG. 16B) is added to the library at a first position in the sequence of the library. In some embodiments, in response to detecting the contact at selection affordance 1632, device 1300 animates preview image 1610 to move on-screen toward affordance 1308 for viewing one or more user interfaces from the library. This indicates to the user that the selected user interface has been added to the stored library (representations of which are accessible for viewing by contacting affordance 1308, which in some embodiments leads to the display of a user interface screen similar to that shown in FIG. 14A at (A)).

In some embodiments, in response to detecting the contact at selection affordance 1632, device 1300 determines whether the represented user interface includes a complication associated with an application that is not currently installed on device 1320. For example, the user interface may have been selected at least in part based on a criterion that the user interface is configured with a complication associated with an application for use on device 1320 that corresponds with an application installed on device 1300, but the application for use on device 1320 is not currently installed on device 1320. In some embodiments, in accordance with a determination that the represented user interface does not include a complication associated with an application that is not currently installed on device 1320, device 1300 sends instructions to device 1320 to store the user interface in the library and/or display the user interface on display 1322.

In some embodiments, device 1300 has a setting that allows the user to select whether to automatically install the application or first display a prompt to install the application. In some embodiments, in accordance with a determination that the represented user interface includes a complication associated with an application that is not currently installed on device 1320, device 1300 sends instructions to device 1320 for installing the application in the memory of device 1320 (e.g., from an external server). In some embodiments, this means that device 1320 installs the application automatically in the background, e.g., without alerting the user. In some embodiments, in accordance with a determination that the represented user interface includes a complication associated with an application that is not currently installed on device 1320, device 1300 displays a user prompt on display 1302 for installing the application configured for use on device 1320 (e.g., a displayed "install" affordance). In some embodiments, in response to detecting a contact on the displayed "install" affordance, device 1300 sends instructions to device 1320 for installing the application in the memory of device 1320 (e.g., from an external server). In some embodiments, this means that device 1320 installs the application automatically in the background, e.g., without alerting the user. In some embodiments, the application is installed directly by device 1320, by instructing device 1320 to install the application via device 1300, or by device 1300 obtaining the application configured for use on device 1320 and then sending the application to device 1320 for installation.

The user interface screen shown in FIG. 16B also includes description bar 1634 and text element 1636. In some embodiments, text element 1636 includes a description of the watch face type according to which the user interface represented by preview image 1610 is configured. Text element 1636 includes description(s) that help the user understand the functionalities of the corresponding watch face type, e.g., in the event that the watch face type has not been used previously on device 1320.

The user interface screen shown in FIG. 16B also includes editable aspect bar 1504 (in this case, the aspect is a color of the user interface), one or more affordances (e.g., 1506) indicating options for the editable aspect (in this case, color options), and text element 1508 that provides a text description of an available option (e.g., a currently selected option). In some embodiments, the news application has a designated color associated with the complication when displayed as part of the context-specific user interface (e.g., on display 1322 of device 1320). For example, the designated color may be a "hero" or predominant color designated during development of the application as part of a software development kit. In some embodiments, device 1300 selects a color for the selected watch face type (e.g., a color indicated by 1506 and/or 1508) based at least in part on the designated color. For example, the selected color may be part of the discrete set of graphical assets used in configuration of the context-specific user interface. In some embodiments, the selected color matches the designated color. In some embodiments, the selected color is the closest color, e.g., as part of the discrete set of graphical assets in memory of device 1320, to the designated color.

The user interface screen shown in FIG. 16B also includes complications bar 1520 and associated affordances 1640, 1642, 1644, 1646, and 1648 that represent available complication slots or platters of the user interface and indicate the currently selected complication option for each slot or platter (which may include not displaying a complication at the slot or platter). Affordance 1640, as represented by representation 1618, indicates that the top left complication slot or platter is currently configured to display a complication that shows information obtained from a calendar application.

Affordances 1642 and 1644, as represented by representations 1612 and 1614 (respectively), indicate that the middle complication slot or platter is currently configured to display a complication that shows information obtained from the news application and that the lower right complication slot or platter is currently configured to display a complication that shows information obtained from the news application. Since the user accessed this user interface by selecting a preview image that was presented as having a news-associated complication, and/or the corresponding user interface was selected based on one or more criteria related to surfacing the news complication to the user, at least one of the complications shown in this user interface is associated with the news application.

In this case, the complications represented by 1612 and 1614 are both associated with the news application but display a different type and/or amount of information (e.g., a different set of application information) from the news application. As such, the news application supports two different complication configurations for use on the context-specific user interface. In some embodiments, device 1300 determines whether the news application supports multiple complication configurations, and in accordance with a determination that the application supports multiple complication configurations, displays a preview image (e.g., 1610) that contains a representation of a complication configured according to the first complication configuration (e.g., 1612) and a representation of a complication configured according to the second complication configuration (e.g., 1614). This lets the user know that the selected watch face type supports multiple complication configurations for the associated application, thereby introducing another functionality of the user interface. In some embodiments, in accordance with a determination that the application does not support multiple complication configurations, displays a preview image that contains a representation of a complication configured according to a complication configuration.

The user can edit select an option for one or more editable aspects of the user interface represented by 1610. For example, the user changes the application associated with the complication in the lower right slot or platter (as represented by 1644) by contacting the display with touch 1660 at affordance 1644. In some embodiments, in response to detecting touch 1660, the user interface screen expands a scrollable menu on display 1302 in which the user swipes horizontally to scroll through the available applications, and optionally contacts a "done" affordance to select a particular option. In some embodiments, the scrollable menu includes one or more applications installed on device 1320 for which a complication is available.

Figure 16C:
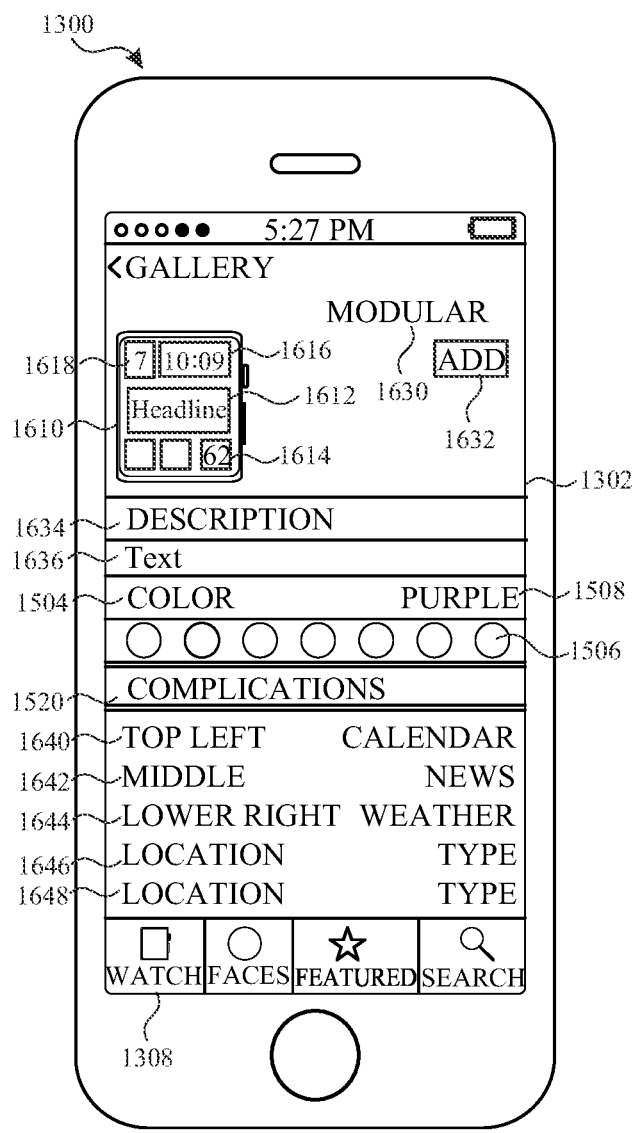

In this example, the user contacts the "done" affordance, and in response device 1300 displays the user interface screen shown on display 1302 in FIG. 16C. Comparing the user interface screens shown in FIGS. 16B and 16C, the application indicated by affordance has been updated to "weather" from "news" as a result of the user editing. In addition, representation 1614 has been updated to display a temperature obtained from the weather application (e.g., either in accordance with updated data from the weather application, or a placeholder). In some embodiments, device 1300 animates a transition of representation 1614 on preview image 1610, e.g., as a slot machine-style rollover from news data to weather data.

In some embodiments, representations 1612 and/or 1614, as part of preview image 1610, display live application data obtained from the news application (e.g., a version of the news application installed on device 1300). In some embodiments, representations 1612 and/or 1614, as part of preview image 1610, display placeholder data that represents information from the news application.

In some aspects, it is advantageous to present to the user different watch face types configured with a particular complication. For example, the user may wish to view a complication as part of a particular configuration, or in combination with a different set of user interface aspects, options, and/or functionalities. It is desirable to present the user with multiple contexts (e.g., context-specific user interfaces) in which a particular complication is available for use in order to demonstrate a greater range of the complication's potential functionalities and/or display styles.

Figure 17:
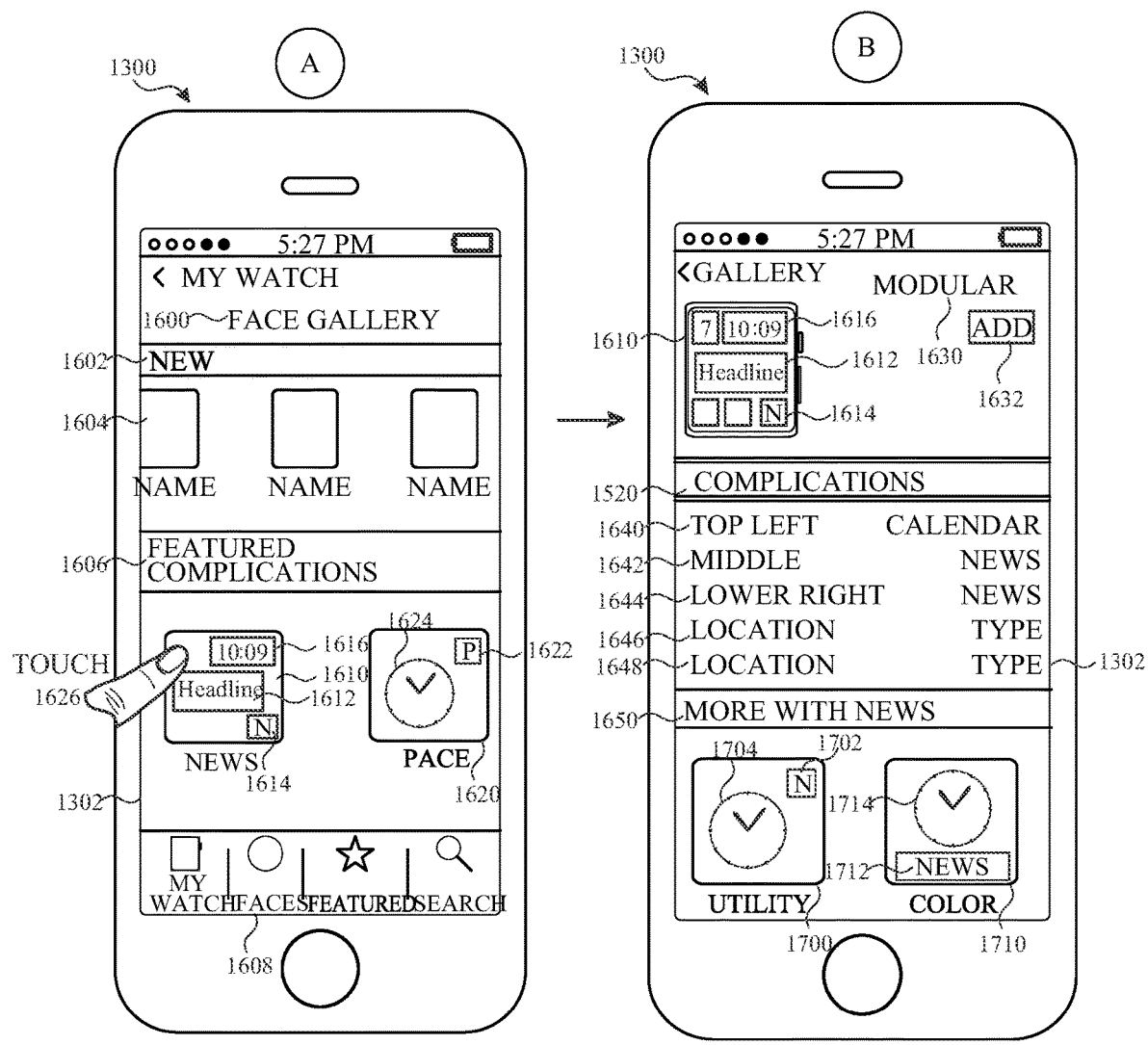
FIG. 17 illustrates exemplary user interfaces in accordance with some embodiments.

FIG. 17 illustrates exemplary electronic device 1300. In some embodiments, device 1300 is one or more of devices 100 (FIG. 1), 300 (FIG. 3), and/or 500 (FIG. 5). For purposes of illustration, first device 1300 is a personal electronic device, similar to portable multifunction device 100 as depicted in FIG. 4A, with a display 1302 (e.g., a touch-sensitive display). In some embodiments, device 1300 is coupled to a second device (e.g., 1320), which may be one or more of devices 100 (FIG. 1), 300 (FIG. 3), and/or 500 (FIG. 5). For example, device 1300 can be coupled via wireless communication to a personal electronic device similar to device 1320 or device 500 as depicted in FIG. 5A, with a touch-sensitive display and a rotatable input mechanism.

In FIG. 17 at (A), device 1300 displays an exemplary user interface screen on display 1302. The user interface screen includes preview image 1610, among other features in common with FIG. 16A. The user touches preview image 1610 with touch 1626 to select the corresponding user interface for viewing, editing, and/or addition to the library.

In response to detecting touch 1626, device 1300 displays an exemplary user interface screen on display 1302, as shown in FIG. 17 at (B). The user interface screen includes preview image 1610, affordances representing complication slots or platters 1640, 1642, 1644, 1646, and 1648, among other features in common with FIG. 16B. The user interface screen in FIG. 17 at (B) also includes bar 1650 and associated user interface preview images 1700 and 1710.

User interface preview image 1700 represents a context-specific user interface that, like the user interface represented by 1610, includes a news complication. This complication is represented in user interface preview image 1700 by representation 1702. Preview image 1700 also includes representation 1704 of an analog clock. Compared to the user interface represented by 1610, the user interface represented by preview image 1700 is configured according to a different watch face type (e.g., "utility" instead of "modular"). Similarly, preview image 1710 represents a user interface configured according to a third watch face type (e.g., "color") that includes a news complication, as represented in 1710 by representation 1712. Thus, bar 1650 and its associated preview images provide the user with additional watch face configurations that feature the news complication.

In some embodiments, in response to detecting a contact on display 1302 at preview image 1700 or 1710, device 1300 displays a user interface screen similar to that shown in FIG. 17 at (B), but with the corresponding preview image and one or more editable aspects and options for the corresponding user interface (e.g., a list of one or more complication slots or platters and associated locations and/or applications for each).

Figure 18:
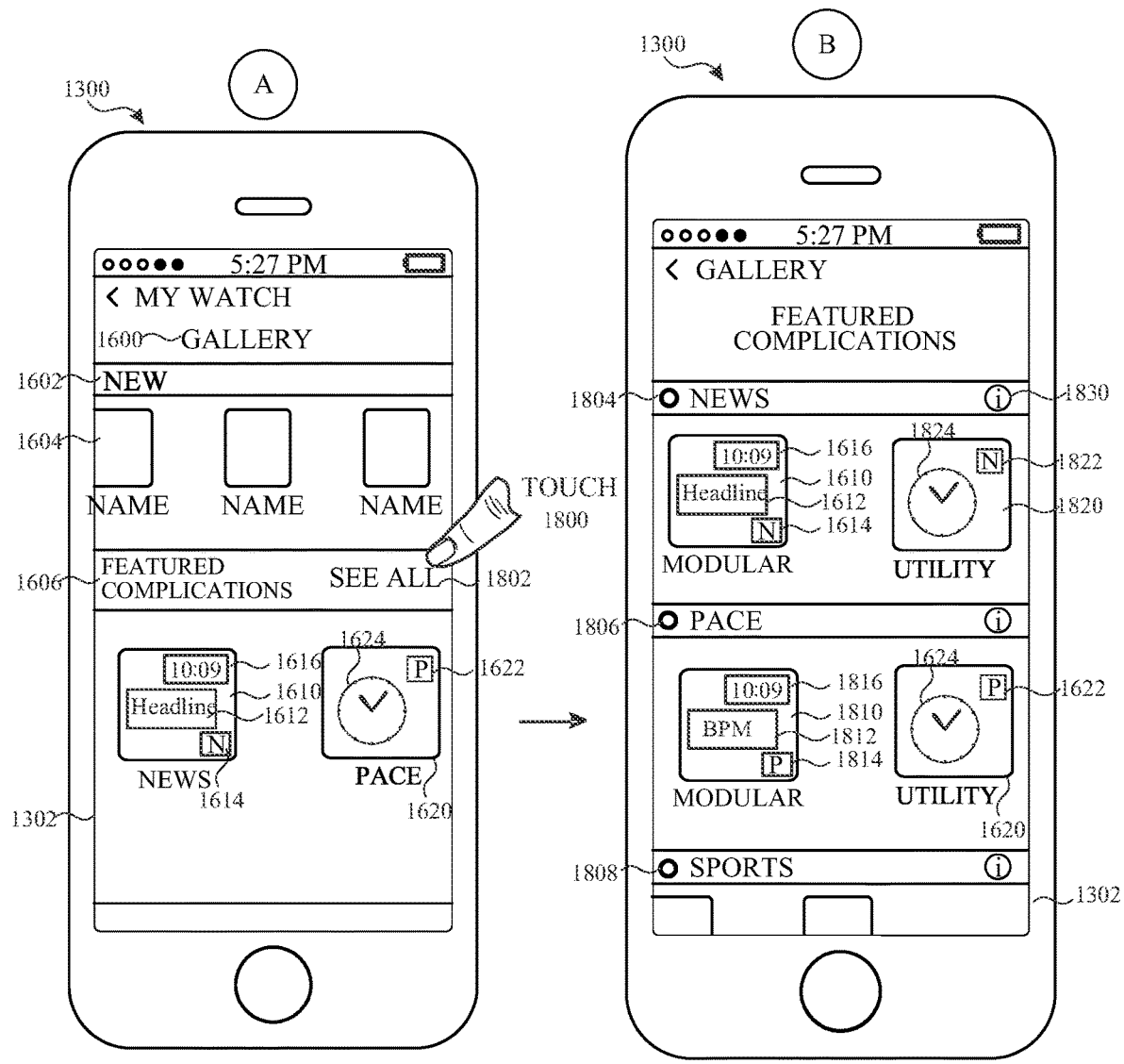
FIG. 18 illustrates exemplary user interfaces in accordance with some embodiments.

FIG. 18 illustrates exemplary electronic device 1300. In some embodiments, device 1300 is one or more of devices 100 (FIG. 1), 300 (FIG. 3), and/or 500 (FIG. 5). For purposes of illustration, first device 1300 is a personal electronic device, similar to portable multifunction device 100 as depicted in FIG. 4A, with a display 1302 (e.g., a touch-sensitive display). In some embodiments, device 1300 is coupled to a second device (e.g., 1320), which may be one or more of devices 100 (FIG. 1), 300 (FIG. 3), and/or 500 (FIG. 5). For example, device 1300 can be coupled via wireless communication to a personal electronic device similar to device 1320 or device 500 as depicted in FIG. 5A, with a touch-sensitive display and a rotatable input mechanism.

In FIG. 18 at (A), device 1300 displays an exemplary user interface screen on display 1302. The user interface screen includes featured complications bar 1606 displayed in association with user interface preview images 1610 and 1620. In this instance, the user wishes to view more types of featured complications. The user provides touch 1800 on display 1302 at "see all" affordance 1802.

In response to detecting touch 1800, device 1300 displays the user interface screen shown in FIG. 18 at (B). This user interface includes user interface objects 1804, 1806, and 1808. Each user interface object indicates a group of user interface preview images, viewable on display 1302, that represent user interfaces containing a complication associated with an application. In this example, preview images associated with affordance 1804 represent user interfaces with one or more news complications, preview images associated with affordance 1806 represent user interfaces with one or more pace complications, and preview images associated with affordance 1808 represent user interfaces with one or more sports complications.

User interface preview images 1610 and 1820 represent user interfaces that include one or more news complications, as shown by representations 1612 and 1614 in preview image 1610 and representation 1822 in preview image 1820. User interface preview images 1610 and 1820 represent user interfaces that include a clock (e.g., as shown by representation 1616 of a digital clock in preview image 1610 and representation 1824 of an analog clock in preview image 1820). Thus, a plurality of preview images representing a plurality of user interfaces, configured according to different watch face types but including the same complication, are presented to the user.

Similarly, user interface preview images 1810 and 1620 represent user interfaces that include one or more pace complications, as shown by representations 1812 and 1814 in preview image 1810 and representation 1622 in preview image 1620. User interface preview images 1810 and 1620 represent user interfaces that include a clock (e.g., as shown by representation 1816 of a digital clock in preview image 1810 and representation 1624 of an analog clock in preview image 1620).

This user interface screen provides the user with an expanded menu of potential clock faces configured with a variety of complications. In some embodiments, the user can scroll through various user interface preview images within a complication type by swiping horizontally on the display. In some embodiments, the user can scroll through various complication types, e.g., grouped by associated application, and through corresponding user interface preview images within each complication type by swiping vertically on the display. For example, the partial view of preview images shown in association with affordance 1808 indicates to the user that additional preview images containing the sports complication are viewable by scrolling the user interface screen.

In some embodiments, as shown by preview images 1610, 1820, 1810, and 1620, multiple supported watch face types are shown for one or more complications. In other words, this user interface screen indicates to the user that the news complication is supported for use on the modular and utility watch face types, as is the pace complication. In some embodiments, preview images for multiple complications are displayed in the same order according to watch face type (in this example, modular then utility). These features allow the user to understand which complications are supported for use in which particular watch face types. Thus, this user interface presents watch face types for each complication to the user in a predictable manner (by virtue of a common order), such that the user can immediately understand which, and/or how many, watch face types support a complication of interest.

The user interface screen also includes information affordance 1830. In some embodiments, device 1300 detects a contact on display 1302, and in response to detecting the contact the device provides a set of information about the corresponding application; or a hyperlink or other navigation to an application store, website, or other external server from which the corresponding application may be downloaded. Thus, the user is sent to an external site that can provide additional information and/or purchase details for an application corresponding to one or more complications of the user interface.

Figure 19:
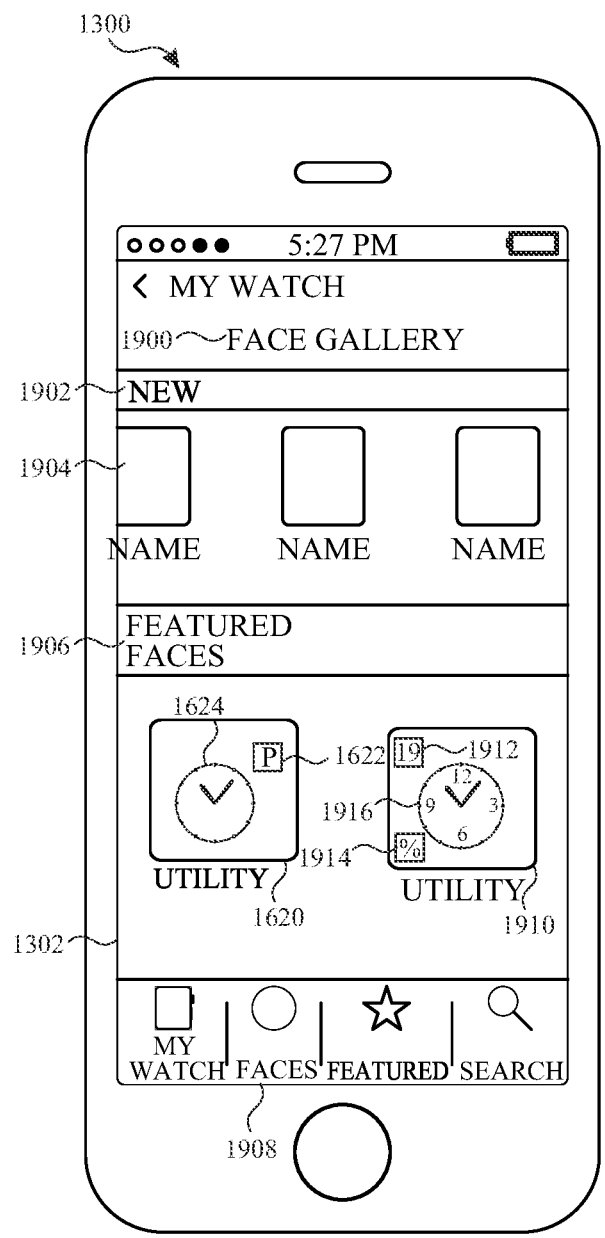
FIG. 19 illustrates exemplary user interfaces in accordance with some embodiments.

While the user interface screen shown in FIG. 16A features new complications to a user, a user may also wish to view new and/or unused watch face types. FIG. 19 illustrates exemplary electronic device 1300. In some embodiments, device 1300 is one or more of devices 100 (FIG. 1), 300 (FIG. 3), and/or 500 (FIG. 5). For purposes of illustration, first device 1300 is a personal electronic device, similar to portable multifunction device 100 as depicted in FIG. 4A, with a display 1302 (e.g., a touch-sensitive display). In some embodiments, device 1300 is coupled to a second device (e.g., 1320), which may be one or more of devices 100 (FIG. 1), 300 (FIG. 3), and/or 500 (FIG. 5). For example, device 1300 can be coupled via wireless communication to a personal electronic device similar to device 1320 or device 500 as depicted in FIG. 5A, with a touch-sensitive display and a rotatable input mechanism.

In FIG. 19, device 1300 displays an exemplary user interface screen on display 1302. The user interface screen includes header 1900, indicating that the user interface screen is a gallery for context-specific user interfaces. Bar 1902 indicates one or more context-specific user interfaces that are "new," or configured according to one or more watch face types that were recently installed in memory of device 1320 (e.g., within a predetermined period of time, or installed in the latest operating system update). Displayed as associated with bar 1902 are one or more user interface preview images (e.g., preview image 1904) representing user interfaces configured according to the one or more new watch face types. The user interface screen also displays affordance 1908, which the user can contact to access the user interface screen illustrated in FIG. 16A (e.g., by contacting the displayed affordance 1908).

Bar 1906 indicates one or more context-specific user interfaces configured according to featured watch face types. Displayed as associated with bar 1906 are user interface preview images 1620 and 1910. User interface preview image 1620 represents a context-specific user interface that includes a complication (as represented by representation 1622) and an analog clock (as represented by representation 1624). User interface preview image 1910 represents a context-specific user interface that includes two complications (as represented by representations 1912 and 1914) and an analog clock (as represented by representation 1916).

The user interfaces represented by 1620 and 1910 include different types of complications (e.g., a pace complication represented by 1622, a calendar complication represented by 1912, and a battery monitoring complication represented by 1914). However, the user interfaces represented by 1620 and 1910 are both configured according to a "utility" watch face type. Thus, the user interface illustrated in FIG. 19 introduces the user to different configurations or customizations that are possible within a particular watch face type. In some embodiments, other editable aspects such as color, display density, or any of the other editable aspects described herein may be varied in the series of user interface preview images. In some embodiments, the user can swipe horizontally on display 1302 to view additional user interface preview images of the "utility" type or swipe vertically on display 1302 to view additional user interface preview images of another watch face type.

FIGS. 20A-20I are flow diagrams illustrating process 2000 for configuring context-specific user interfaces. In some embodiments, process 2000 can be performed at an electronic device with a display, one or more processors, and memory, such as 100 (FIG. 4A) or 1300 (FIGS. 13-19). Some operations in process 2000 can be combined, the order of some operations may be changed, and some operations may be omitted. Process 2000 provides for configuring, at a first device, context-specific user interfaces for display at a second device, potentially conserving battery usage at the second device, enhancing the user visibility of the display, and making user recognition of the information more efficient, potentially reducing display time and improving battery life.

In FIG. 20A, at block 2002, process 2000 is performed at a first electronic device, having a display, memory, and one or more processors, coupled via wireless communication to a second electronic device having a display, memory, one or more processors, and access to a library of one or more user interfaces for display on the second electronic device. For example, in some embodiments, the library of one or more user interfaces for display on the second electronic device is stored in the memory of the first and/or the second electronic device(s). Exemplary first and second devices are device 1300 of FIGS. 13-19 and device 1320 of FIG. 13, respectively.

At block 2004, the first device displays a first user interface screen comprising at least a first user interface preview image. The first user interface preview image represents a first user interface for display on the second electronic device, is configured according to a first watch face type, and comprises a clock and at least a first complication. The first user interface preview image comprises representations of the first watch face type, the clock, and the at least first complication. Exemplary user interface preview images are illustrated throughout FIGS. 13-19, including, inter alia, preview image 1610 with a representation of digital clock 1616 and representations 1612, 1614, and 1616 of complications. The first user interface is selected based at least in part on one or more criterion selected from the group consisting of: the first user interface is configured according to a watch face type not currently represented in a user interface in the library; the first user interface has a first complication not currently represented in a user interface in the library; and the first user interface has a first complication associated with an application for use on the second electronic device that corresponds with an application installed in the memory of the first electronic device.

In accordance with some embodiments, at block 2006, the first device displays, as part of the first user interface screen, a second user interface preview image. The second user interface preview image represents a second user interface for display on the second electronic device, is configured according to a second watch face type, and comprises a clock and at least a second complication. The second user interface preview image comprises representations of the second watch face type, the clock, and the at least second complication of the second user interface. The second user interface is independently selected based at least in part on the one or more criterion. In some embodiments, the second watch face type is different from the first watch face type. In some embodiments, the second complication is different from the first complication. Exemplary user interface preview images are illustrated throughout FIGS. 13-19, including, inter alia, preview image 1620 with a representation of analog clock 1624 and representation 1622 of a complication.

Figure 20B:
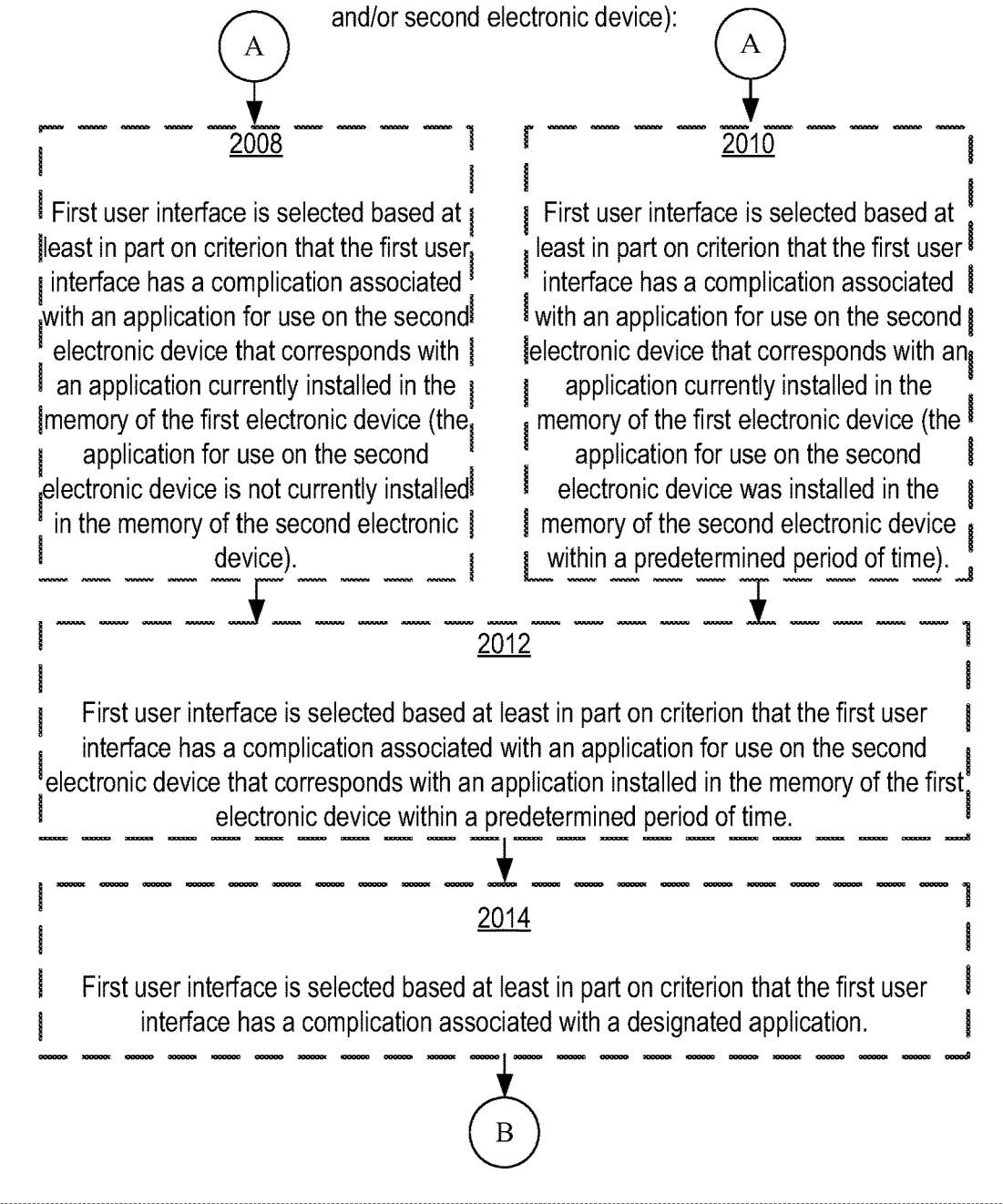

Turning now to FIG. 20B at block 2008, in accordance with some embodiments, the first user interface is selected based at least in part on a criterion that the first user interface has a complication associated with an application for use on the second electronic device that corresponds with an application currently installed in the memory of the first electronic device (the application for use on the second electronic device is not currently installed in the memory of the second electronic device). For example, in some embodiments, the user interface represented by 1610 includes the complications, represented by 1612 and 1614, associated with a news application, for which the version configured for use on device 1320 is not currently installed on device 1320, but the version configured for use on device 1300 is currently installed on device 1300.

In accordance with some embodiments, at block 2010, the first user interface is selected based at least in part on a criterion that the first user interface has a complication associated with an application for use on the second electronic device that corresponds with an application currently installed in the memory of the first electronic device (the application for use on the second electronic device was installed in the memory of the second electronic device within a predetermined period of time). For example, in some embodiments, the user interface represented by 1610 includes the complications, represented by 1612 and 1614, associated with a news application, for which the version configured for use on device 1320 was installed within a predetermined period of time on device 1320, and the version configured for use on device 1300 is currently installed on device 1300.

In accordance with some embodiments, at block 2012, the first user interface is selected based at least in part on a criterion that the first user interface has a complication associated with an application for use on the second electronic device that corresponds with an application installed in the memory of the first electronic device within a predetermined period of time. For example, in some embodiments, the user interface represented by 1610 includes the complications, represented by 1612 and 1614, associated with a news application, for which the version configured for use on device 1300 was installed within a predetermined period of time on device 1300.

In accordance with some embodiments, at block 2014, the first user interface is selected based at least in part on a determination that the first user interface has a complication associated with a designated (e.g., sponsored, or curated) application. For example, in some embodiments, the user interface represented by 1610 includes the complications, represented by 1612 and 1614, associated with a news application, which is part of a curated or sponsored list of applications.

Turning now to FIG. 20C at block 2016, in accordance with some embodiments, the first user interface is selected based at least in part on a determination that the first user interface has a complication associated with an application that is used above a predetermined frequency of use on the first electronic device. For example, in some embodiments, the user interface represented by 1610 includes the complications, represented by 1612 and 1614, associated with a news application, which is used above a predetermined frequency of use on device 1300.

In accordance with some embodiments, at block 2018, the first device receives a user input corresponding to a selection of the first user interface preview image. An exemplary user input is illustrated in FIG. 17 as touch 1626.

In accordance with some embodiments, at block 2020, in response to receiving the user input, the first device ceases to display the first user interface screen; and displays a second user interface screen. The second user interface screen comprises the first user interface preview image (e.g., 1610 in FIG. 17 at (B)), a list of one or more complications of the first user interface (the list comprises at least the first complication; e.g., 1520, 1640, 1642, 1644, 1646, and 1648 in FIG. 17 at (B)), and a selection affordance for selecting the first user interface (e.g., 1632 in FIG. 17 at (B)).

In accordance with some embodiments, at block 2022, the first device receives a user input corresponding to a selection of the selection affordance. For example, the user input may be a touch on displayed affordance 1632.

In accordance with some embodiments, at block 2024, in response to receiving the user input, the first device sends instructions to the second electronic device for displaying the first user interface on the display of the second electronic device.

Turning now to FIG. 20D at block 2026, in accordance with some embodiments, in response to receiving the user input, the first device stores the first user interface as part of the library of one or more user interfaces for display on the second electronic device (e.g., by storing directly on the memory of the first device, or by sending instructions to the second device for storing).

In accordance with some embodiments, at block 2028, the first device displays, as part of the first user interface screen, an affordance for viewing a user interface from the library.

In accordance with some embodiments, at block 2030, the first device, in response to receiving the user input, displays an animation depicting a movement of the first user interface preview image toward the affordance for viewing the user interface from the library. In some embodiments, device 1300 animates preview image 1610 to move on-screen toward affordance 1308 for viewing one or more user interfaces from the library.

In accordance with some embodiments, at block 2032, the display of the first electronic device is a touch-sensitive display, and receiving the user input corresponding to a selection of the first user interface preview image comprises detecting a contact on the display at the first user interface preview image (e.g., touch 1626 in FIG. 17 at (A)).

In accordance with some embodiments, at block 2034, in response to receiving the user input, the first device determines whether the first user interface represented by the first user interface preview image comprises a complication associated with an application that is not currently installed on the second electronic device.

Figure 20E:
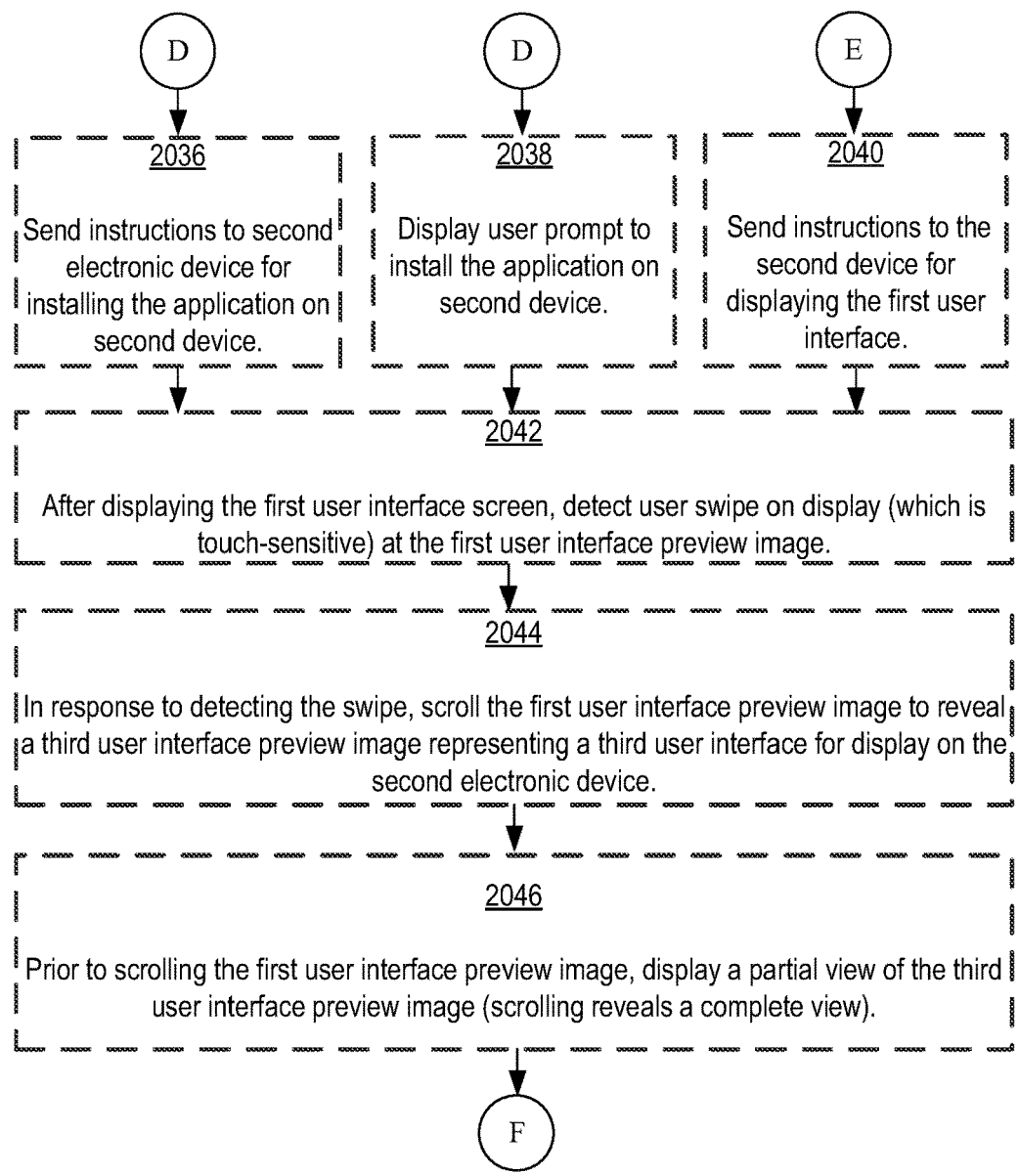

Turning now to FIG. 20E at block 2036, in accordance with some embodiments, and in accordance with a determination that the first user interface represented by the first user interface preview image comprises a complication associated with an application that is not currently installed on the second electronic device, the first device sends instructions to the second electronic device for installing the application associated with the complication of the first user interface in the memory of the second electronic device.

In accordance with some embodiments, at block 2038, and in accordance with a determination that the first user interface represented by the first user interface preview image comprises a complication associated with an application that is not currently installed on the second electronic device, the first device displays a user prompt to install the application associated with the complication of the first user interface in the memory of the second electronic device.

In accordance with some embodiments, at block 2040, and in accordance with a determination that the first user interface represented by the first user interface preview image comprises a complication associated with an application that is currently installed on the second electronic device, the first device sends to the second electronic device the instructions for displaying the first user interface on the display of the second electronic device (e.g., as depicted in block 2024).

In accordance with some embodiments, at block 2042, the first device has a touch-sensitive display, and after displaying the first user interface screen, the first device detects a user swipe on the display at a location of the first user interface preview image. For example, in some embodiments the user swipes display 1302 at 1312 as shown in FIG. 15A at (A).

In accordance with some embodiments, at block 2044, in response to detecting the swipe, the first device scrolls the first user interface preview image to reveal a third user interface preview image representing a third user interface for display on the display of the second electronic device.

In accordance with some embodiments, at block 2046, prior to scrolling the first user interface preview image, the first device displays a partial view of the third user interface preview image (the scrolling reveals a complete view of the third user interface preview image). For example, 1314 is shown in partial view in FIG. 15A at (A).

Turning now to FIG. 20F at block 2048, in accordance with some embodiments, the first and the second user interfaces are part of a prioritized list of user interfaces, and two or more user interfaces of the list are prioritized at least in part based on the one or more criteria. Optionally, the first device de-prioritizes a user interface of the prioritized list. The user interface is de-prioritized based at least in part on one or more criteria selected from: the user interface is already represented in the library; the user interface has a complication that is already represented in a user interface in the library; and the prioritized list comprises a user interface of the same watch face type as the de-prioritized user interface that is adjacent to the de-prioritized user interface in the prioritized list.

In accordance with some embodiments, at block 2050, the first device displays, as part of the first user interface screen, an affordance for viewing additional user interface preview images. An exemplary affordance is shown as affordance 1802 in FIG. 18 at (A).

In accordance with some embodiments, at block 2052, the first device receives a user input corresponding to a selection of the affordance for viewing additional user interface preview images (e.g., touch 1800 at affordance 1802).

In accordance with some embodiments, at block 2054, in response to receiving the user input, the first device ceases to display the first user interface screen; and displays a third user interface screen (e.g., as shown in FIG. 18 at (B)) comprising a plurality of user interface preview images representing a plurality of user interfaces for display on the second electronic device. The plurality of user interfaces comprises a fourth user interface that comprises the first complication, and the fourth user interface is configured according to a watch face type other than the first watch face type. For example, FIG. 18 at (B) illustrates preview images 1610 and 1820 that include a news complication.

Figure 20G:
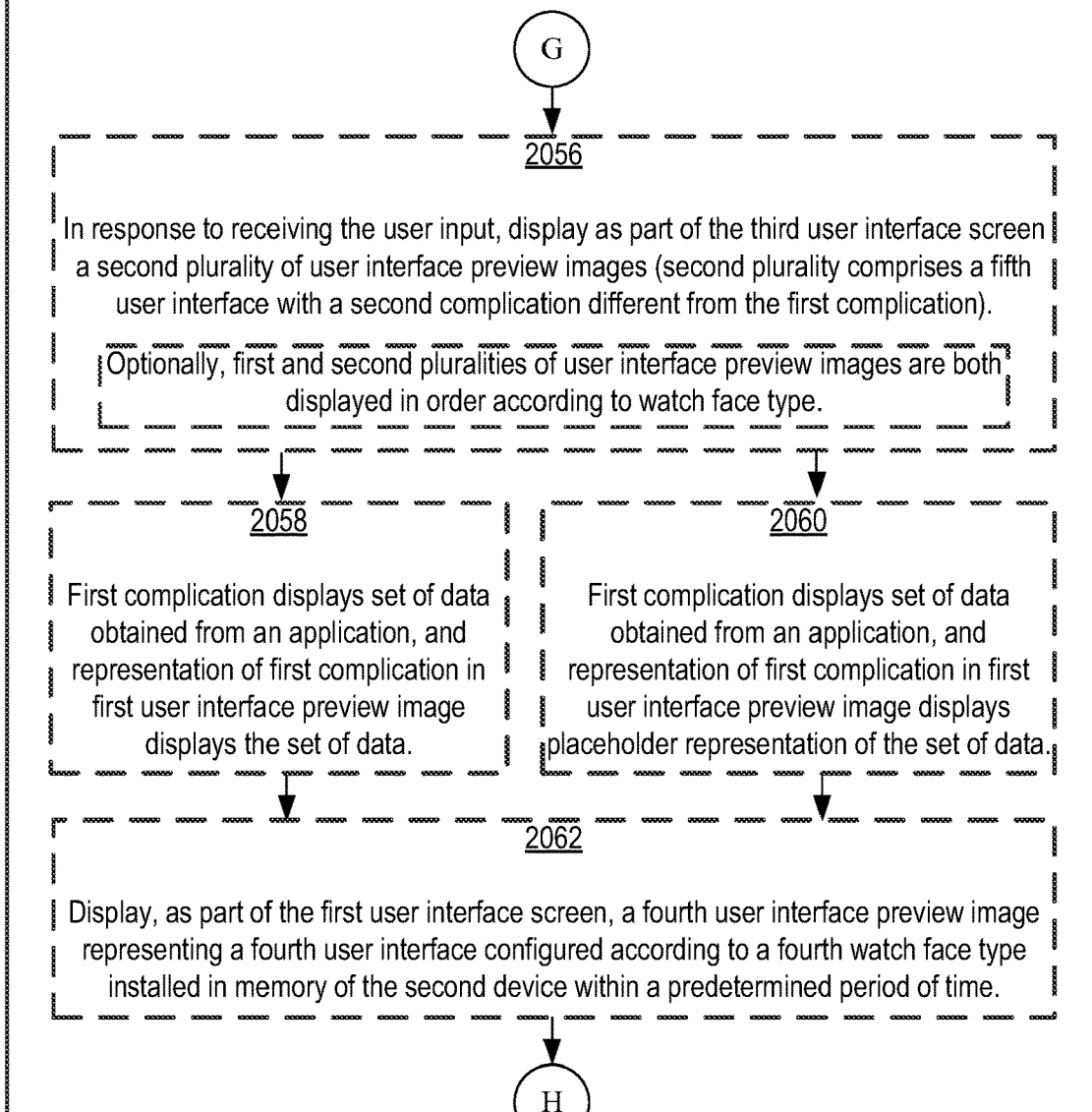

Turning now to FIG. 20G at block 2056, in accordance with some embodiments, and in response to receiving the user input, the first device displays as part of the third user interface screen a second plurality of user interface preview images representing a second plurality of user interfaces for display on the second electronic device. The second plurality of user interfaces comprises a fifth user interface that comprises a second complication different from the first complication. For example, FIG. 18 at (B) illustrates preview images 1810 and 1620 that include a pace complication. Optionally, the first plurality of user interface preview images are displayed in order according to watch face type, and the second plurality of user interface preview images are displayed in the same order according to watch face type (cf. preview images 1610 and 1820 with 1810 and 1620).

In accordance with some embodiments, at block 2058, the first complication of the first user interface displays a set of data obtained from an application when displayed on the display of the second electronic device, and the representation of the first complication in the first user interface preview image displays the set of data obtained from the application (e.g., live application data). In some embodiments, representation 1612 in FIG. 17 at (B) shows a live headline from the news application.

In accordance with some embodiments, at block 2060, the first complication of the first user interface displays a set of data obtained from an application when displayed on the display of the second electronic device, and the representation of the first complication in the first user interface preview image displays a placeholder representation of the set of data obtained from the application. For example, the placeholder may be part of the application data obtained during installation, and/or it may be designated as part of the development of the application, e.g., as part of a software development kit. In some embodiments, representation 1612 in FIG. 17 at (B) shows a placeholder headline from the news application.

In accordance with some embodiments, at block 2062, the first device displays, as part of the first user interface screen, a fourth user interface preview image that represents a fourth user interface configured according to a fourth watch face type. In some embodiments, the fourth watch face type was installed in the memory of the second electronic device within a predetermined period of time.

Turning now to FIG. 20H at block 2064, in accordance with some embodiments, the first device, prior to displaying the first user interface screen, selects the first watch face type of the first user interface. The first watch face type is selected based at least in part on a criterion that the application with which the first complication of the first user interface is associated is supported for use in the selected first watch face type. Optionally, the first watch face type is selected based at least in part on a criterion that the selected first watch face type is represented in one or more user interfaces that are displayed on the display of the second electronic device above a predetermined frequency of display. Optionally, the first watch face type is selected based at least in part on a criterion that the selected first watch face type is represented in one or more user interfaces that were displayed on the display of the second electronic device within a fourth predetermined period of time. Optionally, the first watch face type is selected based at least in part on a criterion that the library comprises a user interface configured according to the first watch face type that comprises a complication that has been edited by the user. Optionally, the first watch face type is selected based at least in part on a criterion that the library does not already comprise a user interface that is configured according to the first watch face type and further comprises the first complication. Optionally, selecting the first watch face type further comprises selecting a color of the first watch face type, and the color of the first watch face type is selected based at least in part on a designated color of the application associated with the first complication (e.g., a "hero" or predominant color designated during development of the application as part of a software development kit).

Figure 20I:
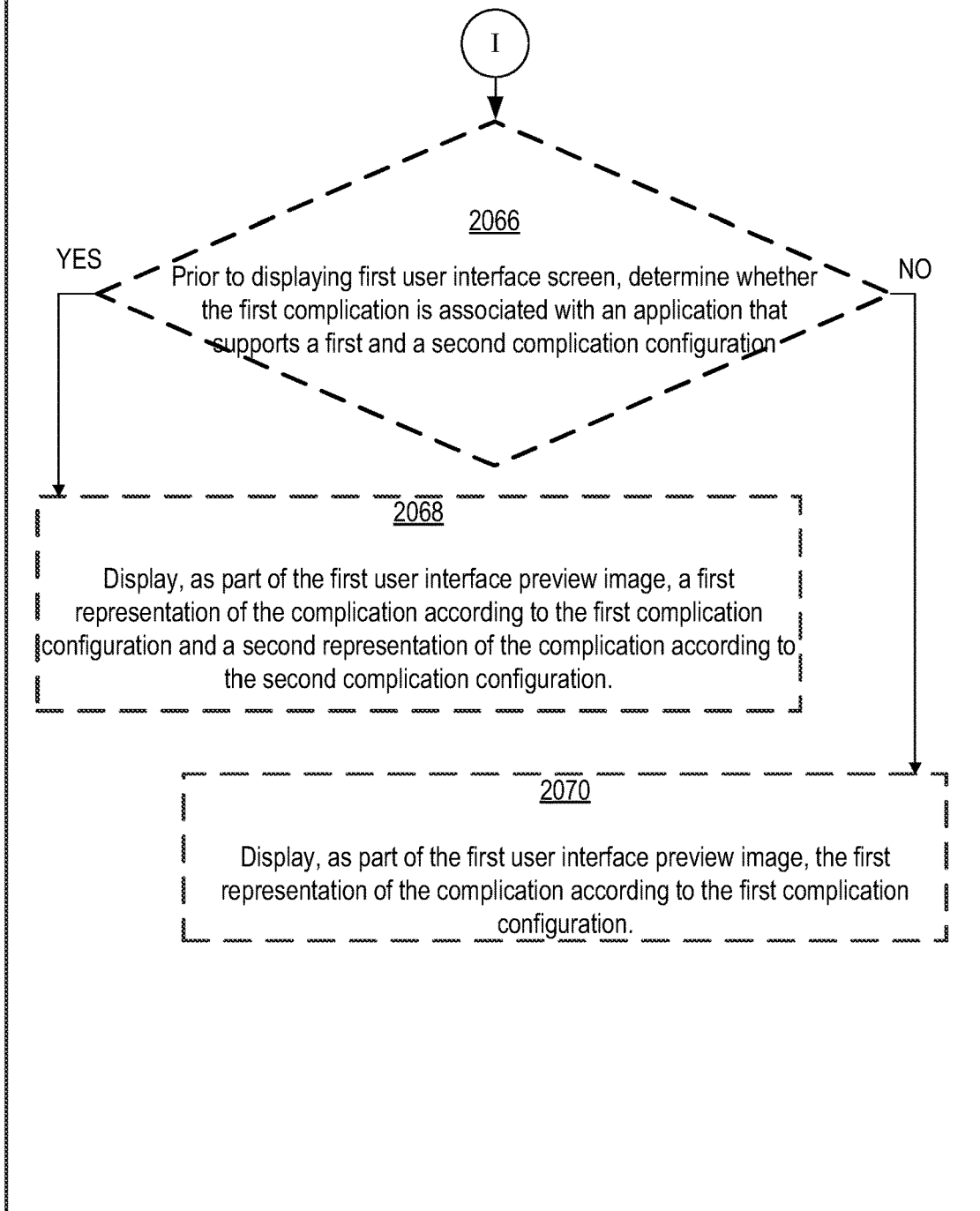

Turning now to FIG. 20I at block 2066, in accordance with some embodiments, prior to displaying the first user interface screen, the first device determines whether the first complication of the first user interface is associated with an application that supports a first and a second complication configuration (the first and the second complication configurations are different).

In accordance with some embodiments, at block 2068, and in accordance with a determination that the first complication of the first user interface is associated with an application that supports the first and the second complication configurations, the first device displays, as part of the first user interface preview image, a first representation of the complication according to the first complication configuration and a second representation of the complication according to the second complication configuration. For example, the user interface represented by preview image 1610 supports multiple complication configurations, as depicted by representations 1612 and 1614 of the news application.

In accordance with some embodiments, at block 2070, and in accordance with a determination that the first complication of the first user interface is associated with an application that does not support a second complication configuration, the first device displays, as part of the first user interface preview image, the first representation of the complication according to the first complication configuration.

It should be understood that the particular order in which the operations in FIGS. 20A-20I have been described is merely exemplary and is not intended to indicate that the described order is the only order in which the operations could be performed. One of ordinary skill in the art would recognize various ways to reorder the operations described herein.

Note that details of the processes described above with respect to method 2000 (e.g., FIGS. 20A-20I) are also applicable in an analogous manner to the methods described elsewhere in this application. For example, other methods described in this application may include one or more of the characteristics of method 2000. For example, the devices, hardware elements, inputs, interfaces, modes of operation, faces, time indicators, and complications described above with respect to method 2000 may share one or more of the characteristics of the devices, hardware elements, inputs, interfaces, modes of operation, faces, time indicators, and complications described elsewhere in this application with respect to other methods. Moreover, the techniques described above with respect to method 2000 may be used in combination with any of the interfaces, faces, or complications described elsewhere in this application.

FIGS. 21A-21D are flow diagrams illustrating process 2100 for configuring context-specific user interfaces. In some embodiments, process 2100 can be performed at an electronic device with a display, one or more processors, and memory, such as 100 (FIG. 4A) or 1300 (FIGS. 13-19). Some operations in process 2100 can be combined, the order of some operations may be changed, and some operations may be omitted. Process 2000 provides for configuring, at a first device, context-specific user interfaces for display at a second device, potentially conserving battery usage at the second device, enhancing the user visibility of the display, and making user recognition of the information more efficient, potentially reducing display time and improving battery life.

In FIG. 21A, at block 2102, process 2100 is performed at a first electronic device, having a touch-sensitive display, memory, and one or more processors, coupled via wireless communication to a second electronic device having a display, memory, one or more processors, and access to a library of one or more user interfaces for display on the second electronic device. For example, in some embodiments, the library of one or more user interfaces for display on the second electronic device is stored in the memory of the first and/or the second electronic device(s). Exemplary first and second devices are device 1300 of FIGS. 13-19 and device 1320 of FIG. 13, respectively.

At block 2104, the first device displays a first user interface screen comprising a first user interface preview image, the first user interface preview image representing a first user interface for display on the second electronic device. The first user interface is configured according to a first watch face type and comprises a clock and at least a first complication. The first user interface preview image comprises representations of the first watch face type, the clock, and the at least first complication. The first user interface is not already in the library of user interfaces for display on the second electronic device. Exemplary preview images are illustrated throughout FIGS. 13-19; see, e.g., 1610 in FIG. 17 at (A).

At block 2106, the first device detects a first contact at the displayed first user interface preview image (e.g., touch 1626).

At block 2108, in response to detecting the first contact, the first device ceases to display the first user interface screen and displays a second user interface screen comprising: the first user interface preview image (e.g., 1610 in FIG. 17 at (B)); a list of one or more complications of the first user interface (the list comprises at least the first complication; e.g., 1520, 1640, 1642, 1644, 1646, and 1648 in FIG. 17 at (B)); a selection affordance for selecting the first user interface (e.g., 1632 in FIG. 17 at (B)); and a second user interface preview image. The second user interface preview image represents a second user interface, is configured according to a second watch face type, and comprises a clock and the first complication. The second watch face type is different from the first watch face type. For example, preview images 1700 and 1710 represent user interfaces configured according to different watch face types as compared to that represented by 1610, but also include a clock (e.g., as represented by 1704 and 1714) and the news complications (e.g., as represented by 1702 and 1712).

At block 2110, the first device detects a second contact at the selection affordance (e.g., a contact at 1632).

At block 2112, in response to detecting the second contact, the first device sends instructions to the second electronic device for displaying the first user interface on the display of the second electronic device.

Turning now to FIG. 21B at block 2114, in accordance with some embodiments, the second user interface screen further comprises: a first editing affordance indicating a first option for an editable aspect of the first user interface; and a second editing affordance indicating a second option for the editable aspect of the first user interface. For example, FIG. 15A at (B) displays a number of different affordances (e.g., 1506) for the color aspect of the user interface represented by 1312. Optionally, the editable aspect is selected from a color of the first user interface, a density of the first user interface, a background of the first user interface, and a font of the first user interface. Optionally the first complication is a stopwatch affordance, and the editable aspect is a stopwatch timescale. Optionally, the first complication is an affordance that is associated with an application. Optionally, the editable aspect is the application associated with the first affordance. Optionally, the affordance displays a set of information obtained from the application, and the editable aspect is the set of information that is obtained from the application and displayed. Additional editable aspects are illustrated in FIGS. 15B and 15C.

In accordance with some embodiments, at block 2116, the second user interface screen further comprises a description of the first watch face type of the first user interface (e.g., 1552).

In accordance with some embodiments, at block 2118, the first device detects a third contact at the second user interface preview image.

Turning now to FIG. 21C at block 2120, in accordance with some embodiments, and in response to detecting the third contact, the first device ceases to display the second user interface screen and displays a third user interface screen comprising: the second user interface preview image; a list of one or more complications of the second user interface (the list comprises at least the first complication); and a selection affordance for selecting the second user interface. For example, the user can contact preview image 1700 to display a user interface screen similar to that shown in FIG. 17 at (B) for configuring the represented user interface.

In accordance with some embodiments, at block 2122, the first option is a currently selected option for the editable aspect of the first user interface, the first user interface preview image represents the first option for the editable aspect, and the first device detects a fourth contact at the second editing affordance.

In accordance with some embodiments, at block 2124, and in response to detecting the fourth contact, the first device updates the first user interface preview image to represent the second option for the editable aspect. Optionally, updating the first user interface preview image comprises animating a transition from the first option of the editable aspect to the second option. For example, representation 1614 in preview image 1610 may be animated to transition from the news information in FIG. 16B to the weather information in FIG. 16C.

In accordance with some embodiments, at block 2126, and in response to detecting the second contact at the affordance for selecting the first user interface (e.g., a touch at affordance 1632), the first device sends instructions to the second electronic device to add the first user interface to the library.

Turning now to FIG. 21D at block 2128, in accordance with some embodiments, the second user interface screen further comprises an affordance for viewing the library of user interfaces for display on the second electronic device. In some embodiments, the first device, in response to detecting the second contact at the selection affordance, animates the first user interface preview image to translate on-screen toward the affordance for viewing the library of user interfaces. In some embodiments, device 1300 animates preview image 1610 to move on-screen toward affordance 1308 for viewing one or more user interfaces from the library.

In accordance with some embodiments, at block 2130, after adding the first user interface to the stored library of user interfaces for display on the second electronic device, the first device detects a fifth contact at the affordance for viewing the library of user interfaces.

In accordance with some embodiments, at block 2132, in response to detecting the fifth contact, the first device ceases to display the second user interface screen and displays a fourth user interface screen comprising the first user interface preview image; and a fourth user interface preview image (the fourth user interface preview image represents a fourth user interface that is part of the library of user interfaces for display on the second electronic device).

In accordance with some embodiments, at block 2134, the first device visually distinguishes the first user interface preview image on the fourth user interface screen to indicate that the first user interface is newly added to the library. For example, a user interface object such as dot 1502 is displayed associated with preview image 1310 to indicate that the user interface is newly added to the library.

In accordance with some embodiments, at block 2136, the first device displays a plurality of user interface preview images representing a plurality of user interfaces for display on the second electronic device. The plurality of user interfaces comprises two or more user interfaces that represent the same watch face type (see, e.g., preview images 1620 and 1910 in FIG. 19).

It should be understood that the particular order in which the operations in FIGS. 21A-21D have been described is merely exemplary and is not intended to indicate that the described order is the only order in which the operations could be performed. One of ordinary skill in the art would recognize various ways to reorder the operations described herein.

Note that details of the processes described above with respect to method 2100 (e.g., FIGS. 21A-21D) are also applicable in an analogous manner to the methods described elsewhere in this application. For example, other methods described in this application may include one or more of the characteristics of method 2100. For example, the devices, hardware elements, inputs, interfaces, modes of operation, faces, time indicators, and complications described above with respect to method 2100 may share one or more of the characteristics of the devices, hardware elements, inputs, interfaces, modes of operation, faces, time indicators, and complications described elsewhere in this application with respect to other methods. Moreover, the techniques described above with respect to method 2100 may be used in combination with any of the interfaces, faces, or complications described elsewhere in this application.

FIGS. 22A-22F are flow diagrams illustrating process 2200 for configuring context-specific user interfaces. In some embodiments, process 2200 can be performed at an electronic device with a display, one or more processors, and memory, such as 100 (FIG. 4A) or 1300 (FIGS. 13-19). Some operations in process 2200 can be combined, the order of some operations may be changed, and some operations may be omitted. Process 2200 provides for configuring, at a first device, context-specific user interfaces for display at a second device, potentially conserving battery usage at the second device, enhancing the user visibility of the display, and making user recognition of the information more efficient, potentially reducing display time and improving battery life.

In FIG. 22A, at block 2202, process 2200 is performed at a first electronic device having a touch-sensitive display, memory, and one or more processors, coupled via wireless communication to a second electronic device having a display, one or more processors, and memory in which a library of one or more user interfaces for display on the second electronic device is stored. Exemplary first and second devices are device 1300 of FIGS. 13-19 and device 1320 of FIG. 13, respectively.

At block 2204, the first device displays a first user interface screen comprising at least a first and a second user interface preview image. The first and the second user interface preview images represent a first and a second user interface for display on the second electronic device, the first and the second user interfaces are configured according to a watch face type and comprise a clock, and the first and the second user interfaces are part of the stored library of user interfaces for display on the second electronic device. Exemplary preview images are described and illustrated through the present disclosure; see, e.g., 1310 and 1312 in FIG. 14A.

At block 2206, the first device receives a first user input corresponding to a user request to reorder the stored library of user interfaces. For example, FIG. 14A shows touch 1400 on edit affordance 1318.

At block 2208, in response to receiving the first user input, the first device ceases to display the first user interface screen and displays a second user interface screen (e.g., as shown in FIG. 14A at (B)) comprising the first and the second user interface preview images. The relative positions of the first and the second user interface preview images on the second user interface screen reflect an order of the first and the second user interfaces in the stored library.

At block 2210, the first device receives a second user input corresponding to a user request to re-order the second user interface before the first user interface in the stored library. An exemplary user input is illustrated as touch and drag 1420 on affordance 1418.

At block 2212, in response to receiving the second user input, the first device sends instructions to the second electronic device for re-ordering the second user interface before the first user interface in the stored library.

Figure 22B:
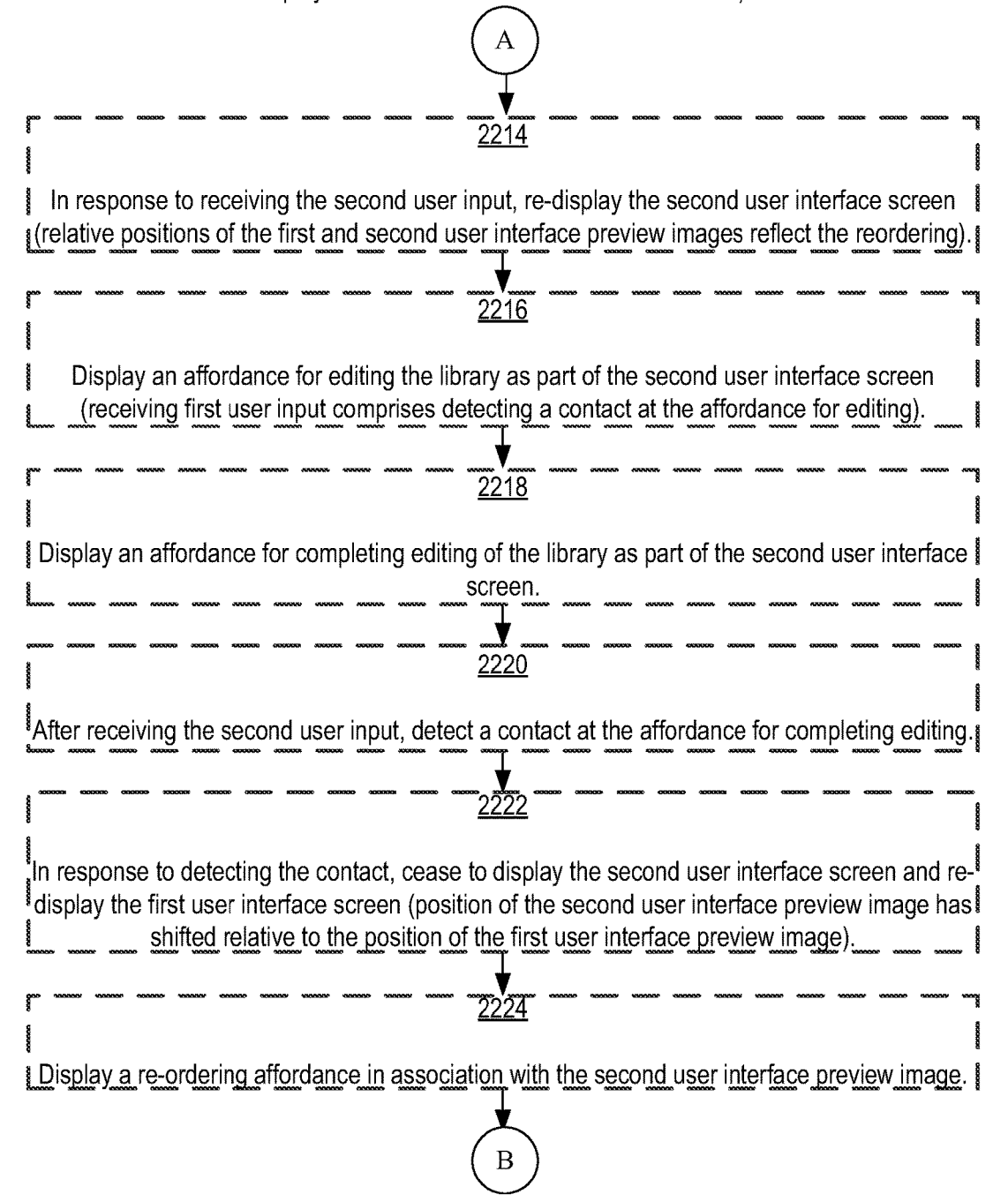

Turning now to FIG. 22B at block 2214, in accordance with some embodiments, and in response to receiving the second user input, the first device re-displays the second user interface screen. The relative positions of the first user interface preview image and the second user interface preview image on the re-displayed second user interface screen reflect the re-ordering of the second user interface before the first user interface in the stored library (cf. 1410 and 1414 in FIG. 14B at (A) and FIG. 14C at (A)).

In accordance with some embodiments, at block 2216, the first device displays an affordance for editing the stored library of user interfaces as part of the first user interface screen, and receiving the first user input comprises detecting a contact at the displayed affordance for editing the stored library of user interfaces (e.g., touch 1400 at affordance 1318).

In accordance with some embodiments, at block 2218, the first device displays an affordance for completing editing of the stored library of user interfaces as part of the second user interface screen.

In accordance with some embodiments, at block 2220, after receiving the second user input, the first device detects a contact on the display at the affordance for completing editing of the stored library of user interfaces (e.g., touch 1422 at affordance 1424).

In accordance with some embodiments, at block 2222, and in response to detecting the contact at the affordance for completing editing of the stored library of user interfaces, the first device ceases to display the second user interface screen and re-displays the first user interface screen (the position of the second user interface preview image on the first user interface screen has shifted relative to the position of the first user interface preview image). This is illustrated in FIG. 14C at (B).

In accordance with some embodiments, at block 2224, the first device displays a re-ordering affordance in association with the second user interface preview image as part of the second user interface screen (e.g., 1418).

Turning now to FIG. 22C at block 2226, in accordance with some embodiments, receiving the second user input corresponding to a user request to order the second user interface before the first user interface comprises: detecting a contact at a first position on the display at the re-ordering affordance; while continuing to detect the contact, detecting movement of the contact from the first position to a second position on the display without a break in the contact on the display (the second position on the display is on an opposite side of the displayed first user interface preview image relative to the first position); and in response to detecting the contact at the second position: translating the second user interface preview image on-screen in a direction of the movement of the contact; and translating the first user interface preview image on-screen in a direction opposite the movement of the contact. After translation of the first and the second user interface preview images, the relative positions of the first and the second user interface preview images reflect the re-ordering of the second user interface before the first user interface in the stored library. This is illustrated and described in reference to touch and drag 1420.

In accordance with some embodiments, at block 2228, the first device displays a delete affordance in association with the first user interface preview image as part of the second user interface screen. An exemplary affordance is shown as 1434 in FIG. 14D at (B).

In accordance with some embodiments, at block 2230, the first device displays an affordance for revealing an edit option (the affordance for revealing an edit option is displayed in association with the first user interface preview image as part of the second user interface screen). An exemplary affordance is shown as 1432 in FIG. 14D at (A).

In accordance with some embodiments, at block 2232, the first device detects a contact on the display at the affordance for revealing an edit option (e.g., touch 1430).

Figure 22D:
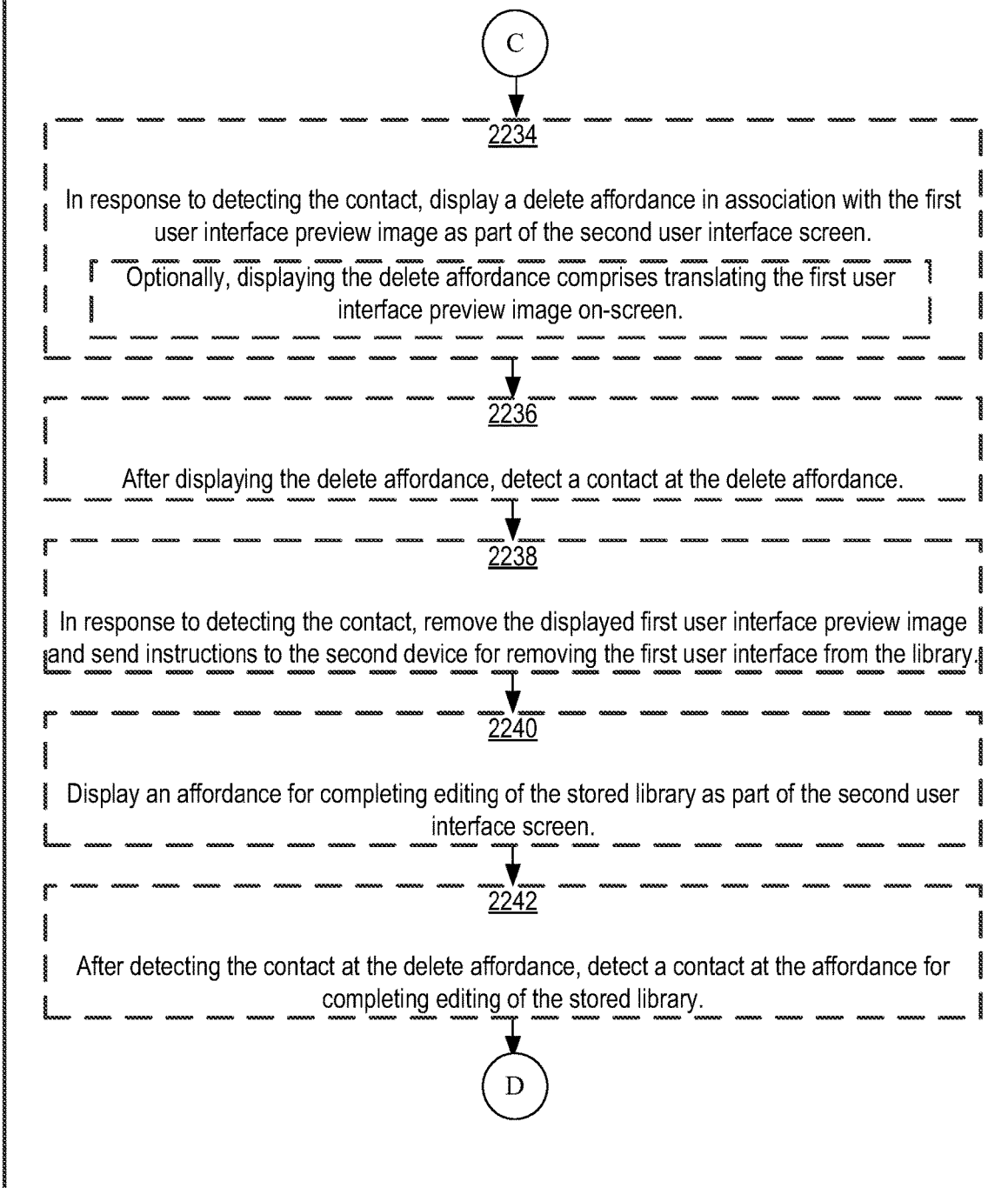

Turning now to FIG. 22D at block 2234, in accordance with some embodiments, and in response to detecting the contact at the affordance for revealing an edit option, the first device displays a delete affordance in association with the first user interface preview image as part of the second user interface screen. An exemplary affordance is shown as 1434 in FIG. 14D at (B). Optionally, displaying the delete affordance comprises translating the first user interface preview image on-screen. This is shown in FIG. 14D at (B).

In accordance with some embodiments, at block 2236, after displaying the delete affordance as part of the second user interface screen, the first device detects a contact on the display at the delete affordance displayed in association with the first user interface preview image (e.g., touch 1436).

In accordance with some embodiments, at block 2238, in response to detecting the contact at the delete affordance, the first device removes the displayed first user interface preview image from the second user interface screen and sends instructions to the second electronic device for removing the first user interface from the stored library (see, e.g., FIG. 14E).

In accordance with some embodiments, at block 2240, the first device displays an affordance for completing editing of the stored library of user interfaces as part of the second user interface screen. An exemplary affordance is shown as 1424.

In accordance with some embodiments, at block 2242, after detecting the contact at the delete affordance, the first device detects a contact on the display at the affordance for completing editing of the stored library of user interfaces (e.g., touch 1422).

Turning now to FIG. 22E at block 2244, in accordance with some embodiments, and in response to detecting the contact at the affordance for completing editing of the stored library of user interfaces, the first device ceases to display the second user interface screen; re-displays the first user interface screen (the first user interface screen comprises the first and the second user interface preview images); and animates the first user interface preview image to disappear from the display. This concept is illustrated in FIG. 14F with respect to preview image 1426.

In accordance with some embodiments, at block 2246, after animating the first user interface preview image to disappear from the display, the first device translates the second user interface preview image on-screen to occupy the position of the first user interface preview image before the animation. An exemplary translation is depicted by arrow 1446 and preview image 1444.

In accordance with some embodiments, at block 2248, while displaying the first user interface screen, the first device detects a swipe on the display at the first or the second user interface preview image.

In accordance with some embodiments, at block 2250, in response to detecting the swipe, the first device scrolls the first and the second user interface preview images to reveal a third user interface preview image. The third user interface preview image represents a third user interface for display on the second electronic device and is part of the stored library.

Turning now to FIG. 22F at block 2254, in accordance with some embodiments, prior to revealing the third user interface preview image, the first device displays as part of the first user interface screen a partial view of the third user interface preview image, such as the partial view of preview image 1314 in FIG. 14A at (A).

In accordance with some embodiments, at block 2256, the first device displays, as part of the second user interface screen, text indications of the watch face types of the first and the second user interfaces. In some embodiments, the indications are displayed in association with the first and the second user interface preview images. Exemplary indications include 1408 in FIG. 14A at (B).

It should be understood that the particular order in which the operations in FIGS. 22A-22F have been described is merely exemplary and is not intended to indicate that the described order is the only order in which the operations could be performed. One of ordinary skill in the art would recognize various ways to reorder the operations described herein.

Note that details of the processes described above with respect to method 2200 (e.g., FIGS. 22A-22F) are also applicable in an analogous manner to the methods described elsewhere in this application. For example, other methods described in this application may include one or more of the characteristics of method 2200. For example, the devices, hardware elements, inputs, interfaces, modes of operation, faces, time indicators, and complications described above with respect to method 2200 may share one or more of the characteristics of the devices, hardware elements, inputs, interfaces, modes of operation, faces, time indicators, and complications described elsewhere in this application with respect to other methods. Moreover, the techniques described above with respect to method 2200 may be used in combination with any of the interfaces, faces, or complications described elsewhere in this application.

Figure 23:
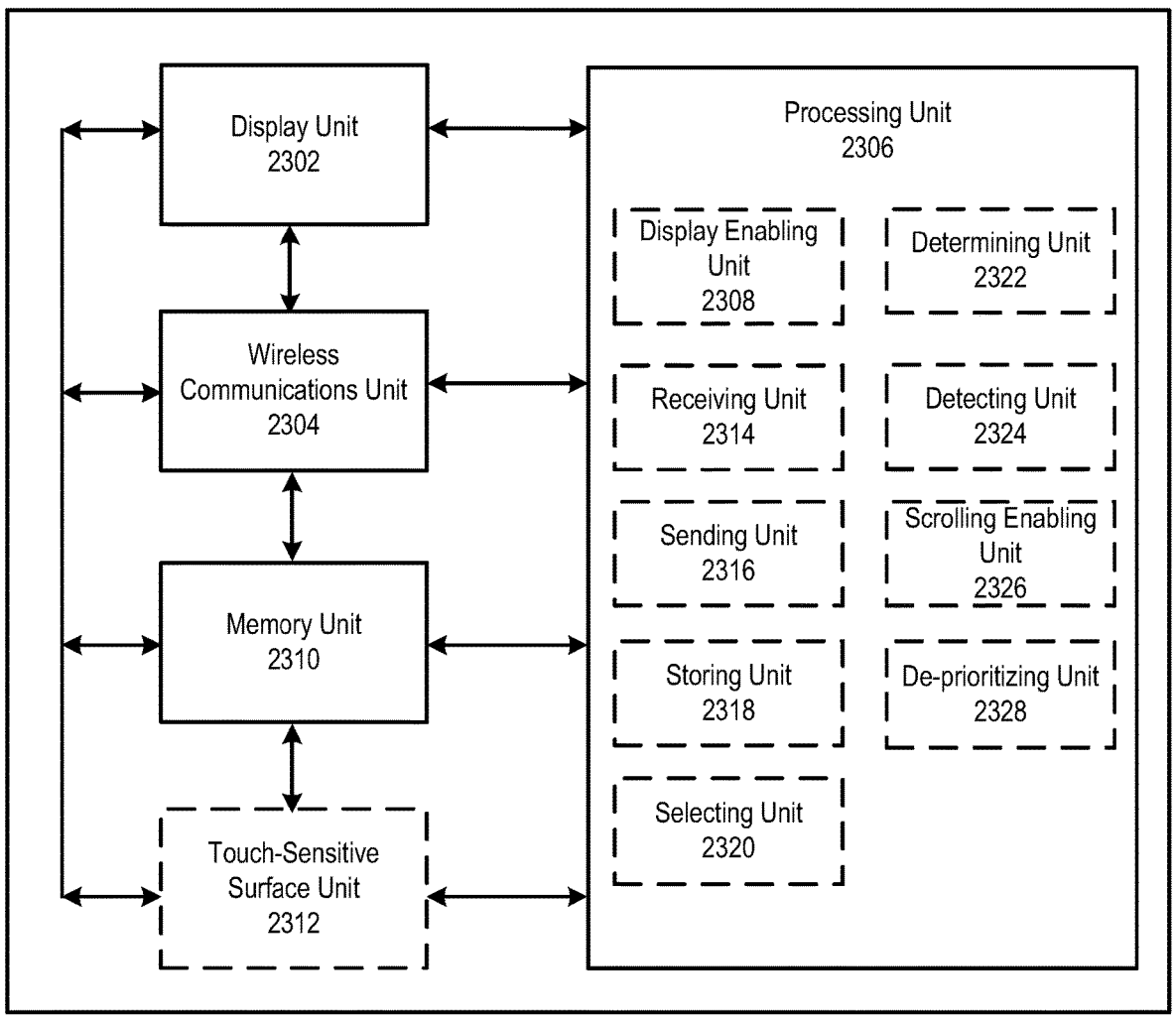
FIG. 23 is a functional block diagram of an electronic device in accordance with some embodiments.

In accordance with some embodiments, FIG. 23 shows an exemplary functional block diagram of an electronic device 2300 configured in accordance with the principles of the various described embodiments. In accordance with some embodiments, the functional blocks of electronic device 2300 are configured to perform the techniques described above. The functional blocks of the device 2300 are, optionally, implemented by hardware, software, or a combination of hardware and software to carry out the principles of the various described examples. It is understood by persons of skill in the art that the functional blocks described in FIG. 23 are, optionally, combined or separated into sub-blocks to implement the principles of the various described examples. Therefore, the description herein optionally supports any possible combination or separation or further definition of the functional blocks described herein.

As shown in FIG. 23, an electronic device 2300 includes a display unit 2302 configured to display a graphic user interface, a wireless communications unit 2304 configured to send and/or receive wireless communications, a memory unit 2310 configured to store data, optionally, a touch-sensitive surface unit 2312 configured to receive contacts, and a processing unit 2306 coupled to the display unit 2302, wireless communications unit 2304, memory unit 2310, and optionally, touch-sensitive surface unit 2312. In some embodiments, the processing unit 2306 includes a display enabling unit 2308, a receiving unit 2314, a sending unit 2316, a storing unit 2318, a selecting unit 2320, a determining unit 2322, a detecting unit 2324, a scrolling enabling unit 2326, and a de-prioritizing unit 2328. In some embodiments, display unit 2302 is a touch-sensitive display unit that serves as touch-sensitive surface unit 2312. In this example, electronic device 2300 is coupled via wireless communication (e.g., using wireless communications unit 2304) to a second electronic device (e.g., device 500 described herein) with a second display unit, a second memory unit, a second processing unit, and an accessing unit configured to provide access to a library of one or more user interfaces for display on the second display unit of the second electronic device.

The processing unit 2306 is configured to enable display (e.g., with display enabling unit 2308), on the display unit (e.g., display unit 2302), of a first user interface screen comprising at least a first user interface preview image, the first user interface preview image representing a first user interface for display on the second display unit of the second electronic device, wherein the first user interface is configured according to a first watch face type and comprises a clock and at least a first complication, wherein the first user interface preview image comprises representations of the first watch face type, the clock, and the at least first complication, and wherein the first user interface is selected (e.g., using selecting unit 2320) based at least in part on one or more criterion selected from the group consisting of: the first user interface is configured according to a watch face type not currently represented in a user interface in the library; the first user interface has a first complication not currently represented in a user interface in the library; and the first user interface has a first complication associated with an application for use on the second electronic device that corresponds with an application installed in the memory unit of device 2300 (e.g., memory unit 2310).

In some embodiments, the processing unit 2306 is configured to enable display (e.g., with display enabling unit 2308), on the display unit (e.g., display unit 2302), of a second user interface preview image, wherein the second user interface preview image is displayed as part of the first user interface screen, wherein the second user interface preview image represents a second user interface for display on the second display unit of the second electronic device, wherein the second user interface is configured according to a second watch face type and comprises a clock and at least a second complication, wherein the second user interface preview image comprises representations of the second watch face type, the clock, and the at least second complication of the second user interface, and wherein the second user interface is independently selected (e.g., using selecting unit 2320) based at least in part on the one or more criterion.

In some embodiments, the second watch face type is different from the first watch face type.

In some embodiments, the second complication is different from the first complication.

In some embodiments, the first user interface is selected (e.g., using selecting unit 2320) based at least in part on a criterion that the first user interface has a complication associated with an application for use on the second electronic device that corresponds with an application currently installed in the memory unit of device 2300 (e.g., memory unit 2310), and wherein the application for use on the second electronic device is not currently installed in the second memory unit of the second electronic device.

In some embodiments, the first user interface is selected (e.g., using selecting unit 2320) based at least in part on a criterion that the first user interface has a complication associated with an application for use on the second electronic device that corresponds with an application currently installed in the memory unit of device 2300 (e.g., memory unit 2310), and wherein the application for use on the second electronic device was installed in the second memory unit of the second electronic device within a first predetermined period of time.

In some embodiments, the first user interface is selected (e.g., using selecting unit 2320) based at least in part on a criterion that the first user interface has a complication associated with an application for use on the second electronic device that corresponds with an application installed in the memory unit of device 2300 (e.g., memory unit 2310) within a second predetermined period of time.

In some embodiments, the first user interface is selected (e.g., using selecting unit 2320) based at least in part on a determination that the first user interface has a complication associated with a designated application.

In some embodiments, the first user interface is selected (e.g., using selecting unit 2320) based at least in part on a determination that the first user interface has a complication associated with an application that is used above a predetermined frequency of use on device 2300.

In some embodiments, the processing unit 2306 is configured to: receive (e.g., using receiving unit 2314) a user input corresponding to a selection of the first user interface preview image; in response to receiving the user input, enable ceasing of the display (e.g., with display enabling unit 2308), on the display unit (e.g., display unit 2302), of the first user interface screen; and in response to receiving the user input, enable display (e.g., with display enabling unit 2308), on the display unit (e.g., display unit 2302), of a second user interface screen, wherein the second user interface screen comprises the first user interface preview image, a list of one or more complications of the first user interface, wherein the list comprises at least the first complication, and a selection affordance for selecting the first user interface.

In some embodiments, the processing unit 2306 is configured to: receive (e.g., using receiving unit 2314) a user input corresponding to a selection of the selection affordance; and, in response to receiving the user input, send (e.g., using sending unit 2316) via the wireless communications unit (e.g., wireless communications unit 2304) instructions to the second electronic device for displaying the first user interface on the second display unit of the second electronic device.

In some embodiments, the processing unit 2306 is configured to: store (e.g., using storing unit 2318) on the memory unit (e.g., memory unit 2310) the first user interface as part of the library of one or more user interfaces for display on the second display unit of the second electronic device.

In some embodiments, the processing unit 2306 is configured to: enable display (e.g., with display enabling unit 2308), on the display unit (e.g., display unit 2302), of an affordance for viewing a user interface from the library as part of the first user interface screen; and, in response to receiving the user input, enable display (e.g., with display enabling unit 2308), on the display unit (e.g., display unit 2302), of an animation depicting a movement of the first user interface preview image toward the affordance for viewing the user interface from the library.

In some embodiments, device 2300 further comprises a touch-sensitive surface unit (e.g., touch-sensitive surface unit 2312), and receiving the user input corresponding to a selection of the first user interface preview image comprises detecting (e.g., using detecting unit 2324) a contact on the touch-sensitive surface unit (e.g., touch-sensitive surface unit 2312) at the first user interface preview image.

In some embodiments, the processing unit 2306 is configured to: in response to receiving the user input, determine (e.g., using determining unit 2322) whether the first user interface represented by the first user interface preview image comprises a complication associated with an application that is not currently installed on the second electronic device; and in accordance with a determination that the first user interface represented by the first user interface preview image comprises a complication associated with an application that is not currently installed on the second electronic device, and in response to receiving the user input, send (e.g., with sending unit 2316) via the wireless communications unit (e.g., wireless communications unit 2304) instructions to the second electronic device for installing the application associated with the complication of the first user interface in the second memory unit of the second electronic device.

In some embodiments, the processing unit 2306 is configured to: in response to receiving the user input, determine (e.g., using determining unit 2322) whether the first user interface represented by the first user interface preview image comprises a complication associated with an application that is not currently installed on the second electronic device; and in accordance with a determination that the first user interface represented by the first user interface preview image comprises a complication associated with an application that is not currently installed on the second electronic device, enable display (e.g., with display enabling unit 2308), on the display unit (e.g., display unit 2302), of a user prompt to install the application associated with the complication of the first user interface in the second memory unit of the second electronic device.

In some embodiments, the instructions for displaying the first user interface on the second display unit of the second electronic device are sent to the second electronic device in accordance with a determination that the first user interface represented by the first user interface preview image comprises a complication associated with an application that is currently installed on the second electronic device.

In some embodiments, device 2300 further comprises a touch-sensitive surface unit (e.g., touch-sensitive surface unit 2312), and the processing unit 2306 is configured to: after displaying the first user interface screen, detect (e.g., with detecting unit 2324) a user swipe on the touch-sensitive surface unit (e.g., touch-sensitive surface unit 2312) at a location of the first user interface preview image; and in response to detecting the swipe, enable scrolling (e.g., with scrolling enabling unit 2326), on the display unit (e.g., display unit 2302), of the first user interface preview image to reveal a third user interface preview image representing a third user interface for display on the second display unit of the second electronic device.

In some embodiments, the processing unit 2306 is configured to: prior to scrolling the first user interface preview image, enable display (e.g., with display enabling unit 2308), on the display unit (e.g., display unit 2302), of a partial view of the third user interface preview image, wherein the scrolling reveals a complete view of the third user interface preview image.

In some embodiments, the first and the second user interfaces are part of a prioritized list of user interfaces, and wherein two or more user interfaces of the list are prioritized at least in part based on the one or more criteria.

In some embodiments, the processing unit 2306 is configured to: de-prioritize (e.g., with de-prioritizing unit 2328) a user interface of the prioritized list, wherein the user interface is de-prioritized based at least in part on one or more criteria selected from the group consisting of: the user interface is already represented in the library; the user interface has a complication that is already represented in a user interface in the library; and the prioritized list comprises a user interface of the same watch face type as the de-prioritized user interface that is adjacent to the de-prioritized user interface in the prioritized list.

In some embodiments, the processing unit 2306 is configured to: enable display (e.g., with display enabling unit 2308), on the display unit (e.g., display unit 2302), of an affordance for viewing additional user interface preview images as part of the first user interface screen; receive (e.g., using receiving unit 2314) a user input corresponding to a selection of the affordance for viewing additional user interface preview images; and in response to receiving the user input, enable ceasing of the display (e.g., with display enabling unit 2308), on the display unit (e.g., display unit 2302), of the first user interface screen; and in response to receiving the user input, enable display (e.g., with display enabling unit 2308), on the display unit (e.g., display unit 2302), of a third user interface screen comprising a plurality of user interface preview images representing a plurality of user interfaces for display on the second display unit of the second electronic device, wherein the plurality of user interfaces comprises a fourth user interface that comprises the first complication, and wherein the fourth user interface is configured according to a watch face type other than the first watch face type.

In some embodiments, the processing unit 2306 is configured to: in response to receiving the user input, enable display (e.g., with display enabling unit 2308), on the display unit (e.g., display unit 2302), of a second plurality of user interface preview images representing a second plurality of user interfaces for display on the second display unit of the second electronic device, wherein the second plurality of user interfaces comprises a fifth user interface that comprises a second complication, wherein the second complication is different from the first complication, and wherein the second plurality of user interface preview images is displayed as part of the third user interface screen.

In some embodiments, the first plurality of user interface preview images are displayed in order according to watch face type, and wherein the second plurality of user interface preview images are displayed in the same order according to watch face type.

In some embodiments, the first complication of the first user interface displays a set of data obtained from an application when displayed on the display of the second electronic device, and wherein the representation of the first complication in the first user interface preview image displays the set of data obtained from the application.

In some embodiments, the first complication of the first user interface displays a set of data obtained from an application when displayed on the display of the second electronic device, and wherein the representation of the first complication in the first user interface preview image displays a placeholder representation of the set of data obtained from the application.

In some embodiments, the processing unit 2306 is configured to: in response to receiving the user input, enable display (e.g., with display enabling unit 2308), on the display unit (e.g., display unit 2302), of a fourth user interface preview image as part of the first user interface screen, wherein the fourth user interface preview image represents a fourth user interface configured according to a fourth watch face type, wherein the fourth watch face type that was installed in the second memory unit of the second electronic device within a third predetermined period of time.

In some embodiments, the processing unit 2306 is configured to: prior to displaying the first user interface screen, select (e.g., with selecting unit 2320) the first watch face type of the first user interface, wherein the first watch face type is selected based at least in part on a criterion that the application with which the first complication of the first user interface is associated is supported for use in the selected first watch face type.

In some embodiments, the first watch face type is selected (e.g., with selecting unit 2320) based at least in part on a criterion that the selected first watch face type is represented in one or more user interfaces that are displayed on the second display unit of the second electronic device above a predetermined frequency of display.

In some embodiments, the first watch face type is selected (e.g., with selecting unit 2320) based at least in part on a criterion that the selected first watch face type is represented in one or more user interfaces that were displayed on the second display unit of the second electronic device within a fourth predetermined period of time.

In some embodiments, the first watch face type is selected (e.g., with selecting unit 2320) based at least in part on a criterion that the library comprises a user interface configured according to the first watch face type that comprises a complication that has been edited by the user.

In some embodiments, the first watch face type is selected (e.g., with selecting unit 2320) based at least in part on a criterion that the library does not already comprise a user interface that is configured according to the first watch face type and further comprises the first complication.

In some embodiments, selecting the first watch face type (e.g., with selecting unit 2320) further comprises selecting a color of the first watch face type, and wherein the color of the first watch face type is selected (e.g., with selecting unit 2320) based at least in part on a designated color of the application associated with the first complication.

In some embodiments, the processing unit 2306 is configured to: prior to displaying the first user interface screen, determine (e.g., with determining unit 2322) whether the first complication of the first user interface is associated with an application that supports a first and a second complication configuration, wherein the first and the second complication configurations are different; and in accordance with a determination that the first complication of the first user interface is associated with an application that supports the first and the second complication configurations, enable display (e.g., with display enabling unit 2308), on the display unit (e.g., display unit 2302), as part of the first user interface preview image, of a first representation of the complication according to the first complication configuration and a second representation of the complication according to the second complication configuration; and in accordance with a determination that the first complication of the first user interface is associated with an application that does not support a second complication configuration, enable display (e.g., with display enabling unit 2308), on the display unit (e.g., display unit 2302), as part of the first user interface preview image, of the first representation of the complication according to the first complication configuration.

The operations described above with reference to FIGS. 20A-20I are, optionally, implemented by components depicted in FIG. 1A, 1B, 2, 3, 4A, 4B, 5A, 5B, or 6A-19. For example, displaying operation 2004 and displaying operation 2006 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIG. 1A, 1B, 2, 3, 4A, 4B, 5A, 5B, or 6A-19.

Figure 24:
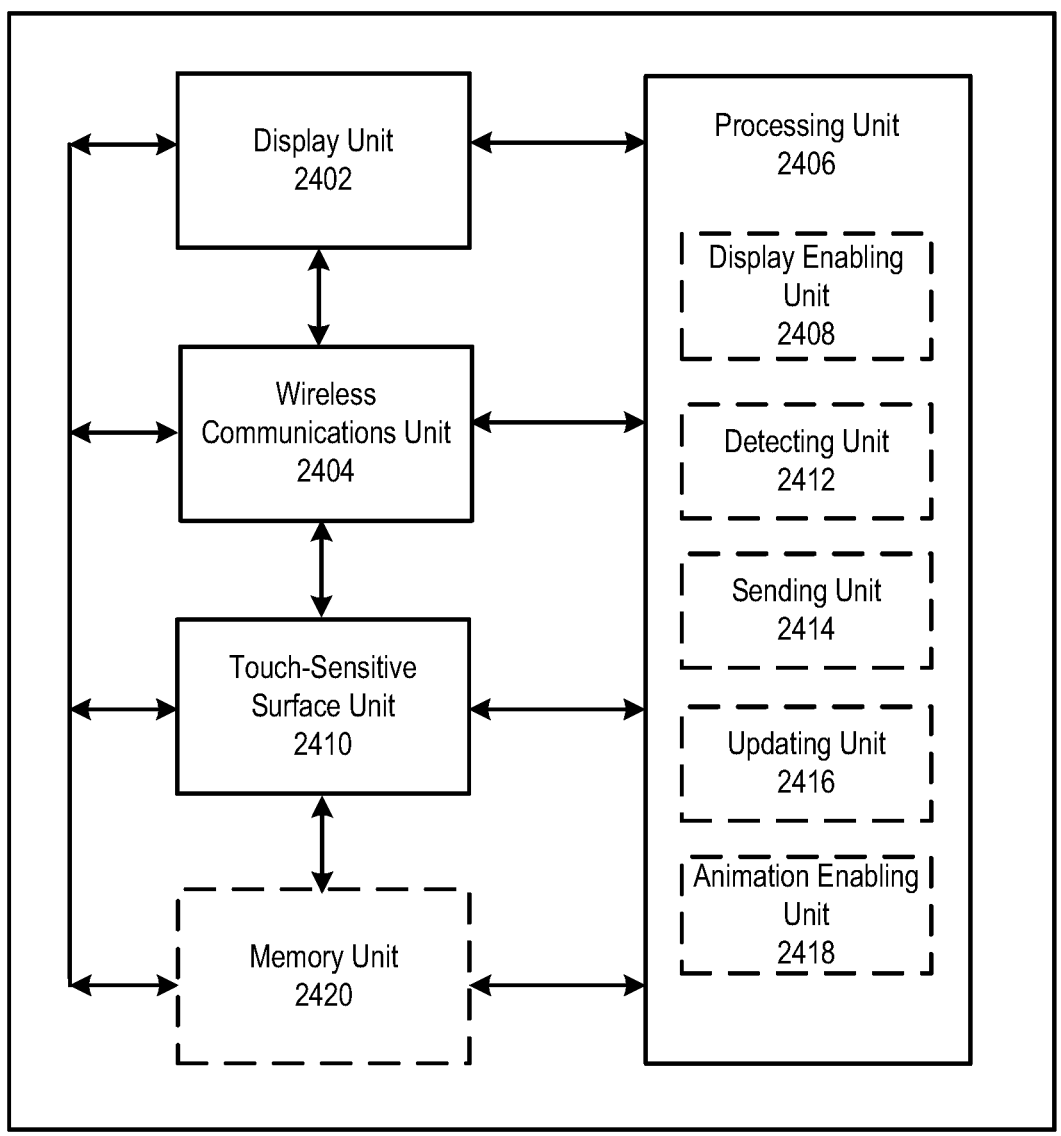
FIG. 24 is a functional block diagram of an electronic device in accordance with some embodiments.

In accordance with some embodiments, FIG. 24 shows an exemplary functional block diagram of an electronic device 2400 configured in accordance with the principles of the various described embodiments. In accordance with some embodiments, the functional blocks of electronic device 2400 are configured to perform the techniques described above. The functional blocks of the device 2400 are, optionally, implemented by hardware, software, or a combination of hardware and software to carry out the principles of the various described examples. It is understood by persons of skill in the art that the functional blocks described in FIG. 24 are, optionally, combined or separated into sub-blocks to implement the principles of the various described examples. Therefore, the description herein optionally supports any possible combination or separation or further definition of the functional blocks described herein.

As shown in FIG. 24, an electronic device 2400 includes a display unit 2402 configured to display a graphic user interface, a wireless communications unit 2404 configured to send and/or receive wireless communications, a touch-sensitive surface unit 2410 configured to receive contacts, optionally, a memory unit 2420 configured to store data, and a processing unit 2406 coupled to the display unit 2402, wireless communications unit 2404, touch-sensitive surface unit 2410, and optionally, memory unit 2420. In some embodiments, the processing unit 2406 includes a display enabling unit 2408, a detecting unit 2412, a sending unit 2414, an updating unit 2416, and an animation enabling unit 2418. In some embodiments, display unit 2402 is a touch-sensitive display unit that serves as touch-sensitive surface unit 2410. In this example, electronic device 2400 is coupled via wireless communication (e.g., using wireless communications unit 2404) to a second electronic device (e.g., device 500 described herein) with a second display unit, a second memory unit, a second processing unit, and an accessing unit configured to provide access to a library of one or more user interfaces for display on the second display unit of the second electronic device.

The processing unit 2406 is configured to enable display (e.g., with display enabling unit 2408), on the display unit (e.g., display unit 2402), of a first user interface screen comprising a first user interface preview image, the first user interface preview image representing a first user interface for display on the second display unit of the second electronic device, wherein the first user interface is configured according to a first watch face type and comprises a clock and at least a first complication, wherein the first user interface preview image comprises representations of the first watch face type, the clock, and the at least first complication, and wherein the first user interface is not already in the library of user interfaces for display on the second display unit of the second electronic device; detect (e.g., with detecting unit 2412) a first contact on the touch-sensitive surface unit (e.g., touch-sensitive surface unit 2410) at the displayed first user interface preview image; in response to detecting the first contact, enable ceasing of the display (e.g., with display enabling unit 2408), on the display unit (e.g., display unit 2402), of the first user interface screen; in response to detecting the first contact, enable display (e.g., with display enabling unit 2408), on the display unit (e.g., display unit 2402), of a second user interface screen comprising: the first user interface preview image; a list of one or more complications of the first user interface, wherein the list comprises at least the first complication; a selection affordance for selecting the first user interface; and a second user interface preview image, wherein the second user interface preview image represents a second user interface, wherein the second user interface is configured according to a second watch face type and comprises a clock and the first complication, and wherein the second watch face type is different from the first watch face type; detect (e.g., with detecting unit 2412) a second contact on the touch-sensitive surface unit (e.g., touch-sensitive surface unit 2410) at the selection affordance; and in response to detecting the second contact, send (e.g., with sending unit 2414) via the wireless communications unit (e.g., wireless communications unit 2404) instructions to the second electronic device for displaying the first user interface on the second display unit of the second electronic device.

In some embodiments, the second user interface screen further comprises: a first editing affordance, wherein the first editing affordance indicates a first option for an editable aspect of the first user interface; and a second editing affordance, wherein the second editing affordance indicates a second option for the editable aspect of the first user interface.

In some embodiments, the editable aspect is selected from the group consisting of a color of the first user interface, a density of the first user interface, a background of the first user interface, and a font of the first user interface.

In some embodiments, the first complication is a stopwatch affordance, wherein the editable aspect is a stopwatch timescale.

In some embodiments, the first complication is an affordance that is associated with an application.

In some embodiments, the editable aspect is the application associated with the first affordance.

In some embodiments, the affordance displays a set of information obtained from the application, and wherein the editable aspect is the set of information that is obtained from the application and displayed.

In some embodiments, the second user interface screen further comprises: a description of the first watch face type of the first user interface.

In some embodiments, the processing unit 2406 is further configured to: detect (e.g., with detecting unit 2412) a third contact on the touch-sensitive surface unit (e.g., touch-sensitive surface unit 2410) at the second user interface preview image; in response to detecting the third contact, enable ceasing of the display (e.g., with display enabling unit 2408), on the display unit (e.g., display unit 2402), of the second user interface screen; in response to detecting the third contact, enable display (e.g., with display enabling unit 2408), on the display unit (e.g., display unit 2402), of a third user interface screen comprising: the second user interface preview image; a list of one or more complications of the second user interface, wherein the list comprises at least the first complication; and a selection affordance for selecting the second user interface.

In some embodiments, the first option is a currently selected option for the editable aspect of the first user interface, wherein the first user interface preview image represents the first option for the editable aspect, and the processing unit 2406 is further configured to: detect (e.g., with detecting unit 2412) a fourth contact on the touch-sensitive surface unit (e.g., touch-sensitive surface unit 2410) at the second editing affordance; and in response to detecting the fourth contact, enable update (e.g., with updating unit 2416), on the display unit (e.g., display unit 2402), of the first user interface preview image to represent the second option for the editable aspect.

In some embodiments, updating the first user interface preview image comprises animating a transition from the first option of the editable aspect to the second option.

In some embodiments, the processing unit 2406 is further configured to: in response to detecting the second contact at the affordance for selecting the first user interface, send (e.g., with sending unit 2414) via the wireless communications unit (e.g., wireless communications unit 2404) instructions to the second electronic device to add the first user interface to the library.

In some embodiments, the second user interface screen further comprises an affordance for viewing (e.g., on display unit 2402) the library of user interfaces for display on the second display unit of the second electronic device, and the processing unit 2406 is further configured to: enable animation (e.g., with animation enabling unit 2418), on the display unit (e.g., display unit 2402), of the first user interface preview image to translate on-screen toward the viewing affordance in response to detecting the second contact at the selection affordance.

In some embodiments, the processing unit 2406 is further configured to: detect (e.g., with detecting unit 2412) a fifth contact on the touch-sensitive surface unit (e.g., touch-sensitive surface unit 2410) at the viewing affordance after adding the first user interface to the stored library of user interfaces for display on the second electronic device; in response to detecting the fifth contact, enable ceasing of the display (e.g., with display enabling unit 2408), on the display unit (e.g., display unit 2402), of the second user interface screen; and in response to detecting the fifth contact, enable display (e.g., with display enabling unit 2408), on the display unit (e.g., display unit 2402), of a fourth user interface screen comprising: the first user interface preview image; and a fourth user interface preview image, wherein the fourth user interface preview image represents a fourth user interface that is part of the library of user interfaces for display on the second display unit of the second electronic device.

In some embodiments, the processing unit 2406 is further configured to: enable visually distinguishing (e.g., with display enabling unit 2408), on the display unit (e.g., display unit 2402), of the first user interface preview image on the fourth user interface screen to indicate that the first user interface is newly added to the library.

In some embodiments, the processing unit 2406 is further configured to: enable display (e.g., with display enabling unit 2408), on the display unit (e.g., display unit 2402), of a plurality of user interface preview images representing a plurality of user interfaces for display on the second display unit of the second electronic device, wherein the plurality of user interfaces comprises two or more user interfaces that represent the same watch face type.

In some embodiments, the library of one or more user interfaces for display on the second electronic device is stored in the second memory unit of the second electronic device.

In some embodiments, the library of one or more user interfaces for display on the second electronic device is stored the memory unit (e.g., memory unit 2420) of device 2400.

The operations described above with reference to FIG. 24 are, optionally, implemented by components depicted in FIG. 1A, 1B, 2, 3, 4A, 4B, 5A, 5B, or 21A-21D. For example, displaying operation 2104, detecting operation 2106, and ceasing/displaying operation 2108 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIG. 1A, 1B, 2, 3, 4A, 4B, 5A, 5B, or 6A-19.

Figure 25:
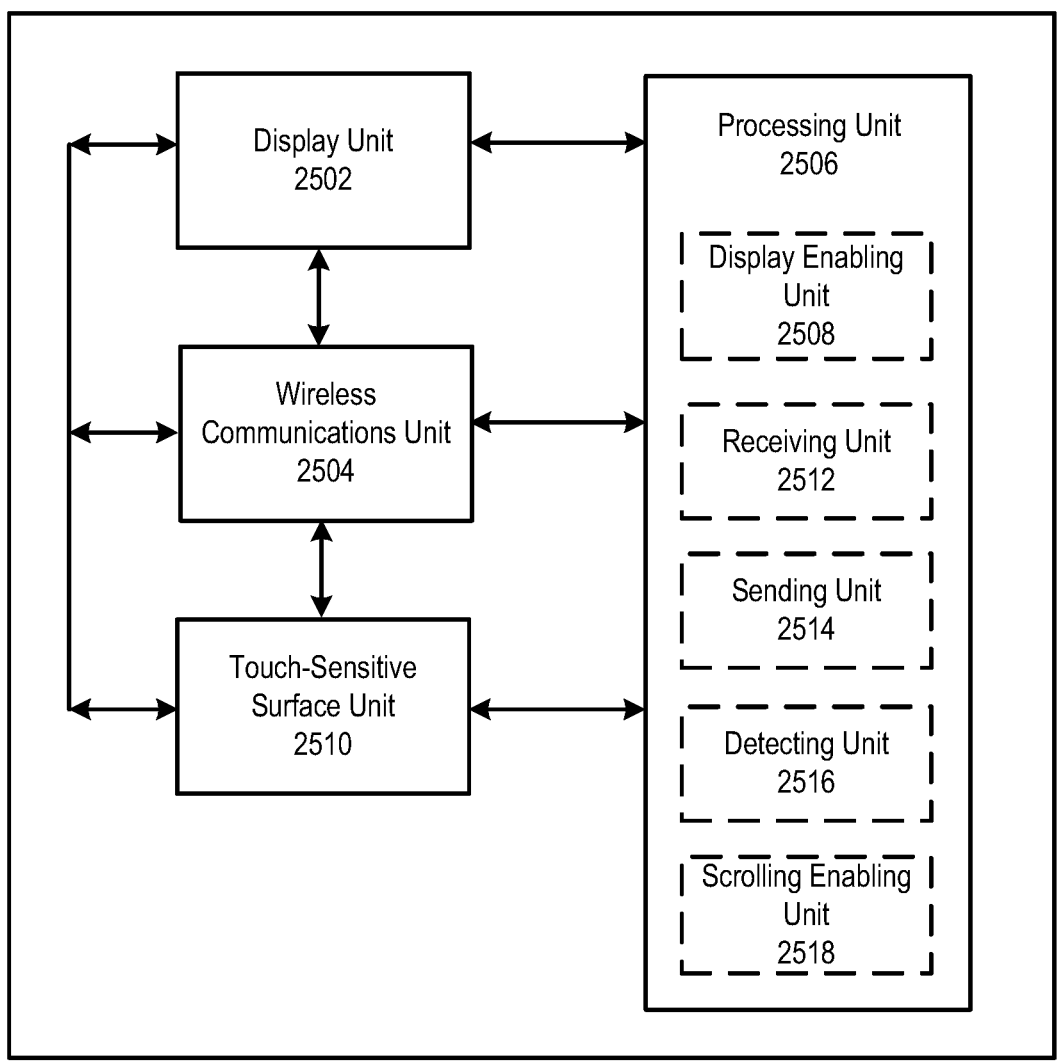
FIG. 25 is a functional block diagram of an electronic device in accordance with some embodiments.

In accordance with some embodiments, FIG. 25 shows an exemplary functional block diagram of an electronic device 2500 configured in accordance with the principles of the various described embodiments. In accordance with some embodiments, the functional blocks of electronic device 2500 are configured to perform the techniques described above. The functional blocks of the device 2500 are, optionally, implemented by hardware, software, or a combination of hardware and software to carry out the principles of the various described examples. It is understood by persons of skill in the art that the functional blocks described in FIG. 25 are, optionally, combined or separated into sub-blocks to implement the principles of the various described examples. Therefore, the description herein optionally supports any possible combination or separation or further definition of the functional blocks described herein.

As shown in FIG. 25, an electronic device 2500 includes a display unit 2502 configured to display a graphic user interface, a wireless communications unit 2504 configured to send and/or receive wireless communications, a touch-sensitive surface unit 2510 configured to receive contacts, and a processing unit 2506 coupled to the display unit 2502, wireless communications unit 2504, and touch-sensitive surface unit 2510. In some embodiments, the processing unit 2506 includes a display enabling unit 2508, a receiving unit 2512, a sending unit 2514, a detecting unit 2516, and a scrolling enabling unit 2518. In some embodiments, display unit 2502 is a touch-sensitive display unit that serves as touch-sensitive surface unit 2510. In this example, electronic device 2500 is coupled via wireless communication (e.g., using wireless communications unit 2504) to a second electronic device (e.g., device 500 described herein) with a second display unit, a second memory unit, a second processing unit, and an accessing unit configured to provide access to a library of one or more user interfaces for display on the second display unit of the second electronic device.

The processing unit 2506 is configured to enable display (e.g., with display enabling unit 2508), on the display unit (e.g., display unit 2502), of a first user interface screen comprising at least a first and a second user interface preview image, the first and the second user interface preview images representing a first and a second user interface for display on the second display unit of the second electronic device, wherein the first and the second user interfaces are configured according to a watch face type and comprise a clock, and wherein the first and the second user interfaces are part of the stored library of user interfaces for display on the second display unit of the second electronic device; receive (e.g., with receiving unit 2512) a first user input corresponding to a user request to reorder the stored library of user interfaces; in response to receiving the first user input, enable ceasing of the display (e.g., with display enabling unit 2508), on the display unit (e.g., display unit 2502), of the first user interface screen; in response to receiving the first user input, enable display (e.g., with display enabling unit 2508), on the display unit (e.g., display unit 2502), of a second user interface screen, wherein the second user interface screen comprises the first and the second user interface preview images, and wherein the relative positions of the first and the second user interface preview images on the second user interface screen reflect an order of the first and the second user interfaces in the stored library; receive (e.g., with receiving unit 2512) a second user input corresponding to a user request to re-order the second user interface before the first user interface in the stored library; and in response to receiving the second user input, send (e.g., with sending unit 2514) via the wireless communications unit (e.g., wireless communications unit 2504) instructions to the second electronic device for re-ordering the second user interface before the first user interface in the stored library.

In some embodiments, the processing unit 2506 is further configured to: in response to receiving the second user input, enable re-display (e.g., with display enabling unit 2508), on the display unit (e.g., display unit 2502), of the second user interface screen, wherein the relative positions of the first user interface preview image and the second user interface preview image on the re-displayed second user interface screen reflect the re-ordering of the second user interface before the first user interface in the stored library.

In some embodiments, the processing unit 2506 is further configured to: enable display (e.g., with display enabling unit 2508), on the display unit (e.g., display unit 2502), of an affordance for editing the stored library of user interfaces as part of the first user interface screen, and receiving the first user input comprises detecting (e.g., with detecting unit 2516) a contact on the touch-sensitive surface unit (e.g., touch-sensitive surface unit 2510) at the displayed affordance for editing the stored library of user interfaces.

In some embodiments, the processing unit 2506 is further configured to: enable display (e.g., with display enabling unit 2508), on the display unit (e.g., display unit 2502), of an affordance for completing editing of the stored library of user interfaces as part of the second user interface screen; detect (e.g., with detecting unit 2516) a contact on the touch-sensitive surface unit (e.g., touch-sensitive surface unit 2510) at the affordance for completing editing of the stored library of user interfaces; in response to detecting the contact at the affordance for completing editing of the stored library of user interfaces, enable ceasing of the display (e.g., with display enabling unit 2508), on the display unit (e.g., display unit 2502), of the second user interface screen; and in response to detecting the contact at the affordance for completing editing of the stored library of user interfaces, enable re-display (e.g., with display enabling unit 2508), on the display unit (e.g., display unit 2502), of the first user interface screen, wherein the position of the second user interface preview image on the first user interface screen has shifted relative to the position of the first user interface preview image.

In some embodiments, the processing unit 2506 is further configured to: enable display (e.g., with display enabling unit 2508), on the display unit (e.g., display unit 2502), of a re-ordering affordance in association with the second user interface preview image as part of the second user interface screen.

In some embodiments, the processing unit 2506 is further configured to: detect (e.g., with detecting unit 2516) a contact at a first position on the touch-sensitive surface unit (e.g., touch-sensitive surface unit 2510) at the re-ordering affordance; while continuing to detect the contact, detect (e.g., with detecting unit 2516) movement of the contact from the first position to a second position on the touch-sensitive surface unit without a break in the contact on the touch-sensitive surface unit (e.g., touch-sensitive surface unit 2510), wherein the second position on the (e.g., touch-sensitive surface unit 2510) is on an opposite side of the displayed first user interface preview image relative to the first position; enable translating (e.g., with display enabling unit 2508), on the display unit (e.g., display unit 2502), of the second user interface preview image on-screen in a direction of the movement of the contact in response to detecting the contact at the second position; and enable translating (e.g., with display enabling unit 2508), on the display unit (e.g., display unit 2502), of the first user interface preview image on-screen in a direction opposite the movement of the contact in response to detecting the contact at the second position, wherein after the translation of the first and the second user interface preview images, the relative positions of the first and the second user interface preview images reflect the re-ordering of the second user interface before the first user interface in the stored library.

In some embodiments, the processing unit 2506 is further configured to: enable display (e.g., with display enabling unit 2508), on the display unit (e.g., display unit 2502), of a delete affordance in association with the first user interface preview image as part of the second user interface screen.

In some embodiments, the processing unit 2506 is further configured to: enable display (e.g., with display enabling unit 2508), on the display unit (e.g., display unit 2502), of an affordance for revealing an edit option, the affordance for revealing an edit option being displayed in association with the first user interface preview image as part of the second user interface screen; detect (e.g., with detecting unit 2516) a contact on the touch-sensitive surface unit (e.g., touch-sensitive surface unit 2510) at the affordance for revealing an edit option; and in response to detecting the contact at the affordance for revealing an edit option, enable display (e.g., with display enabling unit 2508), on the display unit (e.g., display unit 2502), of a delete affordance in association with the first user interface preview image as part of the second user interface screen.

In some embodiments, displaying the delete affordance comprises translating the first user interface preview image on-screen.

In some embodiments, the processing unit 2506 is further configured to: after displaying the delete affordance as part of the second user interface screen, detect (e.g., with detecting unit 2516) a contact on the touch-sensitive surface unit (e.g., touch-sensitive surface unit 2510) at the delete affordance displayed in association with the first user interface preview image; in response to detecting the contact at the delete affordance, enable removal (e.g., with display enabling unit 2508), on the display unit (e.g., display unit 2502), of the displayed first user interface preview image from the second user interface screen; and in response to detecting the contact at the delete affordance, send (e.g., with sending unit 2514) via the wireless communications unit (e.g., wireless communications unit 2504) instructions to the second electronic device for removing the first user interface from the stored library.

In some embodiments, the processing unit 2506 is further configured to: enable display (e.g., with display enabling unit 2508), on the display unit (e.g., display unit 2502), of an affordance for completing editing of the stored library of user interfaces as part of the second user interface screen; after detecting the contact at the delete affordance, detect (e.g., with detecting unit 2516) a contact on the touch-sensitive surface unit (e.g., touch-sensitive surface unit 2510) at the affordance for completing editing of the stored library of user interfaces; and in response to detecting the contact at the affordance for completing editing of the stored library of user interfaces: enable ceasing of the display (e.g., with display enabling unit 2508), on the display unit (e.g., display unit 2502), of the second user interface screen; enable re-display (e.g., with display enabling unit 2508), on the display unit (e.g., display unit 2502), of the first user interface screen, wherein the first user interface screen comprises the first and the second user interface preview images; enable animation (e.g., with display enabling unit 2508), on the display unit (e.g., display unit 2502), of the first user interface preview image to disappear from the display unit; and after animating the first user interface preview image to disappear from the display, enable translation (e.g., with display enabling unit 2508), on the display unit (e.g., display unit 2502), of the second user interface preview image on-screen to occupy the position of the first user interface preview image before the animation.

In some embodiments, the processing unit 2506 is further configured to: detect (e.g., with detecting unit 2516) a swipe on the touch-sensitive surface unit (e.g., touch-sensitive surface unit 2510) at the first or the second user interface preview image; and in response to detecting the swipe, enable scrolling (e.g., with scrolling enabling unit 2518), on the display unit (e.g., display unit 2502), of the first and the second user interface preview images to reveal a third user interface preview image, wherein the third user interface preview image represents a third user interface for display on the second display unit of the second electronic device, and wherein the third user interface is part of the stored library.

In some embodiments, the processing unit 2506 is further configured to: prior to revealing the third user interface preview image, enable display (e.g., with display enabling unit 2508), on the display unit (e.g., display unit 2502), of a partial view of the third user interface preview image as part of the first user interface screen.

In some embodiments, the processing unit 2506 is further configured to: enable display (e.g., with display enabling unit 2508), on the display unit (e.g., display unit 2502), of text indications of the watch face types of the first and the second user interfaces as part of the second user interface screen, wherein the indications are displayed in association with the first and the second user interface preview images.

The operations described above with reference to FIGS. 22A-22F are, optionally, implemented by components depicted in FIG. 1A, 1B, 2, 3, 4A, 4B, 5A, 5B, or 6A-19. For example, displaying operation 2204, receiving operation 2206, and ceasing/displaying operation 2208 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIG. 1A, 1B, 2, 3, 4A, 4B, 5A, 5B, or 6A-19.

The foregoing description, for purpose of explanation, has been described with reference to specific embodiments. However, the illustrative discussions above are not intended to be exhaustive or to limit the scope of the disclosure to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the appended claims.

What is claimed is:

1. A first electronic device, comprising:
a display;
one or more processors; and
memory storing one or more programs configured to be executed by the one or more processors, wherein the first electronic device is coupled via wireless communication to a second electronic device with a display, one or more processors, a memory, and access to a library of one or more user interfaces for display on the second electronic device, the one or more programs including instructions for:
displaying, on the display of the first electronic device, a first user interface screen comprising at least a first user interface preview image and a second user interface preview image, the first user interface preview image and the second user interface preview image representing a first and a second user interfaces for display on the second electronic device, wherein the first user interface the second user interface are configured according to a watch face type and comprise an indication of time, and wherein the first user interface and the second user interface are part of a library of user interfaces associated with the second electronic device;
while editing the library of user interfaces, receiving an input corresponding to a request to delete the second user interface from the library; and
in response to receiving the input corresponding to the request to delete the second user interface from the library, sending instructions to the second electronic device to delete the second user interface from the library.

2. The first electronic device of claim 1, the one or more programs including instructions for:
in response to receiving the input corresponding to the request to delete the second user interface, displaying a second user interface screen, wherein the second user interface screen includes the first user interface preview image and does not include the second user interface preview image.

3. The first electronic device of claim 1, the one or more programs including instructions for:
while displaying the first user interface and prior to editing the library of user interfaces, detecting a first input corresponding to a request to edit the library of user interfaces; and
in response to detecting the first input:
ceasing to display the first user interface screen; and
displaying a second user interface screen to edit the library of user interfaces, wherein the second user interface screen comprises the first and the second user interface preview images.

4. The first electronic device of claim 3, wherein the first user interface screen includes an affordance for editing the library of user interfaces, and wherein detecting the first input comprises detecting an input at the affordance for editing the library of user interfaces.

5. The first electronic device of claim 1, the one or more programs including instructions for:
while editing the library of user interfaces, displaying an affordance for completing editing of the library of user interfaces;
after receiving the input corresponding to the request to delete the second user interface, detecting an input on the display at the affordance for completing editing of the library of user interfaces; and
in response to detecting the input at the affordance for completing editing of the library of user interfaces, displaying the first user interface screen, wherein the first user interface screen includes the first user interface preview image and does not include the second user interface preview image.

6. The first electronic device of claim 1, wherein the input corresponding to the request to delete the second user interface from the library corresponds to a location of the second user interface preview image.

7. The first electronic device of claim 1, the one or more programs including instructions for:
prior to detecting the input corresponding to the request to delete the second user interface from the library and while editing the library of user interfaces, detecting a third input corresponding to a location of the second user interface preview image; and
in response to detecting the third input corresponding to the location of the second user interface preview image:
displaying, on the display, a delete graphical object for deleting the second user interface.

8. The first electronic device of claim 7, the one or more programs including instructions for:
in response to detecting the third input corresponding to the location of the second user interface preview image:
translating, on the display, the second user interface preview image in a first direction.

9. The first electronic device of claim 7, wherein the input corresponding to the request to delete the second user interface from the library corresponds to the delete graphical object.

10. The first electronic device of claim 9, the one or more programs including instructions for:
in response to receiving the input corresponding to the request to delete the second user interface from the library, ceasing displaying the delete graphical object.

11. A method, comprising:
at a first electronic device with a display, one or more processors, and memory, wherein the first electronic device is coupled via wireless communication to a second electronic device with a display, one or more processors, and memory, and wherein a library of two or more user interfaces for display on the second electronic device is stored in the memory of the second electronic device:
displaying, on the display of the first electronic device, a first user interface screen comprising at least a first user interface preview image and a second user interface preview image, the first user interface preview image and the second user interface preview image representing a first and a second user interfaces for display on the second electronic device, wherein the first user interface the second user interface are configured according to a watch face type and comprise an indication of time, and wherein the first user interface and the second user interface are part of a library of user interfaces associated with the second electronic device;
while editing the library of user interfaces, receiving an input corresponding to a request to delete the second user interface from the library; and
in response to receiving the input corresponding to the request to delete the second user interface from the library, sending instructions to the second electronic device to delete the second user interface from the library.

12. A non-transitory computer-readable storage medium comprising one or more programs configured to be executed by one or more processors of a first electronic device with a display, the one or more processors, and memory, wherein the first electronic device is coupled via wireless communication to a second electronic device with a display, one or more processors, a memory, and access to a library of one or more user interfaces for display on the second electronic device, the one or more programs including instructions for:
displaying, on the display of the first electronic device, a first user interface screen comprising at least a first user interface preview image and a second user interface preview image, the first user interface preview image and the second user interface preview image representing a first and a second user interfaces for display on the second electronic device, wherein the first user interface the second user interface are configured according to a watch face type and comprise an indication of time, and wherein the first user interface and the second user interface are part of a library of user interfaces associated with the second electronic device;
while editing the library of user interfaces, receiving an input corresponding to a request to delete the second user interface from the library; and
in response to receiving the input corresponding to the request to delete the second user interface from the library, sending instructions to the second electronic device to delete the second user interface from the library.

13. The method of claim 11, further comprising:
in response to receiving the input corresponding to the request to delete the second user interface, displaying a second user interface screen, wherein the second user interface screen includes the first user interface preview image and does not include the second user interface preview image.

14. The method of claim 11, further comprising:
while displaying the first user interface and prior to editing the library of user interfaces, detecting a first input corresponding to a request to edit the library of user interfaces; and
in response to detecting the first input:
ceasing to display the first user interface screen; and
displaying a second user interface screen to edit the library of user interfaces, wherein the second user interface screen comprises the first and the second user interface preview images.

15. The method of claim 14, wherein the first user interface screen includes an affordance for editing the library of user interfaces, and wherein detecting the first input comprises detecting an input at the affordance for editing the library of user interfaces.

16. The method of claim 11, further comprising:
while editing the library of user interfaces, displaying an affordance for completing editing of the library of user interfaces;
after receiving the input corresponding to the request to delete the second user interface, detecting an input on the display at the affordance for completing editing of the library of user interfaces; and
in response to detecting the input at the affordance for completing editing of the library of user interfaces, displaying the first user interface screen, wherein the first user interface screen includes the first user interface preview image and does not include the second user interface preview image.

17. The method of claim 11, wherein the input corresponding to the request to delete the second user interface from the library corresponds to a location of the second user interface preview image.

18. The method of claim 11, further comprising:
prior to detecting the input corresponding to the request to delete the second user interface from the library and while editing the library of user interfaces, detecting a third input corresponding to a location of the second user interface preview image; and in response to detecting the third input corresponding to the location of the second user interface preview image:
displaying, on the display, a delete graphical object for deleting the second user interface.

19. The method of claim 18, further comprising:
in response to detecting the third input corresponding to the location of the second user interface preview image:
translating, on the display, the second user interface preview image in a first direction.

20. The method of claim 18, wherein the input corresponding to the request to delete the second user interface from the library corresponds to the delete graphical object.

21. The method of claim 20, further comprising:
in response to receiving the input corresponding to the request to delete the second user interface from the library, ceasing displaying the delete graphical object.

22. The non-transitory computer-readable storage medium of claim 12, the one or more programs including instructions for:
in response to receiving the input corresponding to the request to delete the second user interface, displaying a second user interface screen, wherein the second user interface screen includes the first user interface preview image and does not include the second user interface preview image.

23. The non-transitory computer-readable storage medium of claim 12, the one or more programs including instructions for:
while displaying the first user interface and prior to editing the library of user interfaces, detecting a first input corresponding to a request to edit the library of user interfaces; and
in response to detecting the first input:
ceasing to display the first user interface screen; and
displaying a second user interface screen to edit the library of user interfaces, wherein the second user interface screen comprises the first and the second user interface preview images.

24. The non-transitory computer-readable storage medium of claim 23, wherein the first user interface screen includes an affordance for editing the library of user interfaces, and wherein detecting the first input comprises detecting an input at the affordance for editing the library of user interfaces.

25. The non-transitory computer-readable storage medium of claim 12, the one or more programs including instructions for:

while editing the library of user interfaces, displaying an affordance for completing editing of the library of user interfaces;
after receiving the input corresponding to the request to delete the second user interface, detecting an input on the display at the affordance for completing editing of the library of user interfaces; and
in response to detecting the input at the affordance for completing editing of the library of user interfaces, displaying the first user interface screen, wherein the first user interface screen includes the first user interface preview image and does not include the second user interface preview image.

26. The non-transitory computer-readable storage medium of claim 12, wherein the input corresponding to the request to delete the second user interface from the library corresponds to a location of the second user interface preview image.

27. The non-transitory computer-readable storage medium of claim 12, the one or more programs including instructions for:
prior to detecting the input corresponding to the request to delete the second user interface from the library and while editing the library of user interfaces, detecting a third input corresponding to a location of the second user interface preview image; and
in response to detecting the third input corresponding to the location of the second user interface preview image:
displaying, on the display, a delete graphical object for deleting the second user interface.

28. The non-transitory computer-readable storage medium of claim 27, the one or more programs including instructions for:
in response to detecting the third input corresponding to the location of the second user interface preview image:
translating, on the display, the second user interface preview image in a first direction.

29. The non-transitory computer-readable storage medium of claim 27, wherein the input corresponding to the request to delete the second user interface from the library corresponds to the delete graphical object.

30. The non-transitory computer-readable storage medium of claim 29, the one or more programs including instructions for:
in response to receiving the input corresponding to the request to delete the second user interface from the library, ceasing displaying the delete graphical object.

* * * * *